United States Patent [19]
Ueda et al.

[11] Patent Number: 6,049,677
[45] Date of Patent: Apr. 11, 2000

[54] CAMERA HAVING MAGNETIC SIGNAL REPRODUCING CIRCUIT WITH ADJUSTABLE GAIN AMPLIFIER

[75] Inventors: Toshiharu Ueda, Yokohama; Chikara Aoshima, Zama; Kazuhiro Izukawa, Misato, all of Japan

[73] Assignee: Canon Kabushiki Kaisha, Tokyo, Japan

[21] Appl. No.: 08/350,704

[22] Filed: Dec. 7, 1994

Related U.S. Application Data

[63] Continuation of application No. 07/834,640, Feb. 12, 1992, abandoned.

[30] Foreign Application Priority Data

| Feb. 14, 1991 | [JP] | Japan | 3-040846 |
| Feb. 14, 1991 | [JP] | Japan | 3-040847 |
| Feb. 14, 1991 | [JP] | Japan | 3-040848 |
| Feb. 14, 1991 | [JP] | Japan | 3-040849 |
| Apr. 12, 1991 | [JP] | Japan | 3-106367 |
| Jul. 19, 1991 | [JP] | Japan | 3-203648 |
| Jul. 19, 1991 | [JP] | Japan | 3-203657 |
| Jul. 19, 1991 | [JP] | Japan | 3-203658 |
| Jul. 19, 1991 | [JP] | Japan | 3-203659 |
| Jul. 29, 1991 | [JP] | Japan | 3-210390 |
| Jul. 31, 1991 | [JP] | Japan | 3-213026 |
| Jan. 6, 1992 | [JP] | Japan | 4-018132 |
| Jan. 24, 1992 | [JP] | Japan | 4-032874 |

[51] Int. Cl.$^7$ ............................................ G03B 17/24
[52] U.S. Cl. ............................................ 396/319
[58] Field of Search ........................ 354/21, 75, 76, 354/105, 106; 360/1, 3, 32, 46, 67, 68, 90; 396/310, 319, 320

[56] References Cited

U.S. PATENT DOCUMENTS

| 4,326,224 | 4/1982 | Kegure et al. | 360/68 X |
| 4,834,306 | 5/1989 | Robertson et al. | 242/71.1 |
| 4,965,627 | 10/1990 | Robison | 355/40 |
| 4,980,710 | 12/1990 | Harvey | 354/173.1 |
| 5,172,280 | 12/1992 | Quintus et al. | 360/46 X |
| 5,184,161 | 2/1993 | Egawa | 354/105 |
| 5,412,444 | 5/1995 | Kazami | 354/106 |
| 5,481,323 | 1/1996 | Egawa et al. | 354/106 |

*Primary Examiner*—Howard B. Blankenship
*Attorney, Agent, or Firm*—Fitzpatrick, Cella, Harper & Scinto

[57] ABSTRACT

The present invention relates to a camera having a reproducing circuit for reproducing information recorded in a magnetic recording portion of a film. This invention provides a camera capable of properly reproducing information by using the reproducing circuit in such a manner that the reproducing characteristics of the reproducing circuit are adjusted in accordance with the speed at which said image recording member is fed.

7 Claims, 107 Drawing Sheets

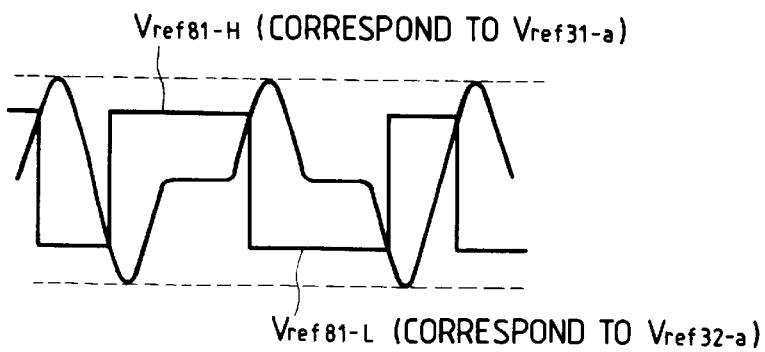
FIG. 12A
FIG. 12B
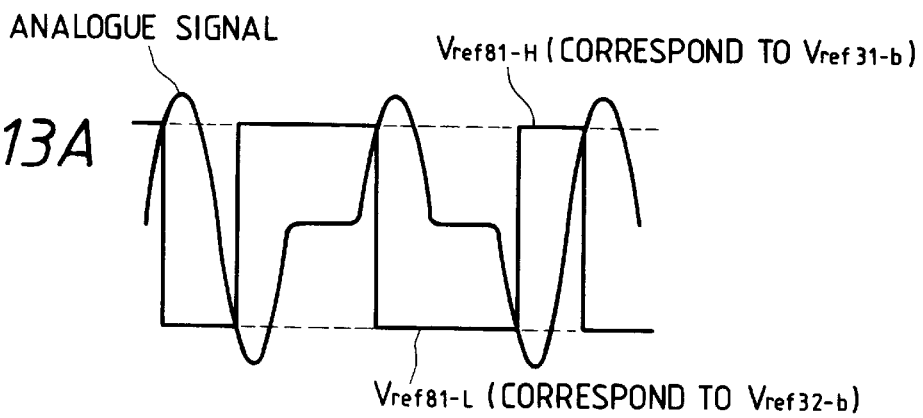
FIG. 13A
FIG. 13B
FIG. 14
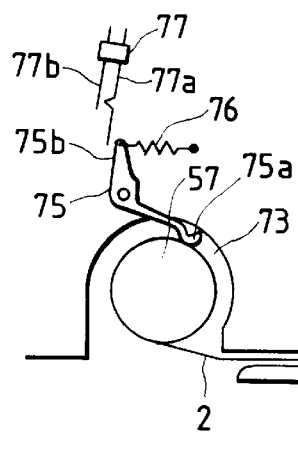

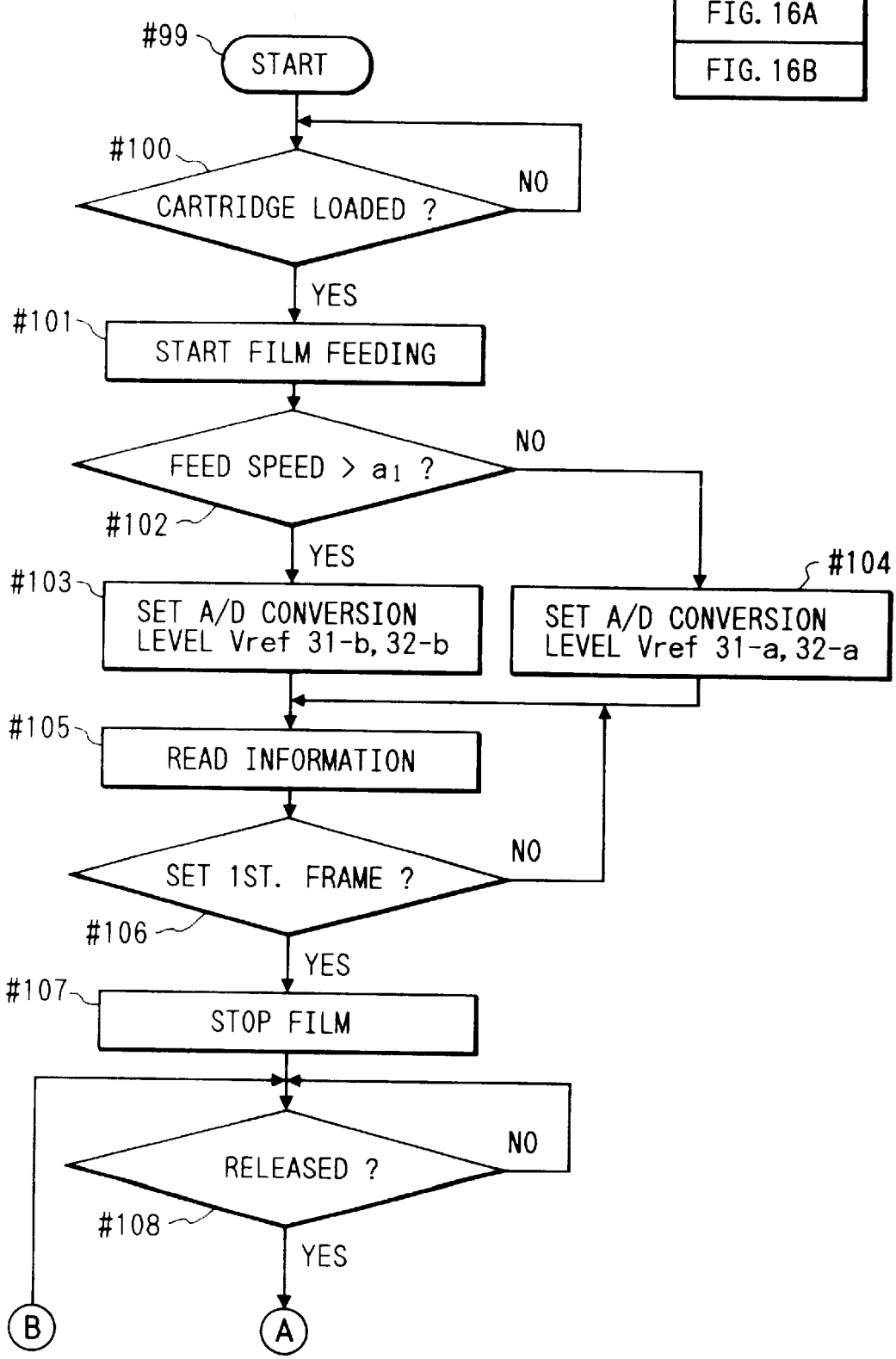

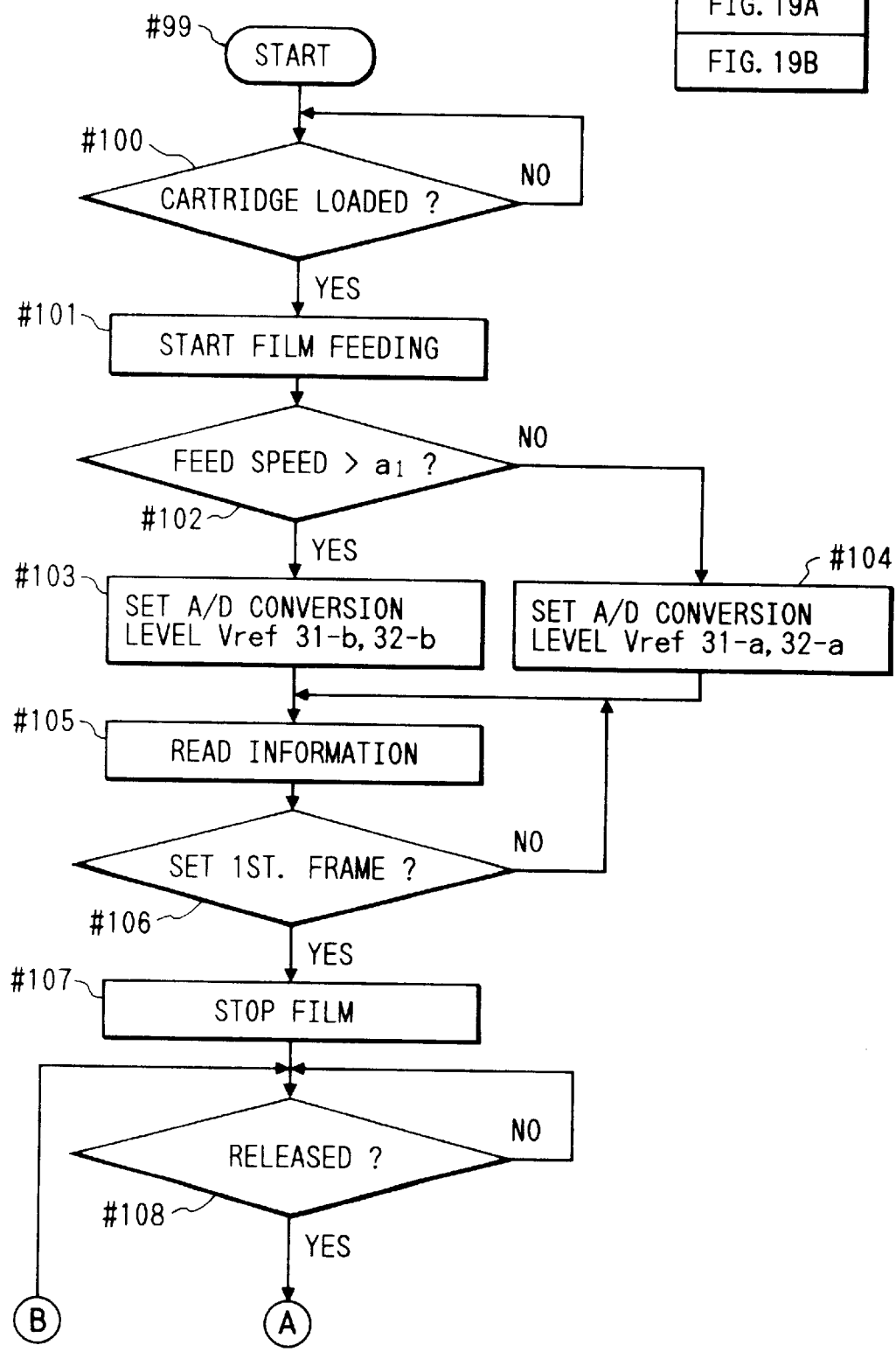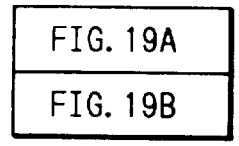

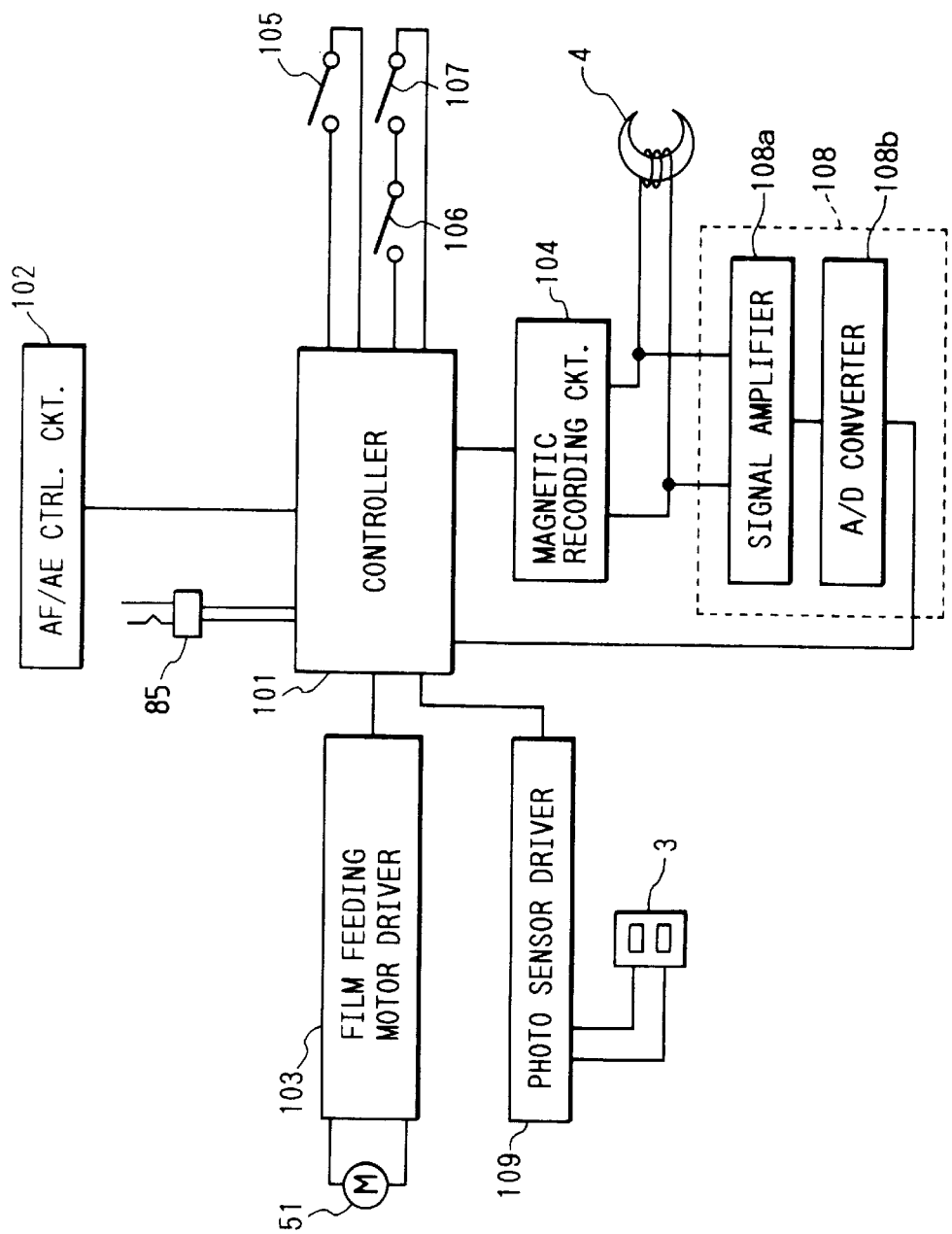

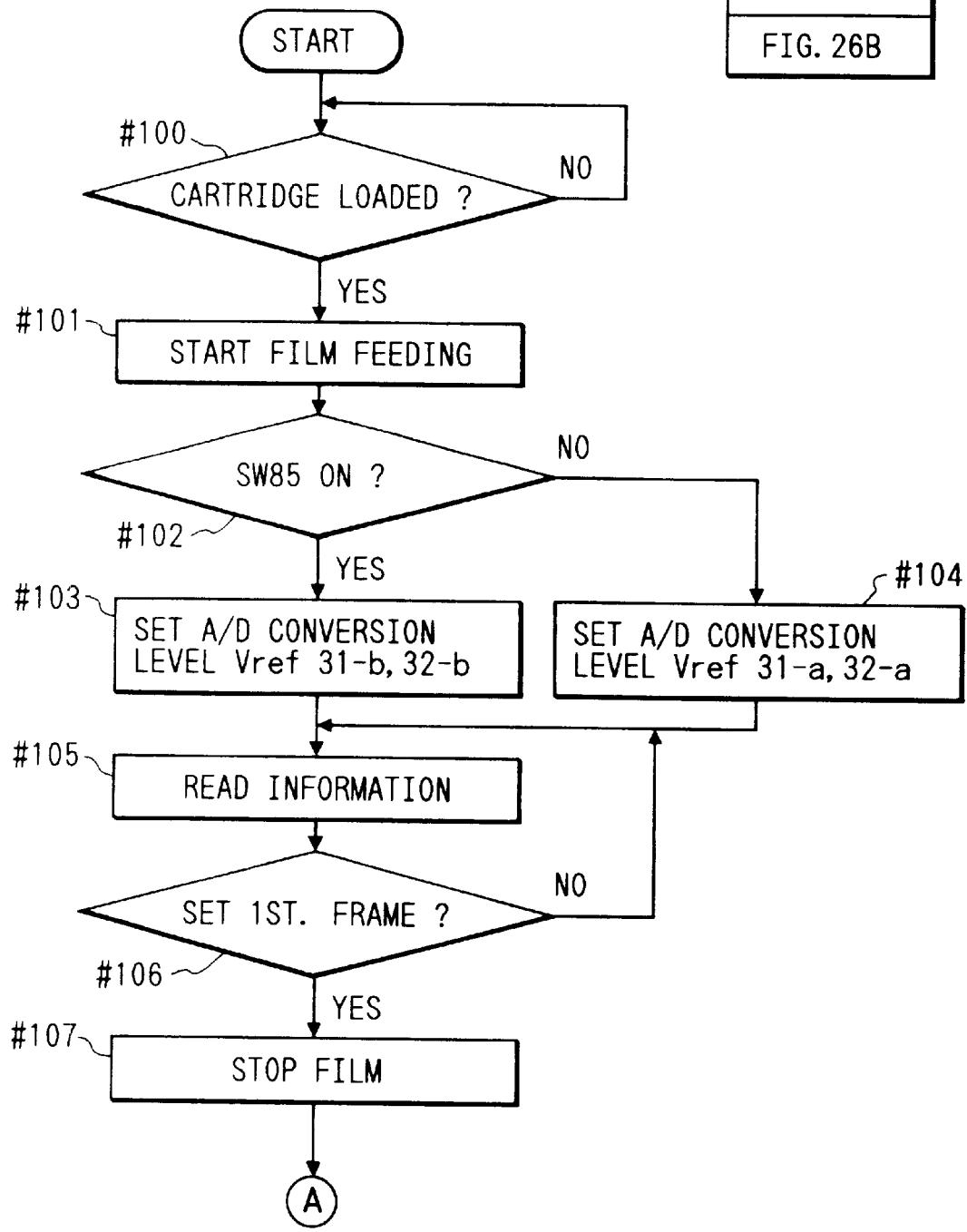

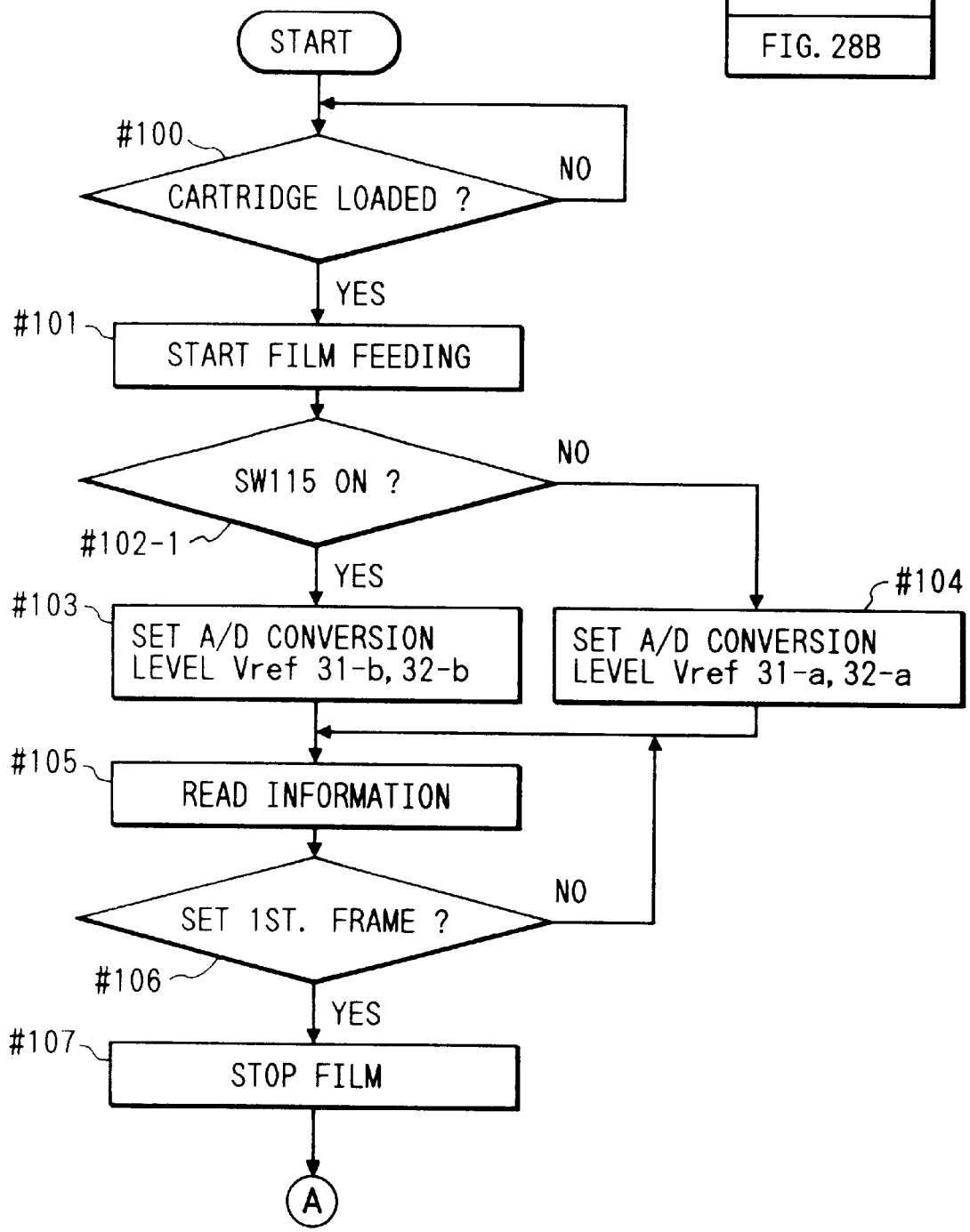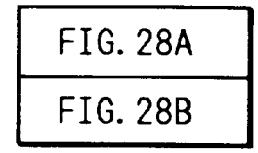

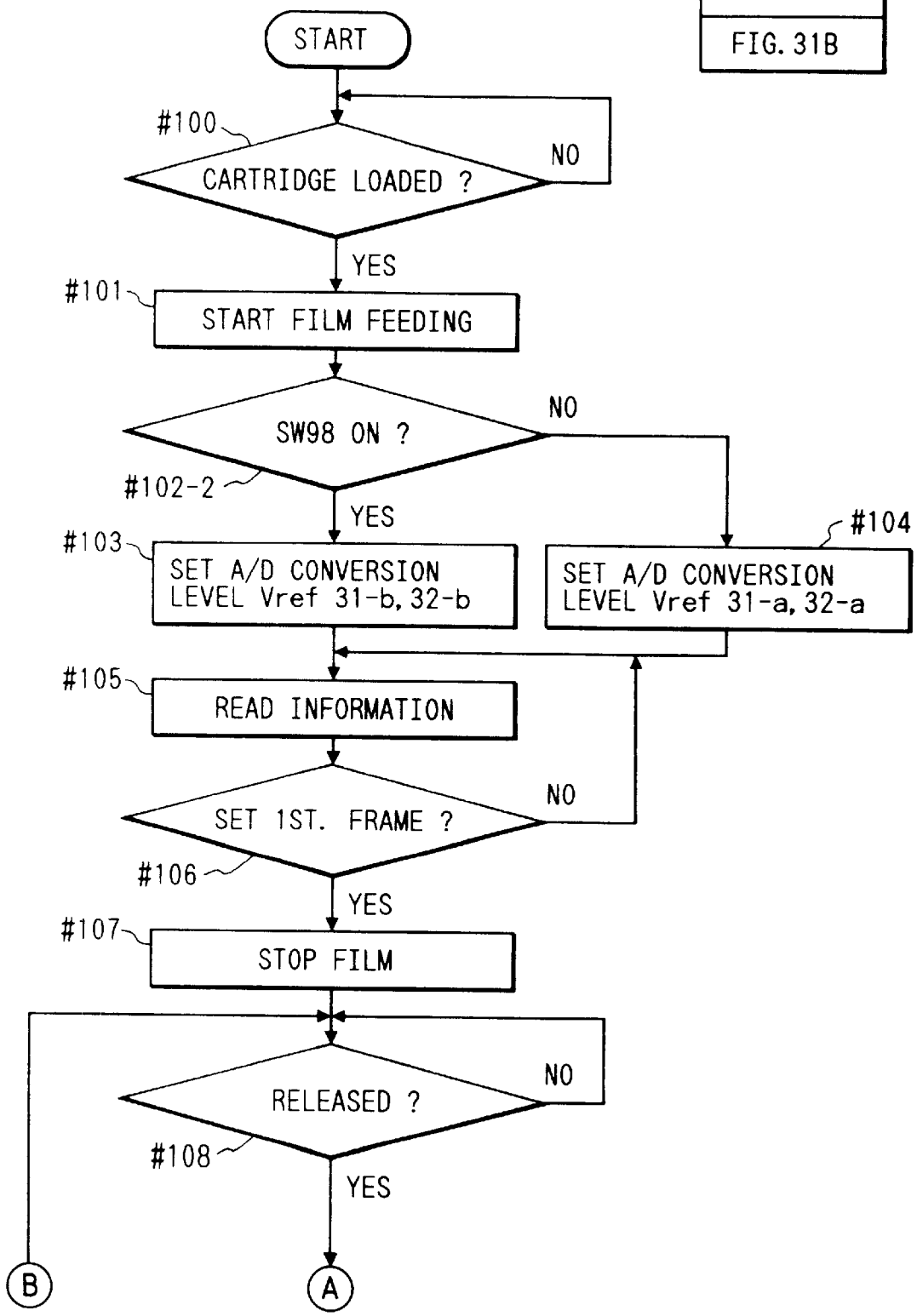

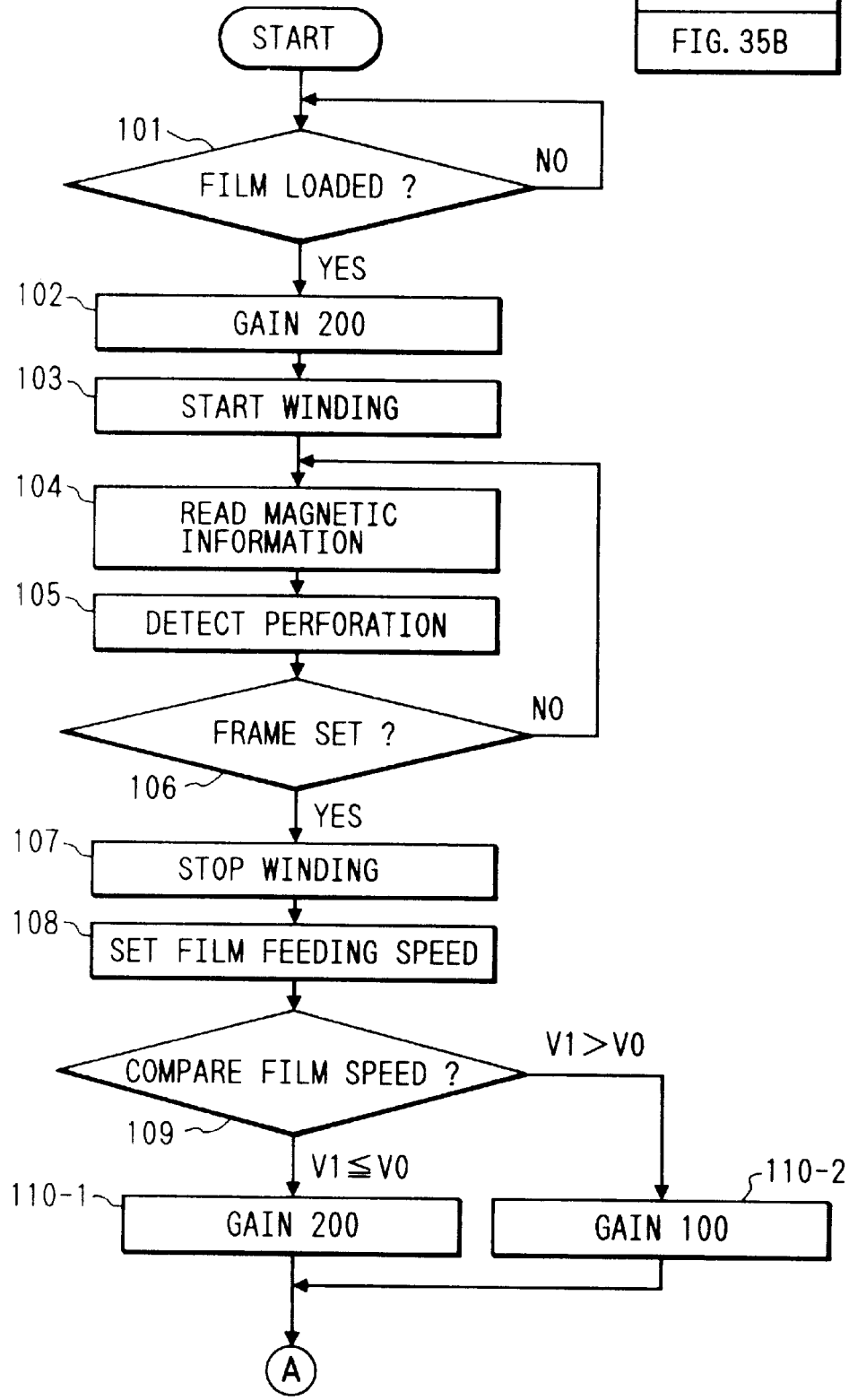

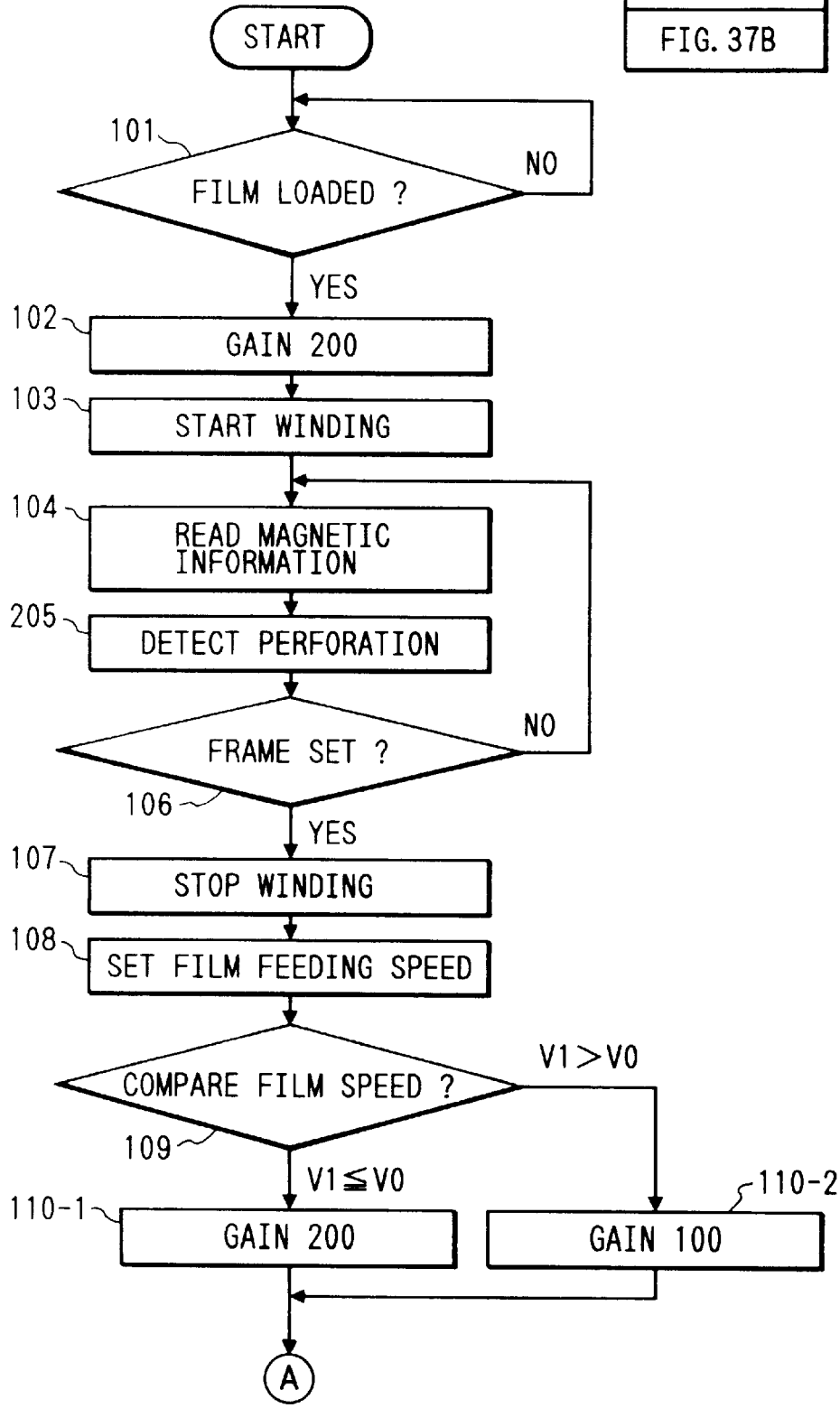

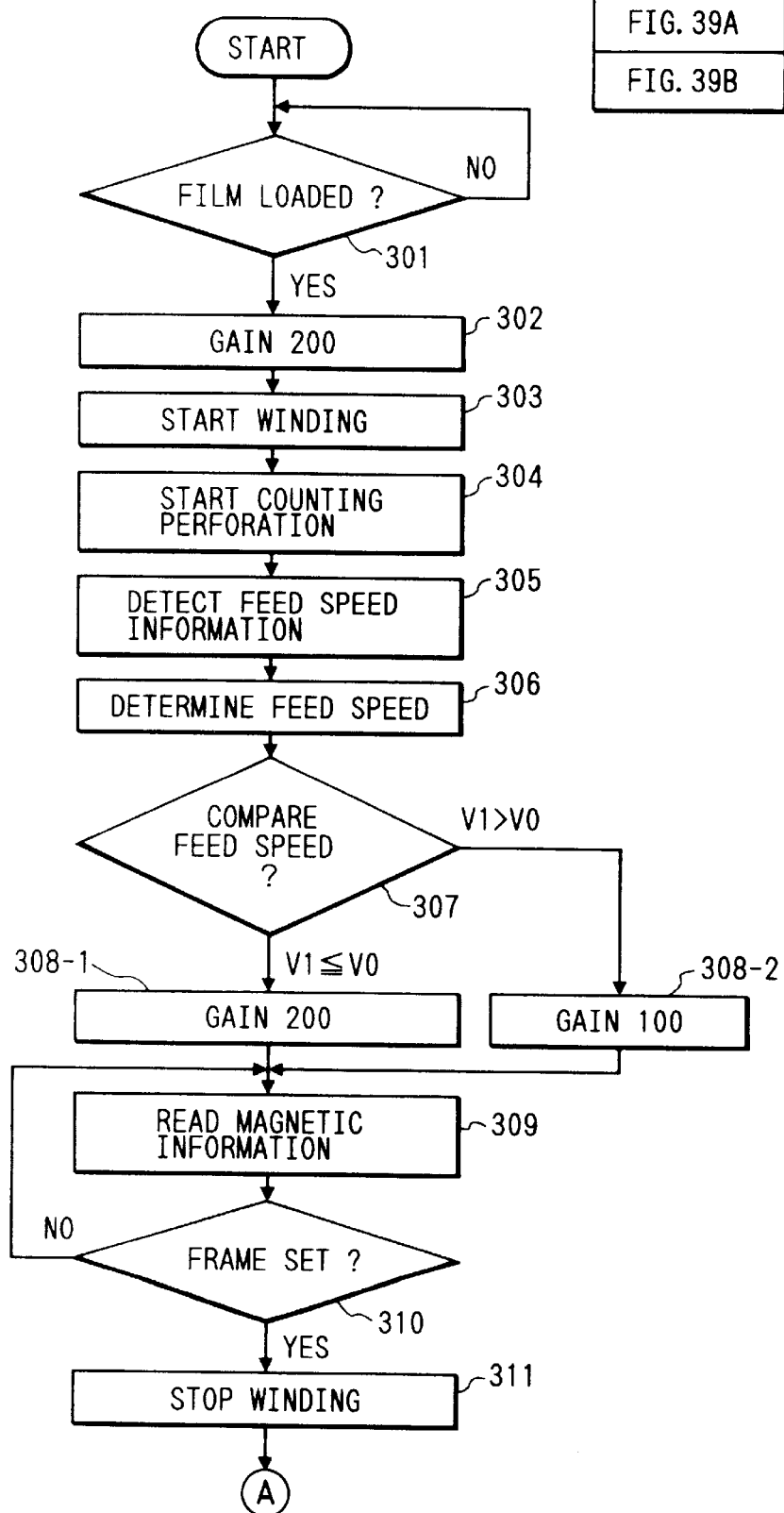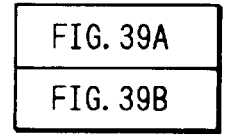

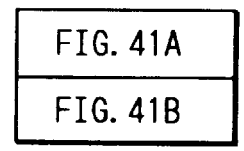
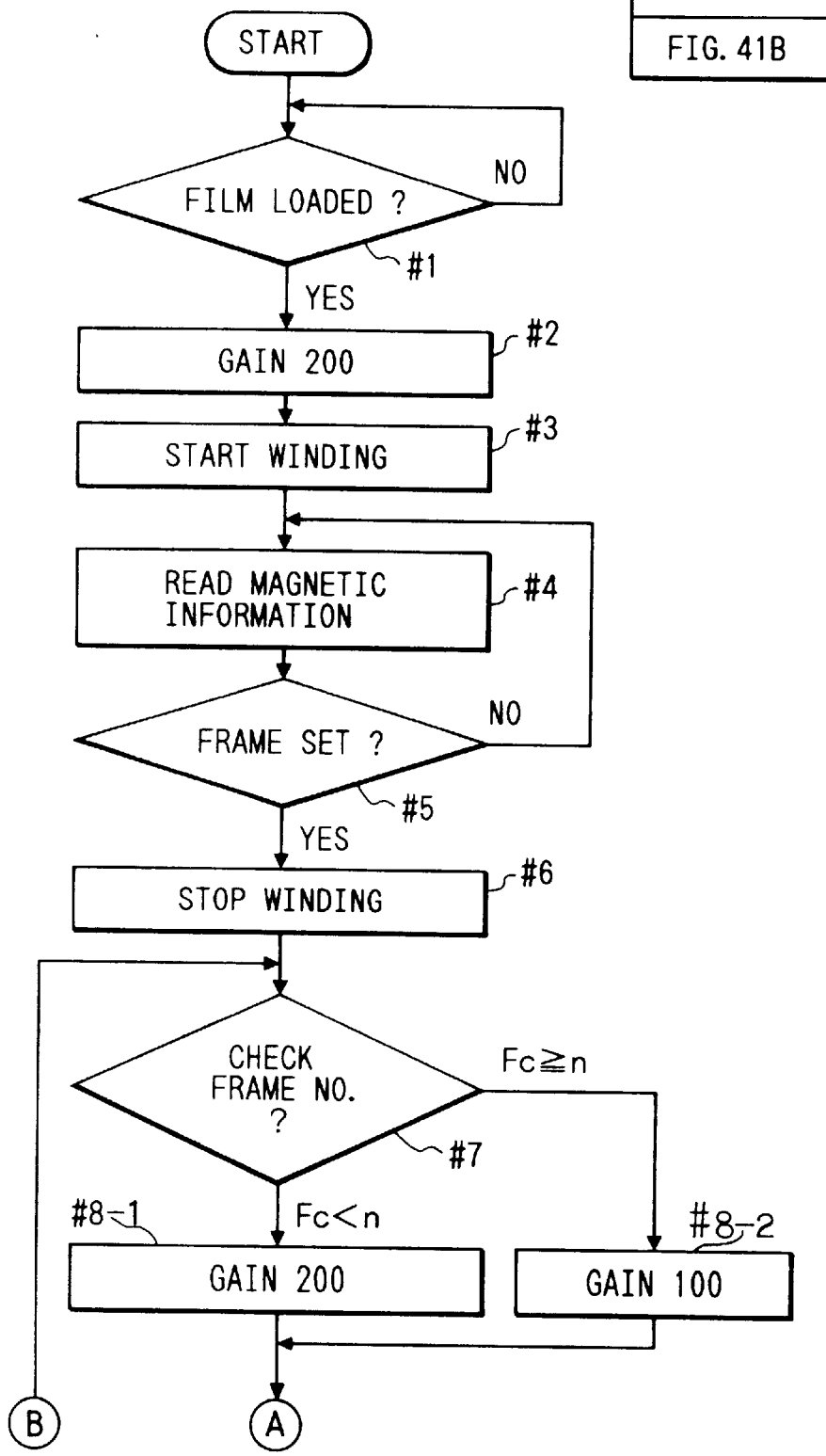
FIG. 41A

| FIG. 74A |
| FIG. 74B |

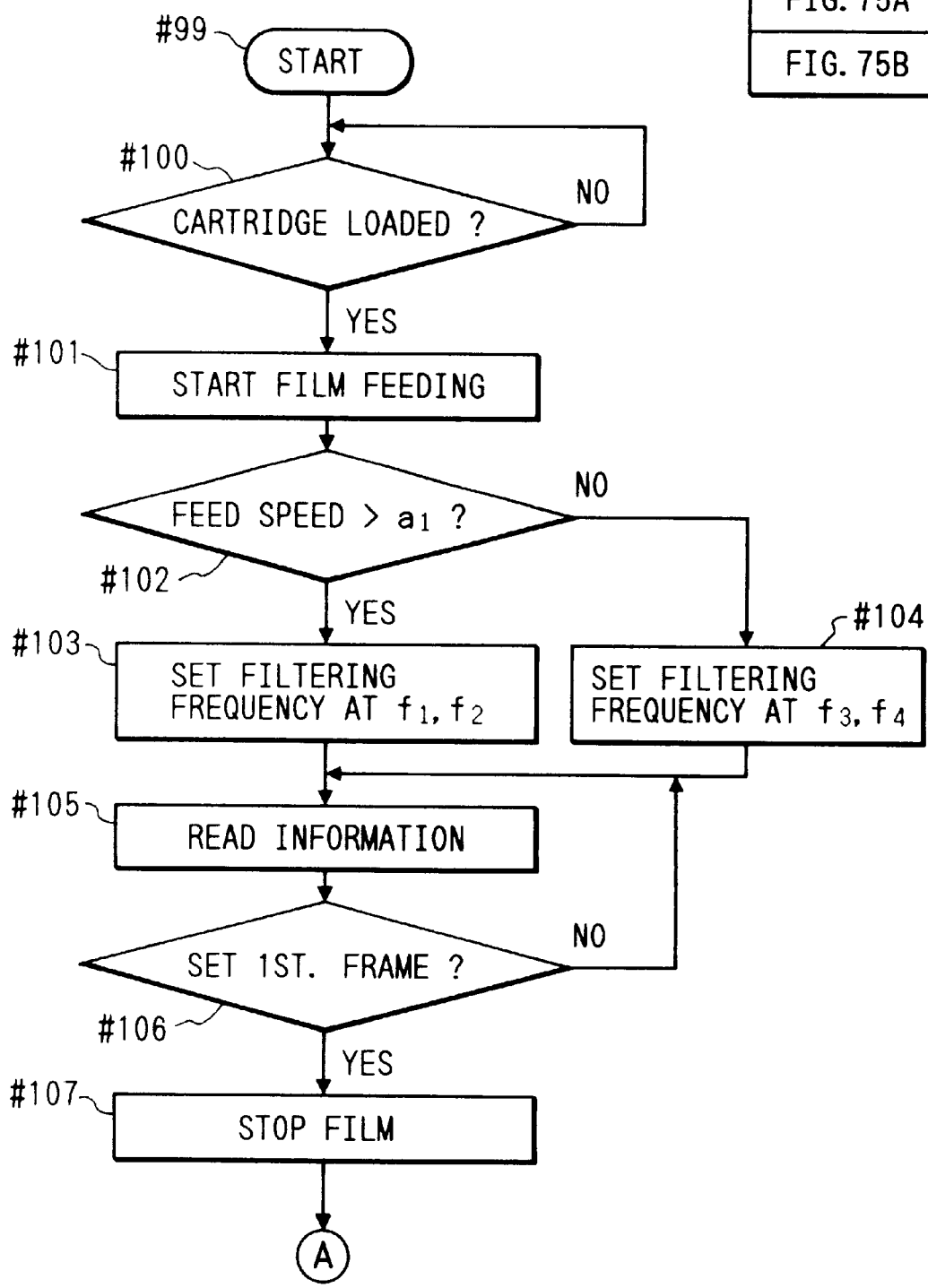

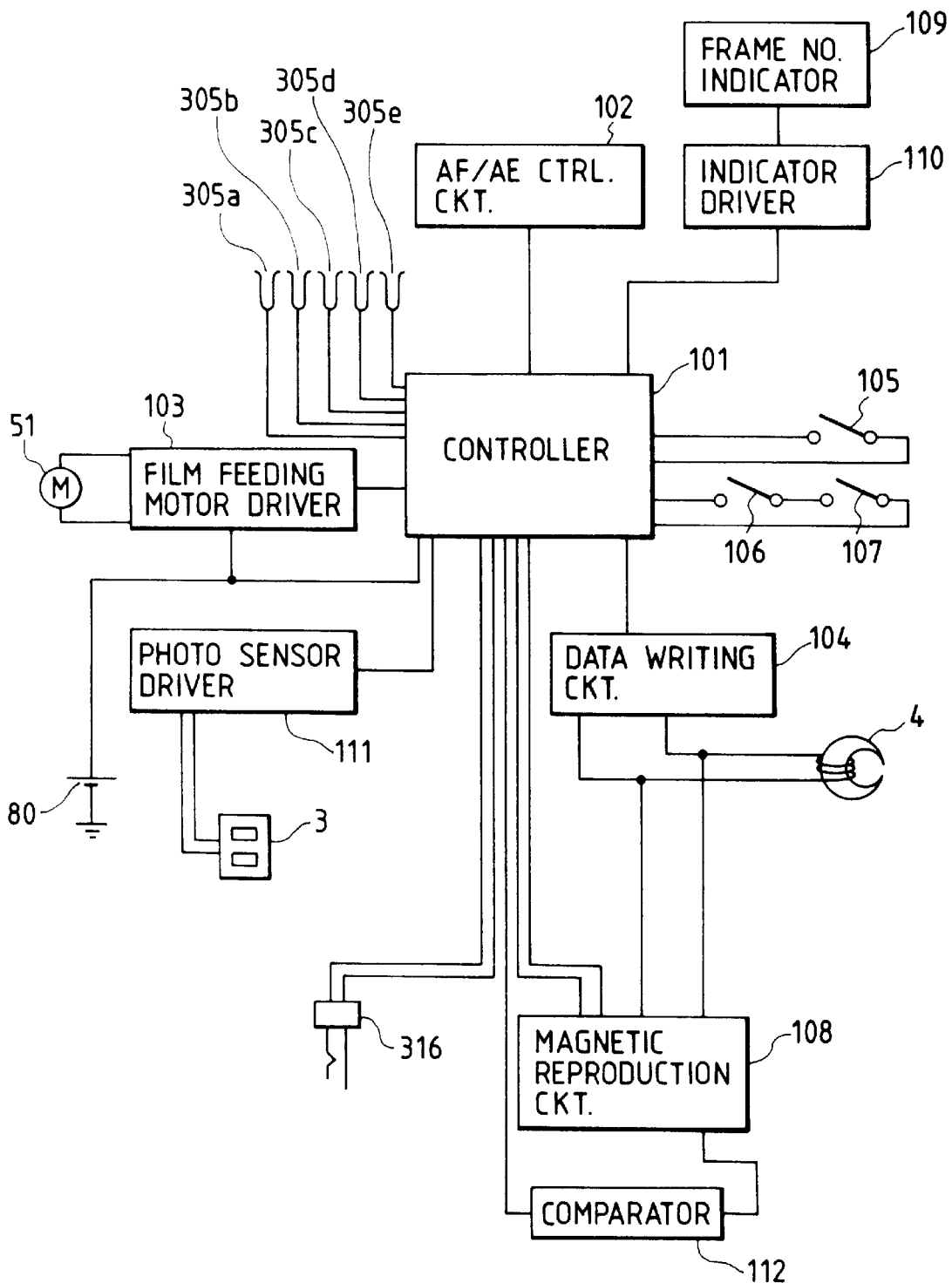

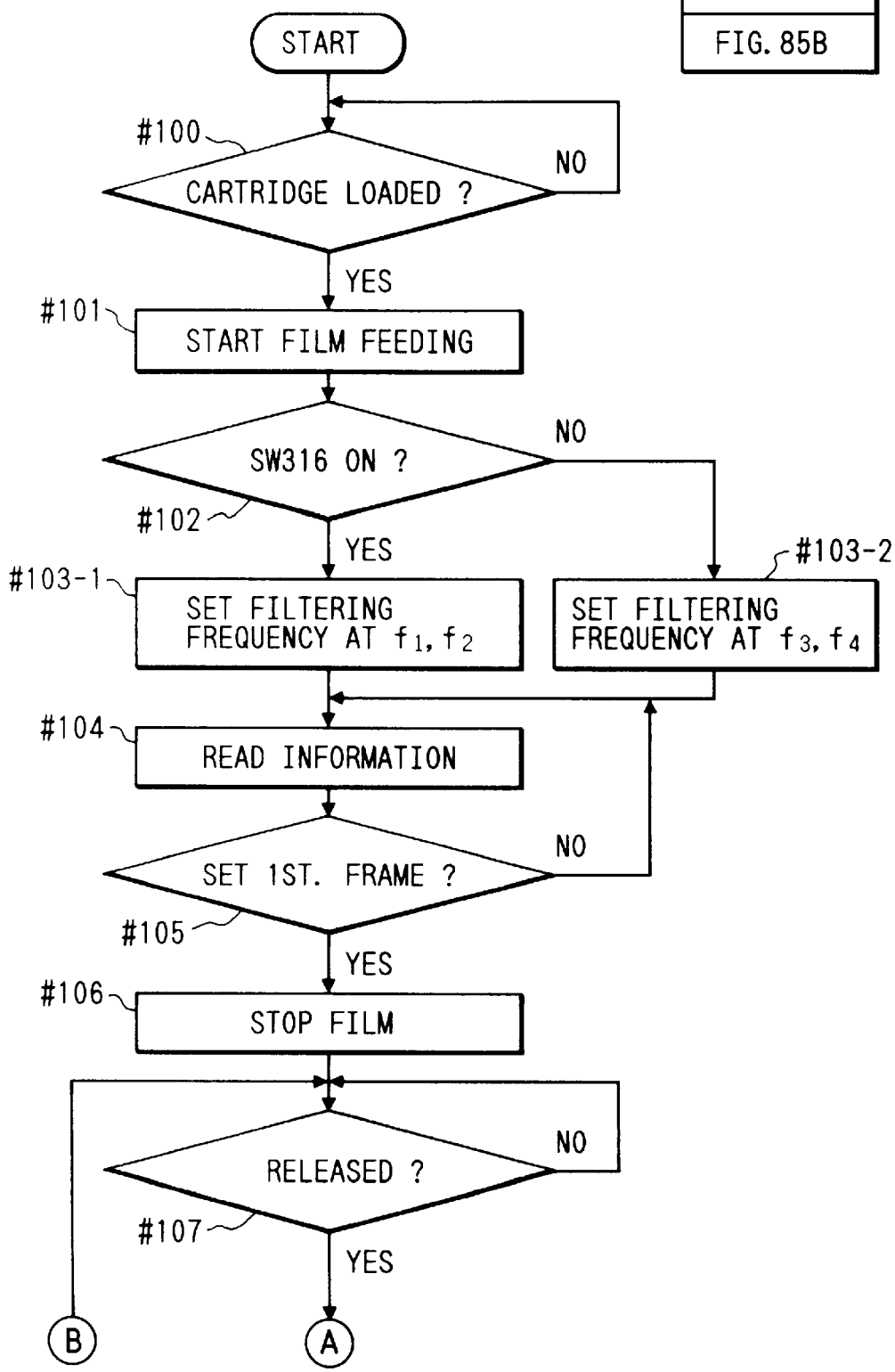

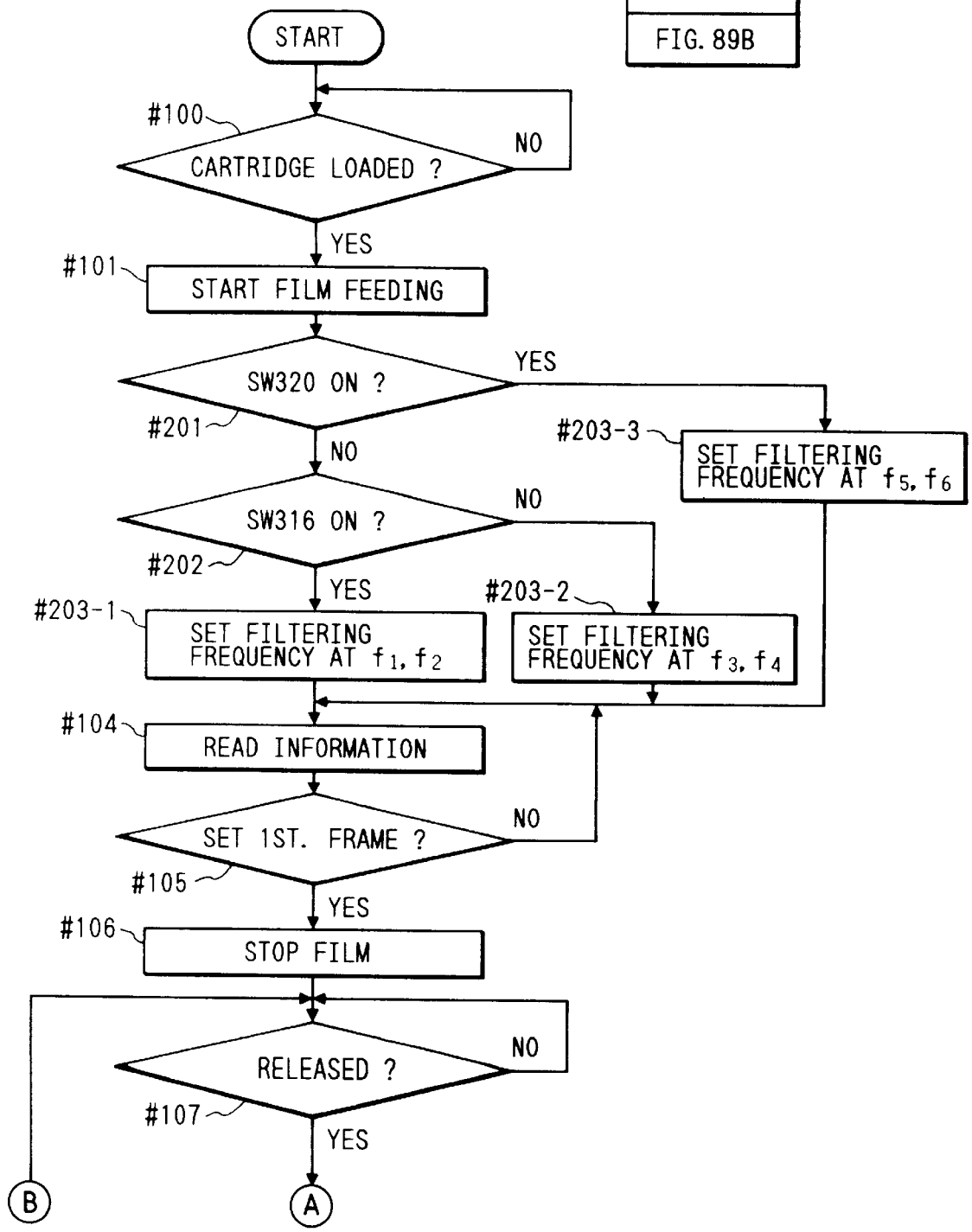

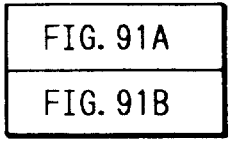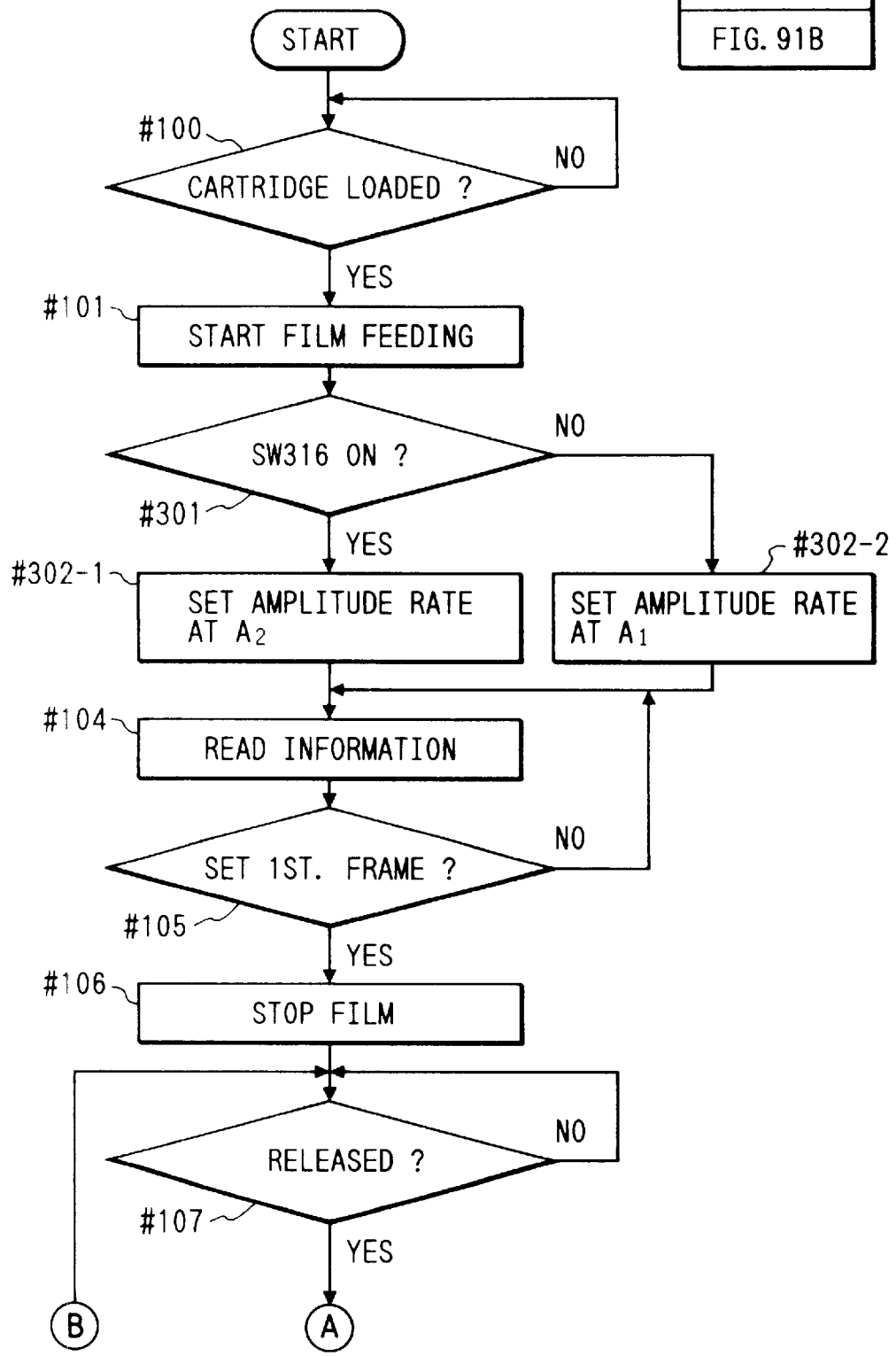

FIG. 112
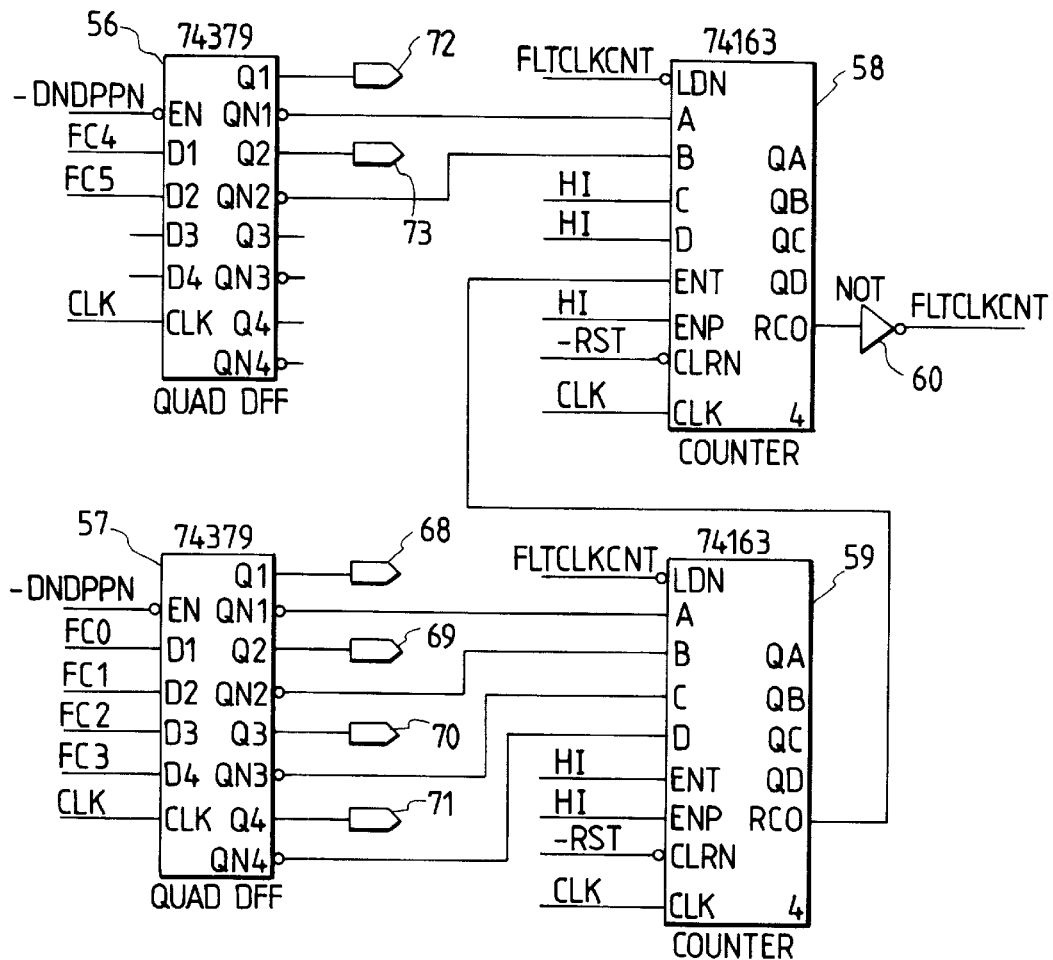
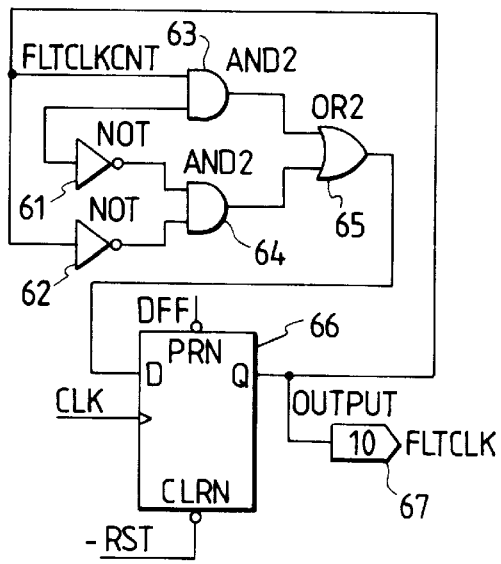

CAMERA HAVING MAGNETIC SIGNAL
REPRODUCING CIRCUIT WITH
ADJUSTABLE GAIN AMPLIFIER

This application is a continuation of application Ser. No. 07/834,640 filed Feb. 12, 1992, now abandoned.

BACKGROUND OF THE INVENTION

1. Field of the Invention

The present invention relates to an improvement in a camera having a magnetic head which reproduces information written to a magnetic storage portion provided for the film during the conveyance of the film.

2. Related Background Art

Recently, a camera has been disclosed in U.S. Pat. No. 4,965,627 which uses a film which has a magnetic recording portion, in which photography information such as the shutter speed, the diaphragm value, the date and the title is written to the magnetic recording portion and the photography information is read out when it is required.

When the film is wound to the film winding spool of a camera, the diameter of the film winding spool is gradually enlarged. Therefore, the film feeding speed is accelerated. That is, the film feeding speed is different between the first frame and the final frame of the film.

When information is read out by a magnetic head at the time of feeding the film, the signal level detected by the magnetic head is in proportion to the film feeding speed. That is, the signal level detected by the magnetic head is low at the first frame because the film feeding speed is relatively low. The signal level detected by the magnetic head is gradually raised adjacent to the final frame because the film feeding speed is raised.

In order to prevent an influence of an external noise, there is a desire of the digital conversion level set for an A/D (analog-to-digital) converter disposed in a magnetically reproducing circuit to be higher than a level at the time of the non-operation of the magnetic head, that is the level at the normal state. However, since the film feeding speed is too low at the leading portions of the film roll as described above, the levels of the signals reproduced in this state are too low and thereby signals the levels of which do not reach the digital conversion level are undesirably generated. Therefore, there arises a problem in that an error takes place at the time of reading information.

If the digital conversion level is set to a lower and constant level than the level at the constant state, the influence of the external noise easily affects regardless of the film feeding speed. Therefore, the noise is undesirably digital-converted, causing a problem to arise in that a reproduction signal becomes different from the actual signal (write signal).

A camera of a type the feeding speed of which can be changed, that is the photographing mode of which can be switched over encounters the problem of the above-described type.

Furthermore, the change in the film feeding speed causes the frequency and the amplitude of the reproduction signal to be changed in accordance with it. Therefore, the S/N ratio (signal-to-noise ratio) of the reproducing device will be deteriorated. Therefore, the reproduction signal generated in this case suffers from undesirable reliability.

SUMMARY OF THE INVENTION

According to one aspect of the application, there is provided a camera capable of correctly reading information even if the film feeding speed is changed due to an external factor such as temperature and the power supply voltage or internal factor such as the photography mode or the number of frames.

In order to achieve the above-described object, according to another aspect of the application, there is provided a camera in which the film feeding speed is directly or indirectly detected and the A/D conversion level in the magnetic reproducing circuit is made to be a level suitable for the speed.

In order to achieve the above-described object, according to another aspect of the application, there is provided a camera in which the rate of amplification of the signal supplied from the head of the reproducing circuit is adjusted in accordance with the film feeding speed.

In order to achieve the above-described object, according to another aspect of the application, there is provided a camera in which the filter characteristics, for example, the time constant of the filter circuit through which a signal from the head of the reproducing circuit passes are adjusted to improve the S/N ration of the reproduction signal in accordance with the change in the frequency and the amplitude of the reproduction signal.

According to one aspect of the application, there is provided a camera capable of easily changing the cut-off frequency of the filter circuit.

Other and further objects, features and advantages of the invention will be appear more fully from the following description.

BRIEF DESCRIPTION OF THE DRAWINGS

FIGS. 10, 10A, and 10B is a flow chart which illustrates the operation of the control circuit shown in FIG. 5;

FIGS. 12A and 12B illustrate signal waveforms of the portions when the first frame to the seventeenth frame are wound to the film winding spool according to the second embodiment of the present invention;

FIGS. 13A and 13B illustrate signal waveforms of the portions when frames from the eighteenth frame are wound to the film winding spool according to the first embodiment of the present invention;

FIG. 14 is a plan view which illustrates the essential structure of a camera according to a third embodiment of the present invention;

FIGS. 16, 16A, and 16B is a flow chart which illustrates the operation of the control circuit shown in FIG. 15;

FIGS. 19, 19A, and 19B is a flow chart which illustrates the operation of the camera and elements shown in FIGS. 17 and 18;

FIG. 25 is a block diagram which illustrates the circuit for the camera according to another embodiment of the present invention;

FIGS. 26, 26A, and 26B is a flow chart which illustrates the operation of the control circuit shown in FIG. 25;

FIGS. 28, 28A, and 28B is a flow chart which illustrates the operation of the control circuit shown in FIG. 27;

FIGS. 31, 31A, and 31B is a flow chart which illustrates the operation of the control circuit shown in FIG. 29;

FIGS. 35, 35A, and 35B is a flow chart which illustrates the control circuit shown in FIG. 32;

FIGS. 37, 37A, and 37B is a flow chart which illustrates the operation of the camera according to the embodiment of the present invention shown in FIG. 36;

FIGS. 39, 39A, and 39B is a flow chart which illustrates the operation of the camera according to the embodiment of the present invention shown in FIG. 38;

FIGS. 41, 41A, and 41B is a flow chart which illustrates the operation of the control circuit shown in FIG. 40;

FIGS. 75, 75A, and 75B is a flow chart which illustrates the operation of anther embodiment of the present invention;

FIG. 84 is a block diagram which illustrates the camera according to the embodiment of the present invention shown in FIG. 76;

FIGS. 85, 85A, and 85B is a flow chart which illustrates the operation of the control circuit shown in FIG. 84;

FIGS. 89, 89A, and 89B is a flow chart which illustrates the operation of the control circuit shown in FIG. 87;

FIGS. 91, 91A, and 91B is a flow chart which illustrates the operation of the control circuit of the camera according to the embodiment of the present invention shown in FIG. 90;

FIG. 112 illustrates the detailed structure of the logic circuit according to another embodiment of the present invention.

DESCRIPTION OF THE PREFERRED EMBODIMENTS

Figure 1:
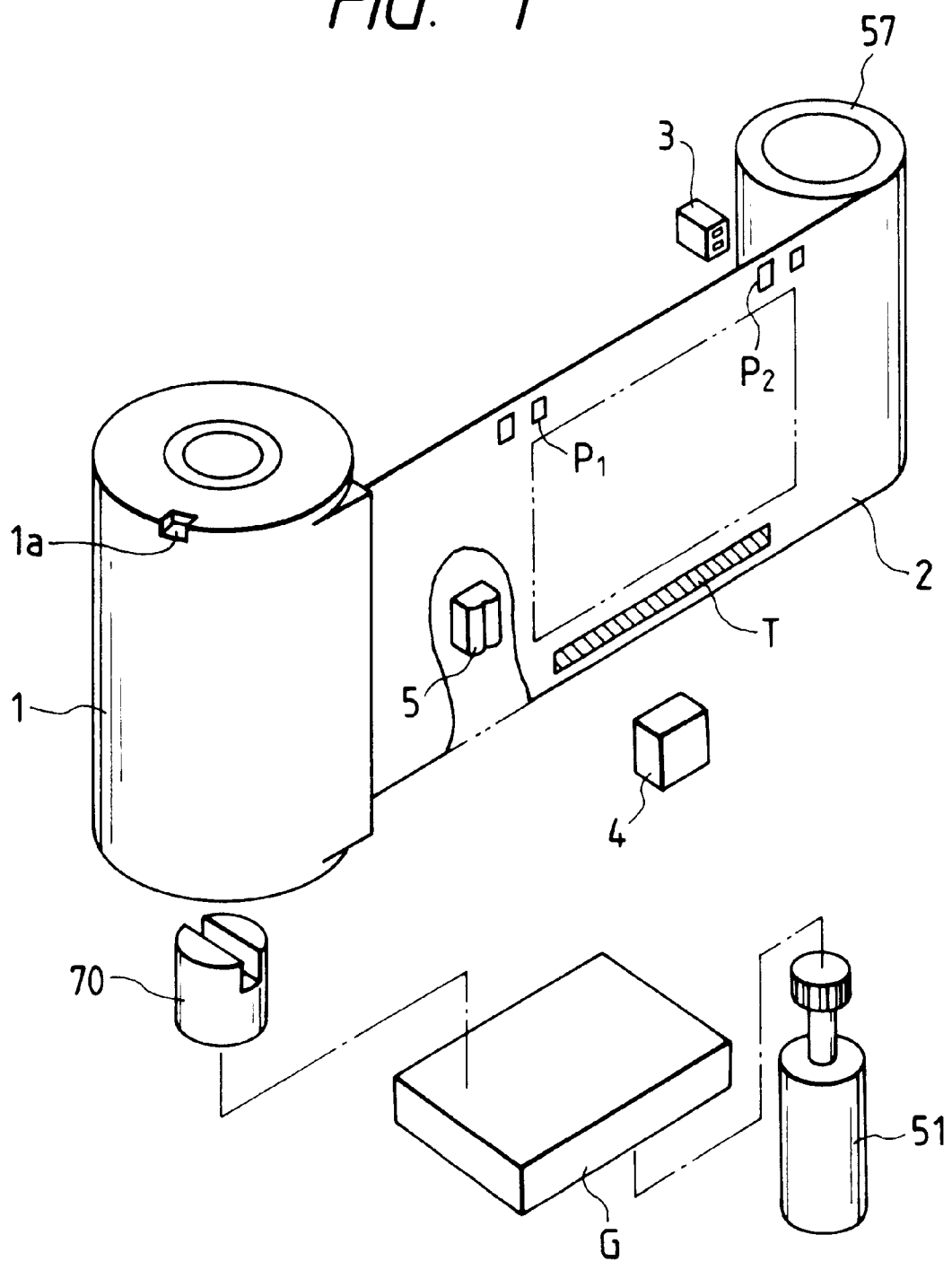
FIG. 1 is a perspective view which illustrates the essential structure of a first embodiment of a camera according to the present invention.

FIGS. 1 to 4 illustrate the mechanical structure of a first embodiment of the present invention. FIG. 1 is a perspective view which illustrates an essential portion of the camera.

Referring to FIG. 1, reference numeral 1 represents a film cartridge and 2 represents a film having a magnetic recording portion (magnetic track) T. Reference numeral 3 represents a photosensor for detecting perforations (P1, P2 and the like) of the film 2 to feed the film 2 by a predetermined distance. Reference numeral 4 represents a magnetic head which comes in contact with the magnetic track T of the film 2 to write/read information. Reference numeral 5 represents a pad positioned to confront the magnetic head 4 while holding the film 2 and arranged to push the film 2 to the magnetic head 4.

Symbol G represents a film feeding mechanism to be described later with reference to FIG. 2 and the like, the film feeding mechanism G being arranged to transmit the output from the film feeding motor 1 to a fork 70. Reference numeral 57 represents a film winding spool.

The film cartridge 1 according to this embodiment is structured as disclosed in U.S. Pat. No. 4,834,306 and the like and constituted as follows:

That is, the film cartridge 1 comprises a film passage slit; the film 2 having an end portion secured to a feeding spool and wound around the feeding spool. The film cartridge 1 further comprises a holding member (omitted from illustration) disposed coaxially with the feeding spool and arranged to restrict the radial expansion of the outer peripheral portion of the film for the purpose of preventing the contact of the outer periphery portion of the film 2 with the inner wall of the film cartridge 1. Furthermore, the film cartridge 1 comprises a releasing portion (omitted from illustration) for deforming a portion of the holding member and continuously releasing the outer periphery of the film from the radial directional restriction of the holding member. In addition, the film cartridge 1 comprises a guide portion (omitted from illustration) for guiding the portion of the film 2, which has been released from the restriction, to the film passage slit. Thus, the relative slip between the outer periphery of the film 2 and the holding member due to the outer peripheral expansion due to the looseness generated at the time of winding the film 2 when the feeding spool (omitted from illustration) engaged to the form is rotated in the direction in which the film is pushed forward. Furthermore, force for driving the film 2 in the direction in which the same is pushed is given to the film 2 so that the film 2 can be pushed forward from the film cartridge 1.

The above-described film 2 is pushed forward from the film cartridge 1 by a film feeding mechanism to be described later before it is wound to a film winding spool 57 of the camera by a known means so as to be fed as desired.

Figure 2:
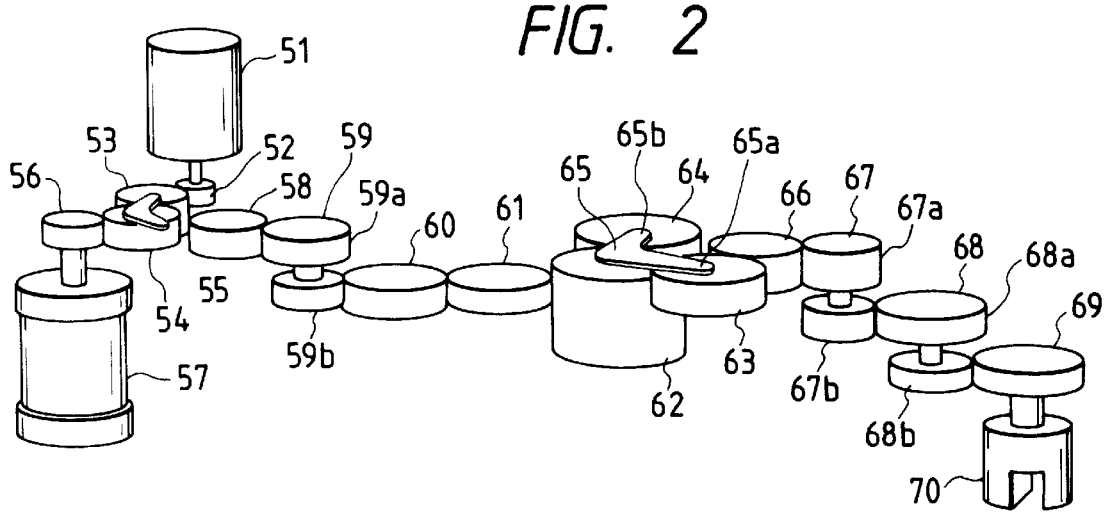
FIG. 2 is a perspective view which illustrates the gear configuration of a film feeding mechanism of the camera shown in FIG. 1.
Figure 3:
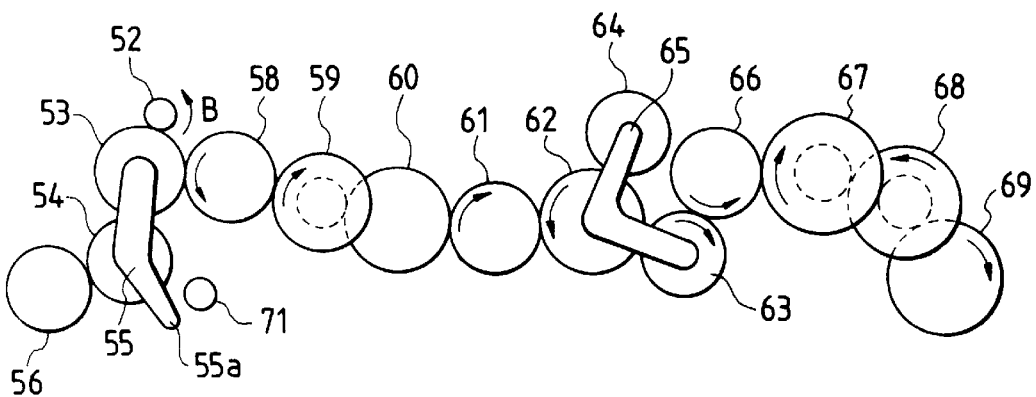
FIG. 3 is a plan view which illustrates the configuration of each gear at the time of film winding operation performed by the film feeding mechanism shown in FIG. 2.
Figure 4:
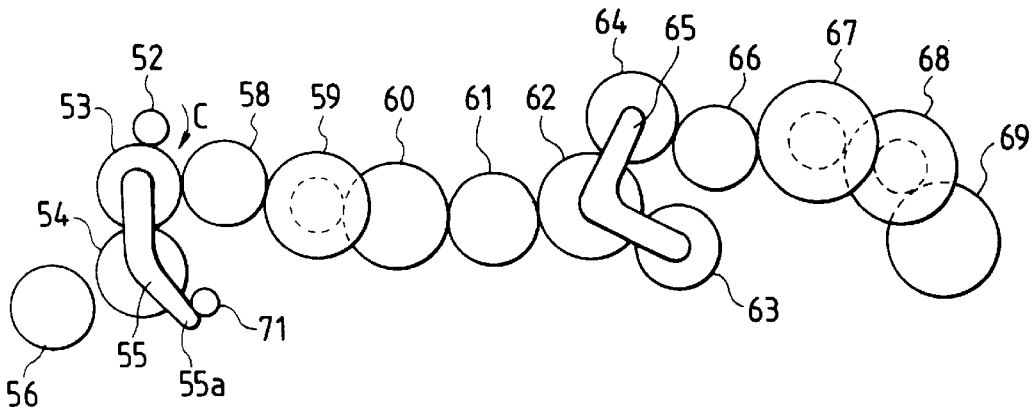
FIG. 4 is a plan view which illustrates the configuration of each gear at the time of film rewinding operation performed by the film feeding mechanism shown in FIG. 2.

FIGS. 2 to 4 illustrate the schematic structure of the film feeding mechanism G.

Referring to FIGS. 2 to 4, reference numeral 51 represents a film feeding motor which is rotated forward (in a direction designated by an arrow B shown in FIG. 3) at the time of winding the film, while the same is rotated reversely (in a direction designated by an arrow C shown in FIG. 4) at the time of rewinding the film. Reference numeral 52 represents a pinion gear secured to the rotational shaft of the motor 51. Reference numeral 53 represents a first sun gear engaged to the pinion gear 52. Reference numeral 54 represents a first planetary gear engaged to the first sun gear 53. Reference numeral 55 represents a first connection lever for connecting the first sun gear 53 and the first planetary gear 54 and rotatably holding the first planetary gear 54 while generating frictional force with the first planetary gear 54 so that the rotation of the first sun gear 53 causes the first planetary gear 54 to rotate around the first sun gear 53 while making the first sun gear 53 to be the rotational center. The above-described first sun gear 53, the first planetary gear 54 and the first connection lever 55 constitute a known planetary gear mechanism. Reference numeral 56 represents a spool gear which is engaged to the first planetary gear 54 only when the film feeding motor 51 is rotated forward. Reference numeral 57 represents a film winding spool secured to the spool gear 56 and arranged to be moved integrally with the same.

Reference numeral 58 represents a first idler gear which is always engaged to the first sun gear 53. Reference numeral 59 represents a first two-profile gear having a large gear portion 59a and a small gear portion 59b, the large gear portion 59a being engaged to the first idler gear 58. Reference numeral 60 represents a second idler gear which is engaged to the small gear portion 59b of the two-speed gear 59. Reference numeral 61 represents a third gear which is engaged to the second idler gear 60. Reference numeral 62 represents a second sun gear which is engaged to the third idler gear 61. Reference numeral 63 represents a second planetary gear which is engaged to the second sun gear 62. Reference numeral 64 represents a third planetary gear which is engaged to the second sun gear 62 similarly to the second planetary gear 13. Reference numeral 65 represents a second connection lever for connecting the second sun gear 62, the second planetary gear 63 and the third planetary gear 64 by its arm portions 65a and 65b and rotatably holding the planetary gears while generating frictional force so that the rotation of the second sun gear 62 causes the second planetary gear 63 and the third planetary gear 64 to rotate around the second sun gear 62 while making the second sun gear 62 to be the rotational center. The above-described second sun gear 62, the second and the third planetary gears 63 and 64 and the second connection lever 65 constitute a known planetary gear mechanism.

Reference numeral 66 represents a fourth idler gear which is engaged to the second planetary gear 63 and as well as which is not engaged to the third planetary gear 64 by the left directional rotation of the second connection lever 65 around the second sun gear 62 at the time of the forward rotation of the film feeding motor 51. When the motor 51 is rotated reversely, the fourth idler gear 66 is engaged to the third planetary gear but it is not engaged to the second planetary gear 63 due to the right directional rotation of the second connection lever 65. Reference numeral 67 represents a two-speed gear having a large gear portion 67a and a small gear portion 67b, the large gear portion 67a being engaged to the fourth idler gear 66. Reference numeral 68 represents a third two-speed gear having a large gear portion 68a and a small gear portion 68b, the large gear portion 68a being engaged to the small gear portion 67b of the second two-speed gear 67. Reference numeral 69 represents a fork gear which is engaged to the small gear portion 68b of the third two-speed gear 68. Reference numeral 70 represents a fork which is rotated integrally with the fork gear 69. Thus, the feeding spool (omitted from illustration) disposed in the film cartridge 1 is rotated. As a result, film 2 can be pushed forward and wind from the cartridge 1.

Reference numeral 71 represents a stopper disposed in the camera body (omitted from illustration) and acting to restrict the left directional rotational position of the first connection lever 55.

In the structure constituted as described above, when the film feeding motor 51 (the pinion gear 52) is rotated (forward) in the direction designated by the arrow B as shown in FIG. 3 after the film cartridge 1 has been loaded into a cartridge chamber (omitted from illustration), the first sun gear 53 is rotated clockwise. As a result, the first planetary gear 54 is rotated clockwise around the first sun gear 53 by the action of the first connection lever 55 until it is engaged to the spool gear 56. Therefore, the rotational force of the film feeding motor 51 is transmitted to the spool gear 6 so that the film winding spool 57 is rotated clockwise.

The rotational force is transmitted to the second sun gear 62 via the idler gear 58 which is another gear engaged to the first sun gear 53, the first two-speed gear 59, the second idler gear 60 and the third idler gear 61. Therefore, the second sun gear is rotated counterclockwise, causing the second planetary gear 63 and the third planetary gear 64 to be rotated counterclockwise around the second sun gear by the action of the second connection lever 65 until the second planetary gear 63 is engaged to the fourth idler gear 66. Thus, the rotational force of the film feeding motor 51 in the direction B is transmitted to the fourth idler gear 66 as the counter-clockwise rotational force before it is transmitted to the fork gear 69 via the second two-speed gear 67 and the third two-speed gear 68. As a result, the fork 70 is rotated clockwise.

The gear ratio of the gear train is determined as follows:

Assuming that the circumferential speed of the film winding spool 57 is V1 and the speed at which the film 2 is pushed forward from the film cartridge 1 by the fork 70 is V2, a relationship V1>V2 is held.

As a result of the clockwise rotation of the fork 70, the film 2 is pushed forward from the film cartridge 1, causing the leading portion of the film 2 to be wound around the film winding spool 57 by a known means (a means for hooking the perforation P of the film 2 by a nail provided for the film winding spool 57 or a means provided for the camera body and arranged to push the film 2 to the film winding spool 57). Then, film 2 is wound by only the rotation of the film winding spool 57 realized by the film feeding motor 51 because of the following reason:

When the film 2 is wound to the film winding spool 57 due to the relationship V1>V2, the rotational fore of the film winding spool 57 is transmitted via the film 2, the fork gear 69, the third two profile gear 68, the second two-profile gear 67 and the fourth idler gear 66 in this order. As a result, the counterclockwise rotational speed of the fourth idler gear 66 is made to be faster than the clockwise rotational speed of the second planetary gear 63. At this time, the fourth idler gear 66 displaces the planetary gear 63 so that the engagement between the second planetary gear 63 and the fourth idler gear 66 is temporarily released. As a result, the difference in the speed can be absorbed.

Then, the film rewinding operation will now be described.

Referring to FIG. 4, when the film feeding motor 51 is rotated in the direction designated by the arrow C, the first connection lever 55 and the first planetary gear 54 are rotated around the first sun gear 53 until an end portion 55a of the first connection lever 55 comes in contact with the stopper 71. As a result, the engagement between the first planetary gear 54 and the spool gear 56 is released.

At this time, the second sun gear 62 rotates clockwise, causing the second planetary gear 63 and the third planetary gear 64 to be rotated clockwise around the second sun gear 62 by the action of the second connection lever 65. As a result, the engagement between the fourth idler gear 66 and the second planetary gear 63 is released. As an alternative to this, the fourth idler gear 66 and the third planetary gear 64 are engaged to each other. Therefore, the fork gear 69 is rotated counterclockwise, causing the feeding spool disposed in the film cartridge 1 to be rotated reversely by the fork 70. Thus, the film 2 is wound into the cartridge 1.

Figure 5:
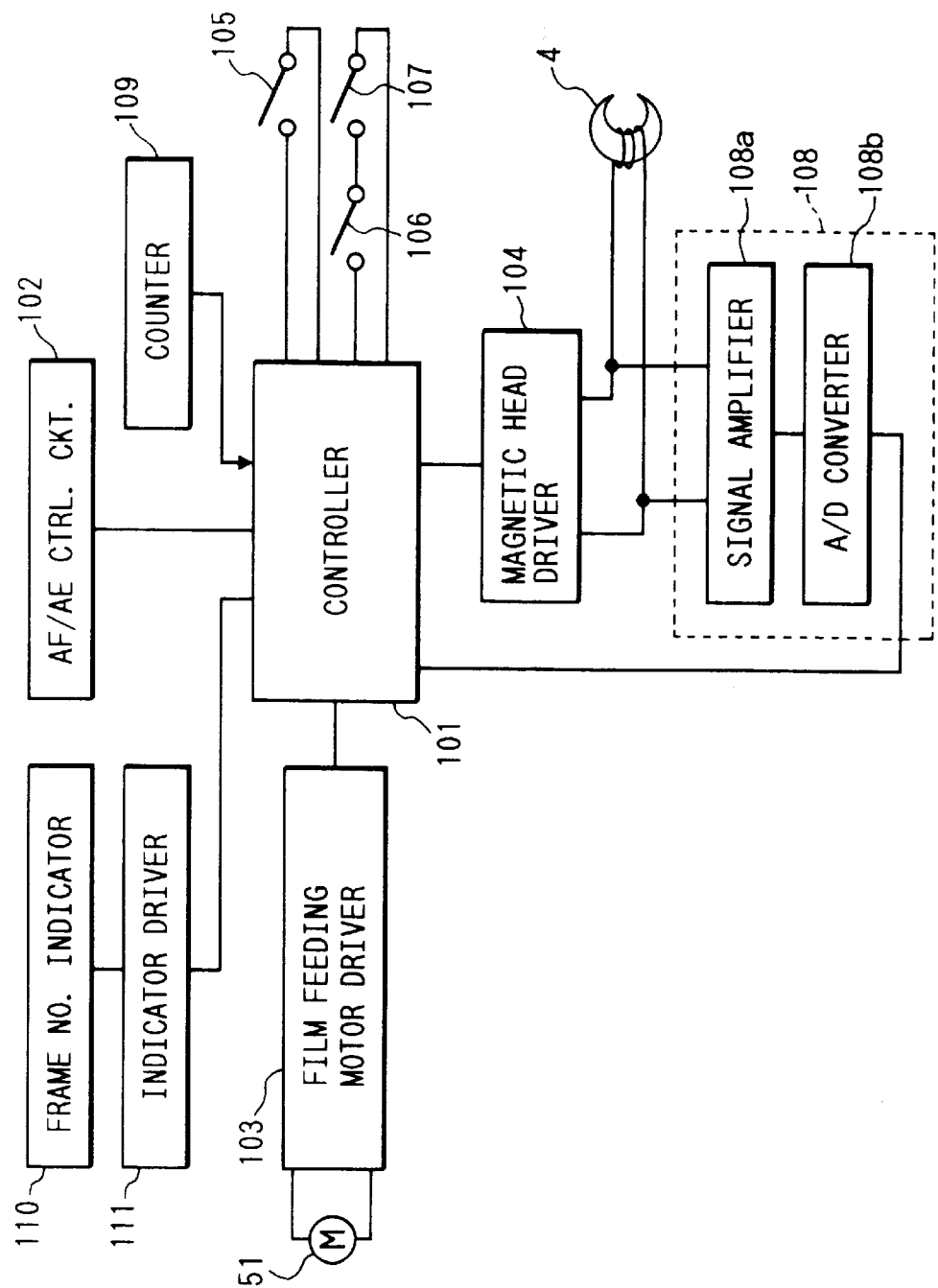
FIG. 5 is a block diagram which illustrates a circuit for the camera according to the first embodiment of the present invention.

FIG. 5 is a block diagram which illustrates a circuit for use in the camera according to the first embodiment of the present invention.

Referring to FIG. 5, reference numeral 101 represents a control circuit comprising a microcomputer and the like and acting to control the operations of the camera. Reference numeral 102 represents an AF.AE control circuit for controlling the focusing of the photographing lens and the operation of the exposure control shutter. Reference numeral 103 represents a film feeding motor driver circuit for rotating the film feeding motor 51. Reference numeral 104 represents a magnetic head drive circuit for driving the magnetic head 4 to write information. Reference numeral 105 represents a release switch for releasing the shutter of the camera when the release switch is switched on. Reference numeral 106 represents a cartridge loading switch which is switched on when the film cartridge 1 is loaded into the camera. Reference numeral 107 represents a back cover switch which is switched on when the back cover is closed. When both the above-described switched 106 and 107 are switched on, the control circuit 101 operates the film feeding motor driver circuit 103 to commence setting of the first frame of the film 2.

Reference numeral 108 represents a magnetic reproducing circuit for detecting magnetic information written to the magnetic track T of the film 2 by the magnetic head 4, amplifying it as an analog signal and digital-converting the analog signal to make it information for the control circuit 101. The magnetic reproducing circuit comprises a signal amplifier 108a for detecting the output from the magnetic head 4 and amplifying the analog signal of the output and an A/D converter 108b for converting the amplified analog signal into a digital signal.

Reference numeral 109 represents a counter circuit for counting the number of shutter releasing times taken place in the camera. Reference numeral 110 represents a frame count display constituted by a liquid crystal display or the like and displaying the number of photographed frames. Reference numeral 111 represents a display driver circuit for driving the frame count display 110 to increase/decrease the count of the frames.

Figure 6:
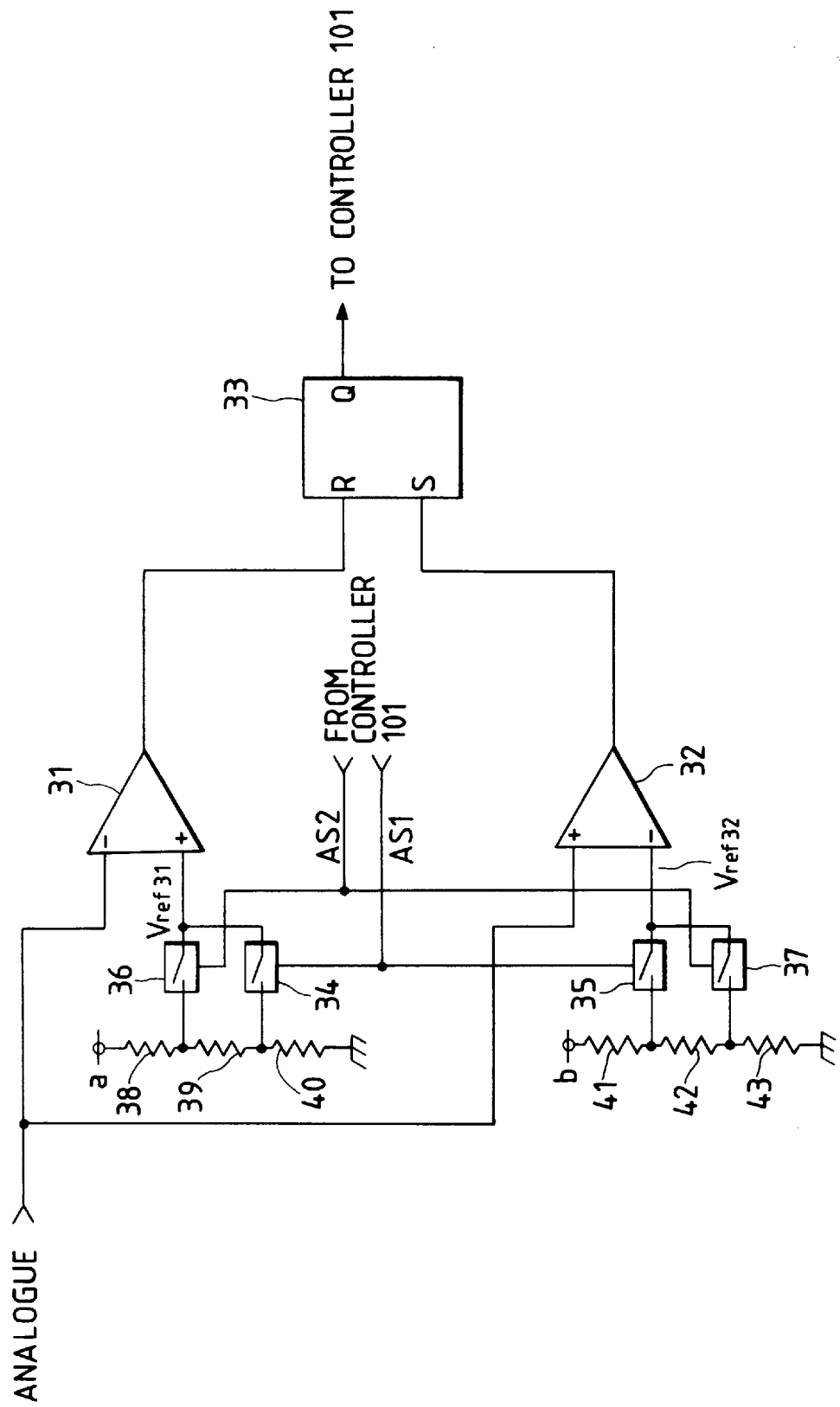
FIG. 6 is a circuit diagram which illustrates the schematic structure of an A/D converter shown in FIG. 5.

FIG. 6 is a circuit diagram which illustrates the schematic structure of the A/D converter 108b shown in FIG. 5.

Referring to FIG. 6, reference numerals 31 and 32 represent comparators for digital-converting the positive and negative signals (assuming that the normal level is "0") of the analog signal amplified by the signal amplifier 108a.

Reference numeral 33 represents an RS flip-flop for digital-converting the positive and negative signals which have been digital converted by the comparators 31 and 32. Reference numerals 34 to 37 represent analog switches for switching the signal reversing level of the comparators 31 and 32. Reference numerals 38 to 43 represent resistors for setting the signal reversing level of the comparators 31 and 32. The above-described resistors are given reference numerals R38, R39, R40, R41 and R42.

The above-described analog switches 34 to 37 act as follows: When switch signal AS1 is supplied from the control circuit 101, the analog switches 34 and 35 are switched on. When switch signal AS2 is supplied, the analog switches 36 and 37 are switched on.

Assuming that the voltage applied to terminals a and b are Va and Vb, signal reversing levels Vref31 and Vref32 become as follows when the analog switches 36 and 37 are switched on:

$$Vref31 = (R39+R40)/(R38+R39+R40) \times Va$$

$$Vref32 = R43/(R41+R42+R43) \times Vb$$

On the other hand, signal reversing levels Vref31 and Vref32 become as follows when the analog switches 34 and 35 are switched on:

$$Vref31 = R40/(R38+R39+R40) \times Va$$

$$Vref32 = (R42+R43)/(R41+R42+R43) \times Vb$$

The film feeding speed in the camera is in proportion to the quantity of the film 2 wound to the film winding spool 57, that is the diameter of the formed coil if the rotational speed of the film winding spool 57 is the same. Furthermore, the level of the analog signal detected by the magnetic head 4 is in proportion to the film feeding speed as described above. Therefore, the level of the analog signal detected by the magnetic head 4 is in proportion to the diameter of the film 2 wound around the film winding spool 57.

Assuming that the diameter of the film winding spool 57 is D, the thickness of the film 2 is d, the pitch of one frame is L, and the aperture position when the leading portion of the film is wound around one-turn the film winding spool 57 is the first frame, overall length Fn of the film 2 when the n frames have been wound around the film winding spool 57 becomes:

$$Fn = (n-1) L + D\pi$$

Therefore, overall length Fm of the film when the film has been wound by m times to film spool becomes as follows:

$$Fm = \sum_{k=1}^{m} \{D + 2d(k-1)\}\pi$$
$$= \{(D - 2d)m + dm(m + 1)\}\pi$$

The round number "m" at frame number "n" can be expressed by the following equation:

$$m = \frac{-(D-d)\pi + \sqrt{(D-d)^2\pi^2 + 4d\pi\{D\pi + (n-1)L\}}}{2d\pi}$$

Therefore, the diameter Dn of coiled film at the n-th frame can be expressed as follows:

$$Dn = D + f(m) \times 2 \times d$$

where f(m) is a function for neglecting decimal points of m.

For example, substitution of general figures such that D=10 mm, d=0.14 mm and L=38 mm results:

Coil diameter D1 at the first frame=10.28 mm

Coil diameter D36 at the 36-th frame=18.40 mm

Therefore, the level of the analog signal becomes different by about two times between the first frame and the 36-th frame. According to the conventional structure, if the digital conversion level set for the A/D converter 108b disposed in a magnetic reproducing circuit 108 is made to be a constant value which is different from the steady-state level as much as possible in order to prevent an influence of an external noise, a reproduction signal the level of which does not reach the digital conversion level is undesirably generated in a case where the film feeding speed is too low. Therefore, there arises a problem of an information read error. On the contrary, if the digital conversion level is set to a constant value which is different from the steady-state level by a small degree, the influence of the external noise can easily be affected regardless of the film feeding speed. Therefore, there arises a problem of an undesirable digital conversion of the noise.

Therefore, according to this embodiment, the digital conversion level is set such that the difference from the steady-state level (in a state in which no reproduction signal is generated from the magnetic head 4) is made to be smaller in a case where the number of the photographed frames of the film 2 is small. In addition, the level difference from the steady-state level is made to be larger in a case where the number of the photographed frames of the film 2 is large.

FIGS. 7 and 8 respectively illustrate the output waveform at the first frame at which the film feeding speed is low and that at the 36-th frame at which the film feeding speed is high.

Figure 7A:
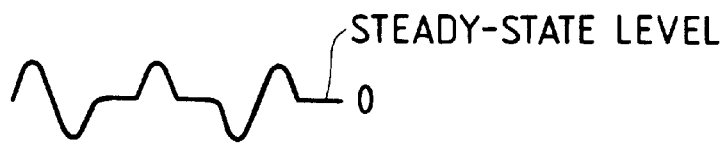
FIGS. 7A to 7C illustrate signal waveforms of the portions when the first frame is wound to the film winding spool according to the first embodiment of the present invention.
Figure 7B:
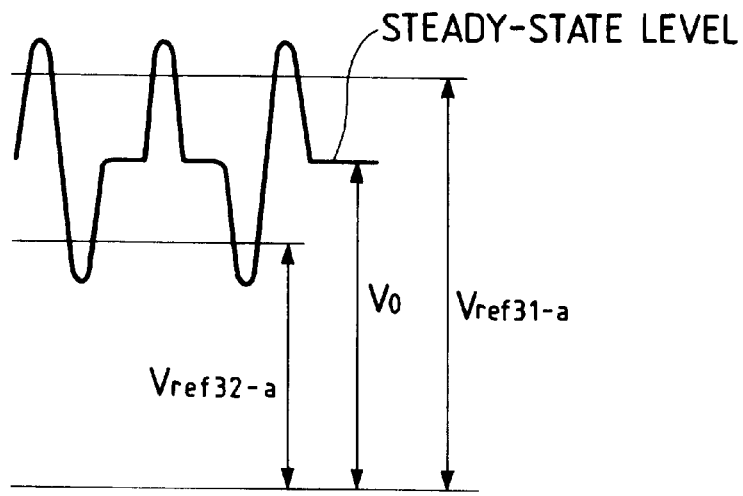
Figure 7C:
Figure 8A:
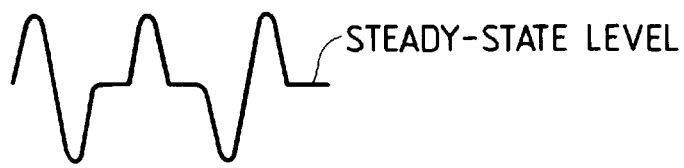
FIGS. 8A to 8C illustrate signal waveforms of the portions when the final frame is wound to the film winding spool according to the first embodiment of the present invention.
Figure 8B:
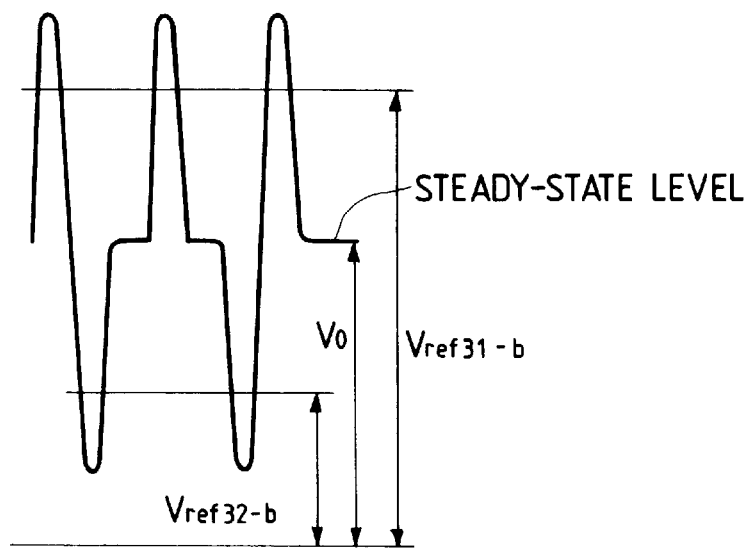
Figure 8C:

Specifically, FIGS. 7A and 8A illustrate detection (reproduction) signals detected by the magnetic head 4 at the first and the 36-th frames. FIGS. 7B and 8B illustrate output signals from the signal amplifier 108a which amplifies the above-described signals. FIGS. 7C and 8C illustrate output signals from the A/D converter 108b which A/D converts the above-described signals.

The digital conversion levels Vref31-a and Vref32-a shown in FIG. 7B are as follows:

$$Vref31\text{-}a = R40/(R38+R39+R40) \times Va$$

$$Vref32\text{-}a = (R42+R43)/(R41+R42+R43) \times Vb$$

In this case, the analog switches 34 and 35 are switched on.

The digital conversion levels Vref31-b and Vref32-b shown in FIG. 8B are as follows:

$$Vref31\text{-}b = (R39+R40)/(R38+R39+R40) \times Va$$

$$Vref32\text{-}b = R43/(R41+R42+R43) \times Vb$$

In this case, the analog switches 36 and 37 are switched on.

Figure 9A:
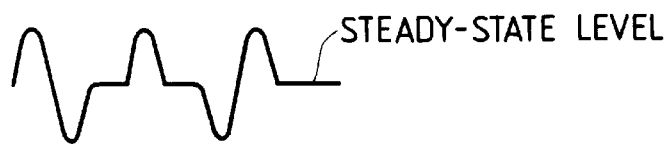
FIGS. 9A to 9C illustrate signal waveforms of the portions when an intermediate frame is wound to the film winding spool according to the first embodiment of the present invention.
Figure 9B:
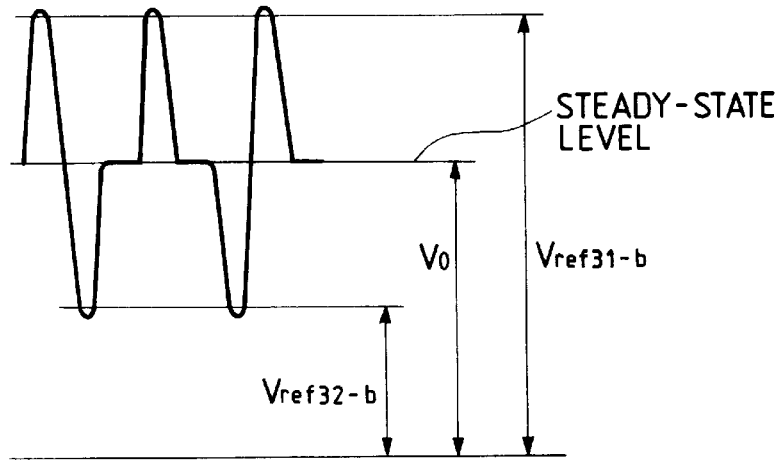
Figure 9C:

FIG. 9 illustrates the output waveform at the time of an intermediate frame between the first frame and the 36-th frame, for example, the 18-th frame. Specifically, FIG. 9A illustrates a signal detected by the magnetic head 4 at the 18-th frame. FIG. 9B illustrates an output signal from the signal amplifier 108a which amplifies the above-described signal. FIG. 9C illustrates an output signal from the A/D converter 108b which A/D converts the input of the above-described signal.

The upper and the lower peaks of the output signal shown in FIG. 9B are made to be limit levels which are larger than the digital conversion level Vref31-*b* and as well as smaller than Vref32-*b*.

Therefore, according to this embodiment, the digital conversion level is set to be Vref31-*a* and Vref32-*a* in a region from the first frame to the 17-th frame, the same is set to be Vref31-*b* and Vref32-*b* in a region from the 18-th frame.

Figure 10:
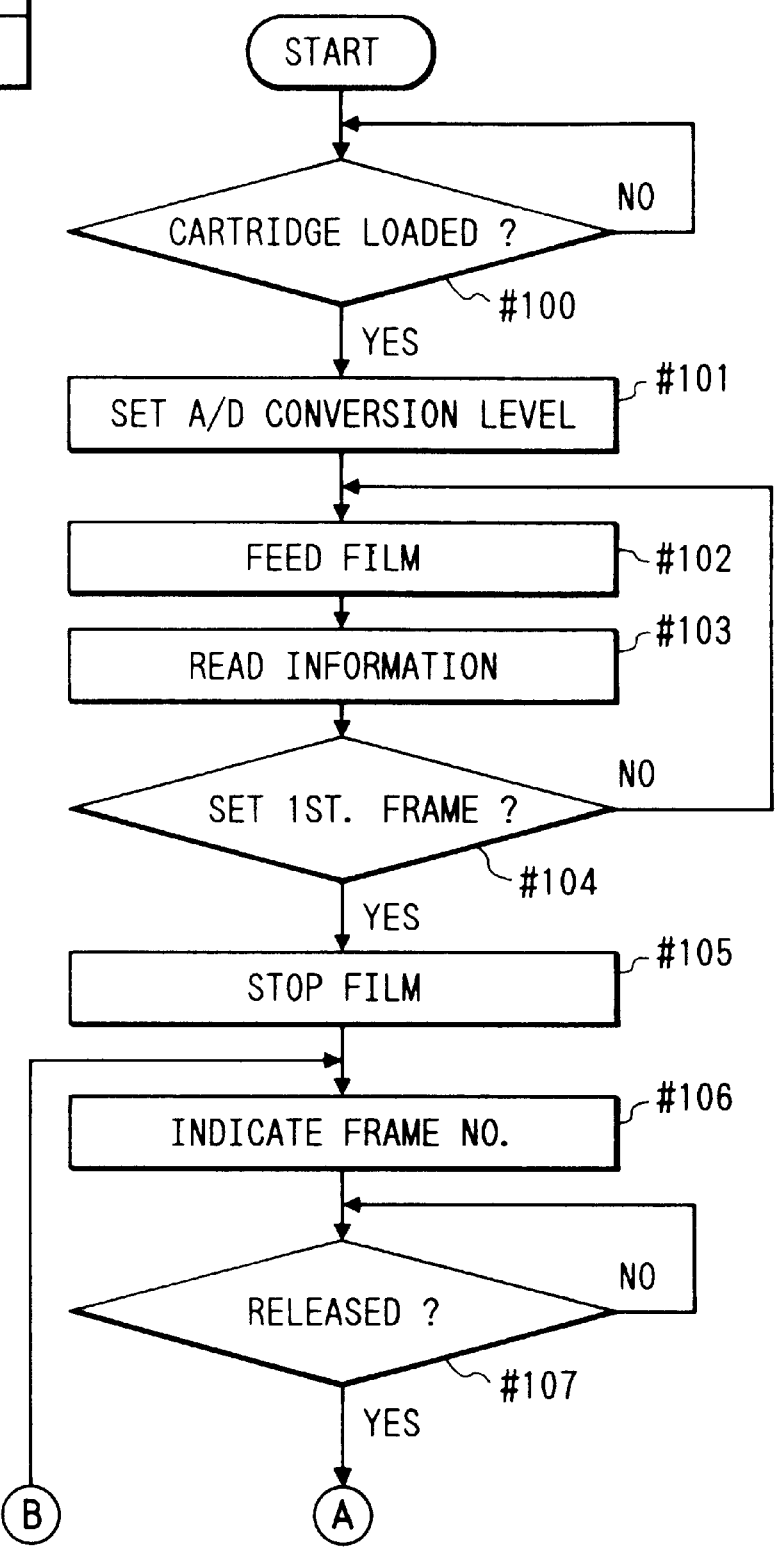
Figure 10B:
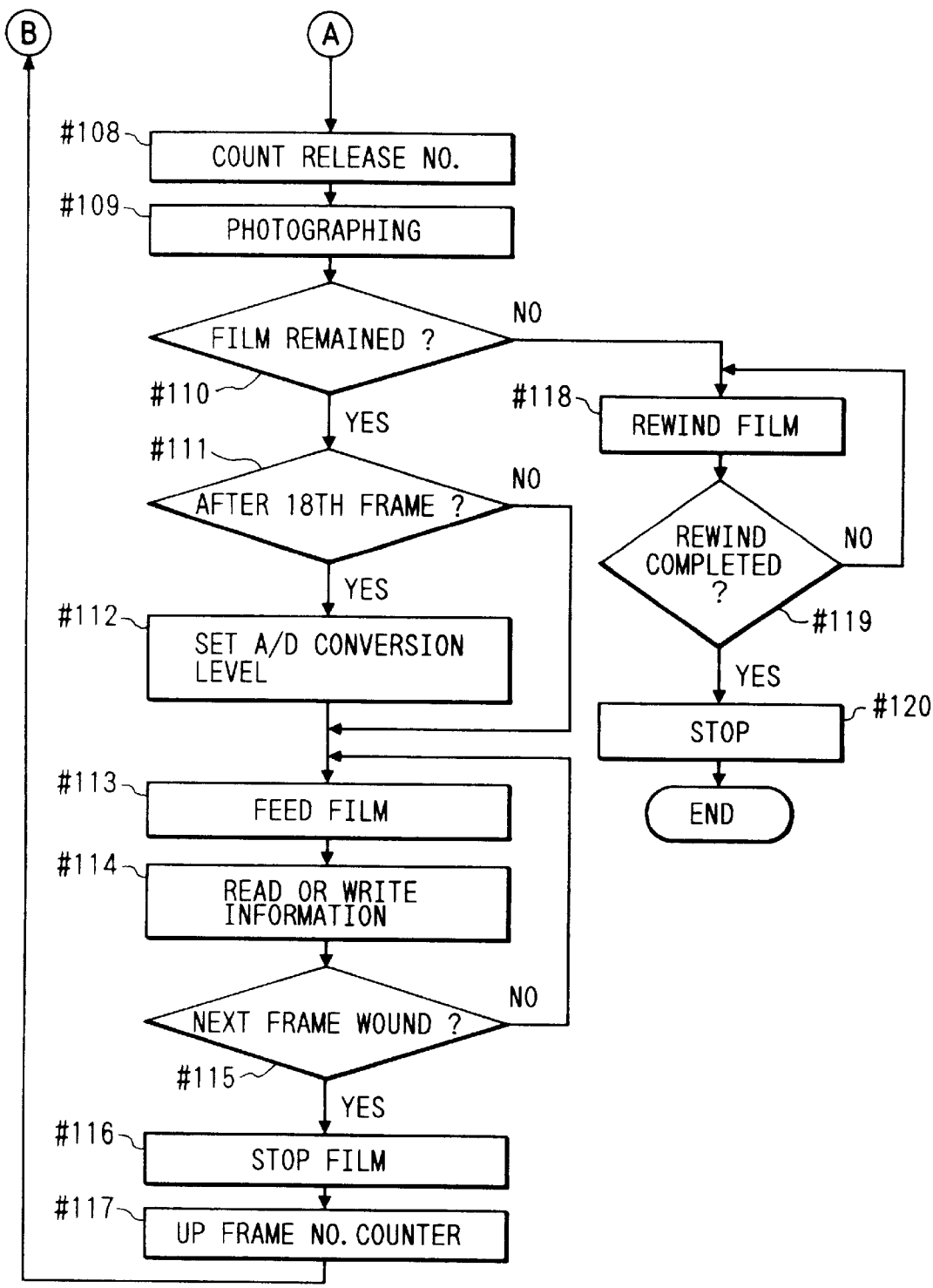

Then, the operation of the control circuit 101 will now be described with reference to a flow chart shown in FIG. 10.

When a power switch of the camera is switched on, the operation from step 100 is commenced.

(Step 100) It is discriminated whether or not both the cartridge loading switch 106 and the back cover switch 107 have been switched On. If it has been discriminated that they have been switched on, a discrimination is made that the film cartridge 1 has been loaded into the camera and the flow proceeds to step 101.

(Step 101) The analog switches 34 and 35 are switched on by transmitting the switch signal AS1 and the digital conversion levels are set to Vref31-*a* and Vref32-*a* as shown in FIG. 7B.

(Step 102) The film feeding motor driver circuit 103 is operated so that an operation of setting the first frame of the film 2 to the position of the aperture by the film feeding motor 51, that is the film idle feeding operation is commenced.

(Step 103) The magnetic head 4 is operated by means of the magnetic head drive circuit 104 during the operation for idle-feeding the film 2 to read and store information about the film such as the film sensitivity, the number of frames, the type of the film (negative film or positive film) written to the magnetic track T formed in the film 2.

(Step 104) If a discrimination is made that the operation of setting the first frame has been completed by a known means (for example, the detection of the quantity of the fed film, the motor actuated time and the detection of the perforation P by the encoder), the flow proceeds to step 105.

(Step 105) The film feeding motor 51 is stopped by means of the film feeding motor driver circuit 103 to stop the film winding operation.

(Step 106) The frame count display 111 is operated by means of the frame number display driver circuit 110 to cause the frame count display 111 to display the first frame.

(Step 107) The state of the release switch 105 is discriminated. If the same has been switched on, a discrimination is made that the release has been made and the flow proceeds to step 108.

(Step 108) The number of release times of the subject film 2 is counted by the counter circuit 109.

(Step 109) The AF.AE control circuit 102 is operated so that the photographing operation such as the focusing of the photographing lens and the exposure operation by opening/closing the shutter is performed.

(Step 110) The predetermined number of frames read in step 103 or a predetermined number of frames set by a known means and the number of frames of the film photographed are subjected to a comparison so as to discriminate whether or not there are residual frames of the film. If there are residual frames, the flow proceeds to step 111. If there is no residual frame, the flow proceeds to step 118. The detection of the number of the frames is made by, for example, detecting the count of the counter circuit 109. As an alternative to this, the present number of the photographed frames may be detected on the basis of the number of the frames in step 117.

(Step 111) A discrimination whether or not the number of the photographed frame has reached 18 is made on the basis of the count (number of releasing operations) of the counter circuit 109 in step 108. If the same has not reached 18, the digital conversion level is not changed and the flow proceeds to step 113. If the same has exceeded 18, the flow proceeds to step 112.

(Step 112) The switch signal AS2 is transmitted to switch on the analog switches 36 and 37 and the digital conversion level is set to Vref31-*b* and Vref32-*b* as shown in FIGS. 8B and 9B.

(Step 113) The film feeding motor 51 is rotated by means of the film feeding motor driver circuit 103 to commence the winding of the next frame.

(Step 114) The magnetic head 4 is operated by means of the magnetic head drive circuit 104 during the operation of winding the next frame of the film 2. Thus, photography information such as the shutter speed, the diaphragm value and information about the data of the photography and the like is written to the magnetic track T which corresponds to the photographed frame of the film 2 or information written to the film 2 is read by the magnetic head 4 by operating the magnetic reproducing circuit 108.

(Step 115) A discrimination is made whether or not the next frame of the film 2 has been wound. If it has been completed, the flow proceeds to step 116. If it has not been completed, the flow returns to step 113.

(Step 116) The rotation of the film feeding motor 51 is stopped by means of the film feeding motor driver circuit 103 to stop the operation of winding the film 2 before the flow proceeds to step 117.

(Step 117) An instruction of counting is issued to the frame number display driver circuit 110 before the flow returns to step 106.

In a case where there is no residual frame of the film 2 in step 110, the flow proceeds to step 118 as described above.

(Step 118) By actuating the film feeding motor driver circuit 103, the film feeding motor 51 is rotated in a direction in which the film is rewound so that the operation of rewinding the film 2 into the film cartridge 1 is commenced.

(Step 119) A discrimination is made whether or not the operation of rewinding the film 2 into the film cartridge 1 has ben completed. If the same has been completed, the flow proceeds to step 120. If the same has not been completed, the flow returns to step 118.

(Step 120) The sequential operation of the camera is completed.

Figure 11:
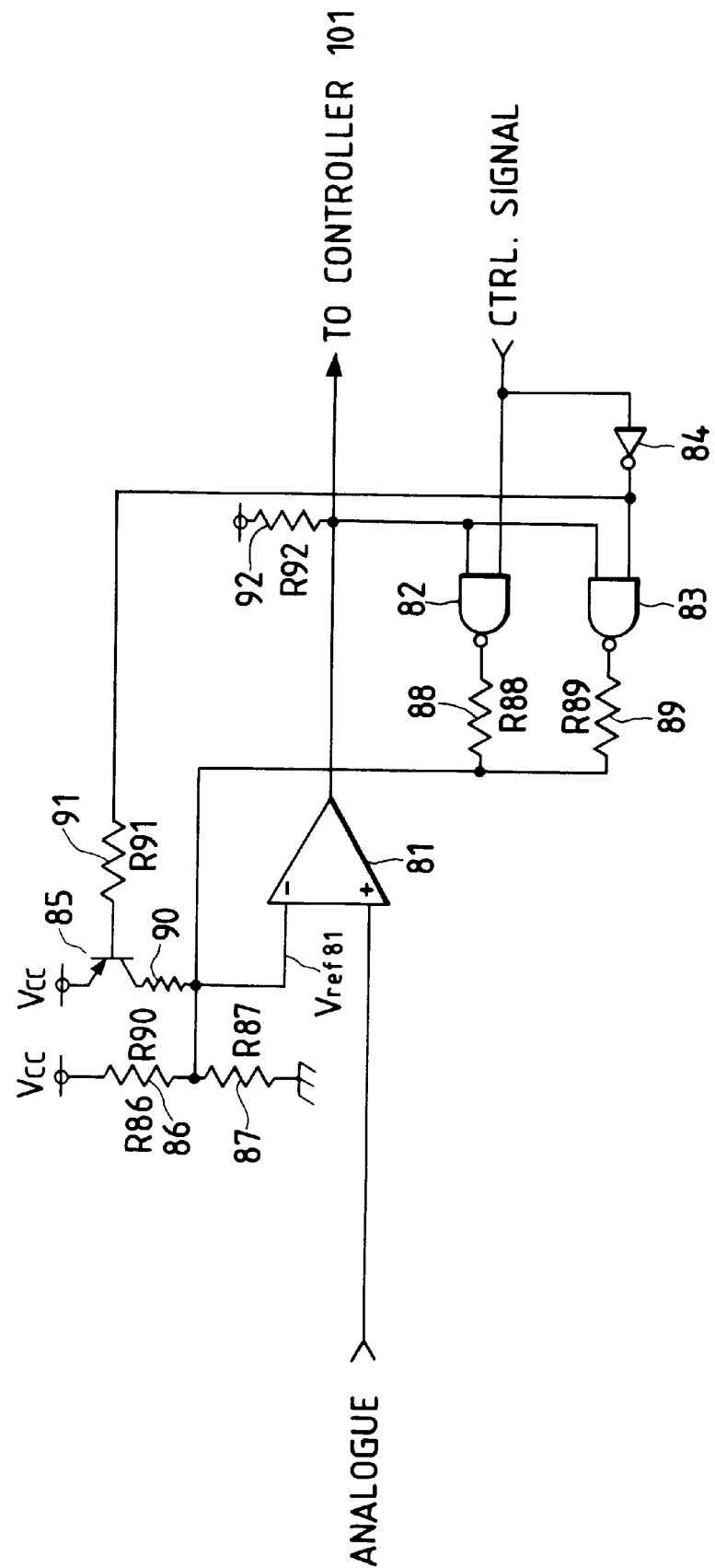
FIG. 11 is a circuit diagram which illustrates the schematic structure of the A/D converter according to a second embodiment of the present invention.

FIG. 11 illustrates a second embodiment of the present invention where another example of the structure of the A/D converter 108*b* in the magnetic reproducing circuit 108 is shown. The difference from the first embodiment lies in that the A/D conversion is performed by one comparator 81.

Referring to FIG. 11, reference numeral 81 represents an open collector comparator for digital-converting an analog signal detected by a signal amplifier 108*a* which amplifies the analog signal. Reference numerals 82 and 83 represent open collector NAND gates for changing their output states in accordance with the control signal supplied from the control circuit 101 on the basis of the number of the photographed frames and the output from the comparator 81 for the purpose of securing the hysteresis width in the comparative voltage (the digital conversion level Vref81). Reference numeral 84 represents inverters for controlling the NAND gate 83 and as well as controlling a PNP transistor 85 via a resistor 91 which has a resistance value of R91. Reference numeral 85 represents the PNP transistor for controlling the pulling up of the resistor 90 having the resistance value of R91 in such a manner that the PNP transistor is turned on/off. Reference numerals 86 to 90 represent resistors for determining the digital conversion level Vref81. According to this embodiment, the resistance values are given reference numerals R86, R87, R88 and R89. The resistors 88 and 89 hold a relationship R88<R89.

Then, the operation of the A/D converter 108b thus-constituted will now be described.

In accordance with the number of photographed frames, the control circuit 101 transmits an H level control signal to the NAND gate 82 and the inverter 84 in a case where the number of the photographed frames is 18 or more. If the same is 17 or less, it transmits an L-level control signal.

Assuming that the number of the photographed frames is 18 or more, H control signal is supplied from the control circuit 101 to the A/D converter 108b. Therefore, the output from the inverter 84 becomes "L" and thereby the PNP transistor 85 is turned on. As a result, the resistor 90 is brought to a state similar to a state in which it is connected in parallel to the resistor 86.

Since the L signal is supplied from the inverter 84 to the NAND gate 83, the NAND gate is always brought to the open state. Furthermore, the output state from the NAND gate 82 is determined in accordance with the output from the comparator 8. Therefore, in a case where no analog signal is supplied to the comparator 81 or in a case where the output from the comparator 81 is L, the output from the NAND gate 82 is brought to the open state and therefore the resistor 88 is disregarded. As a result, the comparative voltage of the comparator, that is the digital conversion level Vref81-H (which corresponds to Vref31-b) becomes as follows:

$$Vref81\text{-}H = Vcc \times R87/\{(R86 \times R90)/(R86+R90)+R87\}$$

If an analog signal, the level of which is higher than the digital conversion level Vref81-H, is supplied to the comparator 81, the output from the NAND gate 82 becomes low level and the resistor 88 is brought to a state in which it is connected in parallel to the resistor 87. Therefore, the digital conversion level Vref81-L (which corresponds o Vref32-b) of the comparator 81 becomes as follows:

$$Vref81\text{-}L = Vcc \times \{(R87 \times R88)/(R87+R88)\}/[\{(R86 \times R90)/(R86+R90)\}+\{(R87 \times R88)/(R87+R88)\}]$$

In the case where the number of the photographed frames is 17 or less, the output from the inverter 84 becomes the open state and therefore the PNP transistor 85 is turned off. As a result, the resistor 90 does not affect the digital conversion level Vref81. Thus, the digital conversion level Vref81-H (which corresponds to Vref31-a) in the case where the output from the comparator is "L" becomes as follows:

$$Vref81\text{-}H = Vcc \times R87/(R86+R87)$$

On the other hand, the digital conversion level Vref81-L (which corresponds to Vref32-a) in the case where the output from the comparator 81 is "H" becomes as follows:

$$Vref81\text{-}L = Vcc \times \{(R87 \times R89)/(R87+R89)\}/[R86+\{(R87 \times R89)/(R87+R89)\}]$$

FIGS. 12A, 12B, 13A and 13B respectively illustrate the output waveforms from the portions of the A/D converter 108b in a case where the number of the photographed frames is 17 or less and the same is 18 or more in the structure according to the second embodiment.

FIG. 14 illustrates is a plan view which illustrates the essential structure of a third embodiment of the camera according to the present invention. According to this embodiment, the number of the photographed frames of the film 2 is not counted but a discrimination is made whether or not the diameter of the film 2 wound around the film winding spool 57 has reached a predetermined diameter. Furthermore, the digital conversion level is changed on the basis of the result of the detection by the method according to the first or the second embodiment.

Referring to FIG. 14, reference numeral 72 represents a cartridge chamber provided for the camera body (omitted from illustration), 73 represents a spool chamber and 74 represents a film pressing plate. Reference numeral 75 represents a body roller lever rotatably fastened to the camera body and pushing, by its portion 75a, the film 2 to the film winding spool 57 for the purpose of desirably performing automatic loading. Reference numeral 76 represents a spring an end portion of which is fastened to the camera body and another end portion of which is fastened to the body roller lever 75 and which gives right directional rotational force to the body roller lever 75.

Reference numeral 77 represents a film diameter detection switch having a section 77a which is able to come in contact with a portion 75b of the body roller lever 75, the film diameter detection switch 77 being deformed when it is brought to come in contact by the left rotation of the body roller lever 75 so as to come in contact (switched on) with a section 77b.

The film diameter detection switch 77 is connected to the control circuit 101. According to this embodiment, the control circuit 101 switches on the analog switch AS1 in a state shown in FIG. 6 according to the first embodiment when the switch 77 is switched off. When the switch 77 is switched on, the control circuit 101 switches on the analog switch AS2.

That is, when the film 2 is wound around the film winding spool 57 and the 18-th frame has been wound around the film winding spool 57, the body roller lever 75 is rotated in the left direction against the urging force of the spring 76. As a result, the portion 75b turns on the sections 77a and 77b. When the control circuit 101 detects the fact that the sections 77a and 77b have been turned on, it changes the digital conversion levels Vref31-a and Vref32-a to Vref31-b and Vref32-b.

According to the above-described embodiments, the digital conversion level of the A/D converter 108b in the magnetic reproducing circuit 108 is changed in accordance with the number of the photographed frames of the film 2. Therefore, the problem of the undesirable omission of the reproduction signal at the time of the conversion of the reproduction analog signal read by the magnetic head 4 into the digital signal can be prevented. In addition, the other problem of the output of erroneous information due to the undesirable conversion of external noise into data can be prevented.

As described above, the structure of the embodiment of the present invention comprises a frame number discriminating means for discriminating whether or not the number of the photographed frames of the film reached a predetermined number and a conversion level changing means for changing the conversion level at which the analog signal is converted into the digital signal. Thus, in accordance with the discrimination made whether or not the number of the photographed frames of the film has reached a predetermined number, that is the fact that the change in the quantity of the film wound around the film winding spool changes the film feeding speed, the conversion level for converting the analog signal reproduced by the magnetic head into the digital signal is changed. Therefore, the omission of the reproduction signal can be prevented and as well as the generation of read error due to the external noise can be reduced.

Figure 15:
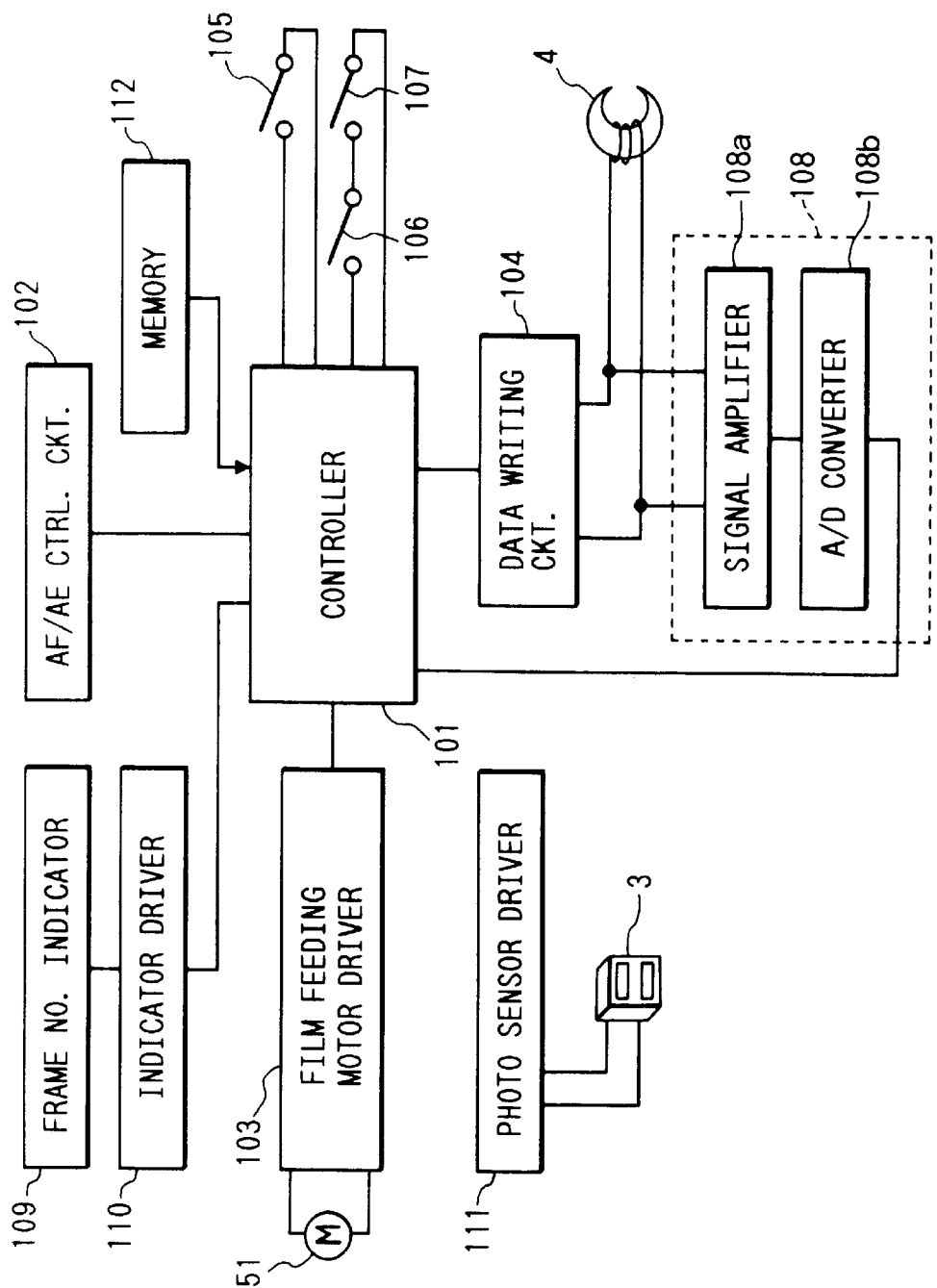
FIG. 15 is a block diagram which illustrates a circuit for a camera according to another embodiment of the present invention.

FIG. 15 is a block diagram which illustrates a circuit for use in the camera according to another embodiment of the present invention.

Referring to FIG. 15, reference numeral 101 represents a control circuit comprising a microcomputer and the like and acting to control the operations of the camera. Reference numeral 102 represents an AF.AE control circuit for controlling the focusing of the photographing lens and the operation of the exposure control shutter. Reference numeral 103 represents a film feeding motor driver circuit for rotating the film feeding motor 51. Reference numeral 104 represents a data writing circuit for operating the magnetic head 4 to write information. Reference numeral 105 represents a release switch for releasing the shutter of the camera when the release switch is switched on. Reference numeral 106 represents a cartridge loading switch which is switched on when the film cartridge 1 is loaded into the camera. Reference numeral 107 represents a back cover switch which is switched on when the back cover is closed. When both of the above-described switched 106 and 107 are switched on, the control circuit 101 operates the film feeding motor driver circuit 103 to commence setting of the first frame of the film 2.

Reference numeral 108 represents a reproducing circuit for detecting magnetic information written to the magnetic track T of the film 2 by the magnetic head 4, amplifying it as an analog signal and digital-converting the analog signal to make it information for the control circuit 101. The reproducing circuit 108 comprises a signal amplifier 108a for detecting the output from the magnetic head 4 and amplifying the analog signal of the output and an A/D converter 108b for converting the amplified analog signal into a digital signal.

Reference numeral 109 represents a count display comprising a liquid crystal display or the like and displaying the number of the photographed frames. Reference numeral 110 represents a display drive circuit for increasing/decreasing the count. Reference numeral 111 represents a photosensor drive circuit for driving the photosensor 3. Reference numeral 112 represents a storage circuit for storing the film feeding speed or the like to be described later.

As a result, the film feeding speed is actually measured and it is stored so as to set the digital conversion level such that the difference from the normal level in a state in which no signal is transmitted is made to be small in a case where the film feeding speed is low on the basis of the stored film feeding speed. In a case where the film feeding speed is low, the digital conversion level is set such that the difference from the stedy-state level is made to be large.

The film feeding speed is calculated in such a manner that time t which is required for the photosensor 3 to detect the perforation P1 of the film 2 from the commencement of the film feeding operation is measured. Assuming that the pitch between the perforations P1 and P2 is L, film feeding speed a is L/t. According to this embodiment, the digital conversion level is changed on the basis of the fact that the film feeding speed "a" is higher than predetermined value "a".

Then, the operation of the control circuit 101 will now be described with reference to a flow chart shown in FIG. 16.

(Step 99) When power is supplied to the camera, the flow proceeds to step 100.

(Step 100) When both of the film cartridge loading switch 106 and the switch 107 are switched on, a discrimination is made that the film cartridge 1 has been loaded in the camera and the flow proceeds to step 101.

(Step 101) The film feeding motor 51 is rotated by means of the film feeding motor drive circuit 103 so as to set the first frame of the film 2 to the position of the aperture and commence the so-called film idling operation.

(Step 102) During the film idle-feeding operation, the photosensor 3 is operated by means of the photosensor drive circuit 111 to detect the perforation of the film 2. Thus, the time taken from the perforation to the next perforation is measured to calculate the film feeding speed a. Assuming that the pitch of the perforations is L and the above-described detection time is t1, the film feeding speed a can be calculated by L/t1. The film feeding speed a at this time is stored in the storage circuit 112 before a comparison is made between the film feeding speed a and a predetermined value a1. If it is faster than a1, the flow proceeds to step 103. If it is slower than a1, the flow proceeds to step 104. The speed thus-detected is stored in the storage circuit 112.

(Step 103) The switch signal AS2 is transmitted to switch on the analog switches 36 and 37 to make the digital conversion level to be Vref31-b and Vref32-b as shown in FIG. 8B.

(Step 104) The switch signal AS1 is transmitted to switch on the analog switches 34 and 35 so as to make the digital conversion level to be Vref31-a and Vref32-a as shown in FIG. 7B.

(Step 105) The reproducing circuit 108 is operated to read out information about the film such as the film sensitivity, the number of the frames of the film and the type of the film (negative or positive) and the like which has been previously written to the magnetic storage portion T of the film 2 to be read by the magnetic head 4. Then, in accordance with the time constant of the filter set in step 103 or step 104, the noise component is removed from the detected signal before it is converted into a digital signal by a known circuit so as to store it in the storage circuit 112.

(Step 106) A discrimination is made whether or not the first frame has been set by a known means (for example, the quantity of the film fed or the time in which the motor is activated by an encoder or the detection of the number of perforations detected by the photosensor 3). If the first frame has been detected, the flow proceeds to step 107.

(Step 107) The film feeding motor 51 is stopped by means of the film feeding motor drive circuit 103 to stop the film idle-feeding operation. Furthermore, the display drive circuit 110 is operated to cause the frame number display 109 to display the first frame.

(Step 108) The state of the release switch 105 is discriminate. If it has been switched on, a discrimination is made that the releasing operation has been performed and the number of the releasing operations of the film is stored in the storage circuit 112 before the flow proceeds to step 109.

(Step 109) The AF.AE control circuit 102 is operated to perform known photographing operation such as the focusing of the photographing lens and the exposure operation by opening/closing the shutter.

(Step 110) A comparison between the number of the frames read in step 105 or the number of films which can be photographed and which has been previously set by a known means and the present number of the photographed frames is made to discriminate whether or not there are residual frames. If there are residual frames, the flow proceeds to step 111. If there is no residual frame, the flow proceeds to step 119.

(Step 111) A discrimination is made whether or not the film feeding speed a at the time of feeding the previous frame stored in the storage circuit 112 is higher than a1. If it is higher than a1, the flow proceeds to step 112. If it is lower than a1, the flow proceeds to step 113.

Assuming that the present film feeding speed a is the speed at the moment at which the first frame has been photographed, it is the film feeding speed at the time of the automatic loading operation, that is the film feeding speed calculated in step 102 and stored in the storage circuit 112. Assuming that the present feeding speed is the speed at the moment at which the frames from the second frame has been photographed, it is the film feeding speed which is stored in step 116 to be described later and at which the previous frame has been photographed.

(Step 112) The switch signal AS2 is transmitted to switch on the analog switches 36 and 37 to make the digital conversion level to be Vref31-b and Vref32-b as shown in FIG. 8B.

(Step 113) The switch signal AS1 is transmitted to switch on the analog switches 34 and 35 to make the digital conversion level to be Vref31-a and Vref32-a as shown in FIG. 7B.

(Step 114) The film feeding motor 51 is rotated by means of the film feeding motor drive circuit 103 to commence the operation of winding one frame and as well as start a timer.

(Step 115) At the time of winding the film 2 to the next frame, the magnetic head 4 is operated via the data writing circuit 104 so as to write photography information such as the shutter speed, the diaphragm value, the date of the photography and the like to the magnetic storage portion T of the film 2. Furthermore, information written to the film is read by the magnetic head 4 by operating the reproducing circuit 108 if necessary.

(Step 116) When it is a fact that the photosensor has detected the perforation of the next frame via the photosensor drive circuit 111, a discrimination is made that winding of the film 2 to the next frame has been completed and the flow proceeds to step 117. At this time, the timer, which has been started in step 114, is stopped to obtain the time taken from the commencement of the winding operation to the detection of the perforation of the next frame. Thus, the film feeding speed a is calculated by the above-described method to store it in the storage circuit 112.

(Step 117) The operation of the film feeding motor 51 is stopped by means of the film feeding motor drive circuit 103 so as to stop feeding of the film.

(Step 118) The count displayed by the frame number display 109 is increased by one frame by operating the display drive circuit 110 before the flow returns to step 108.

In a case where a discrimination is made that there is no residual frame in step 110, the flow proceeds to step 119 as described above.

(Step 119) The film feeding motor 51 is rotated in the reverse direction by means of the film feeding motor drive circuit 103 so as to commence the film rewinding operation into the film cartridge 1.

(Step 120) A discrimination is made whether or not the rewinding of the film 2 into the film cartridge 1 has been completed by a known means. If it has been completed, the flow proceeds to step 121.

(Step 121) The operation of the film feeding motor 51 is stopped by means of the film feeding motor drive circuit 103 to stop the operation of rewinding the film.

(Step 122) The sequential operation of the camera is completed.

Figure 17:
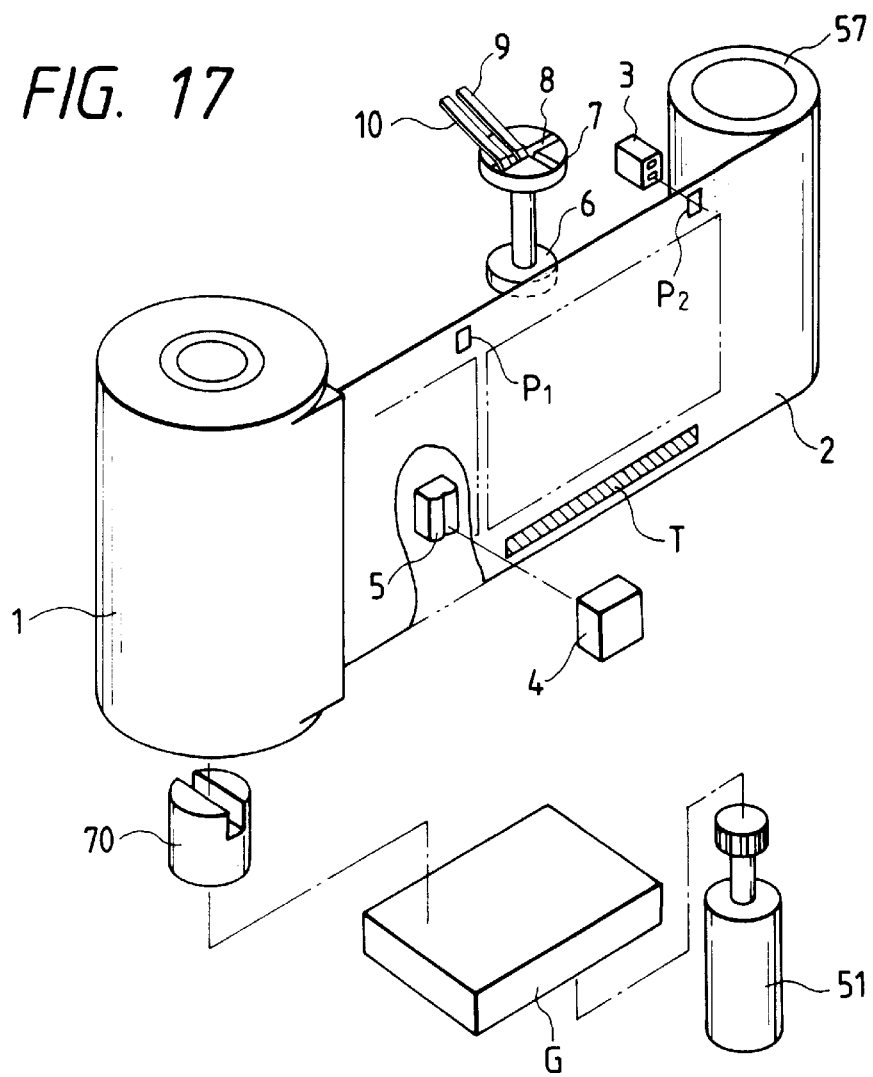
FIG. 17 is a perspective view which illustrates the essential structure of the camera according to another embodiment of the present invention.
Figure 18:
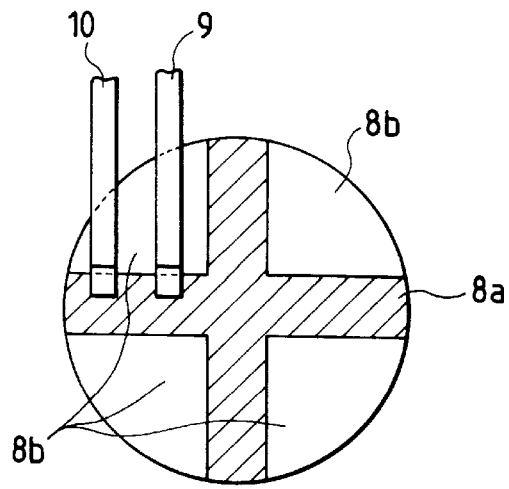
FIG. 18 is a plan view which illustrates the pulse plate and a pulse section.
Figure 19B:
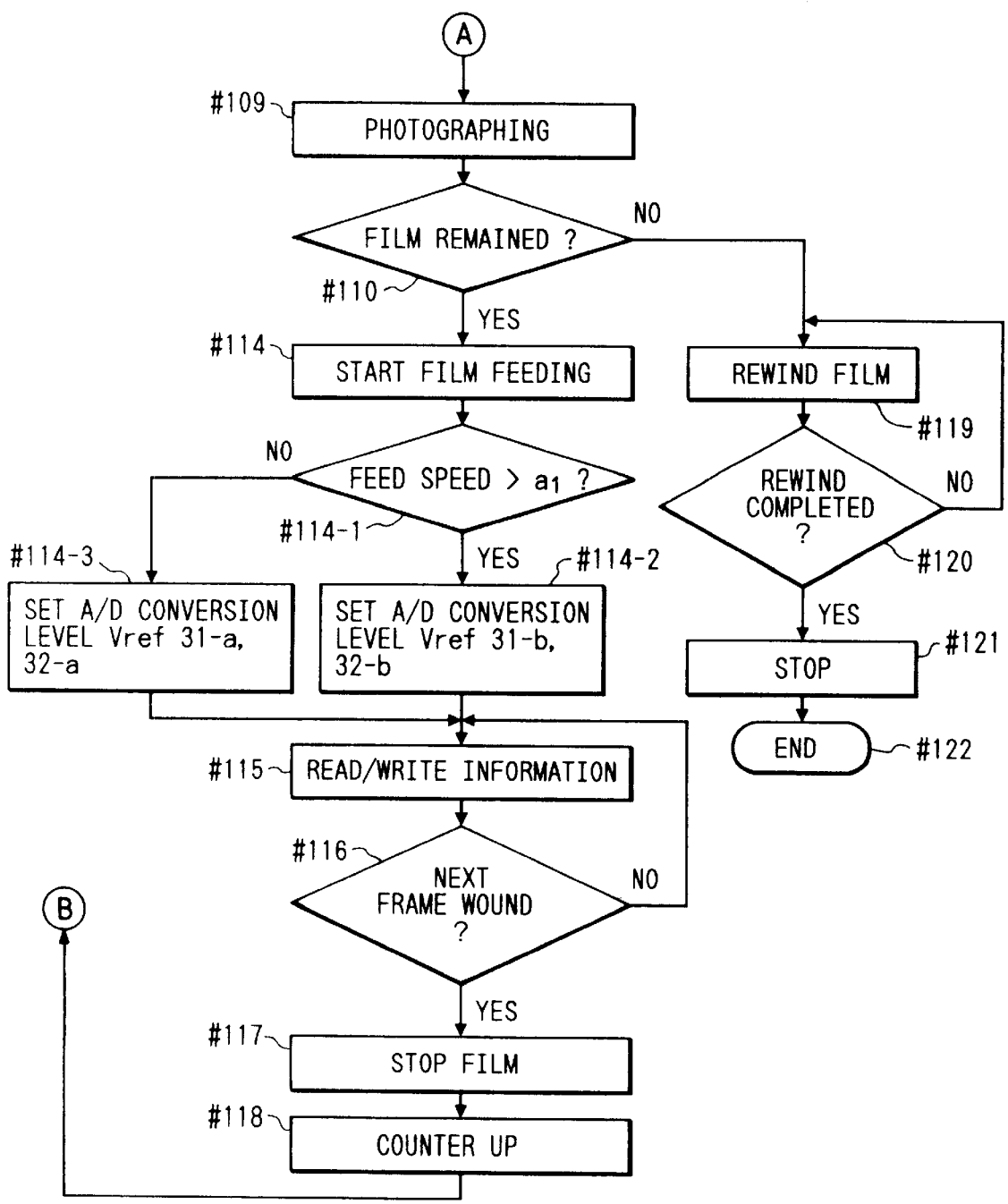

FIGS. 17 to 19 illustrate another embodiment of the present invention. FIG. 17 is a perspective view which illustrates an essential portion of the camera and FIG. 18 is an enlarged view which illustrates the pulse plate and the pulse section shown in FIG. 17. The same elements as those according to the embodiment shown in FIG. 1 are given the same reference numerals.

Referring to FIGS. 17 to 19, reference numeral 6 represents a roller positioned in contact with the film 2, the roller 6 being rotatably fastened to the camera body (omitted from illustration). Reference numeral 7 represents a disc which is able to move together with the roller 6. Reference numeral 8 represents a pulse plate secured to the surface of the disc 7 and having a conductive portion 8a and a non-conductive portion 8b. Reference numerals 9 and 10 represent pulse sections which are brought into contact with the conductive portion 8a of the pulse plate 8 to generate a pulse signal so as to transmit the quantity of the rotation of the pulse plate 8 to the control circuit 101 of the camera. As shown in FIG. 18, when the pulse plate 8 is rotated by one rotation, the pulse sections 9 and 10 respectively are turned on/off by n1 times (four times according to this embodiment).

Assuming that the diameter of the roller 6 is D and the time required to generate pulses by n2 times is t2, the film feeding speed a can be calculated by $(D\pi/t2) \times (n2/n1)$.

The film feeding speed a is calculated in the former portion of the operation of winding the frame before the digital conversion level is set. Furthermore, information about the subject frame is read in the latter portion of the frame winding operation.

FIG. 19 is a flow chart which illustrates the operation according to this embodiment. Referring to FIG. 19, the operation different from that according to the embodiment shown in FIG. 16 will now be described.

(Step 110) A discrimination is made whether or not there is residual frames of the film. If there are residual frames, the flow proceeds to step 114. If there is not residual frame, the flow proceeds to step 119.

(Step 114) The film feeding motor 51 is rotated by means of the film feeding motor drive circuit 103 so as to commence the operation of winding the film 2 by one frame.

(Step 114-1) When the film is fed as described above, the roller 6 is rotated and the pulse is generated by means of the pule plate 8 and the sections 9 and 10. First, time t2 required to generate n2 pulses is detected. Then, the film feeding speed a is calculated by $a=(D\pi/t2) \times (n2/n1)$. If it is higher than a1, the flow proceeds to step 114-2. If it is lower than a1, the flow proceeds to step 114-3.

(Step 114-2) The switch signal AS2 is transmitted to switch on the analog switches 36 and 37 to make the digital conversion level to be Vref31-b and Vref32-b as shown in FIG. 8B.

(Step 114-3) The switch signal AS1 is transmitted to switch on the analog signals 34 and 35 to make the digital conversion level to be Vref31-a and Vref32-a as shown in FIG. 7B.

(Step 115) While removing the noise component at the digital conversion level set in step 114-2 or step 114-3, information written to the magnetic storage portion T of the film 2 is read out by the magnetic head 4 so as to supply it to the control circuit 101. As an alternative to this, photography information is, if necessary, written by means of the data writing circuit 104.

Figure 16B:
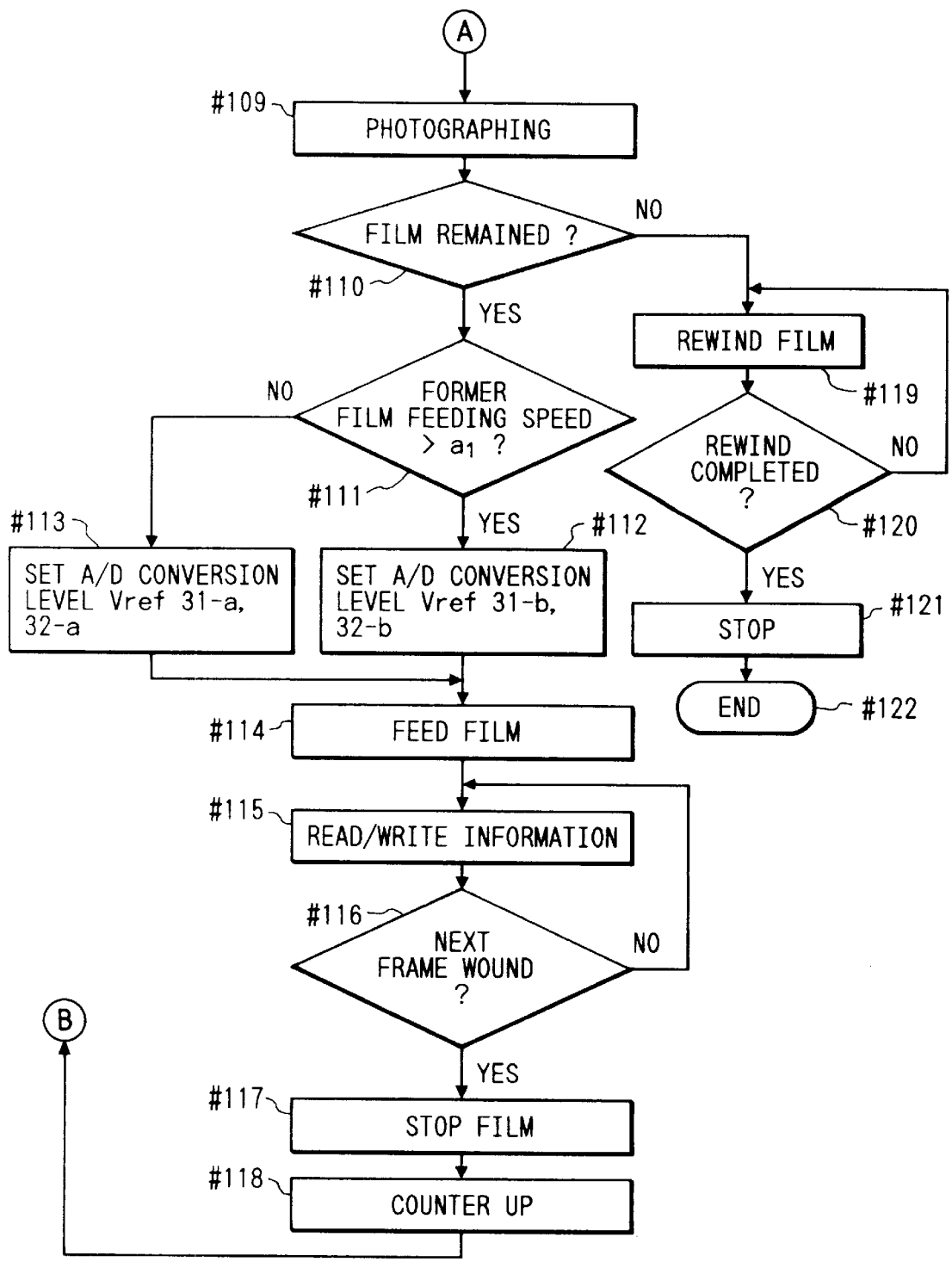

The other operations are the same as those according to the embodiment shown in FIG. 16.

Figure 20:
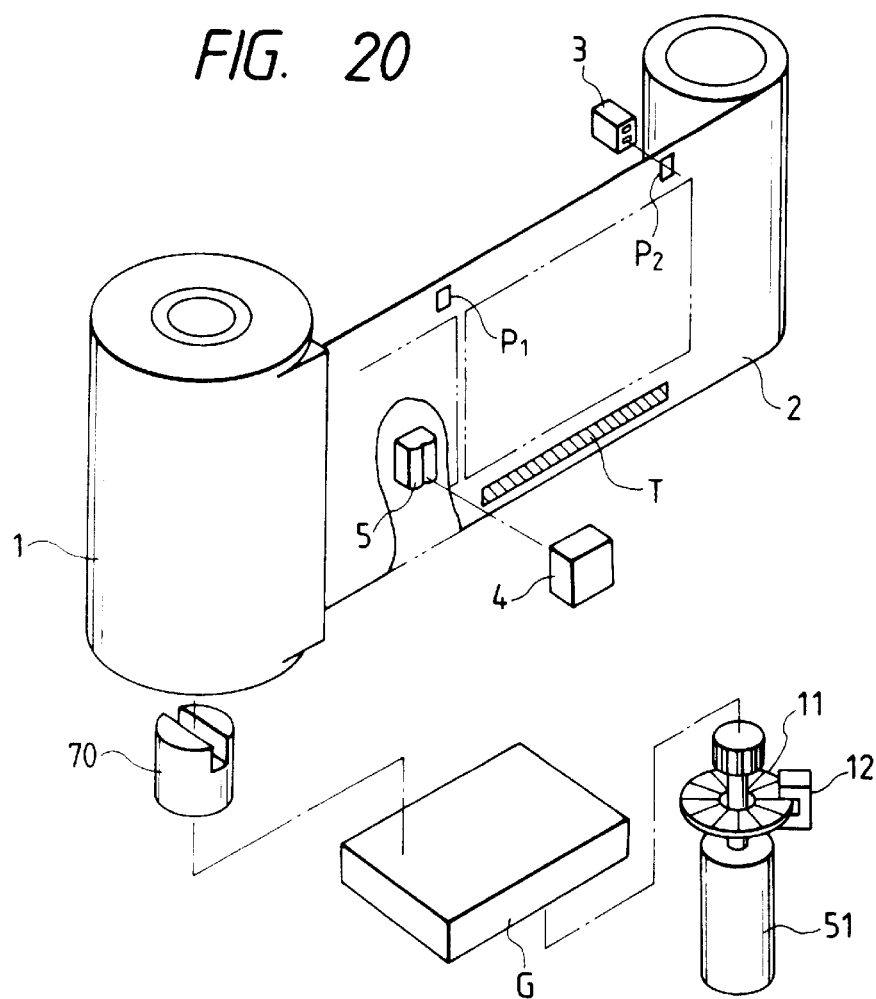
FIG. 20 is perspective view which illustrates the essential structure of another embodiment of the camera according to the present invention.

FIG. 20 is a perspective view which illustrates the essential structure of a third embodiment of the camera according to the present invention. The same elements as those according to the embodiment shown in FIG. 17 are given the same reference numerals.

According to this embodiment, the film feeding speed is not directly detected from the film 2 but the same is calculated from the detection of the number of rotations of the film feeding motor 51. According to this method, the film feeding speed can be precisely detected while eliminating a necessity of contact with the film 2.

Referring to FIG. 20, reference numeral 11 represents a slit disc secured to the output shaft of the film feeding motor 51. Reference numeral 12 represents a photosensor for detecting the light and dark portions of the slit disc 11.

Assuming that when the slit disc 11 is rotated by one rotation, m1 meaning number of light and dark portion pairs can be detected, the rotation of the film feeding motor 51 by N times causes the film winding spool 57 to rotate one time and the number of the photographed frames is n in this case, the film feeding speed "a" can be obtained as follows in a case where m2 light and dark have been detected in time T.

Assuming that the diameter of the film winding spool 57 of the camera is D, the thickness of the film 2 is d, the pitch of one frame is L and the position at which the leading portion of the film 2 is wound to the film winding spool 57 by one time is at the first frame, the overall length of the film 2 when the film 2 has been wound to the film winding spool 57 by n frames can be expressed as follows:

$$Fn = (n-1)L + D\pi$$

Therefore, the film overall length Fm to the m round can be expressed as follows:

Therefore, overall length Fm of the film when the film has been wound by m times becomes as follows:

$$Fm = \sum_{k=1}^{m} \{D + 2d(k-1)\}\pi$$
$$= \{(D - 2d)m + dm(m + 1)\}\pi$$

The frame number or the round number can be expressed by the following equation:

$$m = \frac{-(D-d)\pi + \sqrt{(D-d)^2\pi^2 + 4d\pi\{D\pi + (n-1)L\}}}{2d\pi}$$

Therefore, the diameter Dn of coiled film at the n-th frame can be expressed as follows:

$$Dn = D + f(m) \times 2 \times d$$

where f(m) is a function for neglecting decimal points of m)

Therefore, the film feeding speed a is calculated by the following equation:

$$a = \{D + f(m) \times 2 \times d\} \cdot \pi \cdot m2/(m1 \cdot N \cdot T)$$

On the basis of this, the digital conversion level is changed.

According to the above-described embodiments, the digital conversion level of the A/D converter 108b in the reproducing circuit 108 is changed in accordance with the feeding speed of the film 2. Therefore, the omission of the reproduction signal at the time of the conversion of the analog signal read by the magnetic head 4 into the digital signal can be prevented and as well as the problem of transmitting erroneous information as a reproduction signal due to undesirable conversion of external noise as data can be prevented.

As described above, according to the embodiments shown in FIGS. 15 to 20, the conversion level changing means for changing the digital conversion level for converting the analog signal into the digital signal in the A/D conversion circuit in accordance with the film feeding speed detected by the speed detection means is provided. Thus, the digital conversion level is changed in accordance with the detected film feeding speed to make it correspond to the change in the output level of the analog signal detected by the magnetic head in accordance with the film feeding speed. Therefore, the conversion error such as the signal omission or an undesirable conversion of external noise at the time of converting the analog signal detected by the magnetic head into the digital signal can be prevented. As a result, a camera capable of transmitting a proper reproduction signal can be provided.

FIGS. 21 to 24 illustrate another structure of the film feeding mechanism C for the camera shown in FIG. 11.

According to this embodiment, the film winding spool is given reference numeral 77.

Figure 21:
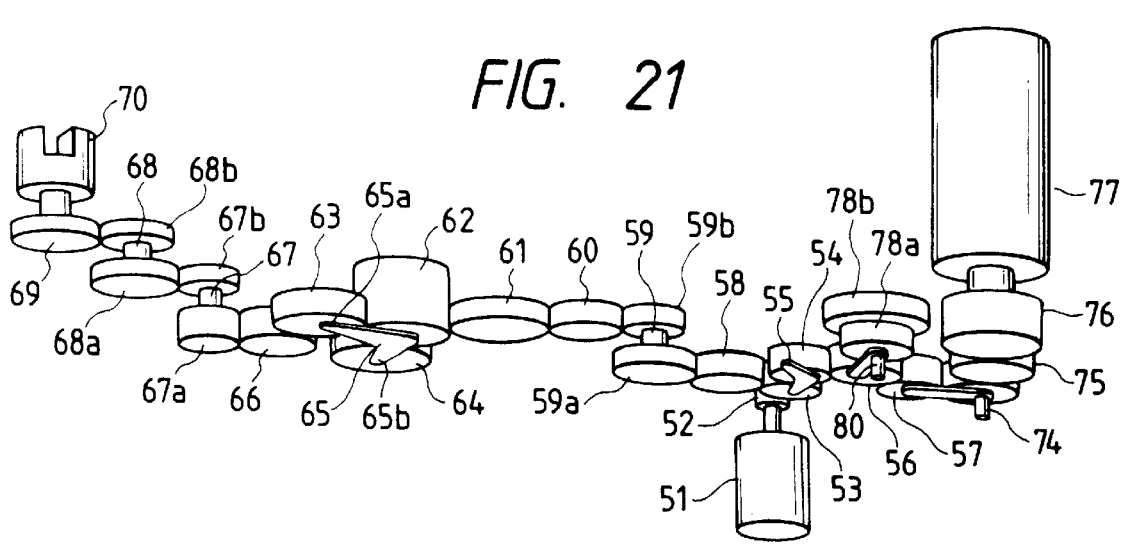
FIG. 21 is a perspective view which illustrates another example of the gear configuration of the film feeding mechanism shown in FIG. 1.
Figure 23:
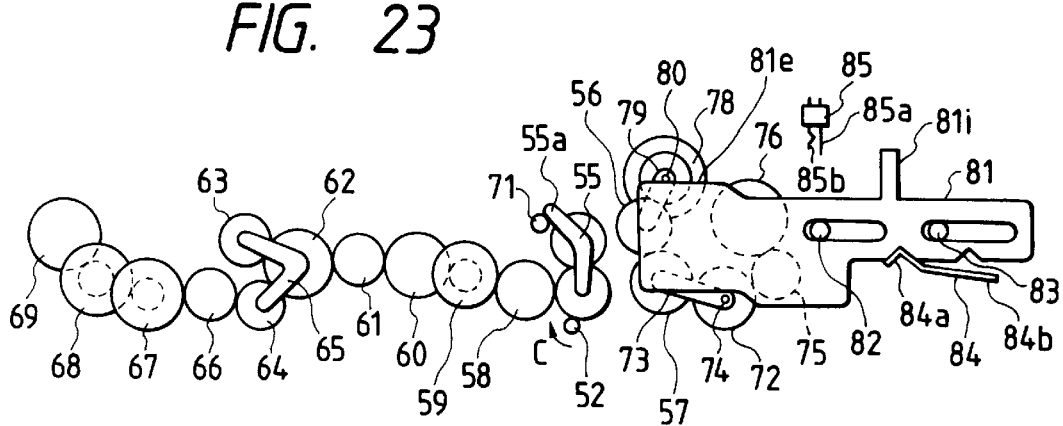
FIG. 23 is a plan view which illustrates the configuration of the gears at the time of rewinding the film (at a low speed) by the film feeding mechanism shown in FIG. 21.
Figure 24:
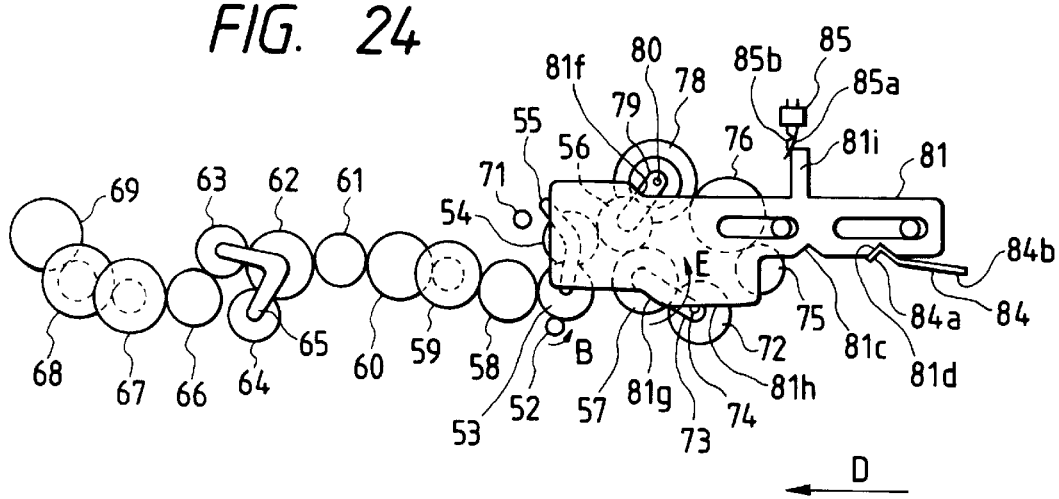
FIG. 24 is a plan view which illustrates the configuration of the gears at the time of winding the film (at a high speed) by the film feeding mechanism shown in FIG. 21.

Referring to FIGS. 21 and 24, reference numeral 51 represents a film feeding motor which is rotated forward (in a direction designated by an arrow B shown in FIG. 22) at the time of winding the film, while the same is rotated reversely (in a direction designated by an arrow C shown in FIG. 23) at the time of rewinding the film. Reference numeral 52 represents a pinion gear secured to the rotational shaft of the motor 51. Reference numeral 53 represents a first sun gear engaged to the pinion gear 52. Reference numeral 54 represents a first planetary gear engaged to the first sun gear 53. Reference numeral 55 represents a first connection lever for connecting the first sun gear 53 and the first planetary gear 54 and rotatably holding the first planetary gear 54 while generating frictional force with the first planetary gear 54 so that the rotation of the first sun gear 53 causes the first planetary gear 54 to rotate around the first sun gear 53 while making the first sun gear 53 to be the rotational center. The above-described first sun gear 53, the first planetary gear 54 and the first connection lever 55 constitute a known planetary gear mechanism. Reference numeral 56 represents a spool sun gear which is engaged to the first planetary gear 54 only when the film feeding motor 51 is rotated forward. Reference numeral 57 represents a film winding spool secured to the spool sun gear 56 and arranged to be moved integrally with the same.

Reference numeral 58 represents a first idler gear which is always engaged to the first sun gear 53. Reference numeral 59 represents a first two-profile gear having a large gear portion 59a and a small gear portion 59b, the large gear portion 59a being engaged to the first idler gear 58. Reference numeral 60 represents a second idler gear which is engaged to the small gear portion 59b of the two-profile gear 59. Reference numeral 61 represents a third gear which is engaged to the second idler gear 60. Reference numeral 62 represents a second sun gear which is engaged to the third idler gear 61. Reference numeral 63 represents a second planetary gear which is engaged to the second sun gear 62. Reference numeral 64 represents a third planetary gear which is engaged to the second sun gear 62 similarly to the second planetary gear 13. Reference numeral 65 represents a second connection lever for connecting the second sun gear 62, the second planetary gear 63 and the third planetary gear 64 by its arm portions 65a and 65b and rotatably holding the planetary gears while generating frictional force so that the rotation of the second sun gear 62 causes the second planetary gear 63 and the third planetary gear 64 to rotate around the second sun gear 62 while making the second sun gear 62 to be the rotational center. The above-described second sun gear 62, the second and the third planetary gears 63 and 64 and the second connection lever 65 constitute a known planetary gear mechanism.

Reference numeral 66 represents a fourth idler gear which is engaged to the second planetary gear 63 and as well as which is not engaged to the third planetary gear 64 by the left directional rotation of the second connection lever 65 around the second sun gear 62 at the time of the forward rotation of the film feeding motor 51. When the motor 51 is rotated reversely, the fourth idler gear 66 is engaged to the third planetary gear but it is not engaged to the second planetary gear 63 due to the right directional rotation of the second connection lever 65. Reference numeral 67 represents a two-profile gear having a large gear portion 67a and a small gear portion 67b, the large gear portion 67a being engaged to the fourth idler gear 66. Reference numeral 68 represents a third two-profile gear having a large gear portion 68a and a small gear portion 68b, the large gear portion 68a being engaged to the small gear portion 67b of the second two-profile gear 67. Reference numeral 69 represents a fork gear which is engaged to the small gear portion 68b of the third two-profile gear 68. Reference numeral 70 represents a fork which is rotated integrally with the fork gear 69. Thus, the feeding spool (omitted from FIG. 21) disposed in the film cartridge 1 is rotated. As a result, film 2 can be pushed forward and wind from the cartridge 1.

Reference numeral 71 represents a stopper disposed in the camera body (omitted from illustration) and acting to restrict the left directional rotational position of the first connection lever 55.

Reference numeral 72 represents a second spool planetary gear which is engaged to the second spool sun gear 57. Reference numeral 73 represents a third connection lever for connecting the second spool sun gear 57 and the second spool planetary gear 72, rotatably holding the second spool planetary gear 72 while generating frictional force with the second spool planetary gear 72 and causing second spool sun gear 57 to rotate to rotate the second spool planetary gear 72 around the second spool sun gear 75. The above-described second spool sun gear 57, the second spool planetary gear 72 and the third connection lever 73 constitute a known planetary gear mechanism.

Reference numeral 74 represents a pin erected on the third connection lever 73. Reference numeral 75 represents a spool idler disposed so as to be engaged to the second spool planetary gear 72 at the position on the rotation locus of the second spool planetary gear 72. Reference numeral 76 represents a spool gear which is engaged to the spool idler 75. Reference numeral 77 represents a film winding spool secured to the spool gear 76 and acting together with the spool gear 76.

Reference numeral 78 represents a first spool planetary gear having a small gear portion 78a and a large gear portion 78b, the first spool planetary ger 78 being engaged to the second spool sun gear 57 at its small gear portion 78a. Furthermore, when the first spool planetary gear 78 is rotated in the right direction around the first spool sun gear 56, the spool gear 78 and its large gear portion 78b are engaged to each other. Reference numeral 79 represents a fourth connection lever for connecting the first spool sun gear 56 and the first spool planetary gear 78, rotatably holding the first spool planetary gear 78 while generating frictional force from the first spool planetary gear 78 and causing the first spool sun gear 56 to be rotated to rotate the first spool planetary gear 78 around the first spool sun gear 56. The first spool sun gear 56, the first spool planetary gear 78 and the fourth connection lever 79 constitute a known planetary gear mechanism. Reference numeral 80 represents a pin erected on the fourth connection lever 79.

Reference numeral 81 represents a photography mode switch lever having elongated holes 81a and 81b which can be movably fastened to projections 82 and 83 formed on the main body (omitted from illustration), the lever 81 being arranged such that it can be manually operated. Reference numeral 84 represents a click plate made of flexible material having an end portion 84a fastened to the main body (omitted from illustration) and a bent portion 84a formed at another end portion thereof, the bent portion 84a being able to be fastened to V-grooves 81c and 81d. Since the bent portion 84a are engaged to the V-grooves 81c and and 81d, the undesirable movement of the photographing mode switch lever 81 is prevented. Reference numeral 85 represents a mode switching detection switch having a section 85a which is deformed at the position (the position shown in FIG. 24) of the photography mode switch lever 81 by its projection portion 81i. As a result, the sections 85a and 85b are brought into contact with each other so that the state is changed from the non-conductive state to the conductive state.

Figure 22:
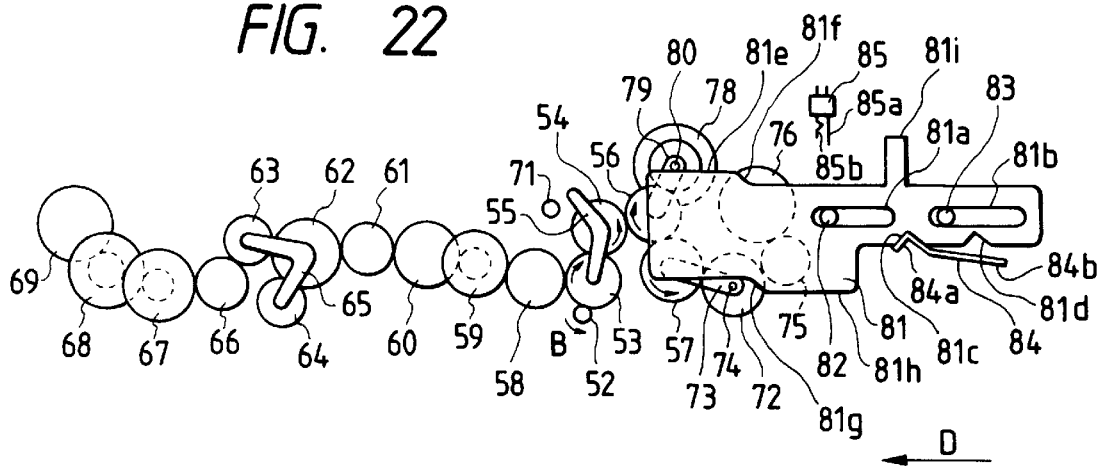
FIG. 22 is a plan view which illustrates the configuration of the gears at the time of winding the film (at a low speed) by the film feeding mechanism shown in FIG. 21.

FIG. 22 illustrates a case where the low speed film winding mode is selected in the above-described structure. The right directional rotation of the first spool planetary gear 78 at this time is prevented by the contact of the pin 80 with a surface 81e of the photography mode switch lever 81. Therefore, the large gear portion 78b of first spool planetary gear 78 is not engaged to the spool gear 76. On the other hand, the left directional rotation of the second spool planetary gear 72 is not prevented since the pin 74 does not come in contact with the photography mode switch lever 81 but the second spool planetary gear 72 is engaged to the spool gear 76 via the spool idler 75.

In the above-described state, when the film feeding motor 51 (pinion gear 52) is rotated in a direction designated by an arrow B (rotated forward) as shown in FIG. 22 after the film cartridge 1 has been loaded into a cartridge chamber (omitted from illustration), the first sun gear 53 is rotated clockwise. Therefor, the first planetary gear 54 is rotated clockwise around the first sun gear 53 by the action of the first connection lever 55 until it is engaged to the first spool sun gear 56. As a result, the first spool sun gear 56 is rotated and as well as the second spool sun gear 57 is rotated counterclockwise. Therefore, the second spool planetary gear 72 is rotated counterclockwise until it is engaged to the spool idler 75, causing the rotation of the film feeding motor 51 to be transmitted to the spool gear 76. Thus, the film winding spool 77 is rotated clockwise.

The rotation is transmitted to the second sun gear 62 via the idler gear 58, which is another gear which is engaged to the first sun gear 53, a first two-profile gear 59, a second idler gear 60 and a third idler gear 61. As a result, the second sun gear is rotated counterclockwise, causing the second planetary gear 63 and the third planetary gear 64 being, due to the action of the second connection lever 65, rotated counterclockwise around the second sun gear. As a result, the second planetary gear 63 is engaged to the fourth idler gear 66. Thus, the rotational force of the film feeding motor 51 in the direction B is transmitted to the fourth idler gear 66 as the counterclockwise rotational force. Then, it is transmitted to the fork gear 69 via the second two-profile gear 67 and the third two-profile gear 68, causing the fork 70 to be rotated clockwise.

The gear ratio of the gear train is constituted as follows:
Assuming that the circumferential speed of the film winding spool 77 is V1 and the speed of the film 2 which is pushed forward from the film cartridge 1 by the fork 70 is V2, a relationship V1>V2 is held.

As a result of the clockwise rotation of the fork 70, the film 2 is pushed forward from the film cartridge 1, causing the leading portion of the film 2 to be wound around the film winding spool 77 by a known means (a means for hooking the perforation P of the film 2 by a nail provided for the film winding spool 77 or a means provided for the camera body and arranged to push the film 2 to the film winding spool 77). Then, film 2 is wound by only the rotation of the film winding spool 77 realized by the film feeding motor 51 because of the following reason:

When the film 2 is wound to the film winding spool 77 due to the relationship V1>V2, the rotational force of the film winding spool 77 is transmitted via the film 2, the fork gear 69, the third two-profile gear 68, the second two-profile gear 67 and the fourth idler gear 66 in this order. As a result, the counterclockwise rotational speed of the fourth idler gear 66 is made to be faster than the clockwise rotational speed of the second planetary gear 63. At this time, the fourth idler gear 66 displaces the planetary gear 63 so that the engagement between the second planetary gear 63 and the fourth idler gear 66 is temporarily released. As a result, the difference in the speed can be absorbed.

Then, the film rewinding operation will now be described.

Referring to FIG. 23, when the film feeding motor 51 is rotated in the direction designated by the arrow C, the first connection lever 55 and the first planetary gear 54 are rotated around the first sun gear 53 until an end portion 55a of the first connection lever 55 comes in contact with the stopper 71. As a result, the engagement between the first planetary gear 54 and the spool gear 56 is released.

At this time, the second sun gear 62 rotates clockwise, causing the second planetary gear 63 and the third planetary gear 64 to be rotated clockwise around the second sun gear 62 by the action of the second connection lever 65. As a result, the engagement between the fourth idler gear 66 and the second planetary gear 63 is released. As an alternative to this, the fourth idler gear 66 and the third planetary gear 64 are engaged to each other. Therefore, the fork gear 69 is rotated counterclockwise, causing the feeding spool (omitted from illustration) disposed in the film cartridge 1 to be rotated reversely by the fork 70. Thus, the film 2 is wound into the cartridge 1.

Then, a case where the feeding speed of the film 2 is raised by switching over the photography mode will now be described.

When the photography mode switch lever 81 is manually moved in the direction designated by an arrow D from a state shown in FIG. 22, the V-groove 81d is, as shown in FIG. 24 is engaged to the bent portion 84a of the click plate 84 so as to be reliably secured. At the time of this movement, a slant surface 81g pushes the pin 74 to release the engagement between the spool idler 75 and the second spool sun gear 72. Furthermore, a portion 81h prevents the movement of the pin 74 in a direction designated by an arrow E so that the ensuing engagement between the spool idler 75 and the second spool planetary gear 72 is prevented. On the other hand, the contact of the pin 80 with an end surface 81e is released and therefore the first spool planetary gear 78 is rotated clockwise around the first spool sun gear 56. As a result, it is brought into a state in which is is able to be engaged to the spool gear 76.

Since the first spool planetary gear 78 is constituted by the large gear portion 78b and the small gear portion 78a, the gear engagement shown in FIG. 24 is able to rotate the spool gear 76 faster than in the gear engagement shown in FIG. 22.

FIG. 24 illustrates a state in which the section 85a of the photography mode switching detection switch 85 is deformed by the projection portion 81i of the photography mode switch lever 81 and the section 85a and the section 85b are in a conductive state, that is the switch 85 is switched on.

When the photography mode switch lever 81 is moved in a direction opposing the arrow D, the slant surface 81f pushes the pin 80, causing the engagement between the spool gear 76 and the first spool planetary gear 78 to be released. Furthermore, the restriction of the movement of the pin 74 in the direction E by means of the portion 81h is released. As a result, a state shown in FIG. 22 is realized.

FIG. 25 is a block diagram which illustrates a camera having the film feeding mechanism shown in FIGS. 21 to 24.

Referring to FIG. 25, reference numeral 101 represents a control circuit comprising a microcomputer and the like and acting to control the operations of the camera. Reference numeral 102 represents an AF.AE control circuit for controlling the focusing of the photographing lens and the operation of the exposure control shutter. Reference numeral 103 represents a film feeding motor driver circuit for rotating the film feeding motor 51. Reference numeral 104 represents a magnetic recording circuit for driving the magnetic head 4 to write information. Reference numeral 105 represents a release switch for releasing the shutter of the camera when the release switch is switched on. Reference numeral 106 represents a cartridge loading switch which is switched on when the film cartridge 1 is loaded into the camera. Reference numeral 107 represents a back cover switch which is switched on when the back cover is closed. When both the above-described switched 106 and 107 are switched on, the control circuit 101 operates the film feeding motor driver circuit 103 to commence setting of the first frame of the film 2.

Reference numeral 108 represents a magnetic reproducing circuit for detecting magnetic information written to the magnetic track T of the film 2 by the magnetic head 4, amplifying it as an analog signal and digital-converting the analog signal to make it information for the control circuit 101. The magnetic reproducing circuit comprises a signal amplifier 108a for detecting the output from the magnetic head 4 and amplifying the analog signal of the output and an A/D converter 108b for converting the amplified analog signal into a digital signal.

Reference numeral 109 represents a photosensor drive circuit for detecting the perforation of the film 2 by driving the photosensor 3 to transmit it as the perforation signal in the form of pulses to the control circuit 101. As the A/D converter 108b, that shown in FIG. 6 is employed.

Then, the operation of the control circuit 101 shown in FIG. 25 will now be described with reference to a flow chart shown in FIG. 26.

When power is supplied to the camera, the operation from step 100 is commenced.

(Step 100) If a discrimination is made that both of the film cartridge loading switch 106 and the switch 107 are switched on, a discrimination is made that the film cartridge 1 has been loaded in the camera and the flow proceeds to step 101.

(Step 101) The film feeding motor driver circuit 103 is operated to cause the film feeding motor 51 to set the first frame of the film 2 to the position of the aperture to commence the so-called film idling operation.

(Step 102) A discrimination is made whether or not the photography mode switching detection switch 85 has been switched on to discriminate the state of the film feeding gear train in a photography mode in which the feeding speed is high or a photography mode in which the same is low. If the switch 85 has been switched on, a discrimination is made that the photography mode in which the feeding speed is high is selected and the flow proceeds to step 103. If the switch 85 is switched off, a discrimination is made that the photography mode in which the feeding speed is low is selected and the flow proceeds to step 104.

(Step 103) The level of switch signal AS2 is raised to switch on the analog switches 36 and 37 to make the digital conversion level to be Vref31-*b* and Vref32-*b* as shown in FIG. 8B. Then, the flow proceeds to step 105.

(Step 104) The level of the switch signal AS1 is raised to switch on the analog switches 34 and 35 so as to make the digital conversion level to be Vref31-*a* and Vref32-*a* as shown in FIG. 7B.

(Step 105) The magnetic reproducing circuit 108 is operated to read out information about the film such as the film sensitivity, the number of the frames of the film and the type of the film (negative or positive) and the like which has been previously written to the magnetic storage portion T of the film 2 t by the magnetic head 4. Then, in accordance with the digital conversion level set in step 103 or step 104, the analog signal is converted into a digital signal before it is stored.

(Step 106) A discrimination is made whether or not the first frame has been set by a known means (for example, the quantity of the film fed or the time in which the motor is activated by an encoder or the detection of the number of perforations detected by the photosensor 3). Then, the flow proceeds to step 104.

(Step 107) The operation of the film feeding motor drive circuit 103 is stopped to stop the film feeding motor 51.

(Step 108) The state of the release switch 105 is discriminated. If it has been switched on, a discrimination is made that the releasing operation has been performed and the flow proceeds to step 109.

(Step 109) The AF.AE control circuit 102 is operated to perform photographing operations such as the focusing of the photographing lens and the exposure operation by opening/closing the shutter.

(Step 110) Similarly to step 102, a discrimination is made whether or not the photography mode switching detection switch 85 has been switched on to discriminate the state of the film feeding gear train in a photography mode in which the feeding speed is high or a photography mode in which the same is low. If the switch 85 has been switched on, a discrimination is made that the photography mode in which the feeding speed is high is selected and the flow proceeds to step 111. If the switch 85 is switched off, a discrimination is made that the photography mode in which the feeding speed is low is selected and the flow proceeds to step 112.

(Step 111) The level of the switch signal AS2 is raised to switch on the analog switches 36 and 37 to make the digital conversion level to be Vref31-*b* and Vref32-*b* as shown in FIG. 8B. Then, the flow proceeds to step 113.

(Step 112) The level of the switch signal AS2 is raised to switch on the analog switches 34 and 35 to make the digital conversion level to be Vref31-*a* and Vref32-*a* as shown in FIG. 8B. Then, the flow proceeds to step 113.

(Step 113) The number of the frames of the film read in step 105 or the number of the frames of the film which can be photographed and which has been previously set by a known means and the number of the frames photographed are subjected to a comparison to discriminate whether or not there are residual frames of the film. If there are residual frames, the flow proceeds to step 114. If there is no residual frame, the flow proceeds to step 118.

(Step 114) The film feeding motor driver circuit 103 is operated to commence winding of the film by one frame.

(Step 115) At the time of winding the film 2 to the next frame, the magnetic recording circuit 104 is operated so as to write photography information such as the shutter speed, the diaphragm value, the date of the photography and the like to the magnetic storage portion T of the film 2 by the magnetic head 4. Furthermore, the magnetic reproducing circuit 108 is operated to read out information written to the film 2 by the magnetic head 4.

(Step 116) If a discrimination is made that the photosensor 3 and the photosensor drive circuit 109 have detected the perforation of the next frame, a discrimination is made that winding of the film 2 to the next frame has been completed and the flow proceeds to step 117.

(Step 117) The operation of the film feeding motor driver circuit 103 is stopped to stop feeding of the film 2.

If a discrimination is made that there are no residual frames of the film in step 113, the flow proceeds to step 118 as described above in which the film feeding motor 51 is rotated in the film rewinding direction by means of the film feeding motor driver circuit 103. Thus, the rewinding of the film into the film cartridge 1 is commenced.

(Step 119) A discrimination is made whether or not the operation of rewinding of the film 2 into the cartridge 1 has been completed by a known means. If the same has been completed, the flow proceeds to step 120.

(Step 120) The sequential operation of the camera is completed.

Figure 27:
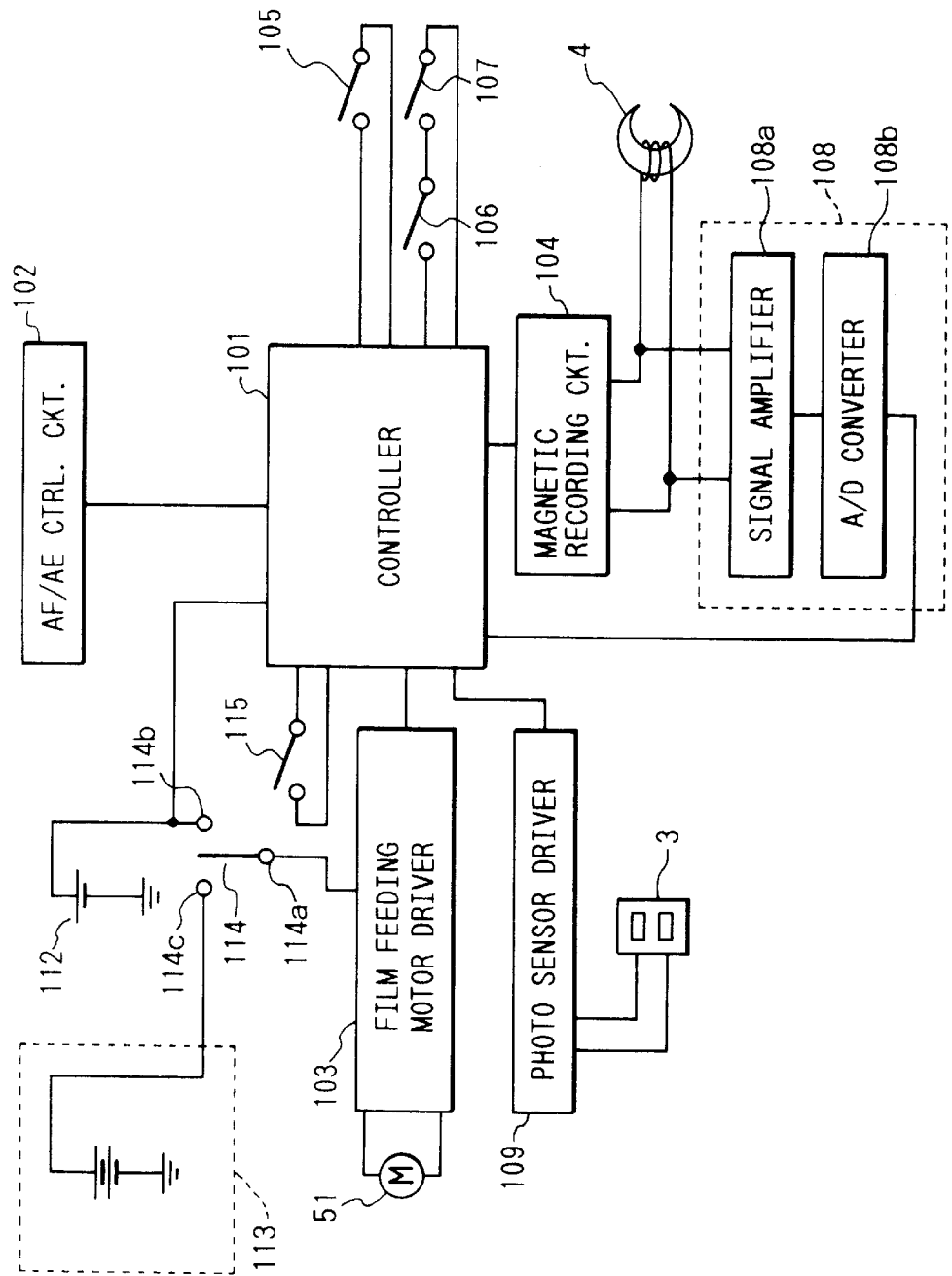
FIG. 27 is a block diagram which illustrates the circuit for the camera according to another embodiment of the present invention.
Figure 28B:
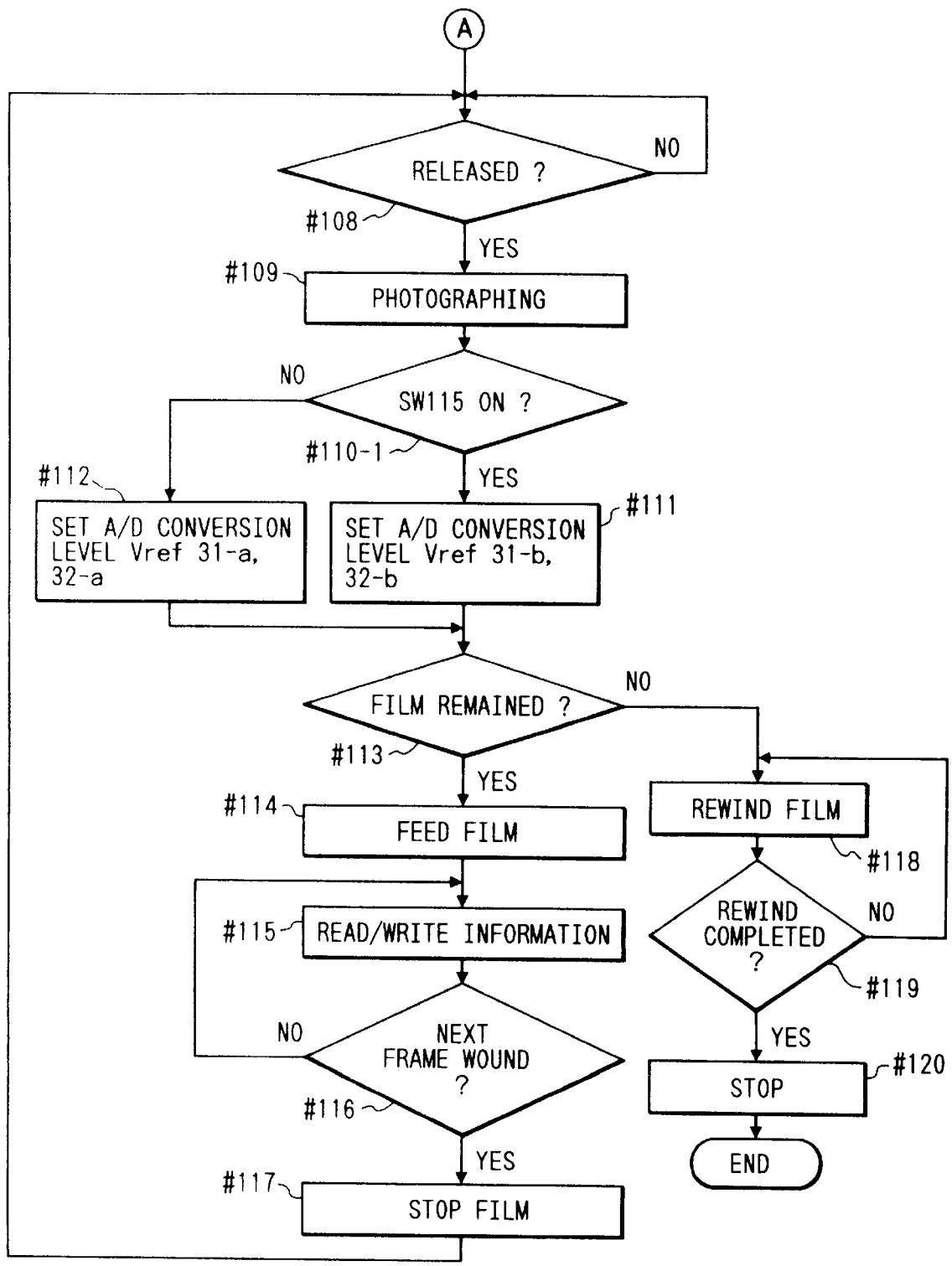

FIGS. 27 and 28 illustrate another embodiment.

According to this embodiment, a camera is arranged to which an external power source can be fastened. When the external power source is fastened to the camera, the film driving motor 51 is rotated by the external power source and the film feeding speed can be switched to a high speed mode.

FIG. 27 is a block diagram which illustrates a circuit for use in the camera according to this embodiment. The same elements as those according to the embodiment shown in FIG. 25 are given the same reference numerals.

Referring to FIG. 27, reference numeral 112 represents an internal power source for the camera. Usually, the all of the operations of the camera are performed by the above-described power source. Reference numeral 113 represents an external power source unit which can be fastened to the camera. Assuming that the voltage of the external power source 113 is Vb and that of the internal power source 112 is Va, a relationship Vb>Va is held. Reference numeral 114 represents a power selection switch arranged such that a section 114*a* and a contact 114*b* are connected to each other in a normal state in which the external power source unit 113 is not fastened. At this time, power is supplied from the internal power source 112 to the film feeding motor driver circuit 103. When the external power source unit 113 is fastened to the camera, the section 114*a* and the contact 114*c* are connected to each other. Thus, the power supply voltage Vb is supplied to the film feeding motor driver circuit 103 and the film feeding motor 51 is rotated with the above-described voltage. Reference numeral 115 represents a state detection switch which is switched on when the external power source unit 113 is fastened to the camera.

As described above, the film feeding speed is raised when the external power source unit 113 is fastened to the camera due to the relationship Vb>Va.

FIG. 28 is a flow chart which illustrates the operation of the control circuit 101. Referring to FIG. 28, only the different elements from those according to the embodiment shown in FIG. 26 are described and the same operations are given the same step Nos.

After the film idle feeding operation has been commenced in step 101, the flow proceeds to step 102-1.

(Step 102-1) A fact whether or not the state detection switch 115 has been switched on is detected to discriminate the fact that the present photography mode is a mode in which the external power source unit 113 is fastened and the film feeding speed is high or a mode in which the external power source unit 113 is not fastened and the film feeding speed is thereby low. If the state detection switch 115 has been switched on, a discrimination is made that the present photography mode is a mode in which the film feeding speed is high and the flow proceeds to step 103. In a case where the state detection switch 115 has been switched off, a discrimination is made that the present photography mode is a mode in which the film feeding speed is low and the flow proceeds to step 104.

If the photography operation is completed in step 109, the flow proceeds to step 110-1.

(Step 110-1) Similarly to step 102-1, a fact whether or not the state detection switch 115 has been switched on is detected to discriminate the fact that the present photography mode is a mode in which the external power source unit 113 is fastened and the film feeding speed is high or a mode in which the external power source unit 113 is not fastened and the film feeding speed is thereby low. If the state detection switch 115 has been switched on, a discrimination is made that the present photography mode is a mode in which the film feeding speed is high and the flow proceeds to step 111. In a case where the state detection switch 115 has been switched off, a discrimination is made that the present photography mode is a mode in which the film feeding speed is low and the flow proceeds to step 112.

Figure 26B:
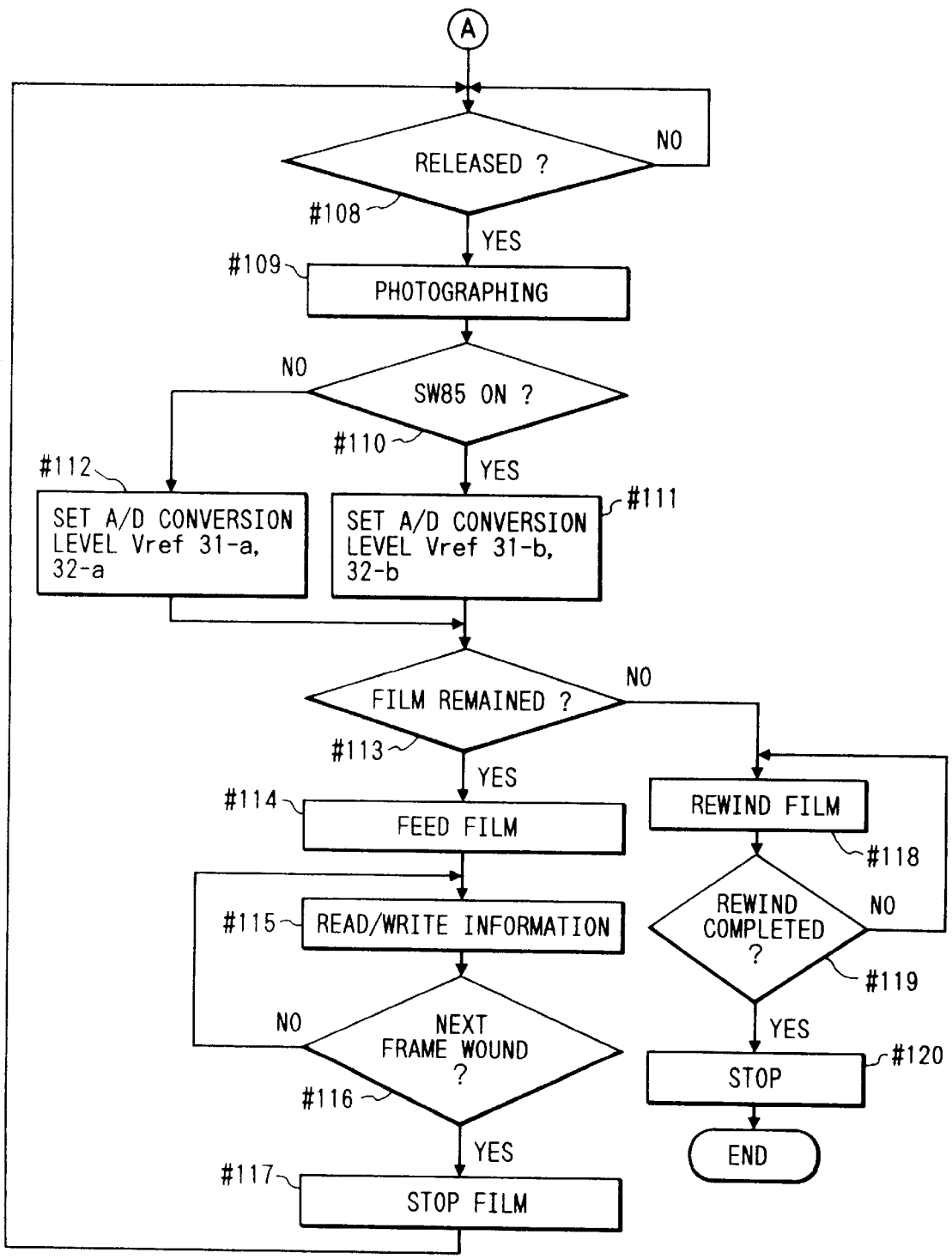

The other operations are the same as those according to the embodiment shown in FIG. 26.

Figure 29:
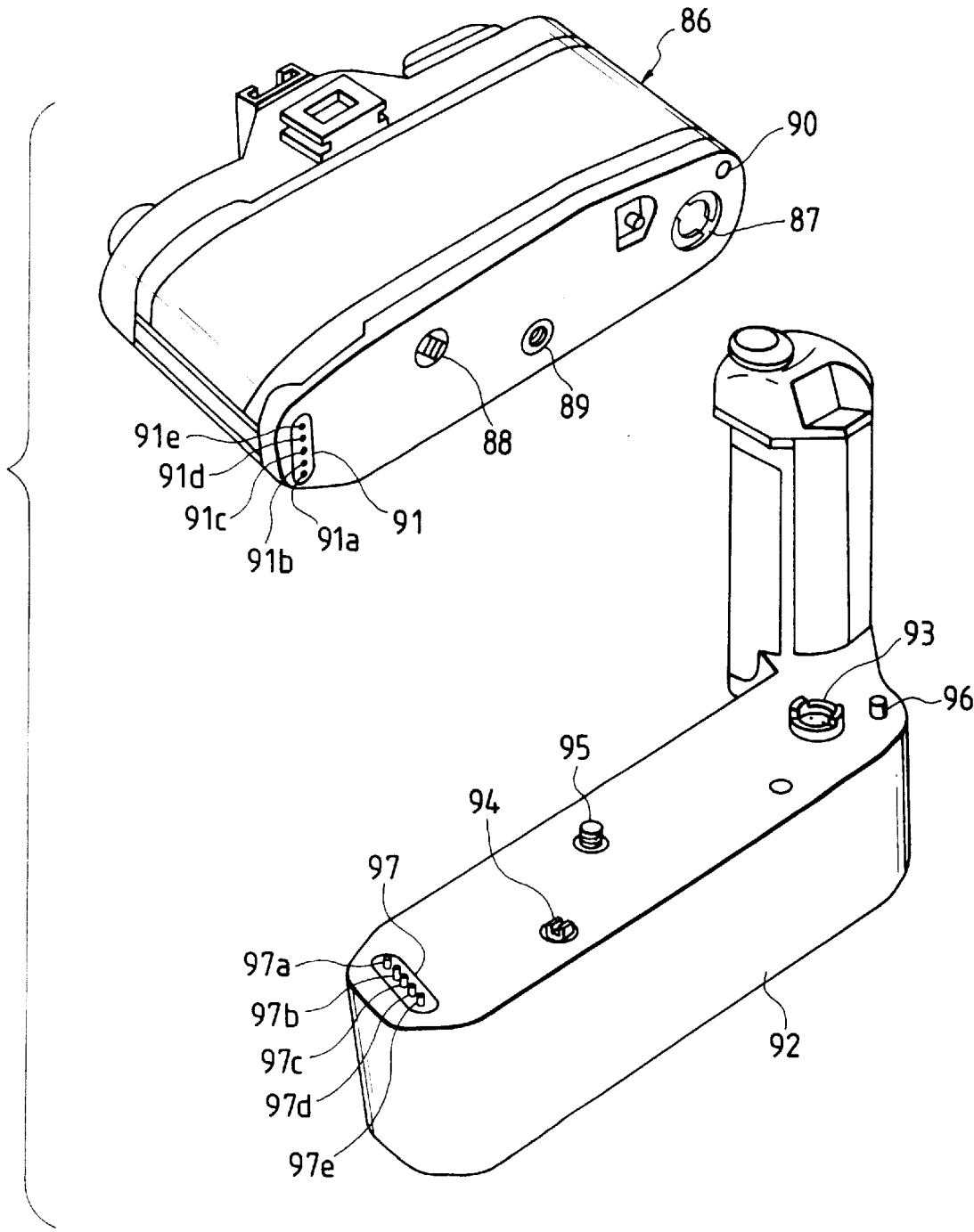
FIG. 29 is a perspective view which illustrates the camera and a motor drive device according to another embodiment of the present invention.
Figure 30:
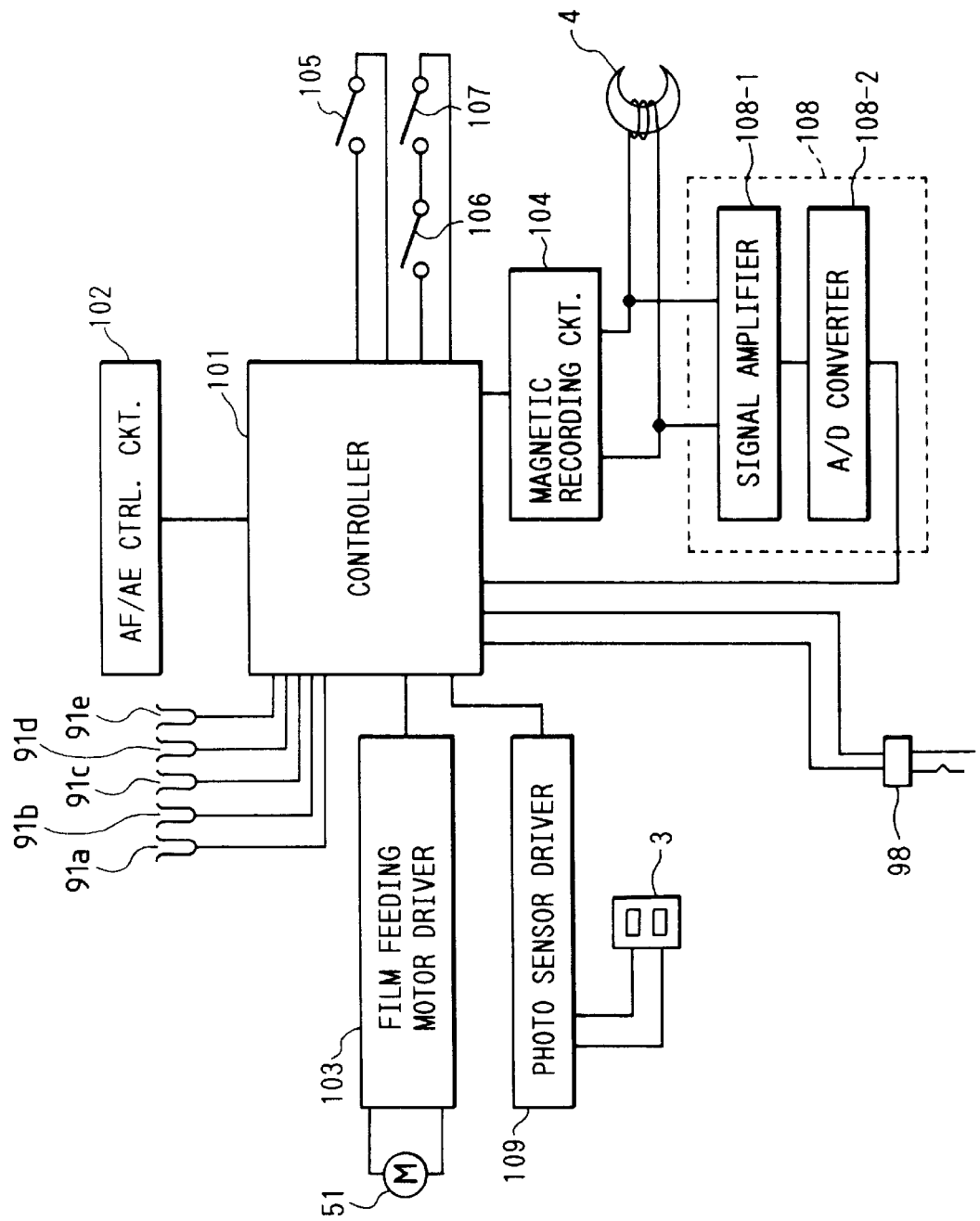
FIG. 30 is a block diagram which illustrates the circuit for the camera according to the embodiment of the present invention shown in FIG. 29.
Figure 31B:
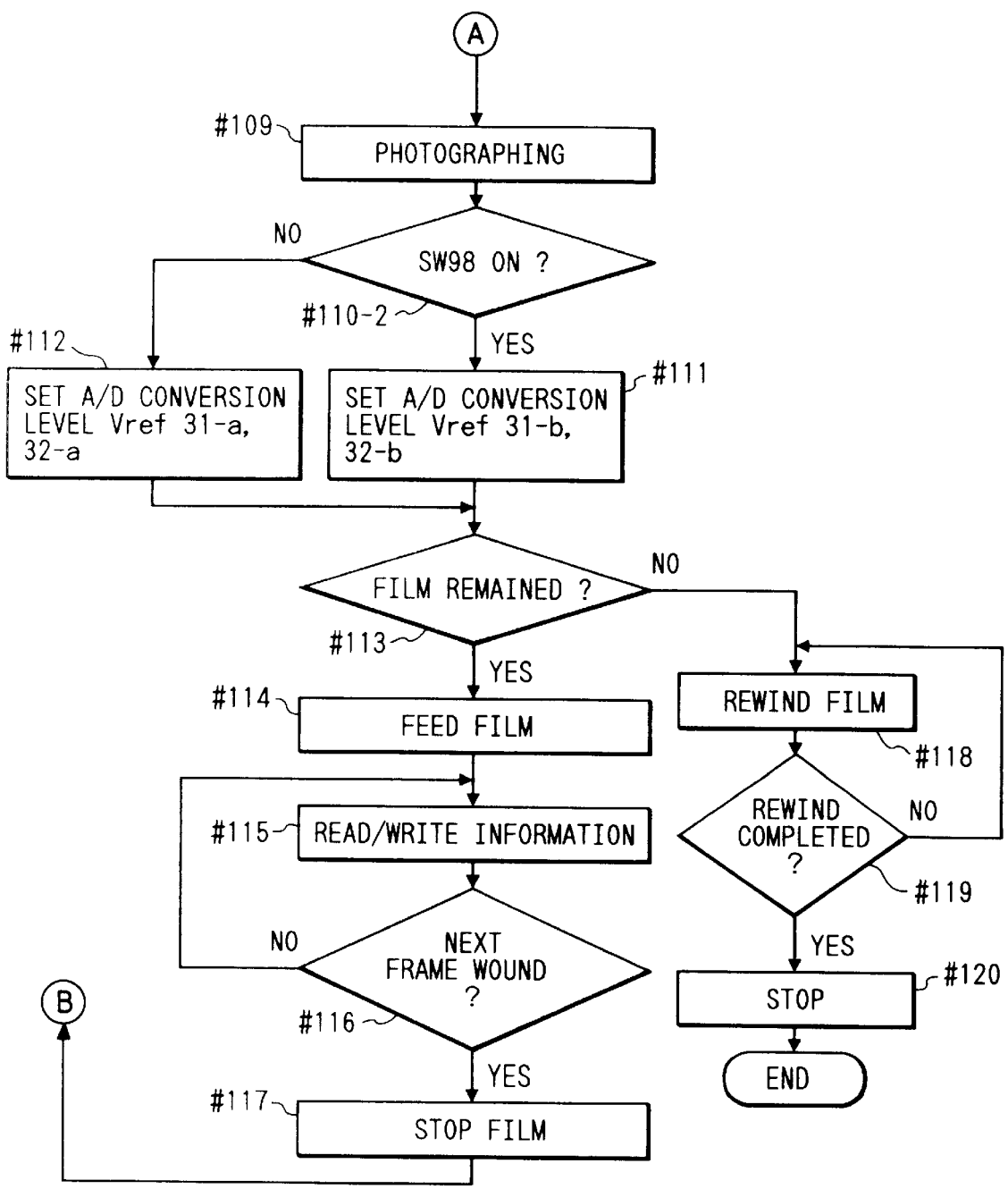

FIGS. 29 to 31 illustrate another embodiment of the present invention.

According to this embodiment, the camera is arranged such that a known motor drive device can be fastened. When the motor drive device is fastened, the film is fed by this device and the film feeding speed is switched over to a high speed.

Referring to FIG. 29, reference numeral 86 represents a camera body and 87 represents a coupling disc to be directly coupled to a film winding spool 77 (omitted from illustration here). Reference numeral 88 represents coupling disc to be directly coupled to a fork 70 (omitted from illustration here). Reference numeral 89 represents a screw hole for fastening the motor drive device, 90 represents a detection pin hole and 91 represents a signal connecting portion with which the motor drive device and a camera body 86 are electrically connected.

Reference numeral 92 represents the motor drive device which includes a battery, an electric circuit motor and a gear train and the like. Reference numeral 93 represents a first motor drive fork connected to the coupling disc 87 and operating the film winding spool 77 of the camera body 86. Reference numeral 94 represents a second motor drive fork connected to the coupling disc 88 and operating the fork 70 of the camera. Reference numeral 95 represents a fastening screw to be received by the screw hole 89 for fastening the motor drive device to connect the camera body 86 and the motor drive device 92. Reference numeral 96 represents a detection pin erected on the motor drive device 92 and forcibly inserted into the detection pin hole 90 when the device is fastened to the camera body 86. The detection pin 96 switches on a switch 98 to be described later when it is forcibly inserted into the detection pin hole 90 and as well as switches over the gear train in the camera to cause the film winding spool 77 and the fork 70 to be freed from the gear train in the camera. Reference numeral 97 represents a signal connecting pin portion connected to the signal connecting portion 91 of the camera 86 to electrically connect the motor drive device 92 and the camera body 86.

FIG. 30 is a block diagram which illustrates a circuit for use in the camera shown in FIG. 29. The same elements as those according to the embodiment shown in FIG. 27 are given the same reference numerals.

Referring to FIG. 30, reference numeral 98 represents a switch which is switched on by the detection pin 96. When the switch 98 is switched on, the control circuit 101 inhibits the operation of the film feeding motor driver circuit 103 but operates a motor driver circuit (omitted from illustration) included in the motor driver device 92.

FIG. 31 is a flow chart which illustrates the operation of the control circuit 101. Referring to FIG. 31, only operations different from those according to the embodiment shown in FIGS. 26 and 28 are described and the same operations are given the same step Nos.

After the film idle-feeding operation has been commenced in step 101, the flow proceeds to step 102-2.

(Step 102-2) A discrimination is made whether or not the switch 98 has been switched on to discriminate a fact that the present photography mode is a photography mode in which the motor drive device 92 is fastened and thereby the film feeding speed is high or a mode in which the motor drive device 92 is not fastened and the film feeding speed is low. If the switch 98 has been switched on, a discrimination is made that the present mode is the mode in which the film feeding speed is high and the flow proceeds to step 103. If the switch 98 has been switched off, a discrimination is made that the present mode is the mode in which the film feeding speed is low and the flow proceeds to step 104.

If the photography operation is completed in step 109, the flow proceeds to step 110-2.

(Step 110-2) Similarly to step 102-2, a discrimination is made whether or not the switch 98 has been switched on to discriminate a fact that the present photography mode is a photography mode in which the motor drive device 92 is fastened and thereby the film feeding sped is high or a mode in which the motor drive device 92 is not fastened and the film feeding speed is low. If the switch 98 has been switched on, a discrimination is made that the present mode is the mode in which the film feeding speed is high and the flow proceeds to step 111. If the switch 98 has been switched off, a discrimination is made that the present mode is the mode in which the film feeding speed is low and the flow proceeds to step 112.

The other operations are the same as those according to the embodiment shown in FIGS. 26 and 28.

According to the above-described embodiments, in a case where a photography mode in which the film feeding speed is high is selected, the digital conversion level in the A/D conversion portion 108b in the magnetic reproducing circuit 108 is changed in synchronization with the above-described switching operation. Therefore, the data omission at the time of the digital conversion operation can be prevented and the read error due to the external noise can be reduced.

FIGS. 32 to 35 illustrate another embodiment of the present invention.

Figure 32:
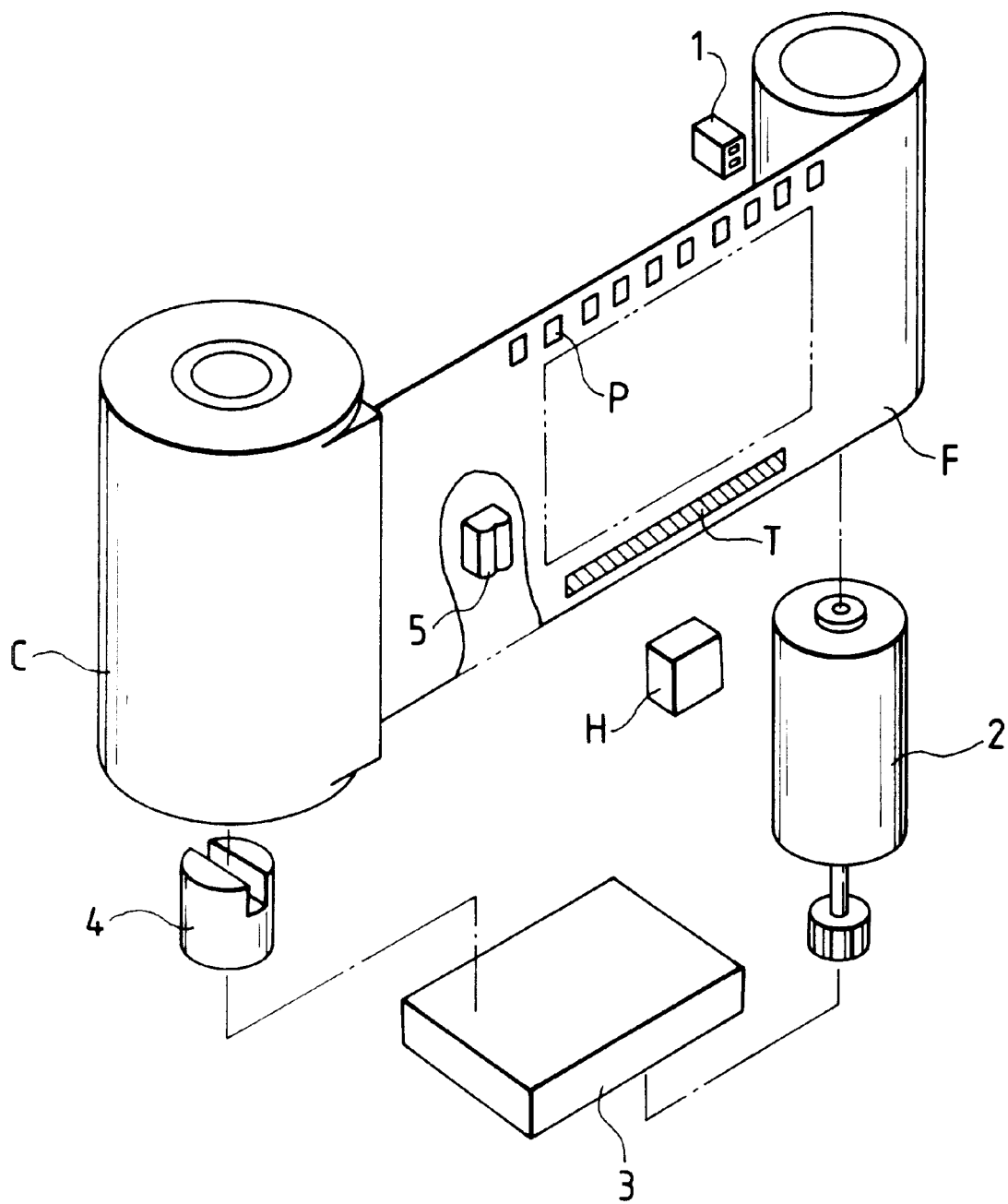
FIG. 32 is a perspective view which schematically illustrates the inner structure of the camera according to another embodiment of the present invention.
Figure 33:
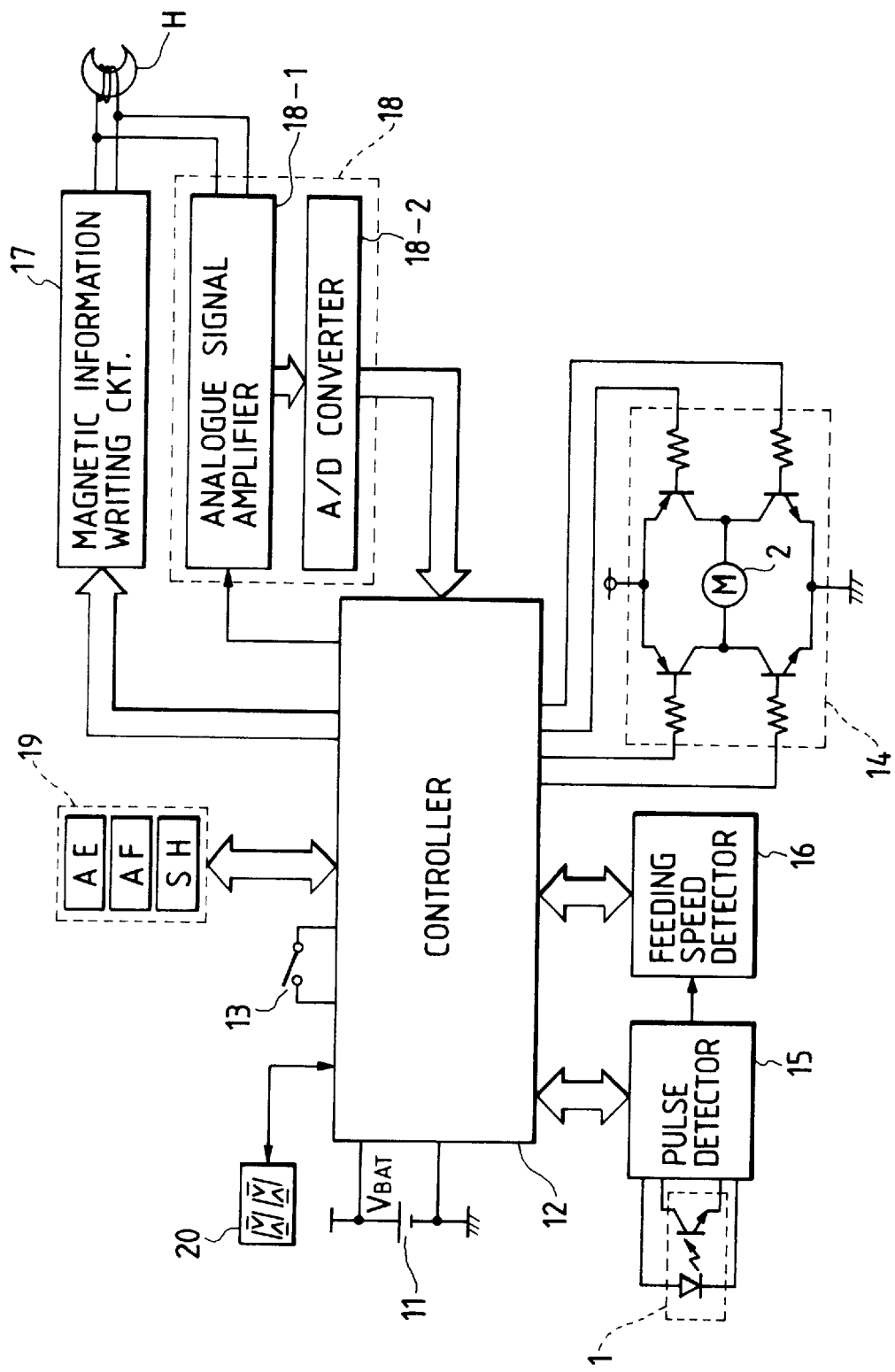
FIG. 33 is a circuit diagram which illustrates the circuit for a camera according to the embodiment of the present invention shown in FIG. 32.

FIG. 32 is a structural view which illustrates the schematic inner structure of the camera according to this embodiment. FIG. 32 is a block diagram which illustrates the overall circuit for use in the camera. Referring to FIGS. 32 and 33, reference numeral 1 represents a photoreflector for detecting perforation P of film 2, to which a magnetic layer is applied to the base side thereof, and generating a pulse signal for feeding the film F by a predetermined distance. Reference numeral 2 represents a film feeding motor disposed in a spool and 3 represents a gear train for switching the deceleration, winding and the rewinding operations. Reference numeral 4 represents a film rewinding fork and symbol C represents a film cartridge, T represents a recording track (magnetic storage portion) in which data about the exposure state and the frame number or the like is recorded as magnetic information and H represents a magnetic head for writing/reading information to and from recording track T of the film F. Reference numeral 5 represents a pressing pad for pressing the film F to the magnetic head H.

Reference numeral 11 represents a battery for operating the overall system and 12 represents a control circuit for controlling the overall operations of the camera and comprising a microcomputer or the like. Reference numeral 13 represents a release switch with which the photography operation is started and 14 represents a feeding circuit for rotating the film feeding motor 2 to wind/rewind the film F. Reference numeral 15 represents a pulse detection circuit for converting the signal denoting the perforation P detected by the photoreflector 1 into a signal for the control circuit 12. Reference numeral 16 represents a feeding speed detection circuit for obtaining the film feeding speed from the signal detected by the pulse detection circuit 15 to transmit information about it to the control circuit 12. Reference numeral 17 represents a magnetic information writing circuit for transmitting a signal for causing the magnetic head H to record photography information to the recording track T of the film F. Reference numeral 18 represents a magnetic reproducing circuit for amplifying an analog signal read by the magnetic head H to digital-convert it into a signal for the control circuit 12. Reference numeral 18-1 represents an analog signal amplifying portion in the magnetic reproducing circuit 18. Reference numeral 18-2 represents an A/D conversion portion in the magnetic reproducing circuit 18. Reference numeral 19 represents an AE.AF.SH circuit for performing known light measuring, distance measuring and photography operations. Reference numeral 20 represents a film counter for storing and displaying the frame number of the film F.

Figure 34:
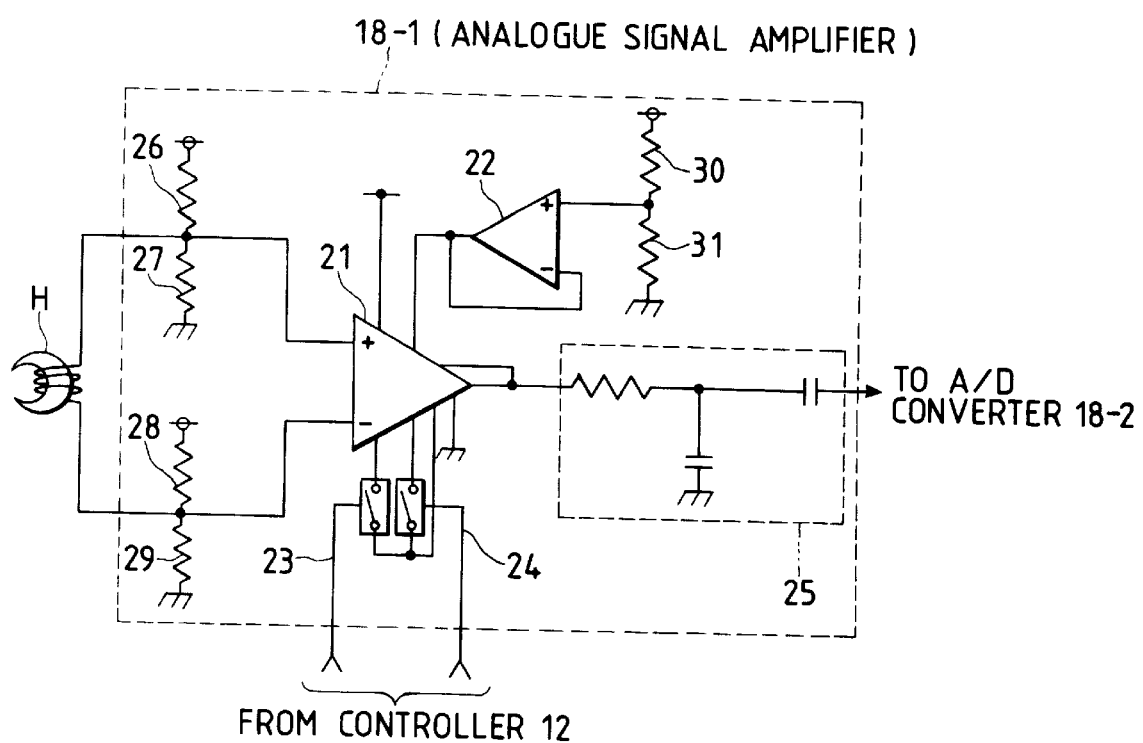
FIG. 34 is a circuit diagram which illustrates the detailed structure of the analog signal amplifying portion shown in FIG. 33.

FIG. 34 is a circuit diagram which illustrates the detailed structure of the analog signal amplifying portion 18-1 in the magnetic reproducing circuit 18 shown in FIG. 33.

Reference numeral 21 represents a measuring amplifier for forming the input from the magnetic head H into a form of a signal. Reference numeral 22 represents an op-amplifier amplifier (for example, AD624) for setting off the output from the measuring amplifier 21.

Reference numerals 23 and 24 represent analog switches for switching the gain of the measuring amplifier 21. When the analog switch 23 is switched on and as well as the analog switch 24 is switched off, a state is realized in which the gain of the measuring amplifier 21 is high (for example, the gain is 200). When the analog switch 23 is switched off and as well as the analog switch 24 is switched on, a state is realized in which the gain of the measuring amplifier 21 is low (for example, the gain is 100).

Reference numeral 25 represents a filter comprising a resistor and a capacitor and cutting noise contained in the output from the measuring amplifier 21. Reference numerals 26 to 31 represent bias resistors.

Figure 35B:
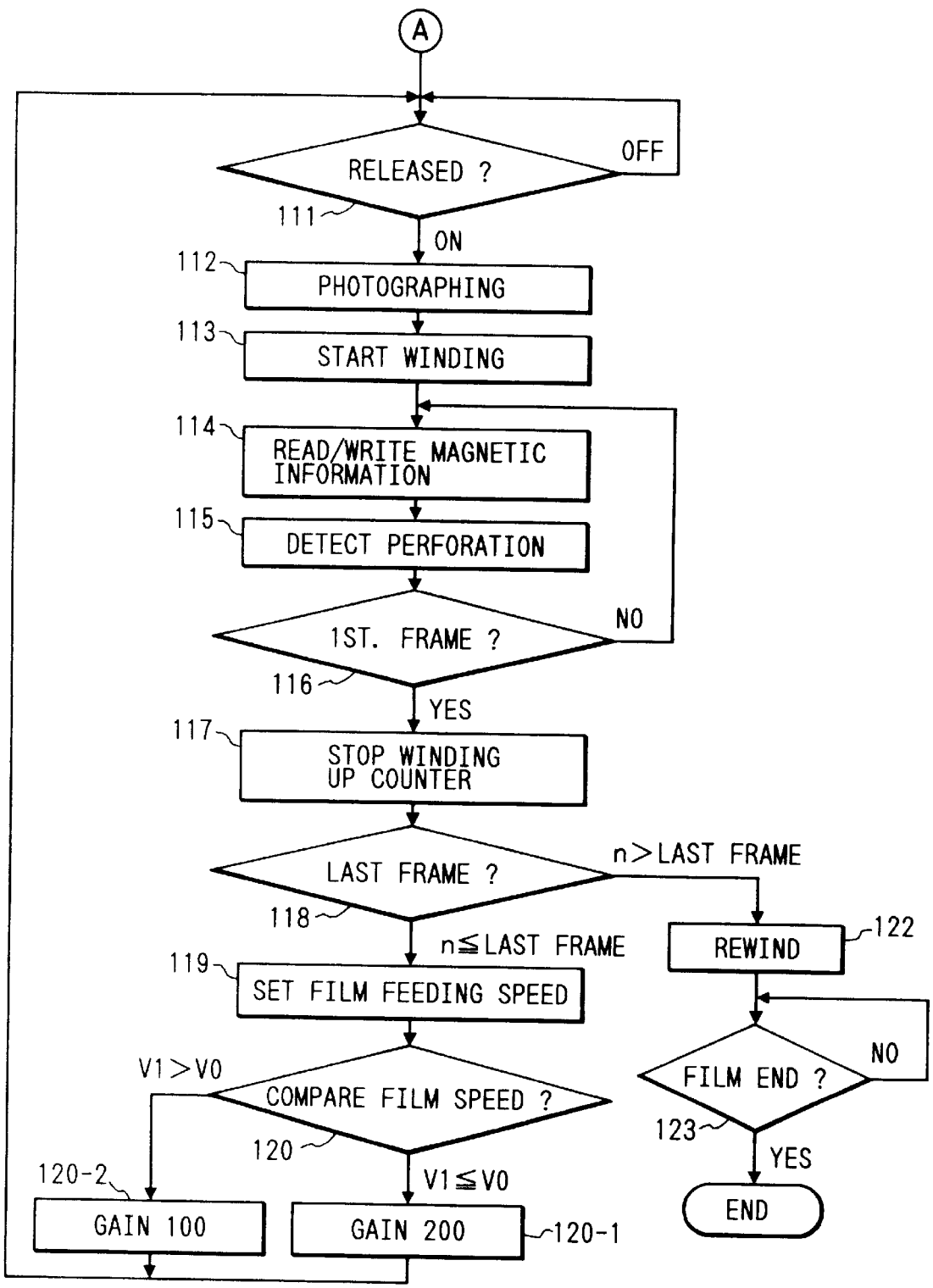

FIGS. 35 is a flow chart which illustrates the operation of the control circuit 12 shown in FIG. 33 and the description will be made with reference to this.

(Step 101) A fact whether or not the film cartridge C has been loaded is detected by a film presence detection switch (omitted from illustration). If the same is detected, the flow proceeds to step 102.

(Step 102) The analog switch 23 is switched on and as well as the analog switch 24 is switched off to realize a state in which the gain of the amplifying circuit 18-1 (the measuring amplifier 21) is high (gain=200).

(Step 103) The operation of the film feeding motor 2 is commenced to start the operation of winding of the film F.

(Step 104) By means of the magnetic head H and the magnetic reproducing circuit 18, magnetic information (the film sensitivity, a predetermined number of frames of the film or the like) written to the recording track T is read. In accordance with the magnetic information, controlling operations for the photography process are performed.

(Step 105) The movement of the perforation P is detected by the feeding photoreflector 1 and the pulse detection circuit 15 as the pulse signal to detect the feeding speed, and the film feeding speed is stored to 16.

(Step 106) On the basis of the number of detections of the pulse signals of the perforation P, a fact whether or not the photography commencement frame (for example, the first frame) has reached the position of the aperture is discriminated. If the same has not reached, the process in the order step 104, step 105 and step 106 is repeated until the photography commencement frame reaches there. If the fact that the same has reached the position of the aperture is detected, the flow proceeds to step 107.

(Step 107) The operation of winding of the film F is stopped and "1" denoting the first frame is stored and displayed on the film counter 20.

(Step 108) Film feeding speed V1 stored in the feeding speed detection circuit 16 in step 105 is received.

(Step 109) A comparison is made between the film feeding speed V1 received in step 108 and reference speed V0 for switching the gain. If V1≦V0, the flow proceeds to step 110-1. If V1>V0, the flow proceeds to step 110-2.

(Step 110-1) In this case, the film feeding speed at the time of winding the film is slower than a predetermined reference speed. Therefore, the analog switch 23 is switched on and the analog switch 24 is switched off to set the analog signal amplifying portion 18-1 to a state in which the gain is high (gain=200). In this case, since the above-described state has been set in step 102, the flow therefore proceeds to step 111.

(Step 110-2) In this case, the film feeding speed at the time of winding the film is faster than a predetermined reference speed. Therefore, the analog switch 23 is switched off and the analog switch 24 is switched on to set the analog signal amplifying portion 18-1 to a state in which the gain is low (gain=100).

(Step 111) The fact that the release switch is switched on or off is detected. When the same is switched on, the flow proceeds to step 112.

(Step 112) The known light measuring and distance measuring operations are performed by the AE.AF.SH circuit 19 and as well as the shutter is controlled to perform the photography operation while taking the conditions such as the photography information or the like into consideration.

(Step 113) Similarly to step 103, the film winding operation is commenced.

(Step 114) By means of the magnetic head H and the writing circuit 17, photography information (for example, the shutter speed, the diaphragm value, the date of the photography and the like) is written to the recording track T of the film F. If necessary, magnetically recorded information on the recording track T is read by the magnetic head H and the magnetic reproducing circuit 18.

(Step 115) Similarly to step 105, the pulse signal generated due to the movement of the perforation P is detected to detect the film feeding speed to store it.

(Step 116) A fact is discriminated whether or not the operation of winding the film by one frame has been completed on the basis of the number of the detected pulse signals denoting the perforation P. The process in the order step 114, step 115 and step 116 is repeated until the operation of winding the film by one frame is completed. When the operation of winding the film by one frame is completed, the flow proceeds to step 117.

(Step 117) The operation of winding the film is stopped and the content and the display of the film counter 20 are increased.

(Step 118) A comparison is made between a predetermined number of frames of the film read as the magnetic information in step 104, that is the maximum number of frames which can be photographed and the count made by the film counter 20. If the count is smaller than the maximum number of the frames which can be photographed, the flow proceeds to step 119. If the count is larger than the maximum number of the frames which can be photographed, the flow proceeds to step 122.

(Step 119) Data about the film feeding speed stored in the feeding speed detection circuit 16 in step 115 is received.

(Step 120) Similar to step 109, a comparison is made between the film feeding speed V1 received in step 119 and reference speed V0 for switching the gain. If $V1 \leq V0$, the flow proceeds to step 121-1. If V1>V0, the flow proceeds to step 121-2.

(Step 121-1) Because of the same reason for step 110-1, the analog switch 23 is switched on and the analog switch 24 is switched off to set the analog signal amplifying potion 18-1 to a state in which its gain is high (gain=200).

(Step 121-2) Because of the same reason for step 110-2, the analog switch 23 is switched off and the analog switch 24 is switched on to set the analog signal amplifying potion 18-1 to a state in which its gain is low (gain=100).

After the operation in step 121-1 or step 121-2 has been completed, the flow returns to step 111.

If the count made by the film counter 20 is larger than the maximum number of the frames which can be photographed in step 118, the flow proceeds to step 122 as described above.

(Step 122) The film F is rewound until the rewinding operation is completed. Then, the flow proceeds to step 123.

(Step 123) A detection is made by the film presence detection switch (omitted from illustration). If a fact that the film cartridge C has been removed from the camera has been discriminated, the film counter 20 is reset and the sequential operation is completed.

Figure 36:
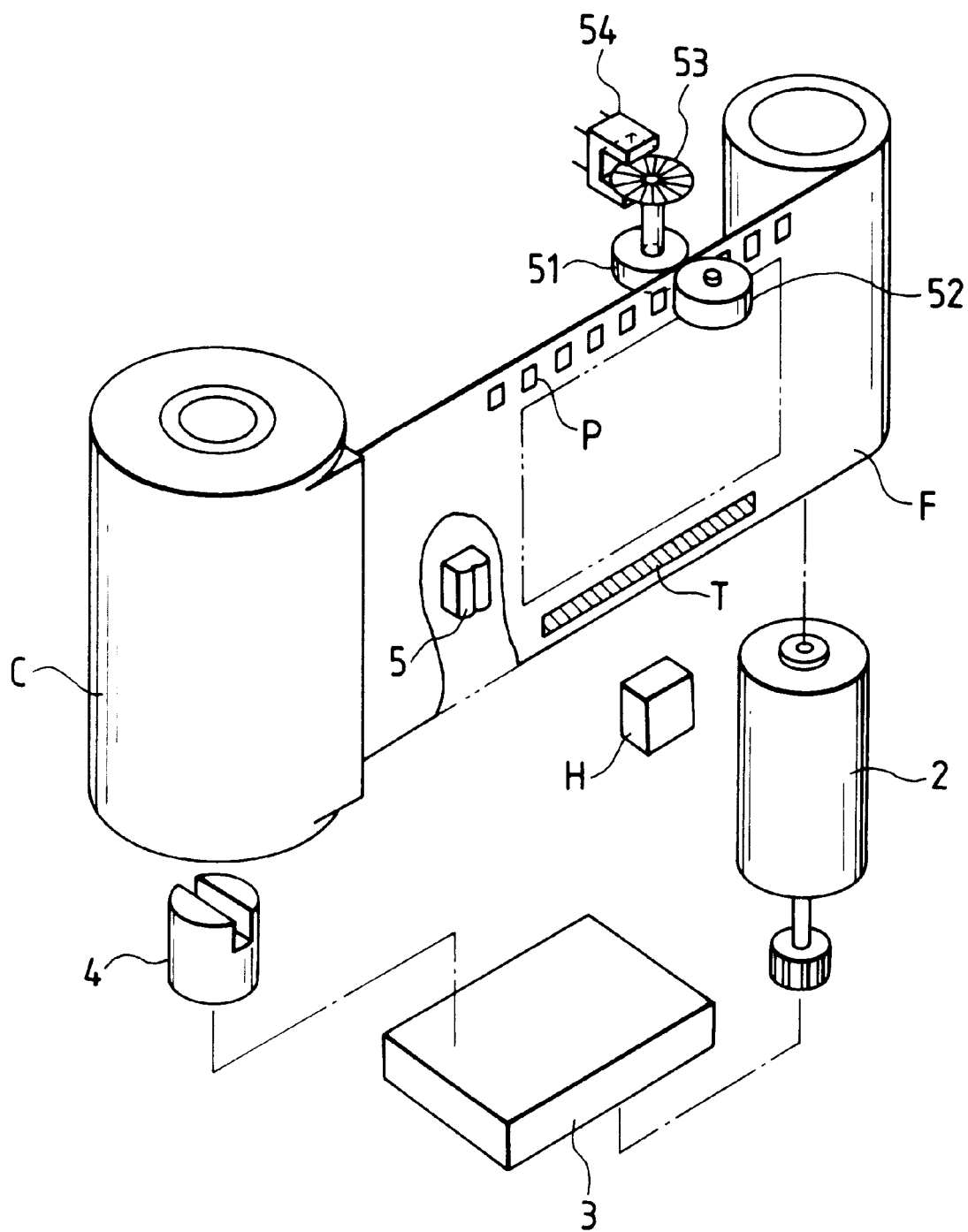
FIG. 36 is a perspective view which schematically illustrates the inner structure of the camera according to another embodiment of the present invention.
Figure 37B:
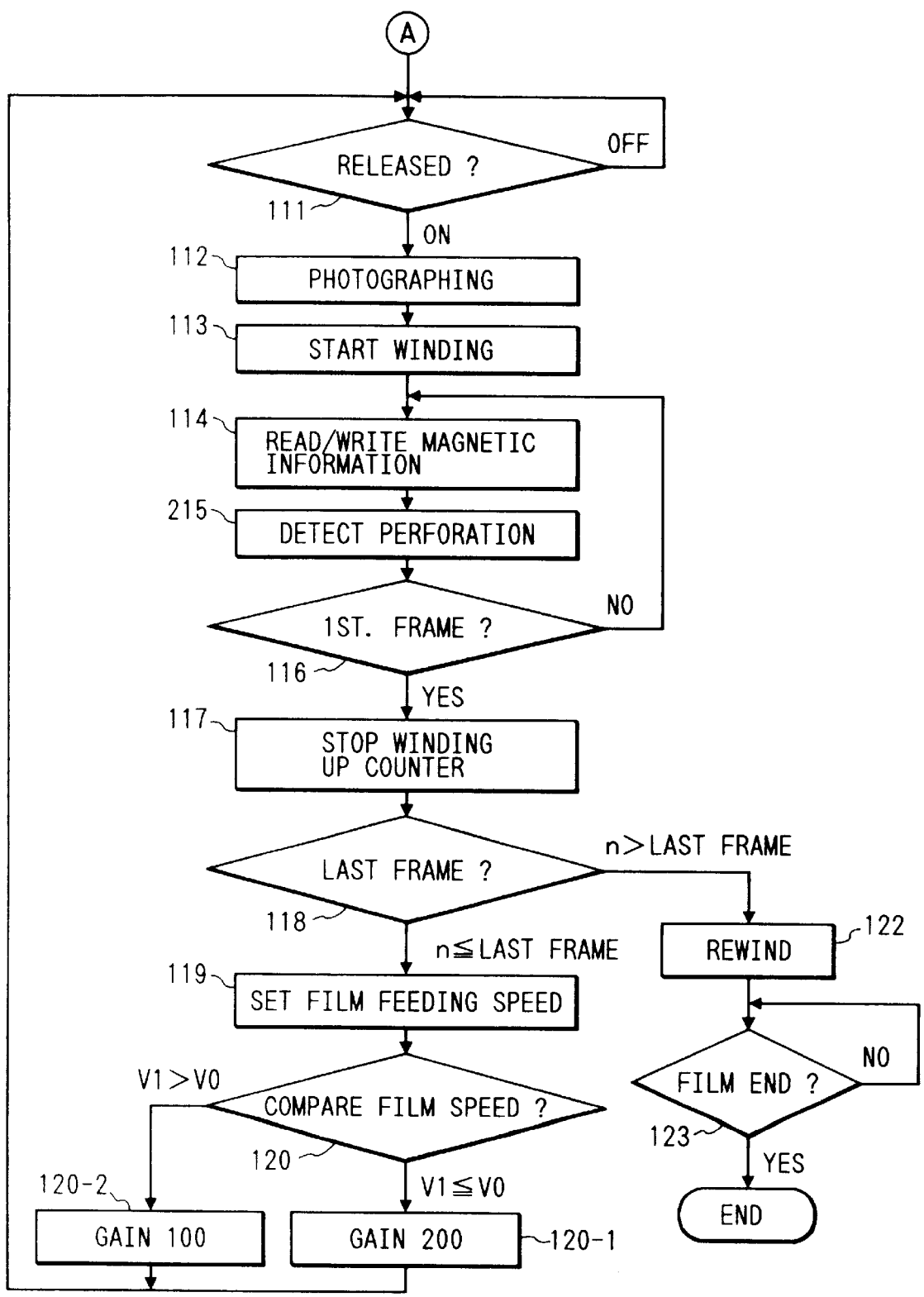

FIGS. 36 and 37 illustrate another embodiment of the present invention. According to this embodiment, a rotatable pulse plate which is rotated when the film is fed is employed as a means for accurately detecting the film feeding speed.

FIG. 36 is a structural view which schematically illustrates the internal structure of the camera according to this embodiment. Referring to FIG. 35, the same elements as those according to the embodiment shown in FIG. 32 are given the same reference numerals and their descriptions are omitted here. Since the overall circuit structure of the camera according to this embodiment is the same as that according to the embodiment shown in FIG. 33, its description is omitted here.

Referring to FIG. 36, reference numeral 51 represents a rotatable roller which receives rotational force when the film F is fed, the roller 51 being rotated by one time when the film F is fed by one frame. Reference numeral 52 represents a pushing roller which is rotatably fastened at a position at which it confronts the roller 51 while holding the film F. Reference numeral 53 represents a pulse plate secured in such a manner that it is able to be rotated together with the roller 51 and having light and dark portions spaced equally. Reference numeral 54 represents a photointerupter for detecting the light and dark portions of the pulse plate 53, which is rotated when the film F is fed, so as to generate a pulse signal with which the film F is fed by a predetermined distance and to make it as the film feeding speed detection data.

FIG. 37 illustrates the control flow according to this embodiment. The same steps as those according to the flow shown in FIG. 35 are given the same reference numerals.

Since the difference from the structure shown in FIG. 35 lies in only the speed detection operation in steps 205 and 215, the different portions will now be described.

(Step 205) The light and dark portions of the pulse plate 53, which is rotated when the film F is fed, are detected by the photoreflector 54 and the pulse detection circuit 15 as the pulse signals to detect the speed of the pulse signal, that is the film feeding speed by the feeding speed detection circuit 16 before it is stored.

(Step 215) Similarly to step 205, the pulse signal generated when the film F is moved is detected to obtain and store the film feeding speed at this time.

Figure 38:
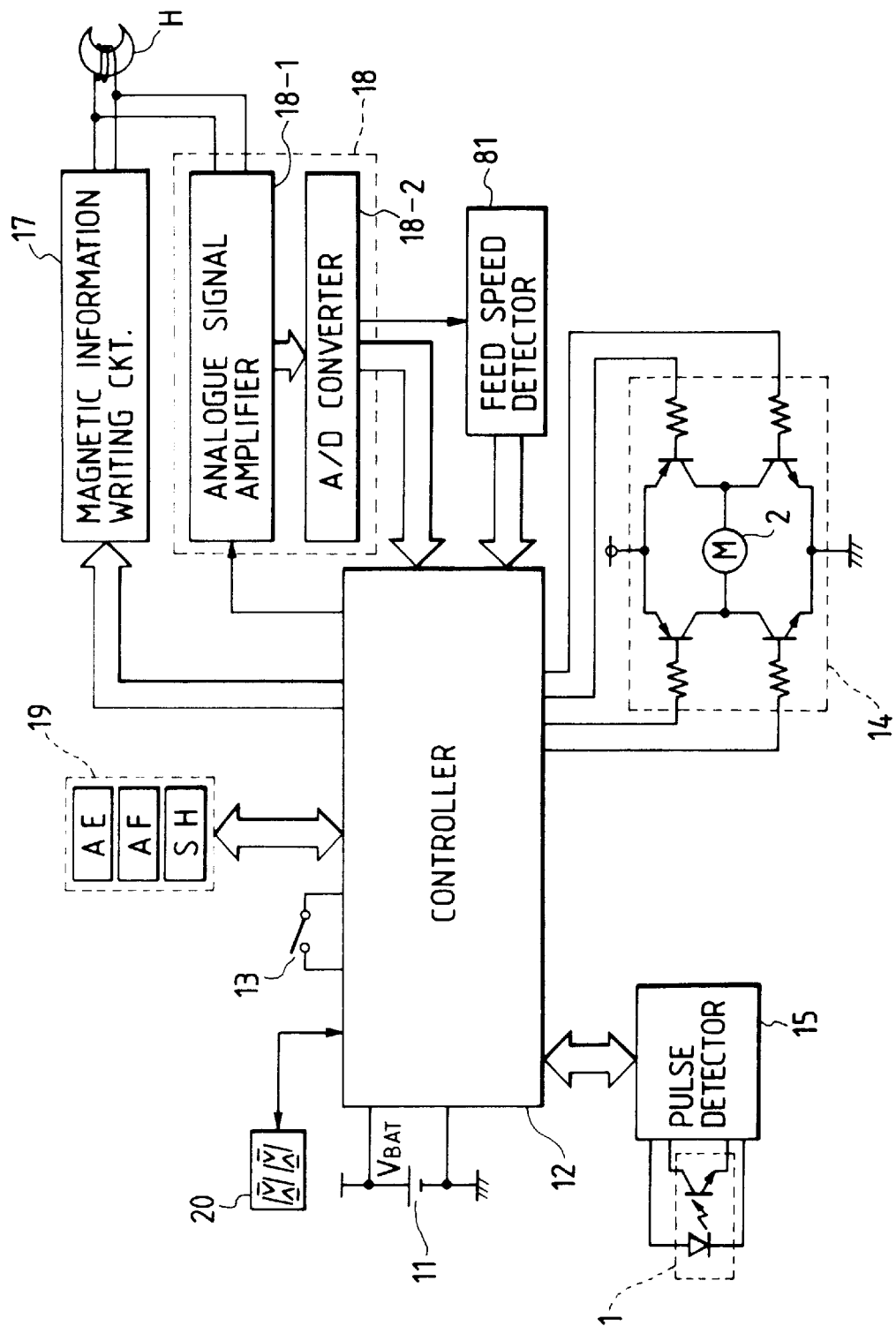
FIG. 38 is a block diagram which illustrates the circuit according to another embodiment of the present invention.
Figure 39B:
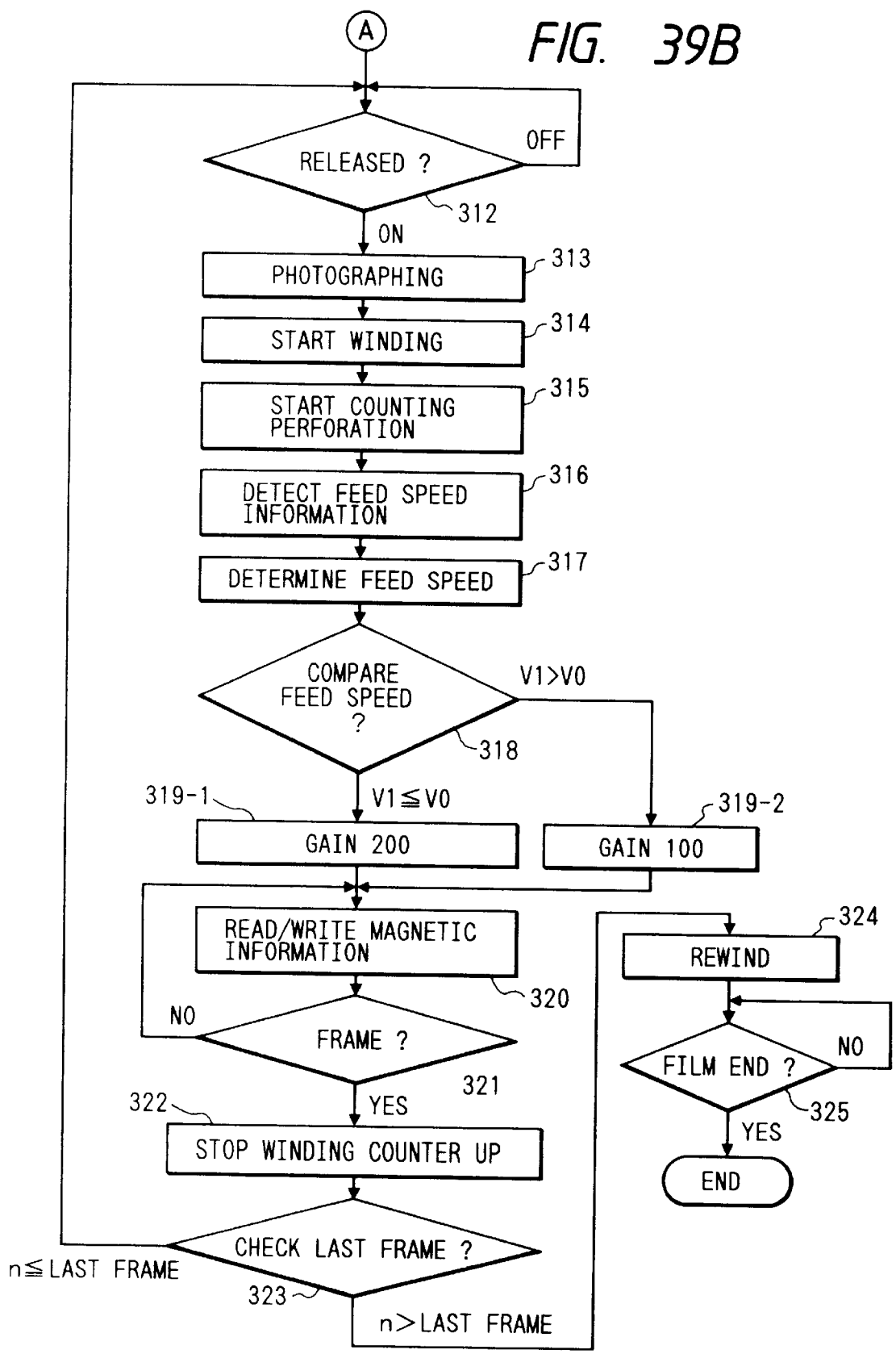

FIGS. 38 and 39 illustrate another embodiment of the present invention. According to this embodiment, the film feeding speed is detected on the basis of the time required to read the magnetic information. That is, since the magnetic information items are recorded at the same intervals (for example, 50 $\mu$m/bit), the film feeding speed can be detected on the basis of the time required to read the magnetic information.

FIG. 38 is a block diagram which illustrates the overall structure of a circuit for use in the camera according to this embodiment. The same elements as those according to the embodiment shown in FIG. 33 are given the same reference numerals and their descriptions are omitted here. Since the schematic internal structure of the camera according to this embodiment is the same as that shown in FIG. 32, its description is omitted here.

Referring to FIG. 38, reference numeral 81 represents a feeding speed detection circuit which receives an output signal from the A/D conversion portion 18-2 of the magnetic reproducing circuit 18, detects the film feeding speed from the time required to detect the signal and transmits information about it to the control circuit 12.

FIG. 39 is a flow chart which illustrates the operation of the control circuit 12 shown in FIG. 38. Then, the operation will now be described with reference to the flow chart.

(Step 301) A fact whether or not the film cartridge C has been loaded is detected on the basis of the film presence detection switch (omitted from illustration). If it has been detected, the flow proceeds to step 302.

(Step 302) The analog switch 23 is switched on and the analog switch 24 is switched off to set the amplifying circuit 18-1 (the measuring amplifier 21) to a state in which its gain is high (gain=200).

(Step 303) The film feeding motor 2 is started to commence the operation of winding the film F.

(Step 304) Counting of number of pulse signals detected by the photoreflector 1 and the pulse detection circuit 15 by the movement of the perforation P is commenced.

(Step 305) The magnetic information recorded to the recording track T is reproduced by the magnetic head H and the reproducing circuit 18. A predetermined number of bits (for example, 40 bits) for the magnetic information digital signal is supplied from the A/D conversion portion 18-2 to the feeding speed detection circuit 81.

(Step 306) The film feeding time is obtained from the time interval of the magnetic information digital signal received by the feeding speed detection circuit 81 in step 305. The film feeding time thus-obtained is received as the film feeding speed V1.

(Step 307) The film feeding speed V1 received in step 306 and the predetermined gain switching reference speed V0 are subjected to a comparison. If V1≦V0, the flow proceeds to step 308-1. If V1>V0, the flow proceeds to step 308-2.

(Step 308-1) Since the film feeding speed at the time of winding the film is slower than the predetermined reference speed, the analog switch 23 is switched on and the analog switch 24 is switched off to set the analog signal amplifying portion 18-1 to a state in which its gain is high (gain=200).

(Step 308-2) Since the film feeding speed at the time of winding the film is faster than the predetermined reference speed, the analog switch 23 is switched off and the analog switch 24 is switched on to set the analog signal amplifying Portion 18-1 to a state in which its gain is low (gain=100).

(Step 309) The magnetic information (the film sensitivity and the predetermined number of frames of the film ) written to the recording track T is read by the magnetic head H and the magnetic reproducing circuit 18. With the magnetic information thus-read, the controls required at the time of the photographing operation are performed.

(Step 310) In accordance with the number of the detected pulse signals denoting the perforation P, the fact whether or not the photography commencement frame (for example, the first frame) has reached the position of the aperture is discriminated. If the same has not reached there, the process in order of step 309 and step 310 is repeated until the photographing commencement frame reaches there. When the fact that the photographing commencement frame reaches there has been discriminated, the flow proceeds to step 311.

(Step 311) Winding of the film F is stopped and "1" denoting the first frame is stored in the film counter 20 to display it.

(Step 312) The fact that the release switch 13 is switched on or off is detected. If the same is switched on, the flow proceeds to step 313.

(Step 313) The known light measuring and distance measuring operations are performed by the AE.AF.SH circuit 19 and as well as the shutter is controlled. The photography operation is performed while taking the conditions such as the magnetic information or the like into consideration.

(Step 314) The film feeding motor 2 is rotated to commence the film winding operation.

(Step 315) Similarly to step 304, counting of number of pulse signals detected by the photoreflector 1 and the pulse detection circuit 15 by the movement of the perforation P is commenced.

(Step 316) Similarly to step 305, a predetermined number of bits (for example, 40 bits) for the magnetic information digital signal is supplied from the A/D conversion portion 18-2 to the feeding speed detection circuit 81.

(Step 317) The film feeding time is obtained from the time interval of the magnetic information digital signal received by the feeding speed detection circuit 81 in step 316. The film feeding time thus-obtained is received as the film feeding speed V1.

(Step 318) The film feeding speed V1 received in step 317 and the predetermined gain switching reference speed V0 are subjected to a comparison. If V1≦V0, the flow proceeds to step 319-1. If V1>V0, the flow proceeds to step 319-2.

(Step 319-1) Since the film feeding speed at the time of winding the film is slower than the predetermined reference speed, the analog switch 23 is switched on and the analog switch 24 is switched off to set the analog signal amplifying portion 18-1 to a state in which its gain is high (gain=200).

(Step 319-2) Since the film feeding speed at the time of winding the film is faster than the predetermined reference speed, the analog switch 23 is switched off and the analog switch 24 is switched on to set the analog signal amplifying Portion 18-1 to a state in which its gain is low (gain=100).

(Step 320) Photography information (for example, the shutter speed, the diaphragm value and the date of the photography and the like) is written to the recording track T of the film F by the magnetic head H and the writing circuit 17. If necessary, the magnetically recorded information on the recording track T is read by the magnetic head H and the magnetic reproducing circuit 18.

(Step 321) On the basis of the number of the detected pulse signal denoting the perforations, the fact that the winding of the film by one frame has been completed is discriminated. The process in order of step 320 and step 321 is repeated until the winding of the film by one frame is completed. When the winding of it by one frame is completed, the flow proceeds to step 322.

(Step 322) Winding of the film is stopped and the count and the display on the film counter 20 are increased.

(Step 323) The predetermined number of frames of the film read in step 309, that is the maximum number of the frames which can be photographed and the count made by the film counter 20 are subjected to a comparison. If the counter is smaller than the maximum number of the frames which can be photographed, the flow proceeds to step 312. If the count is larger than the maximum number of the frames which can be photographed, the flow proceeds to step 324.

(Step 324) The film F is rewound and flow proceeds to step 325 when this rewinding operation is completed.

(Step 325) The detection by means of the film presence detection switch (omitted from illustration) is performed. When the removal of the film cartridge C from the camera has been discriminated, the film counter 20 is reset and the sequential operation is completed.

According to the above-described embodiments, the film feeding speed is detected in accordance with the pulse signal obtained by detecting perforation of the film F, or the light and dark signal obtained by the pulse plate, which is rotated when the film is fed, and the photoreflector 54 or the reading time required to read the magnetic reproduction information. In accordance with the film feeding speed at this time, the degree of amplification of the analog signal amplifying portion 18-1 in the magnetic reproducing circuit is changed. That is, if the film feeding speed at the time of winding the film is slower than a predetermined reference speed, the gain of the analog signal amplifying portion 18-1 is set to, for example, "200". If the film feeding speed at the time of winding the film is faster than a predetermined reference speed, the gain of the analog signal amplifying portion 18-1 is set to, for example, "100". Therefore, if the film feeding speed is changed, the amplitude of the output signal from the analog signal amplifying portion 18-1 is made to be constant. Therefore, the magnetic reproducing can be stablized, if variation of film feeding speed is large.

According to the above-described embodiments, the degree of the amplification is switched into two steps in accordance with the film feeding speed. It may be switched into three steps. Furthermore, the film feeding means arranged as described above may be constituted by a method in which it is obtained from the number of rotations of the motor.

Figure 40:
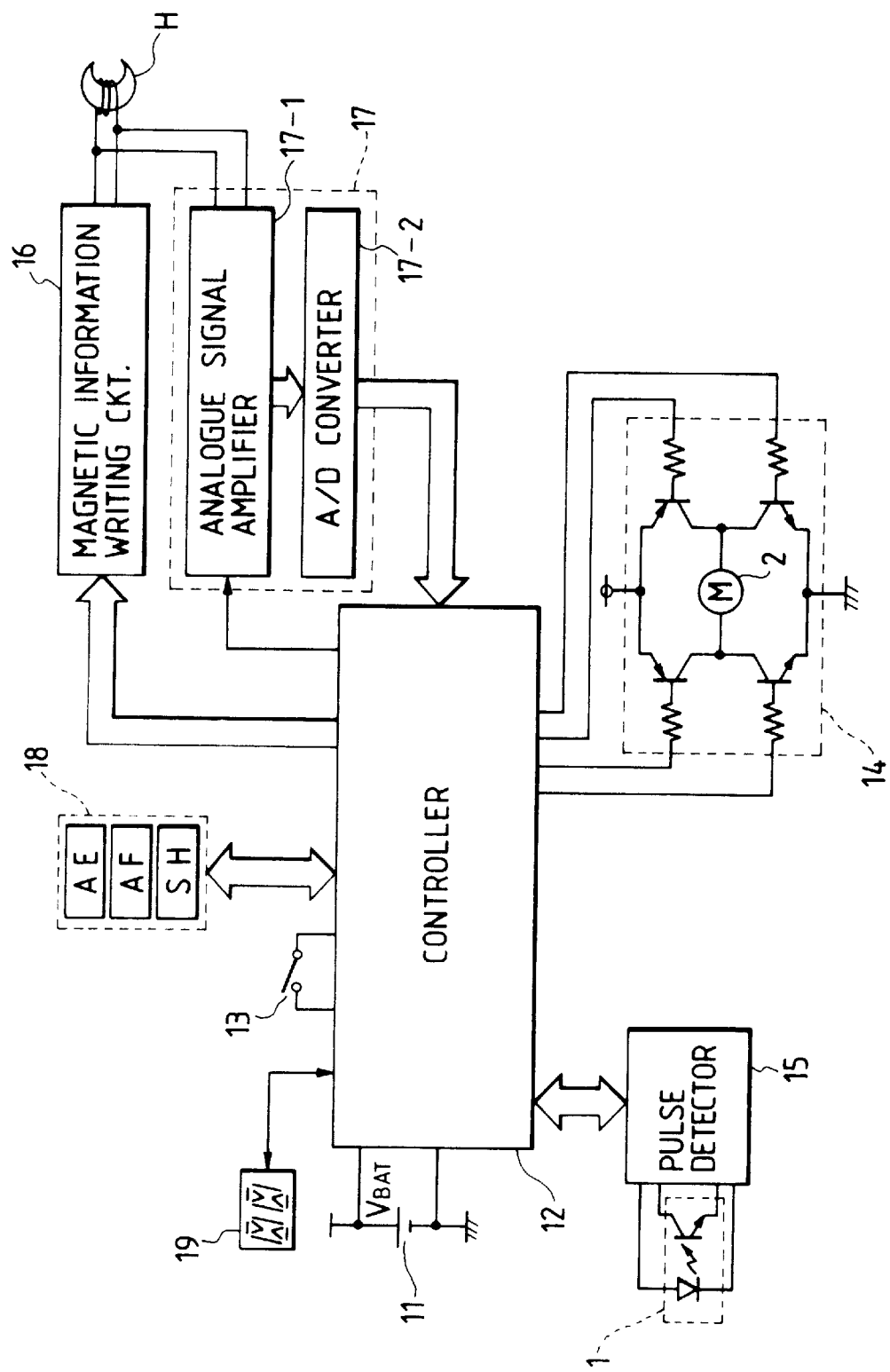
FIG. 40 is a block diagram which illustrates the circuit for the camera according to another embodiment of the present invention.
Figure 41B:
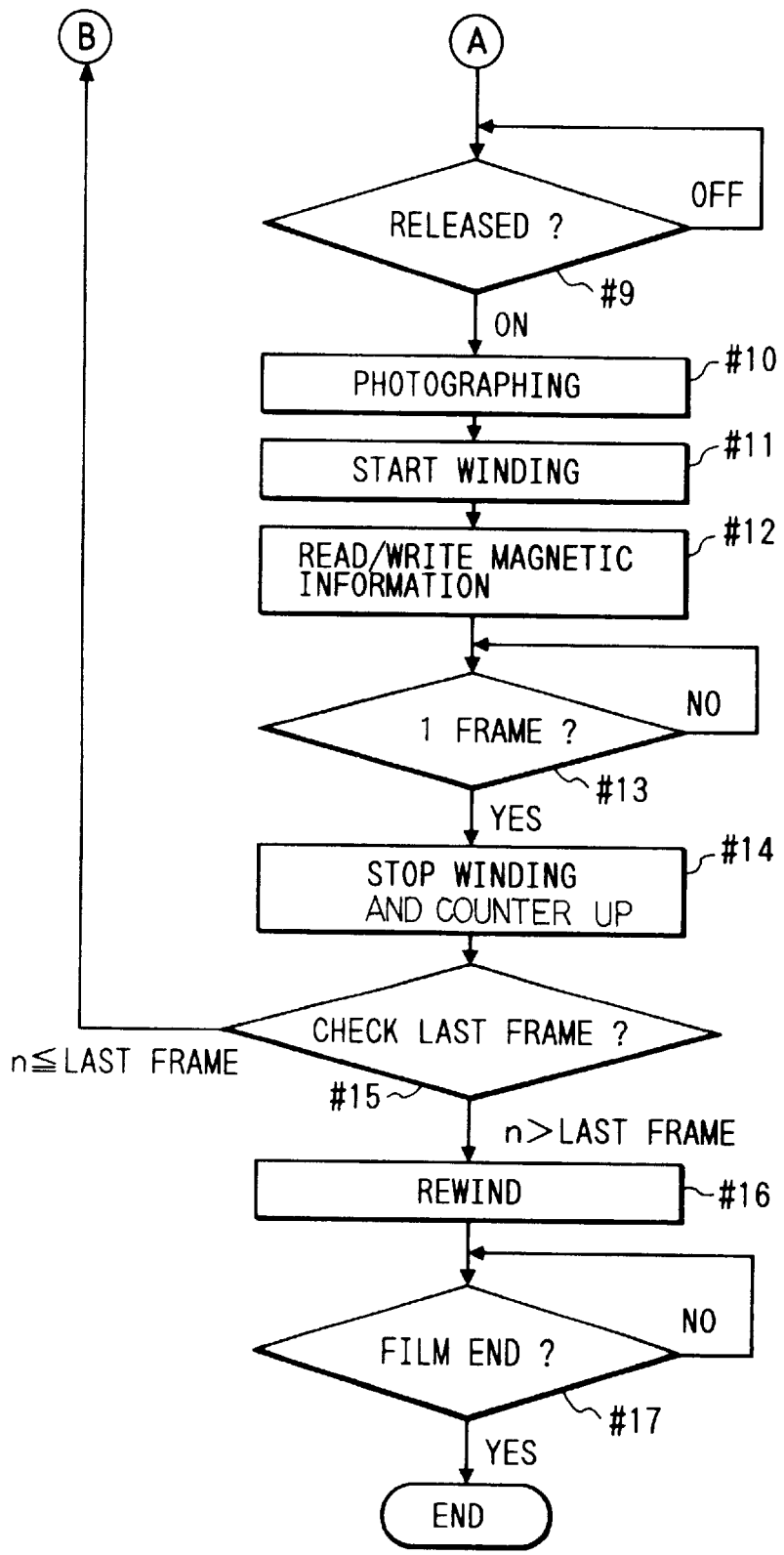

FIGS. 40 and 41 illustrate another embodiment of the present invention.

The explanation of internal structure is omitted as it is identical with FIG. 32. FIG. 40 is a block diagram which illustrates the overall body of the circuit for the camera. Reference numeral 1 represents a feeding photoreflector for detecting perforation P of film F, to which a magnetic layer is applied to the base side thereof and feeding the film F by a predetermined distance. Reference numeral 2 represents a film feeding motor disposed in a spool and 3 represents a gear train for switching the deceleration, winding and the rewinding operations. Reference numeral 4 represents a film rewinding fork and symbol C represents a film cartridge, T represents a recording track (magnetic storage portion) in which data about the exposure state and the frame number or the like is recorded as magnetic information and H represents a magnetic head for writing/reading information to and from recording track T of the film F. Reference numeral 5 represents a pressing pad for pressing the film F to the magnetic head H.

Reference numeral 11 represents a battery for operating the overall system and 12 represents a control circuit for controlling the overall operations of the camera and comprising a microcomputer or the like. Reference numeral 13 represents a release switch with which the photography operation is started and 14 represents a feeding circuit for winding/rewinding the film F. Reference numeral 15 represents a pulse detection circuit for converting the signal detected by the feeding photoreflector 1 into a pulse signal for the control circuit 12. Reference numeral 16 represents a magnetic information writing circuit for transmitting a signal for causing the magnetic head H to record photography information to the recording track T of the film F. Reference numeral 17 represents a magnetic reproducing circuit for amplifying an analog signal read by the magnetic head H to digital-convert it into a signal for the control circuit 12. Reference numeral 17-1 represents an analog signal amplifying portion in the magnetic reproducing circuit 17. Reference numeral 17-2 represents an A/D conversion portion in the magnetic reproducing circuit 17. Reference numeral 18 represents an AE.AF.SH circuit for performing known light measuring, distance measuring and photography operations. Reference numeral 19 represents a film counter for storing and displaying the frame number of the film F.

FIG. 40 illustrates the analog signal amplifying portion 17-1 in the magnetic reproducing circuit which comprises the circuit shown in FIG. 34. The internal structure of the camera is constituted in the same manner as that shown in FIG. 32.

FIG. 41 is a flow chart which illustrates the operation of the control circuit 12 shown in FIG. 40. Then, the operation will now be described with reference to this flow chart.

(Step 1) A fact whether or not the film cartridge C has been loaded is detected by the film presence detection switch (omitted from illustration). If it has been detected, the flow proceeds to step 2.

(Step 2) The analog switch 23 is switched on and the analog switch 24 is switched off to set the amplifying circuit 17-1 (the measuring amplifier 21) to a state in which its gain is high (gain=200).

(Step 3) The film feeding motor 2 is started to commence winding of the film F.

(Step 4) The magnetic information (the film sensitivity and a predetermined number of frames and the like) written to the recording track T is read by the magnetic head H and the magnetic reproducing circuit 17. With the magnetic information thus-read, the controls required at the time of the photographing operation are performed.

(Step 5) On the basis of the number of perforations P detected, a fact whether or not the photography commencement frame (for example, the first frame) has reached the position of the aperture is discriminated. If the same has not reached there, the process in order of step 4 and step 5 is repeated until the photography commencement frame reaches there. When the fact that the photography commencement frame has reached the position of the aperture has been discriminated, the flow proceeds to step 6.

(Step 6) The operation of winding the film F is stopped and "1" denoting the first frame is stored in the film counter 19 to display it.

(Step 7) A comparison is made between value FC stored in the film counter 19 at this time and a predetermined frame number n for switching the gain which has been previously set. If FC<n, the flow proceeds to step 8-1. If FC≧n, the flow proceeds to step 8-2.

(Step 8-1) Since the film count at this time is smaller than the predetermined number of frames, that is the diameter of the wound film is smaller than a predetermined diameter of the wound film, the analog switch 23 is switched on and the analog switch 24 is switched off to set the analog signal amplifying portion 18-1 to a state in which its gain is high (gain=200). Since the above-described state has been set in step 2, the flow immediately proceeds to step 9.

(Step 8-2) Since the film count at this time is larger than the predetermined number of frames, that is the diameter of the wound film is larger than a predetermined diameter of the wound film, the analog switch 23 is switched off and the analog switch 24 is switched on to set the analog signal amplifying portion 18-1 to a state in which its gain is low (gain=100).

(Step 9) A fact that the release switch is switched on or off is detected. If it is switched on, the flow proceeds to step 10.

(Step 10) The known light measuring and distance measuring operations are performed by the AE.AF.SH circuit 18 and as well as the shutter is controlled. Thus, the photography operation is performed while taking the conditions such as the magnetic information into consideration.

(Step 11) Similarly to step 3, winding of the film is commenced.

(Step 12) Photography information (for example, the shutter speed, the diaphragm value, the date of the photography and the like) is written to the recording track T of the film F by the magnetic head H and the writing circuit 16. If necessary, magnetically recorded information on the recording track T is readout by the magnetic head H and the magnetic reproducing circuit 17.

(Step 13) On the basis of the number of detected perforations, a fact whether or not the winding of the film by one frame has been detected is discriminated. The flow does not proceed in this step until the winding of the film by one frame and it proceeds to step 14 when the winding of the same is completed.

(Step 14) The operation of winding the film is stopped and the count in the film counter and the display are increased.

(Step 15) The predetermined number of frames of the film read in step 4, that is, the maximum number of the frames which can be photographed and the count made by the film counter 19 are subjected to a comparison. If the count is smaller than the maximum number of frames which can be photographed, the flow proceeds to step 7. If the count is larger than the maximum number of frames which can be photographed, the flow proceeds to step 16.

(Step 16) The film F is rewound. When the operation of rewinding the film F is completed, the flow proceeds to step 17.

(Step 17) A detection is made by means of the film presence detection switch (omitted from illustration) to discriminate the fact that the film cartridge C has been removed from the camera. If it is detected, the film counter 19 is reset, the sequential operation is completed.

According to the above-described embodiment, the number of the photographed frames is electrically stored and subjected to a comparison to change the gain of the analog signal amplifying portion 17-1 in the magnetic reproducing circuit 17. Then, description will be made about an example in which the gain of the analog signal amplifying portion 17-1 is mechanically changed on the basis of the number of the photographed frames.

FIGS. 42 to 49 illustrate a mechanism for displaying the photographed frames according to this embodiment in which the number of frames is mechanically detected.

Reference numeral 51 represents a first gear which is connected to a known sprocket the teeth of which are engaged to the perforation P of the film F. When the film F is fed by one frame, the sprocket and the first gear 51 are rotated by one rotation. Reference numeral 52 represents an idler gear which is engaged to the first gear 51.

Figure 44:
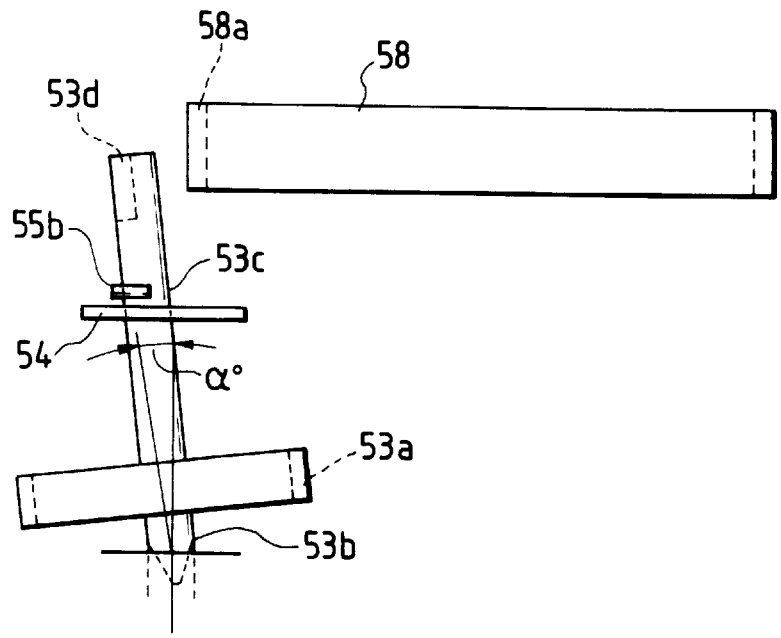
FIG. 44 is a side elevational view which illustrates the relationship between the feeding shaft and the counter plate in the state shown in FIG. 42.
Figure 45:
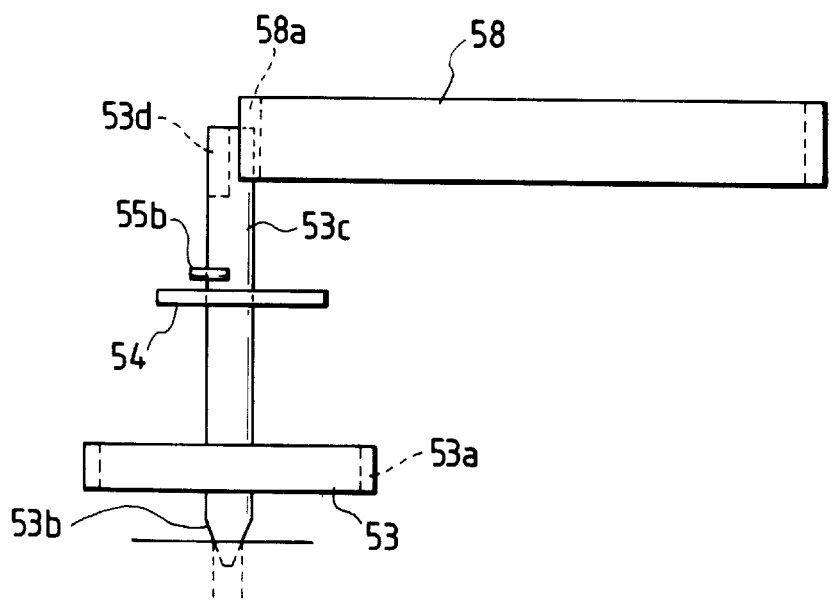
FIG. 45 is a side elevational view which illustrates the relationship between the feeding shaft and the counter plate in the state shown in FIG. 43.

Reference numeral 53 represents a feeding shaft having a gear portion 53a which is engaged to the idler gear 52. As shown in FIGS. 44 and 45, a tapered portion 53b of the feeding shaft 53 is received by a hole formed in the main body (omitted from illustration.). Thus, the feeding shaft 53 is able to incline by at least $\alpha°$ at its reception portion. Furthermore, the feeding shaft 53 has a backlash with which the gear portion 53a is able to smoothly rotate around the idler gear 52. In addition, the number of the teeth is determined such that the feeding shaft 53 is rotated by one rotation when the first gear 51 is rotated by one rotation.

Reference numeral 54 represents a releasing lever rotatably fastened to the main body (omitted from illustration) around its shaft portion 54d, the releasing lever 54 having a groove 54a into which a shaft portion 53c of the feeding shaft 53 is movably fastened. Reference numeral 55 represents a torsion spring having an arm portion 55a disposed at an end portion thereof and fastened to a dowel 54c of the releasing lever 54. Furthermore, an arm portion 55b formed at another end portion is fastened to the shaft portion 53c of the feeding shaft 53. Thus, the feeding shaft 53 and the releasing lever 54 are urged in a direction in which the shaft portion 53c of the feeding shaft 53 and a groove end surface 54b of the releasing lever 54 are pushed to each other.

Reference numeral 56 represents a spring having an end portion which is fastened to the body (omitted from illustration) and another end portion which is fastened to the releasing lever 54. Thus, the releasing lever 54 is applied with right directional rotational force. Reference numeral 57 represents a stopper provided for the body (omitted from illustration) and acting to restrict the right directional rotational position of the releasing lever 54.

Reference numeral 58 represents a count plate rotatably fastened to the body (omitted from illustration), the count plate 58 having a double helical tooth portion 58a on the outer surface thereof. Reference numeral 59 represents a torsion spring having an arm portion 59a formed at an end portion thereof and fastened to a projection 60 of the body (omitted from illustration). Another arm portion 59b formed at another end portion is fastened to a projection 58b of the count plate 58 to urge the count plate 58 in the direction of the right rotation. Reference numeral 61 represents a stopper formed on the body (omitted from illustration) to which a projection 58b formed on the count plate 58 is able to come into contact. Thus, the position of the right rotational position of the count plate 58, that is the initial position of the count plate 58 is determined.

Reference numeral 62 represents a detection lever rotatably fastened to the body (omitted from illustration) while making its shaft portion 62a as the rotational center. It is able to be fastened to a cam surface of the count plate 58 in such a manner that it is rotated in the right direction (see FIGS. 48 and 49) against the urging force of the spring 63 when the count plate 58 is rotated to a predetermined position.

Reference numeral 63 represents a spring having an end portion which is fastened to the body (omitted from illustration) and another end portion fastened to the detection lever 62 in such a manner that it applies a left directional rotational force to the detection lever. Reference numeral 64 represents a stopper provided for the body (omitted from illustration) and acting to restrict the position of the detection lever 62 after it has rotated in the left direction.

Reference numerals 65 and 66 represent gain switches which are switched on/off on the basis of the position of the detection lever 62. If the detection lever 62 is not fastened to the cam surface 58d of the count plate 58, the gain switch 65 is switched on and the gain switch 66 is switched off (see FIG. 48). If the detection lever 62 is fastened to the cam surface 58d, the gain switch 65 is switched off and the gain switch 66 is switched on (see FIG. 49). The state of the connection established between the gain switches 65 and 66 and the analog signal amplifying portion will be described later with reference to FIG. 50.

Reference numeral 67 represents a back cover rotatably fastened to the body (omitted from illustration) at its portion 67a, the back cover 67 having a projecting portion 67b which is able to come in contact with a portion 54e of the releasing lever 54.

Reference numeral 68 represents an index provided for the body (omitted from illustration) and acting to indicate the number of the frames of the film F marked in the count display portion 58c in the form of S . . . 1, 10, 15 of the count plate 58. That is, the count plate 58 is rotated to the left by a predetermined angle when the film F is fed by one frame by a method to be described later. At this time, the position at which the figure of the count display portion 58c is placed indicates the present number of the frames.

The feeding shaft 53 has a cut portion 53d which is able to engage to the double helical tooth portion 58a of the count plate 58. As described later, when the feeding shaft 53 is rotated by one rotation, the count plate 58 is rotated by a degree which corresponds to the pitch of the double helical tooth portion 58a.

Figure 42:
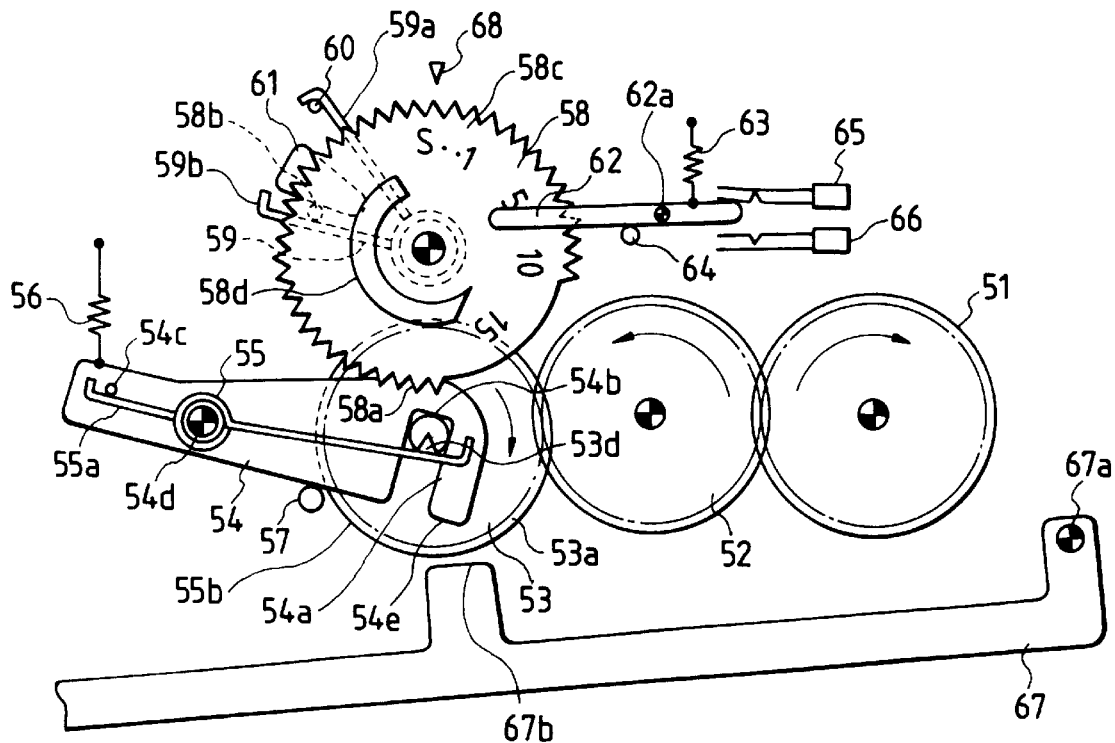
FIG. 42 is a plan view which illustrates the inner structure of the camera according to another embodiment of the present invention.

FIG. 42 illustrates a state in which the back cover 67 is opened and the feeding shaft 53 and the double helical tooth portion 58a of the count plate 58 are not engaged to each other. Furthermore, the shaft portion 53c of the feeding shaft 53 is pushed to the groove end surface 54b of the releasing lever 54 by the torsion spring 55. Thus, the releasing lever 54 is rotated to a position at which it comes in contact with the stopper 57 by the spring 56. Therefore, the feeding shaft 53 is inclined by α° as shown in FIG. 44 and its cut portion 53d is separated from the double helical tooth portion 58a of the count plate 58.

Figure 43:
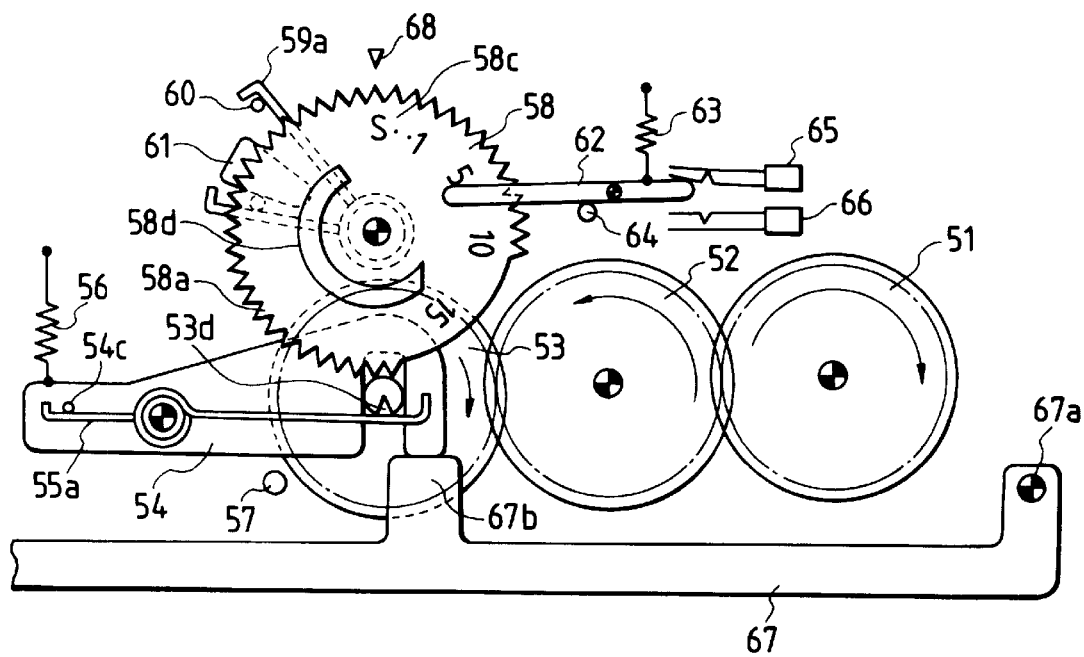
FIG. 43 is a plan view which illustrates a state in which the back cover is closed in the state shown in FIG. 42.

When the back cover 67 is closed, a state shown in FIG. 43 is realized. That is, the projecting portion 67b of the back cover 67 is engaged to the portion 54e of the releasing lever 54 so that the releasing lever 54 is rotated in the left direction against the urging force of the spring 56. During this, the shaft portion 53c of the feeding shaft 53 comes in contact with the double helical tooth portion 58a of the count plate 58. Then, the shaft portion 53c is separated from the groove end surface 54b and the same is pushed to the double helical portion 58a by the torsion spring 55. FIG. 45 illustrates the side surface at this time.

Figure 46:
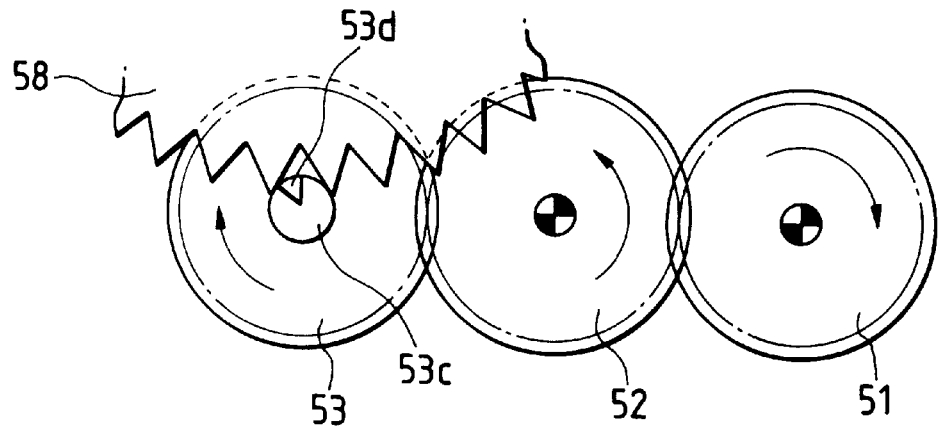
FIG. 46 is a plan view which illustrates the relationship between the feeding shaft, the counter plate and the gears when the film feeding is commenced in a state shown in FIG. 42.
Figure 47:
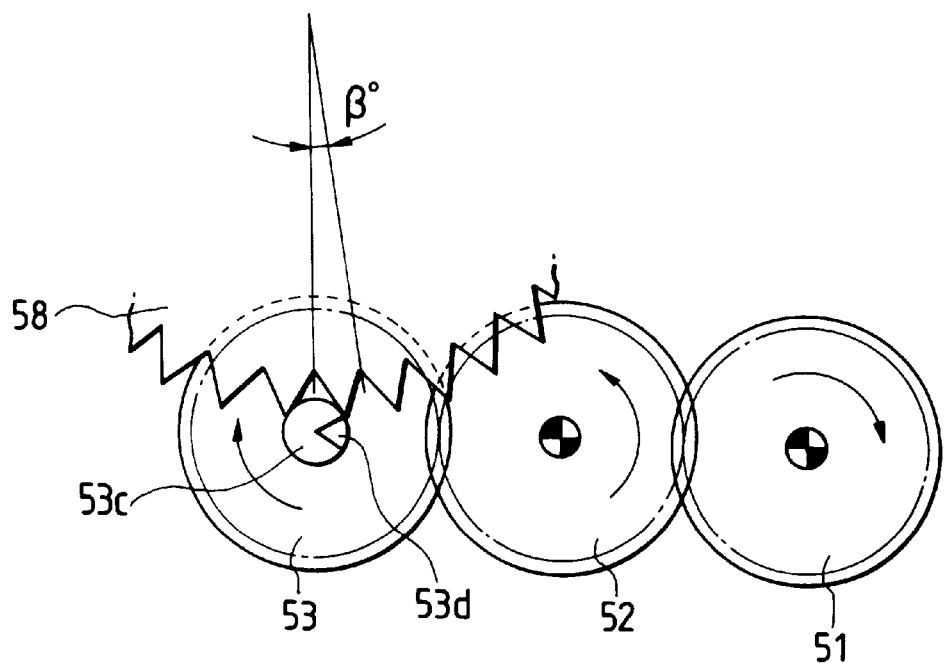
FIG. 47 is a plan view which illustrates the relationship between the feeding shaft, the counter plate and the gears when the film feeding is commenced in a state shown in FIG. 42.

When the perforation P is moved due to the feeding of the film, the sprocket (omitted from illustration) to be engaged to the perforation P is rotated. When the first gear 51 connected to the sprocket is rotated by one rotation due to the feeding of the film 2 by one frame, the feeding shaft 53 is also rotated as described above. At this time, the cut portion 53d formed in the shaft portion 53c is, as shown in FIGS. 46 and 47, engaged to the double helical tooth portion 58a of the count plate 58 so that the count plate 58 is rotated by β° due to the right rotation of the feeding shaft 53 as in the known count plate.

Figure 48:
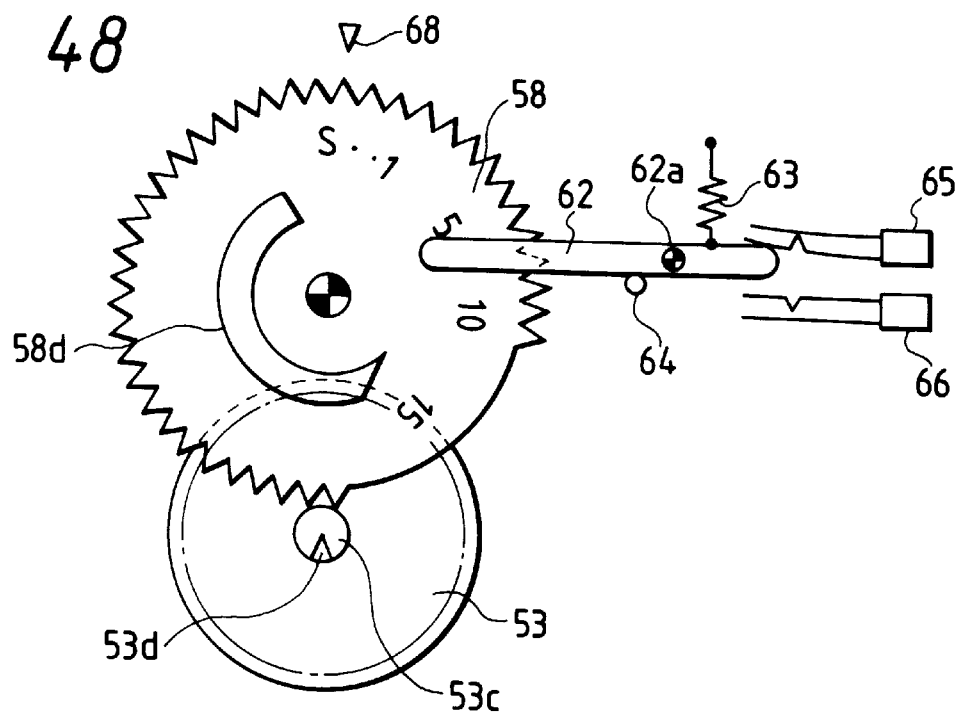
FIG. 48 is a plan view which illustrates the state of each gain switch in a state where the diameter of the wound film is small in the structure according to the embodiment shown in FIG. 42.
Figure 49:
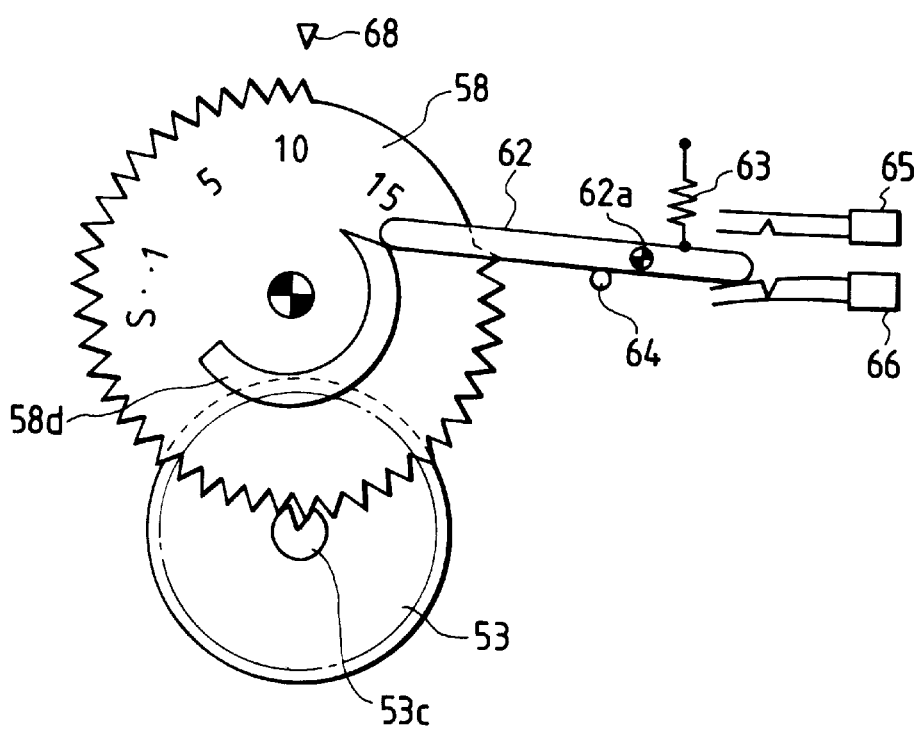
FIG. 49 is a plan view which illustrates the state of each gain switch in a state where the diameter of the wound film is large in the structure according to the embodiment shown in FIG. 42.

When the count plate 58 reaches a predetermined position after it is repeatedly rotated at each β°, the detection lever 62 is engaged to the cam surface 58d of the count plate 58. As a result, it is rotated in the right direction against the urging force of the spring 63. Therefore, the gain switches 65 and 66 in the state shown in FIG. 48 are brought into a state shown in FIG. 49, that is the gain switch 65 is switched on and as well as the gain switch 66 is switched off.

That is, the position at which the detection lever 62 and the cam surface 58d are engaged to each other is used to set the number of frames with which the gain switch is switched over.

Figure 50:
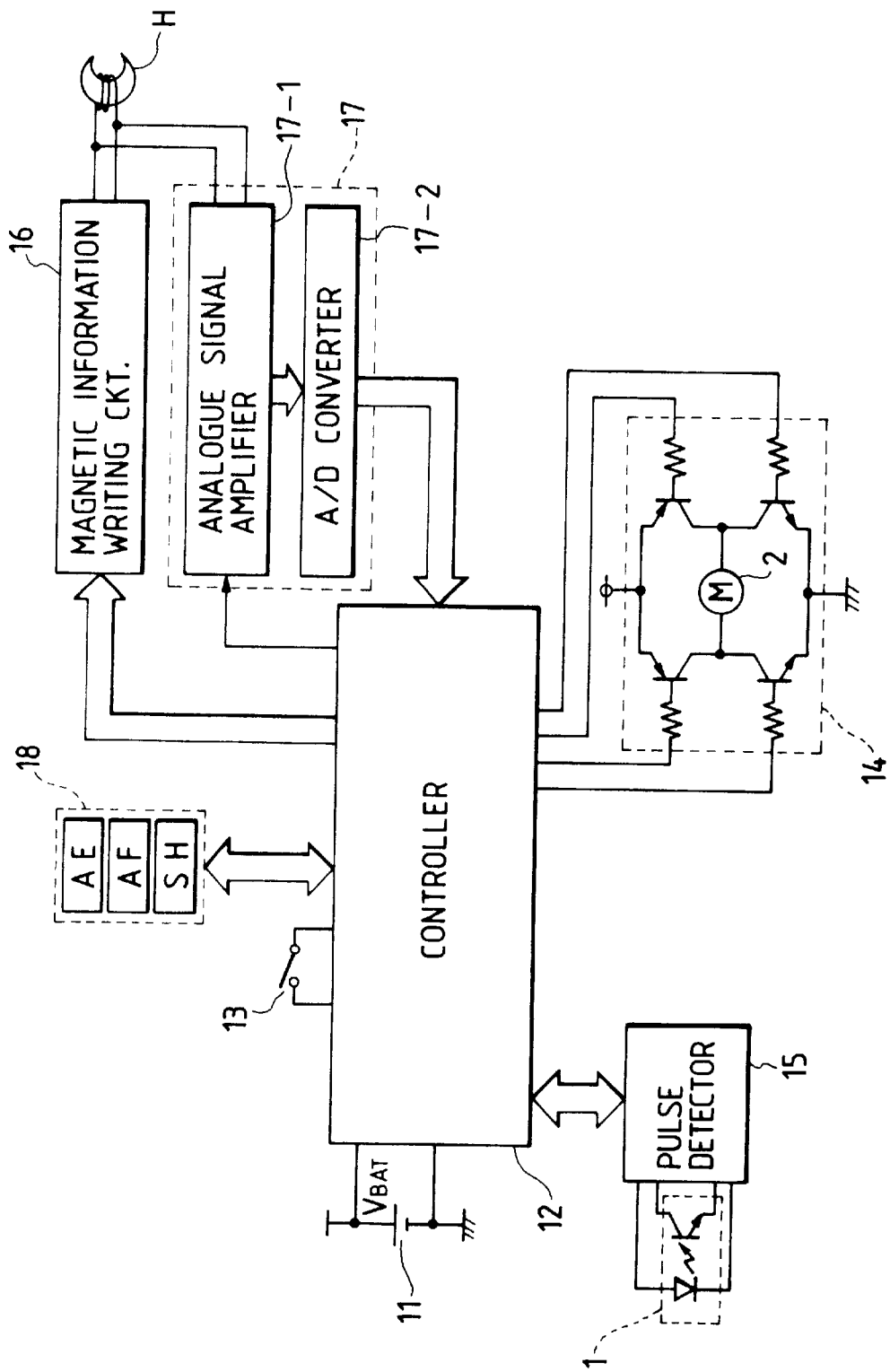
FIG. 50 is a perspective view which schematically illustrates the inner structure of the camera according to the embodiment of the present invention.
Figure 51:
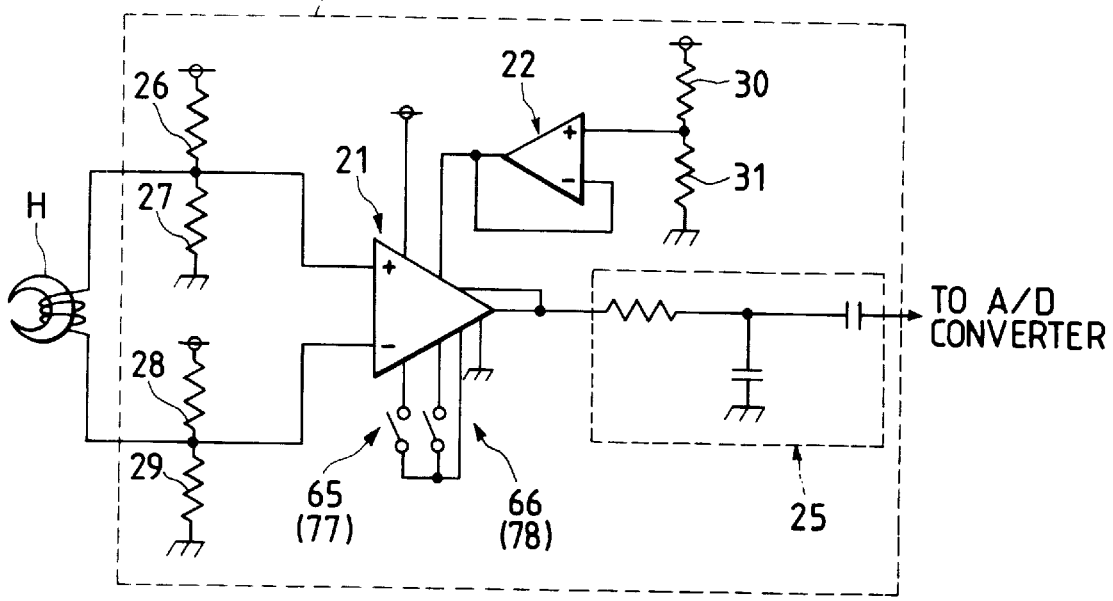
FIG. 51 is a circuit diagram which illustrates the detailed structure of the analog signal amplifying portion shown in FIG. 50.

FIGS. 50 and 51 illustrate an electric circuit for use in a camera having the detection mechanism the mechanical structure of which is arranged as shown in FIGS. 42 to 49. Since the basic structure of this circuit is the same as that shown in FIGS. 40 and 34, only the different portions will now be described. Since the photographed frames are mechanically detected and displayed by the structure arranged as shown in FIGS. 42 to 49, the film counter 19 shown in FIG. 42 is omitted from the structure. Furthermore, the gain of the measuring amplifier 25 is switched over by gain switches 65 and 66 in place of the analog switches 23 and 24 shown in FIG. 34.

Since the analog switches 23 and 24 are omitted as described above, the control signal to be supplied from the control circuit 12 to the analog signal amplifying portion 17-1 of the magnetic reproducing circuit 17 can be omitted. Since the other portions are the same as those shown in FIGS. 40 and 34, their descriptions are omitted here.

Figure 52:
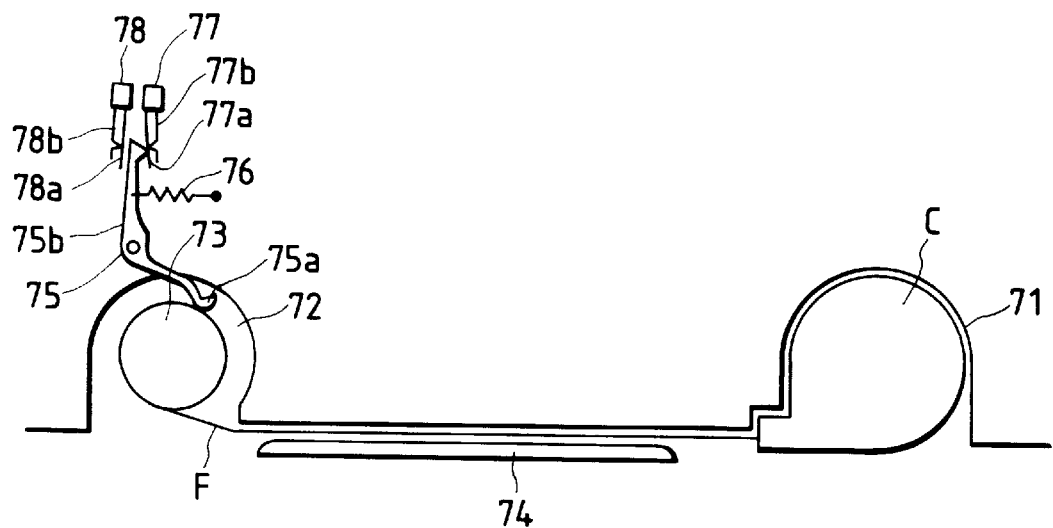
FIG. 52 is a plan view which illustrates the essential structure of the camera according to another embodiment of the present invention.

FIG. 52 is a plan view which illustrates the essential structure of another embodiment of the camera according to the present invention.

According to this embodiment, the number of frames of the film F is not counted but the diameter of the wound film F around the film winding spool of the camera is directed detected to change the gain of the analog signal amplifying portion.

Referring to FIG. 52, reference numeral 71 represents a film cartridge chamber formed in the camera body, 72 represents a spool chamber, 73 represents a film winding spool and 74 represents a film pressing plate. Reference numeral 75 represents a body roller lever rotatably fastened to the camera body and pushing, by its portion 75a, the film F to the film winding spool 73 for the purpose of desirably performing automatic loading. Reference numeral 76 represents a spring, an end portion of which is fastened to the camera body and another end portion of which is fastened to the body roller lever 75 and which gives right directional rotational force to the body roller lever 75.

Reference numerals 77 and 78 represent gain switches having sections 77a and 78a either of which is always brought into contact with a portion 75b of the body roller lever 75. Thus, it is deformed so as to come in contact with the portion 77b or 78b.

That is, if the diameter of the film F wound around the spool 73 is smaller than a predetermined value, the gain switch 77 is electrically connected. If the diameter of the wound film F is larger than a predetermined value, the gain switch 78 is electrically connected.

The above-described gain switches 77 and 78 are connected to the analog signal amplifying portion 17-1 in the magnetic reproducing circuit 17 shown in FIG. 51 according to the above-described embodiment. That is, the gain switches 65 and 66 shown in FIG. 51 are replaced by the gain switches 77 and 78 according to this embodiment. Therefore, also according to this embodiment, a high gain is set in a case where the gain switch 77 is electrically connected. In a case where the gain switch 78 is electrically connected, a low gain is set. Thus, a similar effect can be obtained.

According to the above-described embodiments, the diameter of the wound film is detected and the gain (the degree of amplification) of the analog signal amplifying portion is changed in accordance with the detected diameter. Therefore, an effect can be obtained in that the following problem can be overcome: the film feeding speed is undesirably changed due to the change in the diameter of the wound film, the amplification level of the magnetic signal to be reproduced during the operation of feeding the film is therefore changed and thereby an error in reproducing data takes place. As a result, reproducing can be stably performed while eliminating the influence of the change in the film feeding speed due to the diameter of the wound film.

Figure 53:
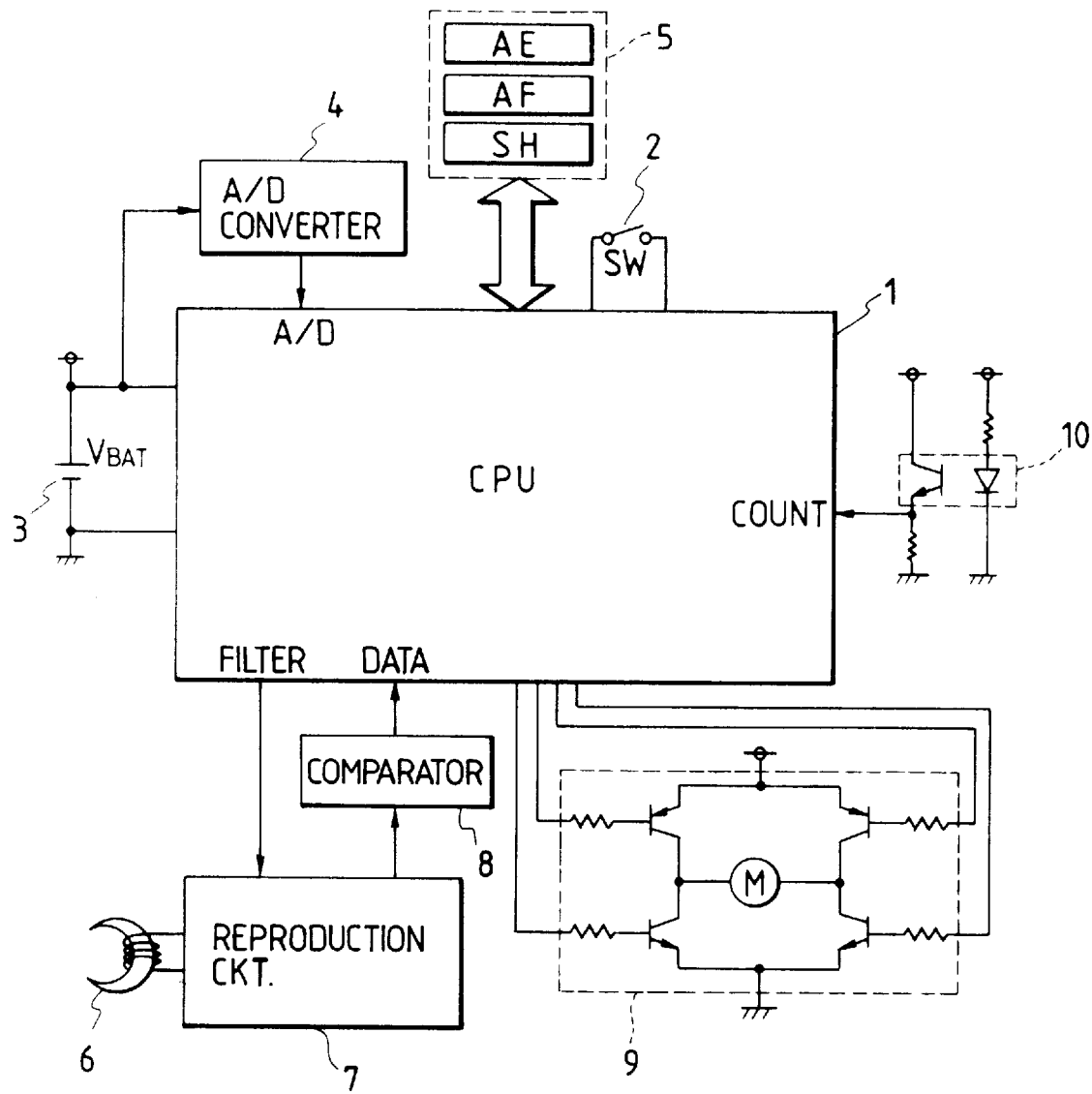
FIG. 53 is a circuit block diagram which illustrates the schematic structure of another embodiment of a magnetically recorded data reproducing apparatus according to the present invention.

FIG. 53 is a block diagram which schematically illustrates the structure of a circuit for use in another embodiment of the magnetic recording data reproducing apparatus according to the present invention.

Reference numeral 1 represents a CPU (Central Processing Unit) for controlling the overall operation to which the following elements are connected: reference numeral 2 represents a switch connected to the CPU1 for commencing the photographing operation. Reference numeral 3 represents a battery (VBAT) serving as a power source for driving the overall system. Reference numeral 4 represents an A/D converter for converting the analog voltage value of the battery 3 into a digital value to transmit it to the CPU1. Reference numeral 5 represents an automatic circuit comprising an AE (Automatic Exposure) circuit, an AF (Automatic Focusing) circuit and an SH (Shutter) circuit for performing the light measuring, the distance measuring and the photographing operations. Reference numeral 6 represents a reproducing head for detecting magnetically recorded data as a signal. Reference numeral 7 represents a reproducing circuit for amplifying the signal detected by the reproducing head 6. Reference numeral 8 represents a comparator for converting the magnetically recorded signal amplified by the reproducing circuit 7 into a digital signal to transmit it to the CPU1. Reference numeral 9 represents a feeding circuit for rotating a motor M which feeds the film and composed of a bridge circuit. Reference numeral 10 represents a photocoupler which repeatedly shows light and dark by a pulse plate which rotates in accordance with the operation of the feeding circuit 9 to generate pulses.

Figure 54:
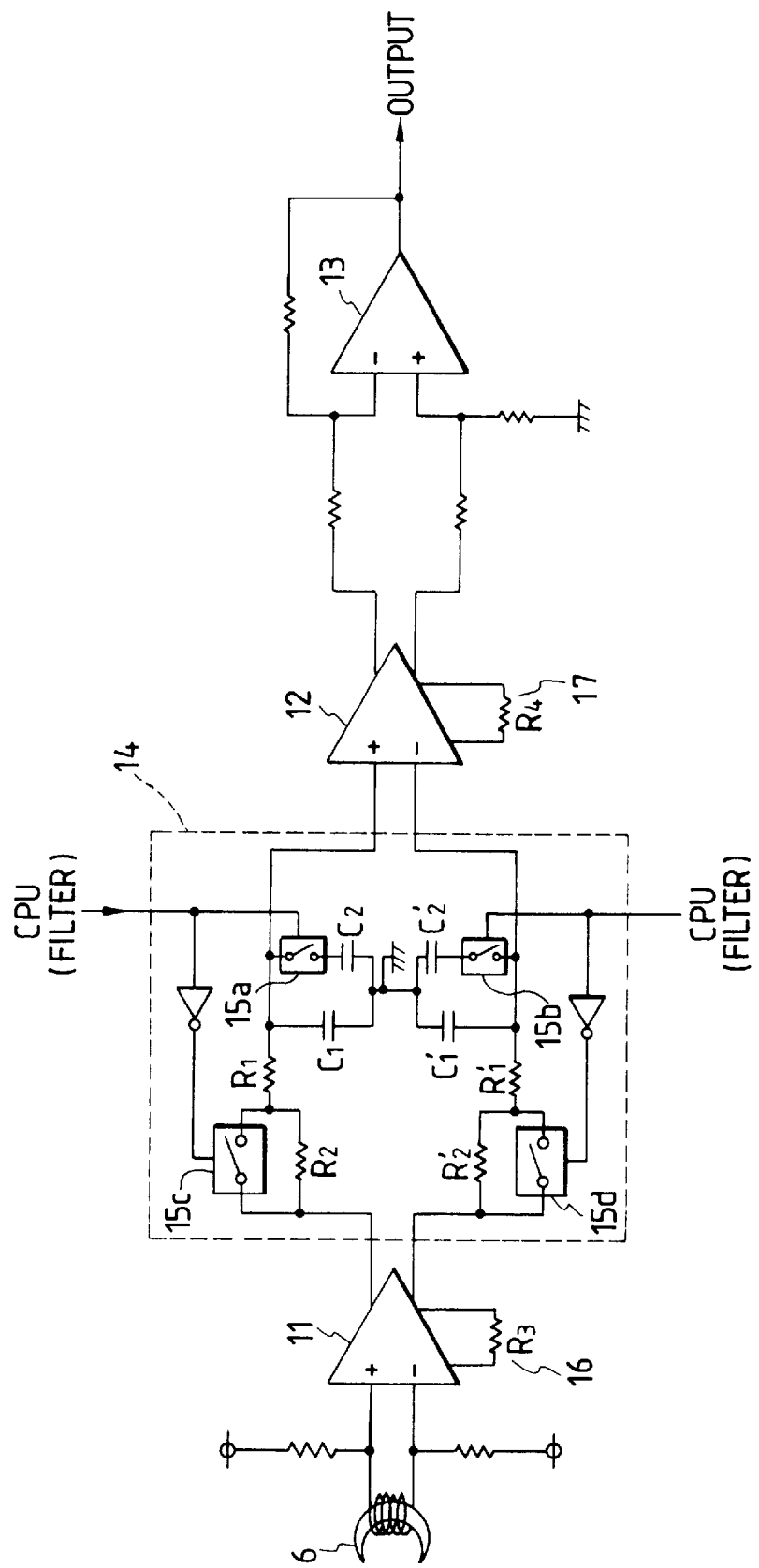
FIG. 54 is a circuit diagram which illustrates the detailed structure of a reproducing head and a reproducing circuit.

FIG. 54 illustrates the detailed structure of a circuit for the reproducing head 6 and that for the reproducing circuit 7.

Reference numerals 11, 12 and 13 represent amplifiers for amplifying the reproduction signal of the magnetically recorded data transmitted from the reproducing head 6, the amplifiers 11, 12 and 13 being connected in series to form three stages. The amplifiers 11 and 12 may comprise, for example, TL592 manufactured by Texas Instrument and the amplifier 13 may comprise TL071. Reference numeral 14 represents a filter circuit for cutting noise or the like in the reproduction signal amplified by the amplifier 11. Reference numerals 15a, 15b, 15c and 15d represent analog switches for switching over the time constant (realized by a combination of resistors R1, R2 and capacitors C1 and C2 and a combination of resistors R1', R2' and capacitors C1' and C2') of the filter circuit 14. Reference numerals 16 and 17 represent amplification degree adjusting resistors connected between the input terminal and the output terminal of the amplifiers 11 and 12 and acting to determine the degree of the amplification. The resistors R1 and R2 are connected in series and connected to an output terminal of the amplifier 11. Similarly, the resistors R1' and R2' are connected in series and connected to another output terminal of the amplifier 11. In addition, analog switches 15c and 15d are connected in parallel to the resistors R2 and R2'. Furthermore, the capacitor C1 is connected to a portion between the output terminal of the resistor R1 and the earth. In addition, the capacitor C1' is connected to a portion between the output terminal of the resistor R1' and the earth. Furthermore, the analog switch 15a and the capacitor C2, which are connected in series, are in parallel connected to the capacitor C1. In addition, the analog switch 15b and the capacitor C2', which are connected in series, are in parallel connected to the capacitor C1'.

Figure 55:
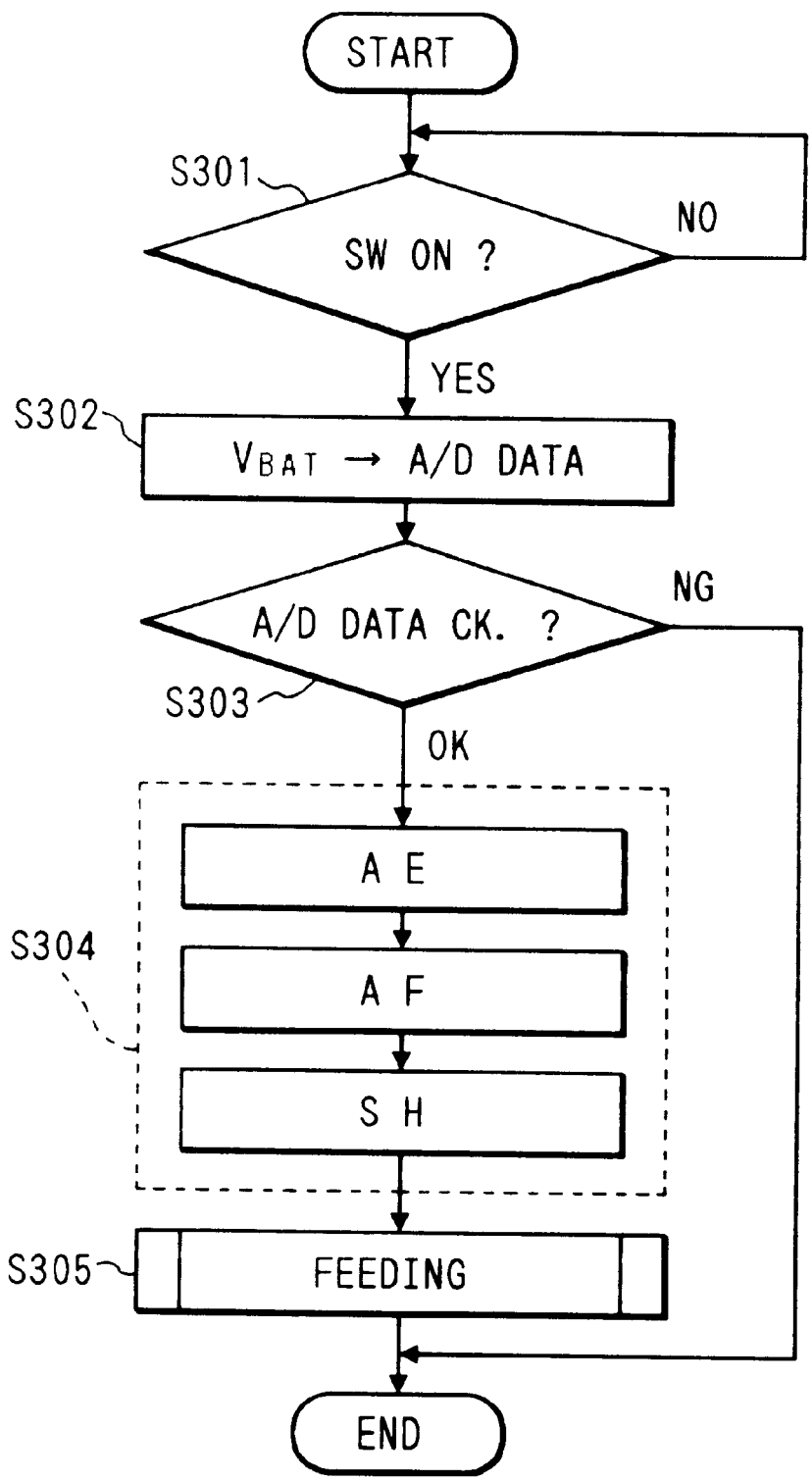
FIG. 55 is a flow chart which illustrates the sequential operation of the embodiment shown in FIGS. 53 and 54.

FIG. 55 is a flow chart which illustrates the sequential operation of the embodiment shown in FIGS. 53 and 54, wherein symbol S represent the step.

First, the state of the switch 2 is checked (S301). When the switch 2 is switched on, the voltage of the battery 3 is converted into digital data by the A/D converter 4. The data about this is stored in the CPU1 (S302). Then, the digital data is (S303) subjected to a comparison with minimum voltage Vmin which is required to operate the camera and which is previously set in the CPU1. If the digital data is smaller than Vmin, the operation is completed. If the same is larger than Vmin, the flow proceeds to an photographing operation (S304). In the photographing operation, the automatizing circuit 5 is used to perform the known light measuring and distance measuring operations. In accordance with data thus-obtained, the photographing operation is performed. Then, the film is fed (S305) and the sequential operation is completeed. The magnetically recorded data is detected as a signal by the reproducing head 6 during the film feeding operation in S305. The signal is then amplified in the reproducing circuit 7 before it is converted into a digital signal by the comparator 8 so as to be received by the CPU1.

Figure 56:
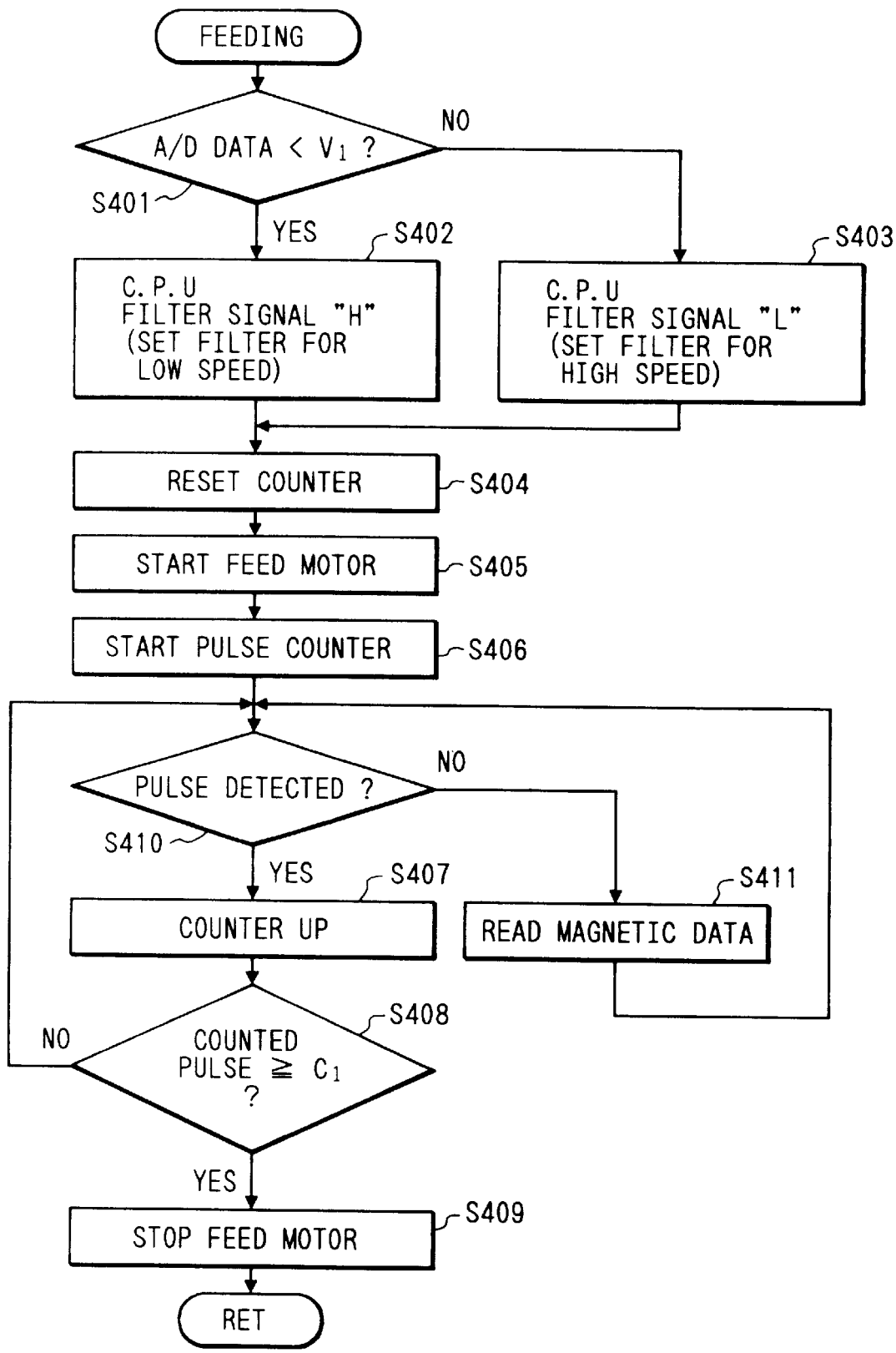
FIG. 56 is a flow chart which illustrates the detailed film feeding operation in the process shown in FIG. 55.

FIG. 56 is a flow chart which illustrates the detailed film feeding operation to be performed in step 305 shown in FIG. 55.

After the photographing operation (the result of the operation in step 304) has been performed, the residual voltage digital data (the result of the operation in step 302) of the battery 3 and filter time constant switching point voltage V1 which has been previously set are subjected to a comparison (S401). If the digital data is smaller than V1, the level of the filter signal to be supplied from the CPU1 to the analog switches 15a and 15b is made to be "H" to switch on the analog switches 15a and 15b and to switch off the analog switches 15c and 15d. As a result, a low speed filter having a high time constant is set (S402). If the digital data is higher than V1, the level of the filter signal to be supplied from the CPU1 to the analog switches 15a and 15b is made to be "L" to switch off the analog switches 15a and 15b and to switch on the analog switches 15c and 15d. As a result, a high speed filter having a low time constant is set (S403). After the filter has been set in step 402 or 403, the counter in the CPU1 for counting the pulses generated in the photocoupler 10 is reset (S404) to commence the feeding circuit (S405). As a result, counting of pulses generated from the photocoupler 10 by the pulse plate which is rotated when the feeding motor is rotated is started (S406). A fact whether or not the pulse has been supplied from the photocoupler 10 to the CPU1 is discriminated (S410). If the pulse has been supplied, the pulse count is increased (S407). If no pulse has been supplied, the magnetically recorded data of the film is detected/amplified by the reproducing head 6 and the reproducing circuit 7, and it is converted into a digital signal by the comparator 8 so as to be received by the CPU1 (S411). Then, the flow returns to the pulse detection process (S410). After the pulse counting process (S407) has been completed, a fact whether or not the pulse count is larger than a predetermined feeding stop count C1 is discriminated (S408). If the pulse count is smaller than C1, the flow again returns to the pulse counting process (S410). If the pulse count is larger than C1, the feeding circuit 9 is stopped (S409). Thus, the sequential feeding operation is completed.

As described above, this embodiment is arranged in such a manner that the filter is switched over to a high speed filter and a low speed filter in a stepped manner in accordance with the residual voltage of the battery 3. Therefore, the influence of noise or the like can be eliminated by reducing the unnecessary filter band in accordance with the magnetically recorded data reproducing frequency even if the film feeding speed is changed in accordance with the power supply voltage. Therefore, the performance of reproducing the magnetically recorded data can be improved. That is, since the high speed filter has a small time constant in comparison to that of the low speed filter, a high frequency band can be reproduced.

Although the above-described embodiment is arranged in such a manner that only one point is used as the filter switching point, a plurality of the switching points may be provided, resulting the performance of reproducing the magnetically recorded data to be further improved.

The above-described embodiment is arranged in such a manner that the time constant of the filter which corresponds to the change in the feeding speed in accordance with the residual voltage of the battery 3 is performed. However, in some cameras, the feeding speed is different depending upon the set mode even if the residual voltage of the battery 3 is the same. For example, in a case where the one-shot/continuous photographing mode is switched in a camera, the gear in the feeding system for raising the feeding speed is switched over in the continuous photographing mode to complete the feeding process in a short time in comparison to the one-shot photography mode. Then, the description will be made about this case.

Figure 57:
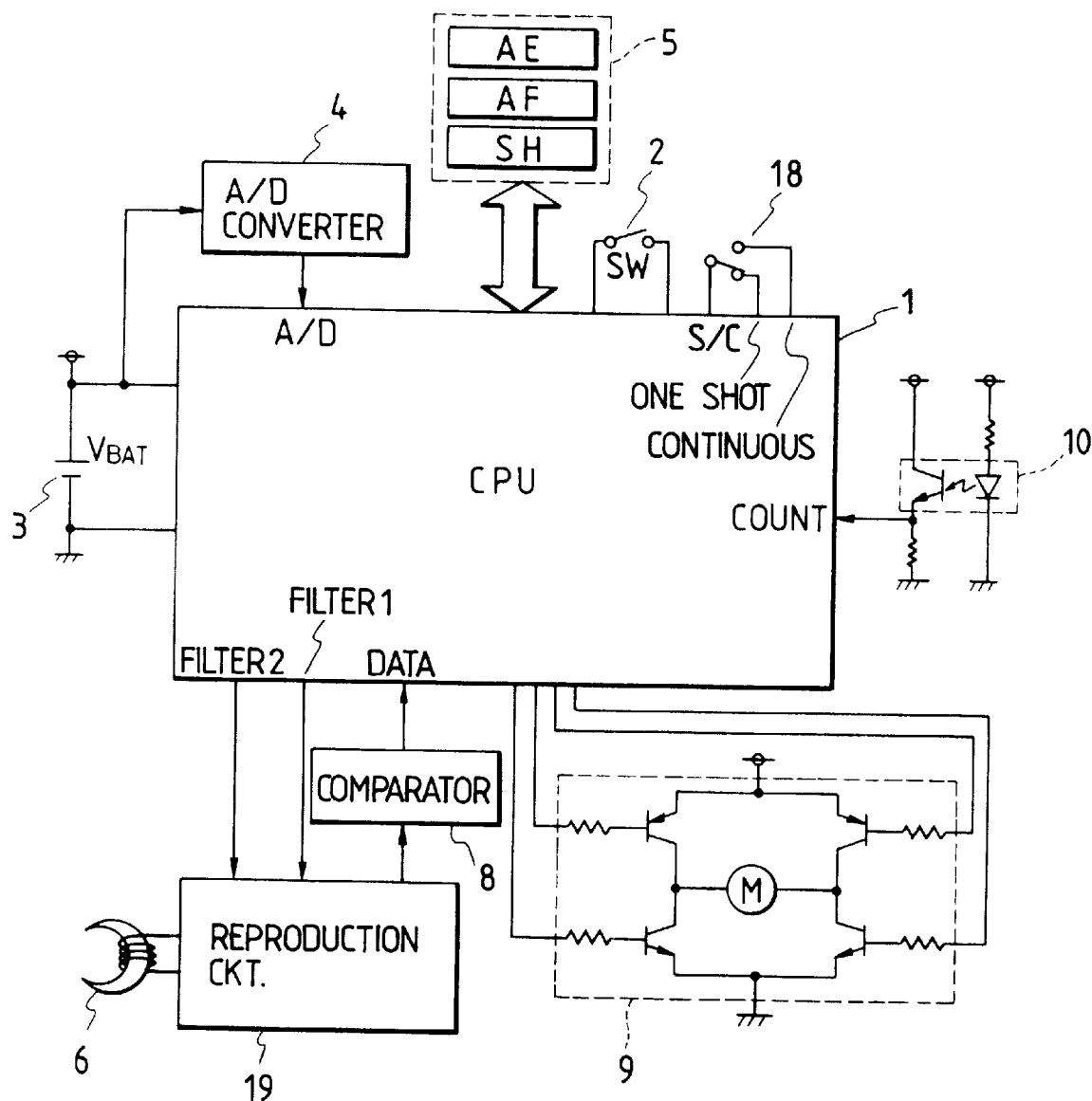
FIG. 57 is a circuit block diagram which illustrates the schematic structure of another embodiment of the present invention.

FIG. 57 is a block diagram which schematically illustrates a circuit for use in another embodiment of the magnetically recorded data reproducing apparatus according to the present invention. According to this embodiment, since the same elements as those according to the embodiment shown in FIG. 53 are given the same reference numerals, their descriptions are omitted here.

This embodiment is arranged in such a manner that a one-shot/continuous mode switch 18 is additionally provided for the structure shown in FIG. 53. According to this embodiment, a signal to be supplied from the CPU1 to the reproducing circuit 19 is composed of a filter signal (Filter-1) and a filter signal 2 (Filter-2).

Figure 58:
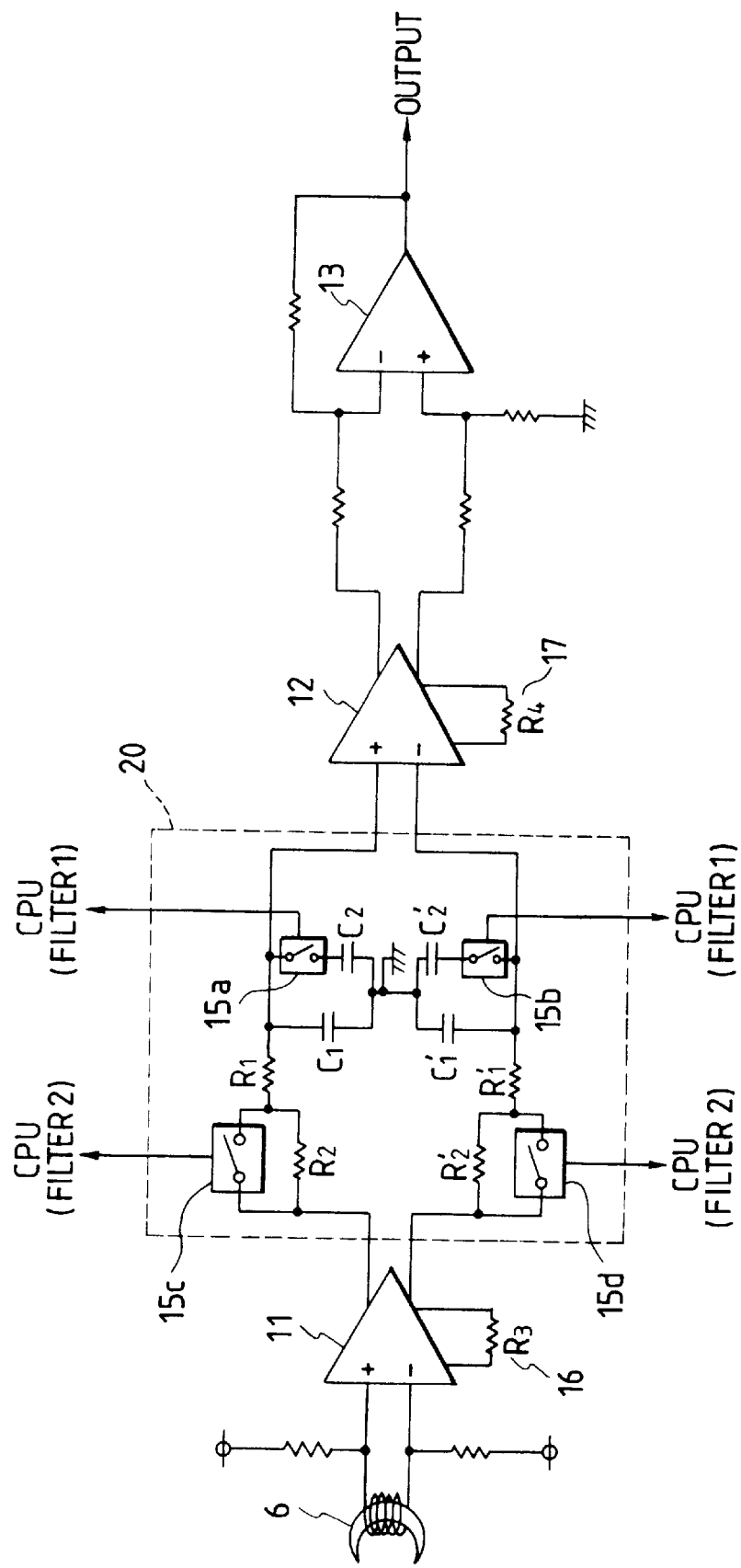
FIG. 58 is a circuit diagram which illustrates the detailed structure of the reproducing circuit shown in FIG. 57.

FIG. 58 is a circuit diagram which illustrates the detailed structure of the reproducing circuit 19 shown in FIG. 57.

The structure is basically structured in the same manner as that of the circuit shown in FIG. 54. However, the analog switches 15a and 15b in the filter circuit 20 are arranged to receive the filter signal 1 of the CPU1 and the analog switches 15c and 15d are arranged to receive the filter signal 2 of the CPU1.

Figure 59:
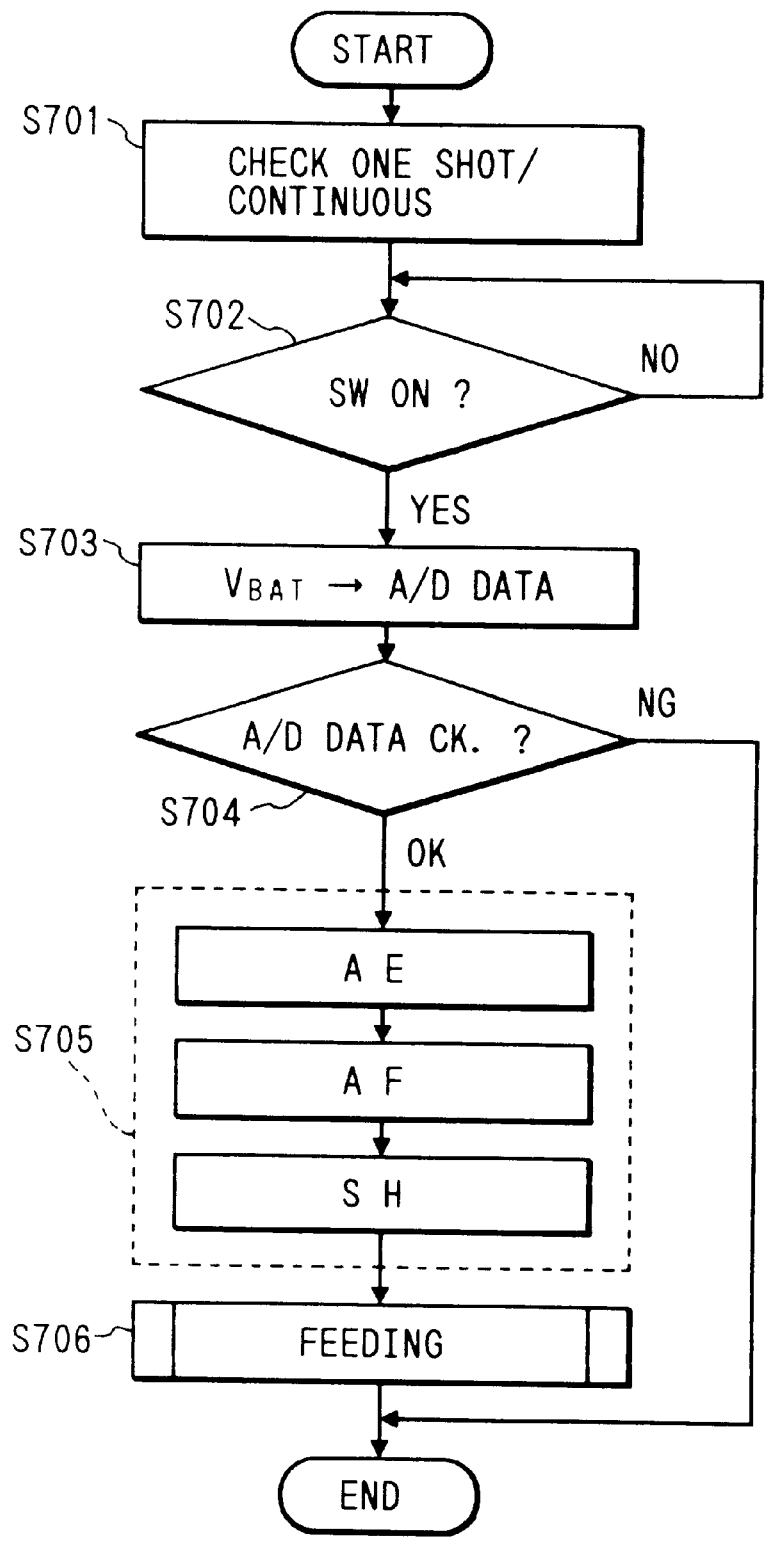
FIG. 59 is a flow chart which illustrates the operation of the structure shown in FIGS. 57 and 58.

FIG. 59 is a flow chart which illustrates the operation of the structure shown in FIGS. 57 and 58.

First, the state of the one-shot/continuous photographing mode switch 18 is checked and the fact that the subject operation is the one-shot photographing operation or the continuous operation is stored as data as the CPU1 (S701). Then, the state of the switch 2 is checked (S702). When the switch 2 is switched on, the voltage of the battery 3 is converted into digital data by the A/D converter 4 to store it in the CPU1 (S703). Then, the digital data is (S704) subjected to a comparison with minimum voltage Vmin which is required to operate the camera and which is previously set in the CPU1. If the digital data is smaller than Vmin, the operation is completed. If the same is larger than Vmin, the flow proceeds to an photographing operation (S705). In the photographing operation, the automatizing circuit 5 is used to perform the known light measuring and distance measuring operations. In accordance with data thus-obtained, the photographing operation is performed. Then, the film is fed (S706) and the sequential operation is completeed. The magnetically recorded data is detected as a signal by the reproducing head 6 during the film feeding operation in S706. The signal is then amplified in the reproducing circuit 19 before it is converted into a digital signal by the comparator 8 so as to be received by the CPU1.

Figure 60:
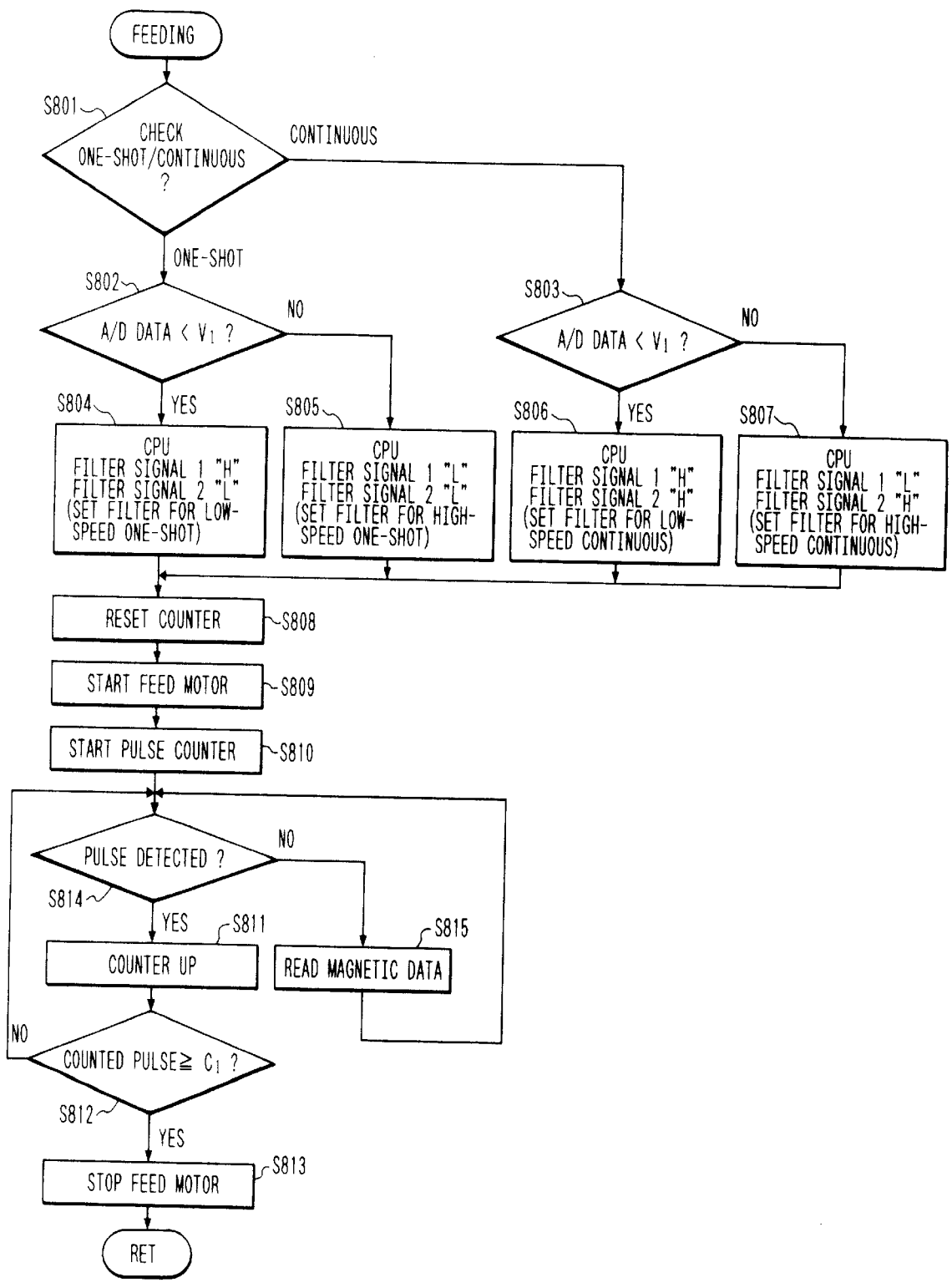
FIG. 60 is a flow chart which illustrates the detailed feeding operation.

FIG. 60 is a flow chart which illustrates the detailed film feeding operation shown in FIG. 59.

First, data about the one-shot/continuous mode (the result of the discrimination made in step 701) is discriminated (S801) before the residual voltage digital data (the result of the process in step 703) of the battery 3 and the filter time constant switch point V1 are subjected to a comparison (S802 and S803). If the digital data is smaller than V1 (A/D Data<V1) in the one-shot photography mode, the level of the filter signal 1 is set to "H" level and the level of the filter signal 2 to "L" level to set the low speed filter (S804). If the digital data is larger than V1 (A/D Data>V1) in the one-shot photography mode, both the levels of the filter signal 1 and the filter signal 2 to are set to "L" level to set the high speed filter (S805).

If the digital data is smaller than V1 (A/D Data<V1) in the continuous photography mode, the level of the filter signal 1 is set to "H" level and the level of the filter signal 2 to "H" level to set the low speed filter for continuous photography (S806). If the digital data is larger than V1 in the continuous photography mode, the level of the filter signal 1 is set to "L" level and the level of the filter signal 2 to "H" level to set the high speed filter for continuous photography (S807). After the filter has been set in any of steps 804 and 807, the counter in the CPU1 for counting the pulses generated by the photocoupler 10 is reset (S808). As a result, the feeding circuit 9 is commenced (S809) and counting of the pulses generated from the photocoupler 10 by the pulse plate which is rotated when the feeding motor is rotated is commenced (S810). Then, a fact whether or not the pulse has been supplied from the photocoupler 10 to the CPU1 is detected (S814) and the pulse count is increased if the pulse has been supplied (S811). If the pulse has not been supplied, the magnetically recorded data of the film is detected/amplified by the reproducing head 6 and the reproducing circuit 19. Then, it is converted into a digital signal by the comparator 8 before it is received by the CPU1 (S815) then the flow again returns to the pulse detection process (S814). After the pulse counting process has been completed (S811), a discrimination is made whether or not the pulse count is larger than the feeding stop count C1 which has been previously set (S812). If the pulse count is smaller than C1, the flow again returns to the pulse count process (S814). If the pulse count is larger than C1, the feeding circuit 9 is stopped (S813) and the sequential feeding operation is completed.

As described above, the switching of the filter time constant on the basis of the residual voltage of the battery 3 and switching of the filter time constant depending upon the photography mode are performed. Therefore, the performance of reproducing the magnetically recorded data can be improved because the time constant of the filter can be reduced in inverse proportion to the feeding speed in a camera of a type in which the gear ratio in the feeding mechanism is changed depending upon the photography mode and the feeding speed is raised in the continuous photography mode in comparison to the one-shot photography mode.

Figure 70:
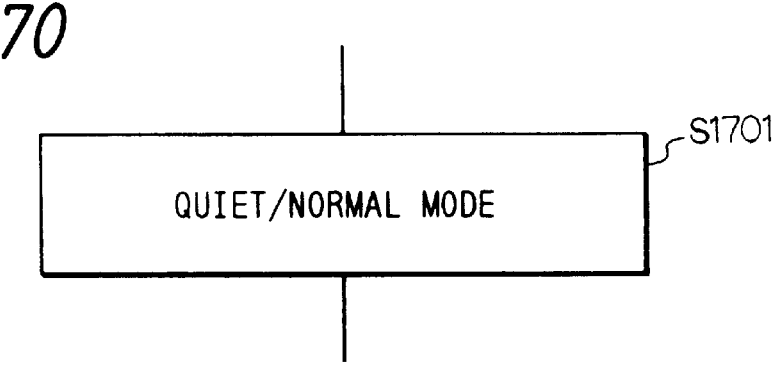
FIGS. 70 and 71 are flow charts which illustrate a partial modification to the flow shown in FIG. 60.
Figure 71:
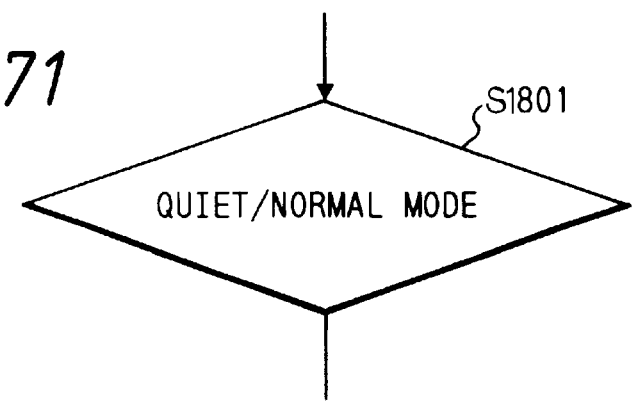

In another mode of the above-described continuous and one-shot photography modes, for example, a silent mode in which the feeding speed is low, it is effective to change the time constant of the filter. In this case, a (silent mode/normal mode check) process (S1701) as shown in FIG. 70 is provided in place of step 701 shown in FIG. 701. Furthermore, a (silent mode/normal mode check) process (S1801) shown in FIG. 71 is provided in place of step 801 shown in FIG. 60.

Figure 61:
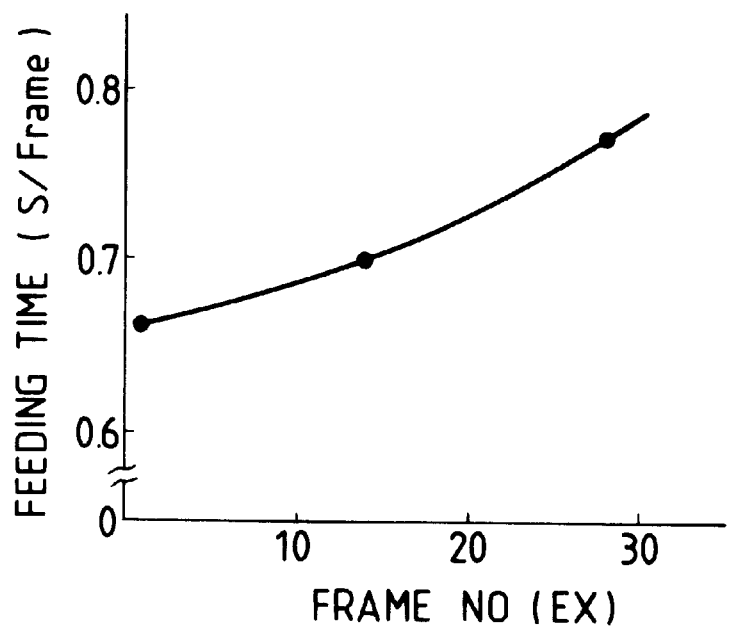
FIG. 61 illustrates the relationship between the change in the number of the film frames fed and the feeding speed.
Figure 62:
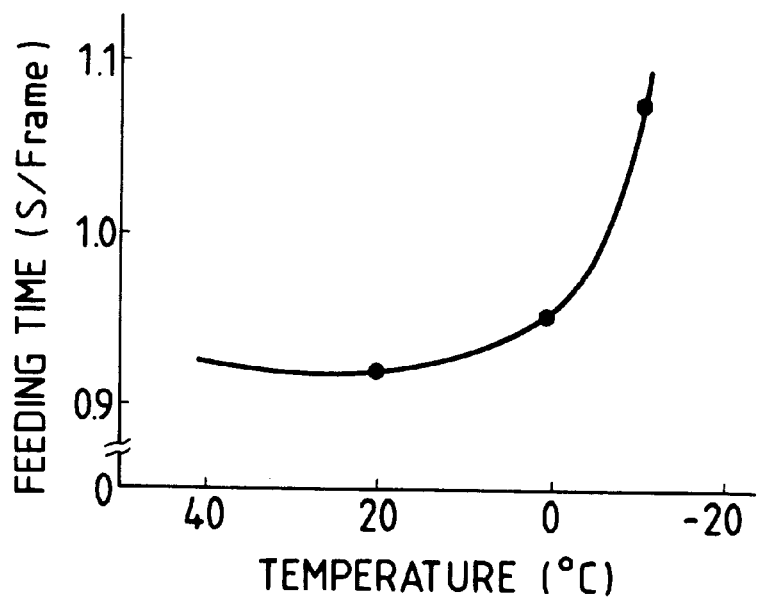
FIG. 62 illustrates the relationship between the temperature and the film feeding speed.

According to this embodiment, the description is made that the feeding speed can be changed due to the residual voltage and the switching of the photography mode. However, the feeding speed will be changed due to the number of frames of the film to be fed or the temperature. FIGS. 61 and 62 are graphs which illustrate the feeding time per frame with respect to the changes. Then, an example adapted to the above-described case will now be described.

Figure 63:
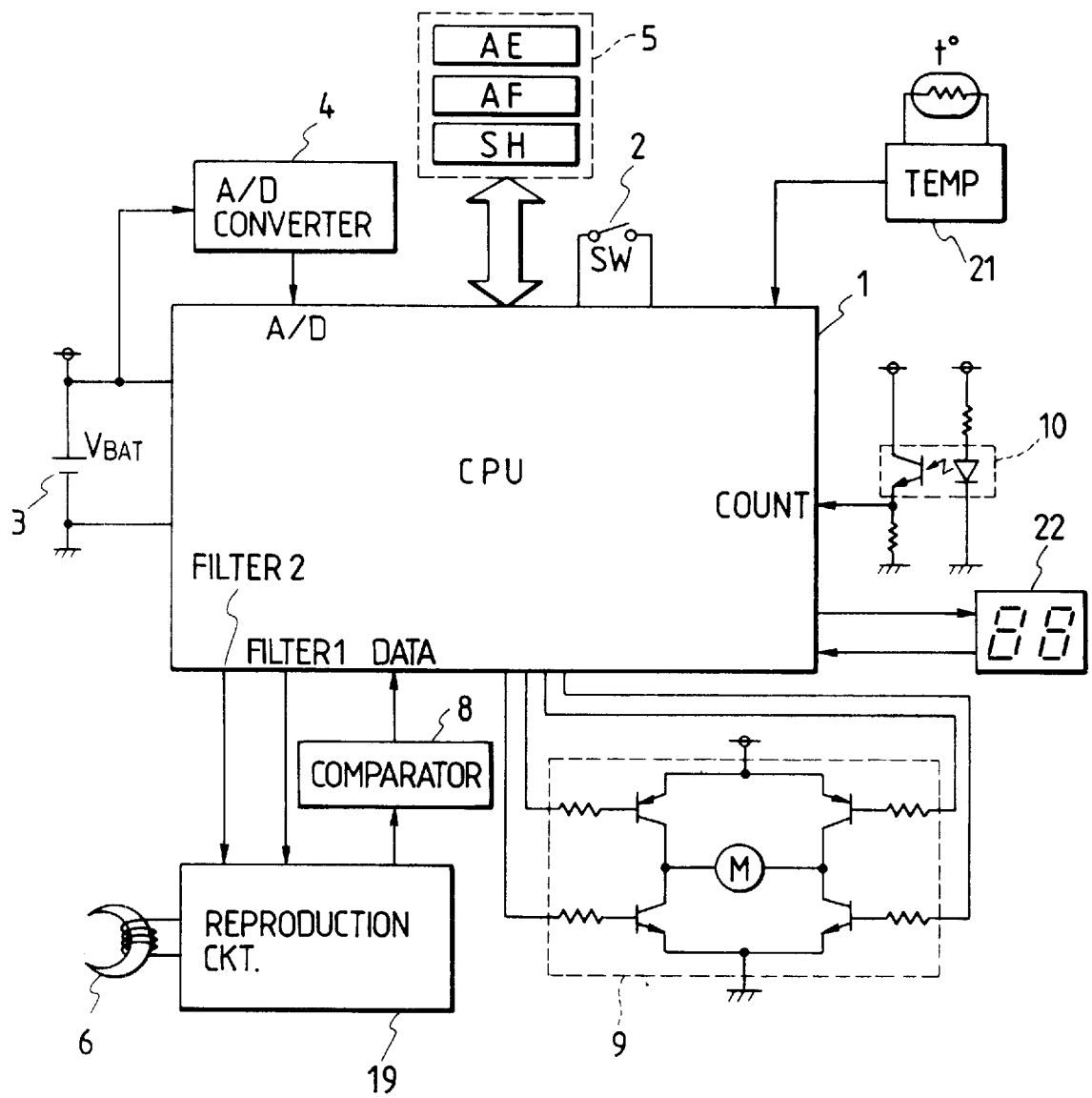
FIG. 63 is a block diagram which illustrates the schematic structure of the magnetically recorded data reproducing apparatus according to the present invention.

FIG. 63 is a block diagram which illustrates another embodiment of the magnetically recorded data reproducing apparatus according to the present invention.

According to this embodiment, the same elements as those according to the above-described embodiments shown in FIGS. 53 and 57 are given the same reference numerals and their descriptions are omitted here. Therefore, the added elements will now be described. Reference numeral 21 represents a temperature detection circuit for changing the voltage on the basis of the temperature by using a thermistor to transmit the voltage to the CPU1 as digital data. Reference numeral 22 represents a film counter for recording the number of the frames of the film. The above-described elements are connected to the CPU1. Since the structure of the reproducing circuit 19 according to this embodiment shown in FIG. 63 is made to be the same as that shown in FIG. 58, its description is omitted here.

Figure 64:
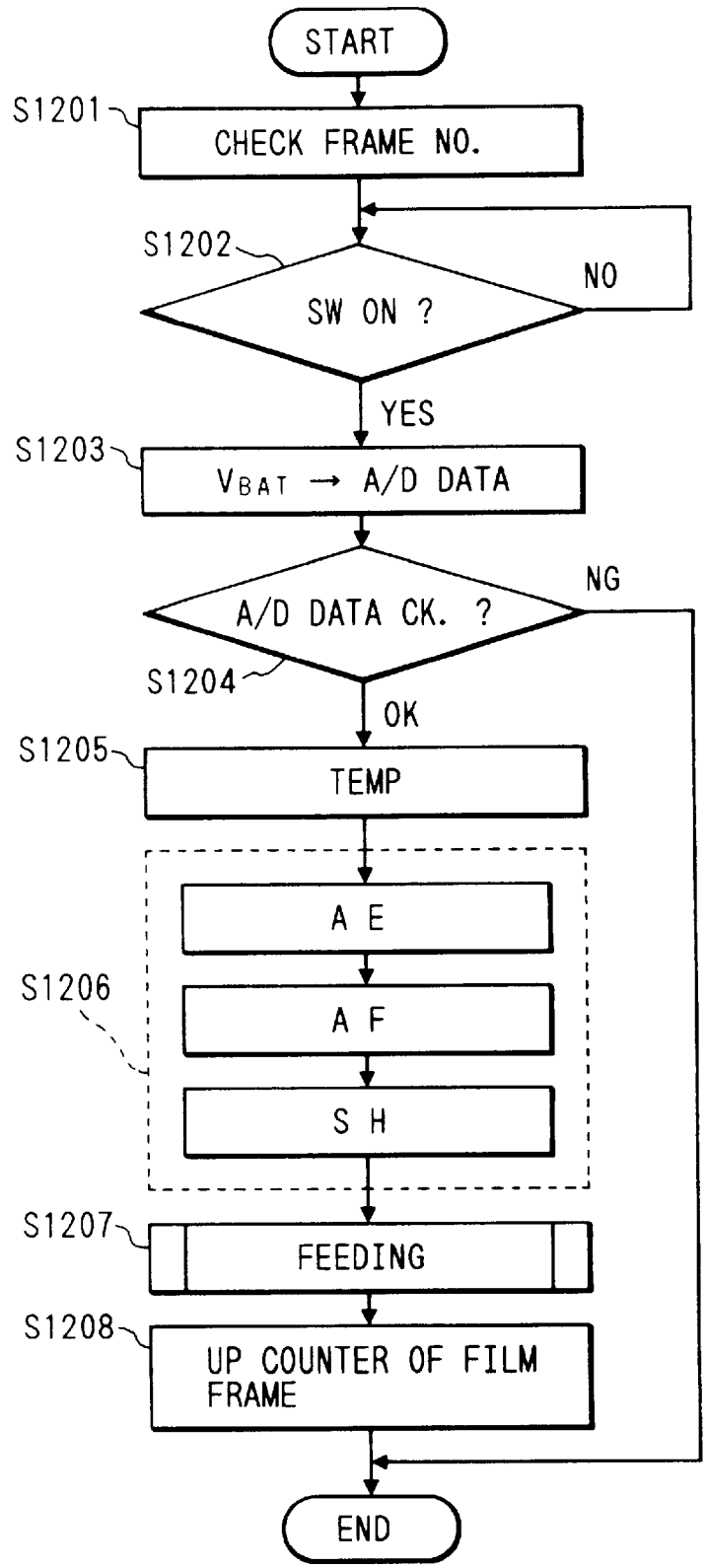
FIG. 64 is a flow chart which illustrates the operation of the structure shown in FIG. 63.

FIG. 64 is a flow chart which illustrates the operation of the structure shown in FIG. 63.

First, the state of the film counter 22 is checked (S1201) to be stored in the CPU1. Then, a fact whether or not the switch 2 is switched on is discriminated (S1202) before the residual voltage of the battery 3 and the data about is stored (S1203). Then, it is compared with the minimum voltage Vmn required to operate the camera which has been previously set in the CPU1 (S1204). If it is larger than Vmn, temperature data is supplied from the temperature detection circuit 21 to the CPU1 (S1205). Then, the photography operation (S1206) is performed and the film is fed (S1207) before the count of the film counter 22 is increased (S1208). Thus, the sequential operation is completed.

Figure 65:
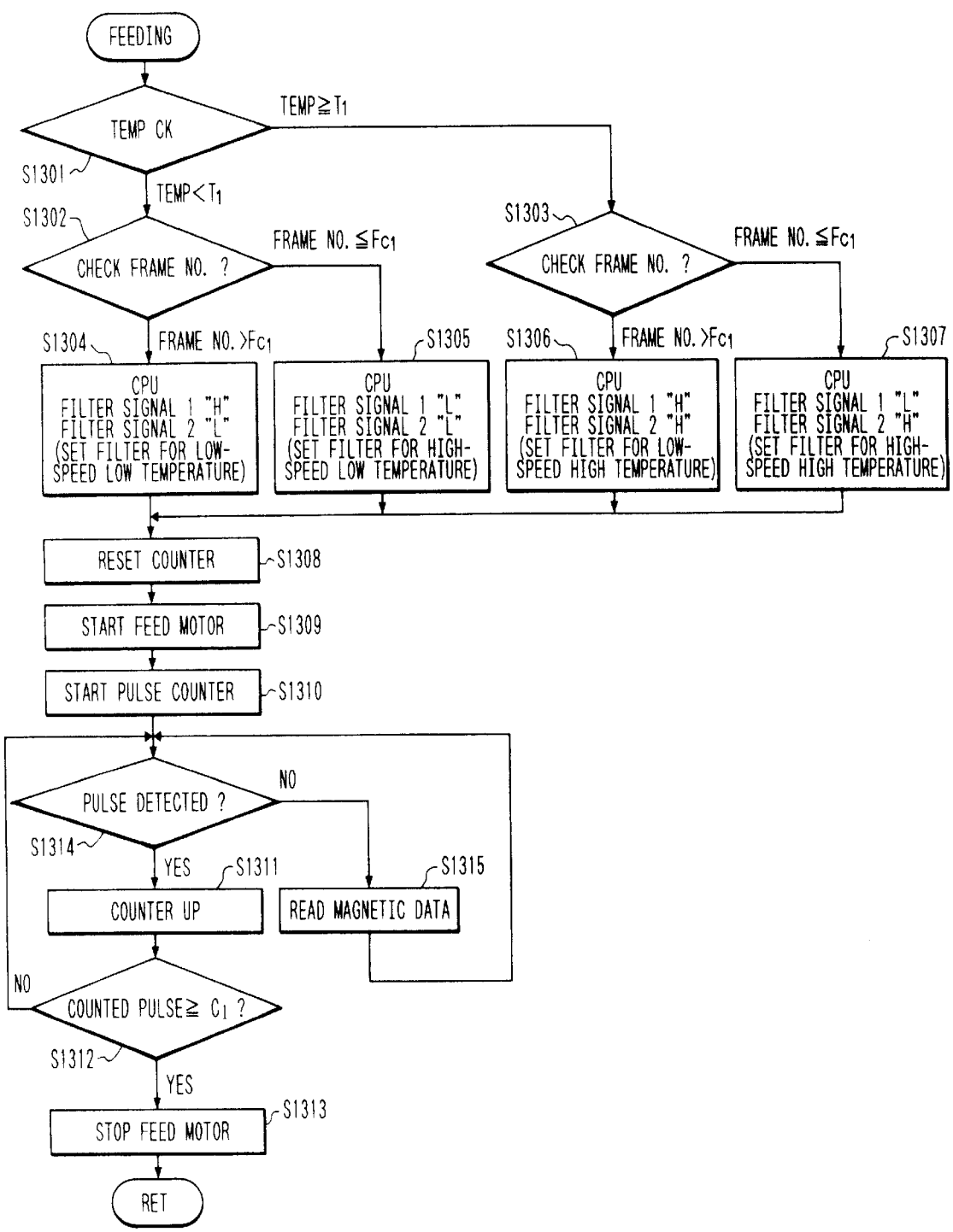
FIG. 65 is a flow chart which illustrates the process of the film feeding operation in the operation shown in FIG. 63.

FIG. 65 is a flow chart which illustrates the detailed process in step 1207 (the film feeding operation).

After the photography operation (S1206) has been completed, temperature data Temp (the result of the process in S1205) and film time constant switch point data T1, which has been previously set, are subjected to a comparison (S1301). Furthermore, film counter data (the result of the process in S1201) and film time constant switch point data FC1, which has been previously set, are subjected to a comparison (S1302 and 1303). If (temperature data Temp<T1) and as well as (film counter data>FC1), the level of the filter signal 1 is set to "H" level and as well as the level of the filter signal 2 is set to "L" level. Furthermore, the low temperature low speed filter is set (S1304). If (temperature data Temp<T1) and as well as (film counter data≦FC1), the level of the filter signal 1 is set to "L" level and as well as the level of the filter signal 2 is set to "L" level. Furthermore, the low temperature high speed filter is set (S1305). If (temperature data Temp≧T1) and as well as (film counter data>FC1), the levels of the filter signal 1 and the filter signal 2 are set to "H" level. Furthermore, the high temperature low speed filter is set (S1306). If (temperature data Temp≧T1) and as well as (film counter data≦FC1), the level of the filter signal 1 is set to "L" level and as well as the level of the filter signal 2 is set to "H" level. Furthermore, the high temperature high speed filter is set (S1307). After the filter has been set in any of steps 1304 to 1307, the counter in the CPU1 for counting the pulses generated in the photocoupler 10 is reset (S1308) to commence the feeding circuit 9 (S1309). As a result, counting of pulses generated from the photocoupler 10 by the pulse plate which is rotated when the feeding motor is rotated is started (S1310). A fact whether or not the pulse has been supplied from the photocoupler 10 to the CPU1 is discriminated (S1314). If the pulse has been supplied, the pulse count is increased (S1311). If no pulse has been supplied, the magnetically recorded data of the film is detected/amplified by the reproducing head 6 and the reproducing circuit 19 then it is converted into a digital signal by the comparator 8 so as to be received by the CPU1 (S1315). Then, the flow returns to the pulse detection process (S1314). After the pulse counting process (S1311) has been completed, a fact whether or not the pulse count is larger than a predetermined feeding stop count C1 is discriminated (S1312). If the pulse count is smaller than C1, the flow again returns to the pulse counting process (S1314). If the pulse count is larger than C1, the feeding circuit 9 is stopped (S1313). Thus, the sequential feeding operation is completed.

As described above, the filter time constant switching is performed in accordance with the feeding speed which is changed due to the number of the frames of the film and the ambient temperature. Therefore, the performance of reproducing the magnetically recorded data can be improved.

According to the above-described embodiment, the filter time constant switching of the reproducing circuit is performed by the analog switch. However, if the reproducing performance is further improved by precisely performing the filter time constant switching points, the number of the analog switches and the control signals must be increased, causing the overall cost to be enlarged.

Accordingly, an example in which the control signals are not increased and the filter time constant switching points are not increased will now be described.

Figure 66:
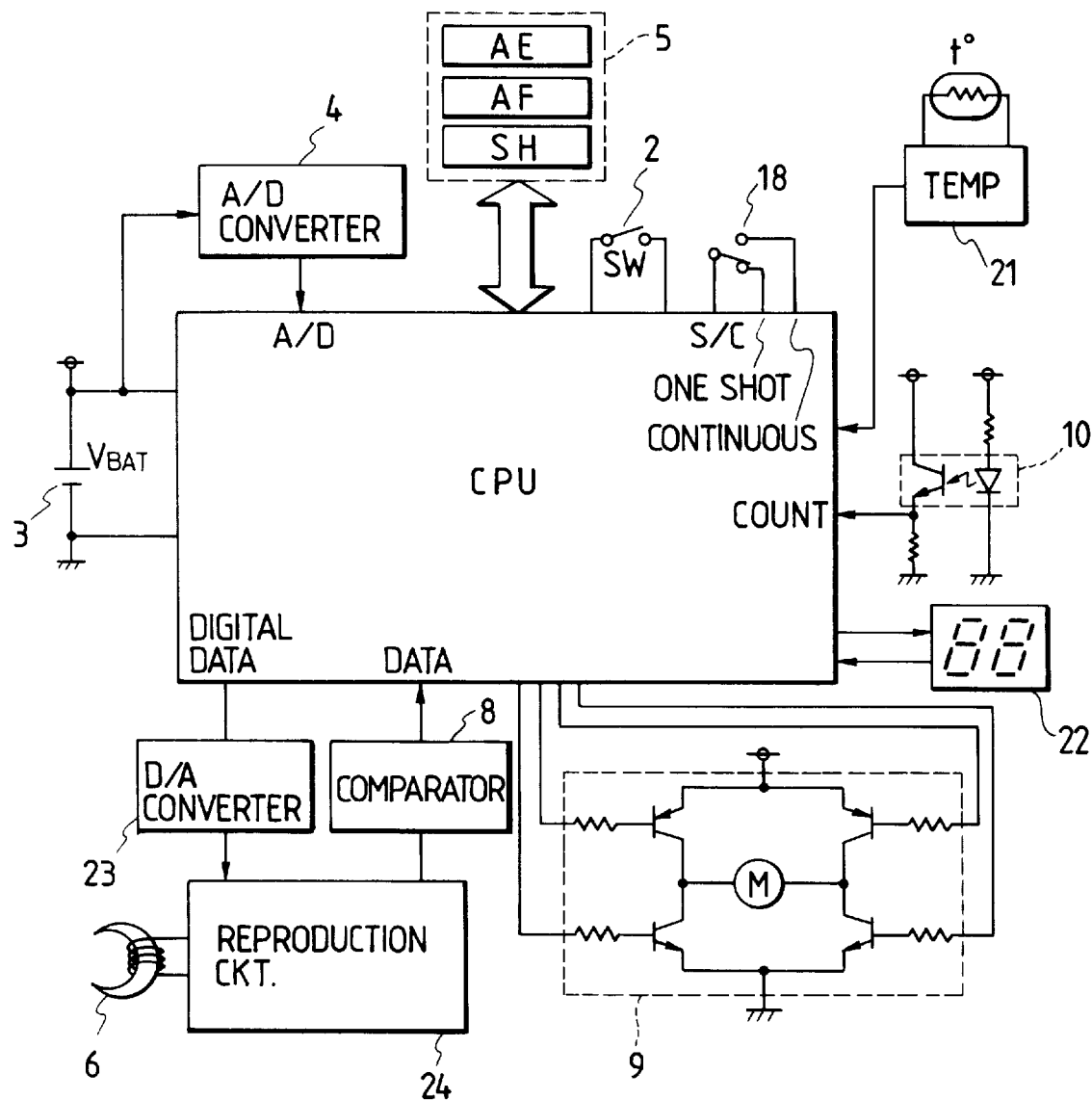
FIG. 66 is a block diagram which illustrates the schematic structure of the magnetically recorded data reproducing apparatus according to another embodiment of the present invention.

FIG. 66 is a block diagram which illustrates another embodiment of the magnetically recorded data reproducing apparatus according to the present invention.

Also according to this embodiment, the same reference numerals as those according to the embodiments shown in FIGS. 53, 57 and 63 are given the same reference numerals and their descriptions are omitted here. Then, the description will be made about only the changed or added elements. The basic structure of this embodiment is the same as that according to the embodiment shown in FIGS. 57 and 63. However, a digital data table is included in the CPU1, the digital data table acting to select and transmit digital data in accordance with data about the residual voltage in the battery 3, data about the one-shot/continuous mode switch 18, output data from the temperature detection circuit 21 and data about the film counter 22 which are the factors for changing the feeding speed. Furthermore, a D/A converter 23 for converting digital data transmitted from the digital data table into an analog signal to transmit it to the reproducing circuit 24 is provided.

Figure 67:
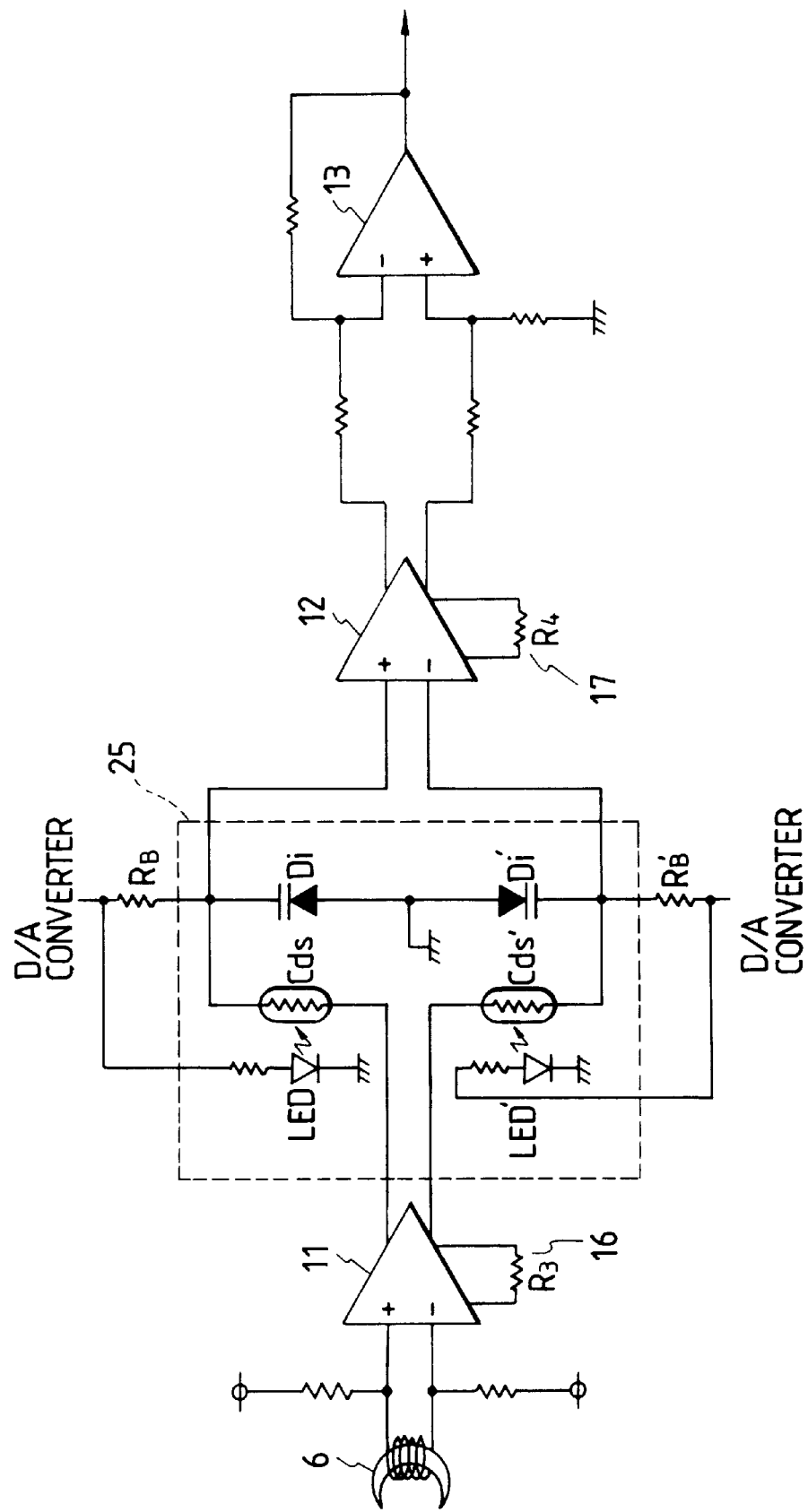
FIG. 67 is a circuit diagram which illustrates the detailed structure of the reproducing circuit shown in FIG. 66.

FIG. 67 is a circuit diagram which illustrates the reproducing circuit 24 shown in FIG. 66.

The structure is basically arranged to be the same as that shown in FIG. 54 but the structure of the filter is structured as follows: the filter circuit 25 comprises light emitting diodes LED and LED' serving as light emitting elements to be connected to the D/A converter 23 and cadmium sulfide cells Cds and Cds' inserted into output lines of the amplification degree adjusting resistance 16 and serving light receiving elements which correspond to the light emitting diodes LED and LED' and variable capacity diodes Di and Di'. Referring to the drawings symbols RB and RB' represent bias resistors which are respectively inserted into portions between the variable capacity diodes Di and Di' and the D/A converter 23.

In the above-described structure, the brightness of each of the LEDs is changed in accordance with the supplied voltage from the D/A converter 23 and the resistance value of the cadmium sulfide cells Cds and Cds' and the static capacity of the variable capacity diodes Di and Di' are determined. Therefore, the time constant can be continuously changed by a simple structure. Although the time constant can be switched over between the two stages, that is, the low speed and the high speed according to the above-described embodiments, the structure according to this embodiment is able to be adapted to a wide film speed range.

Figure 68:
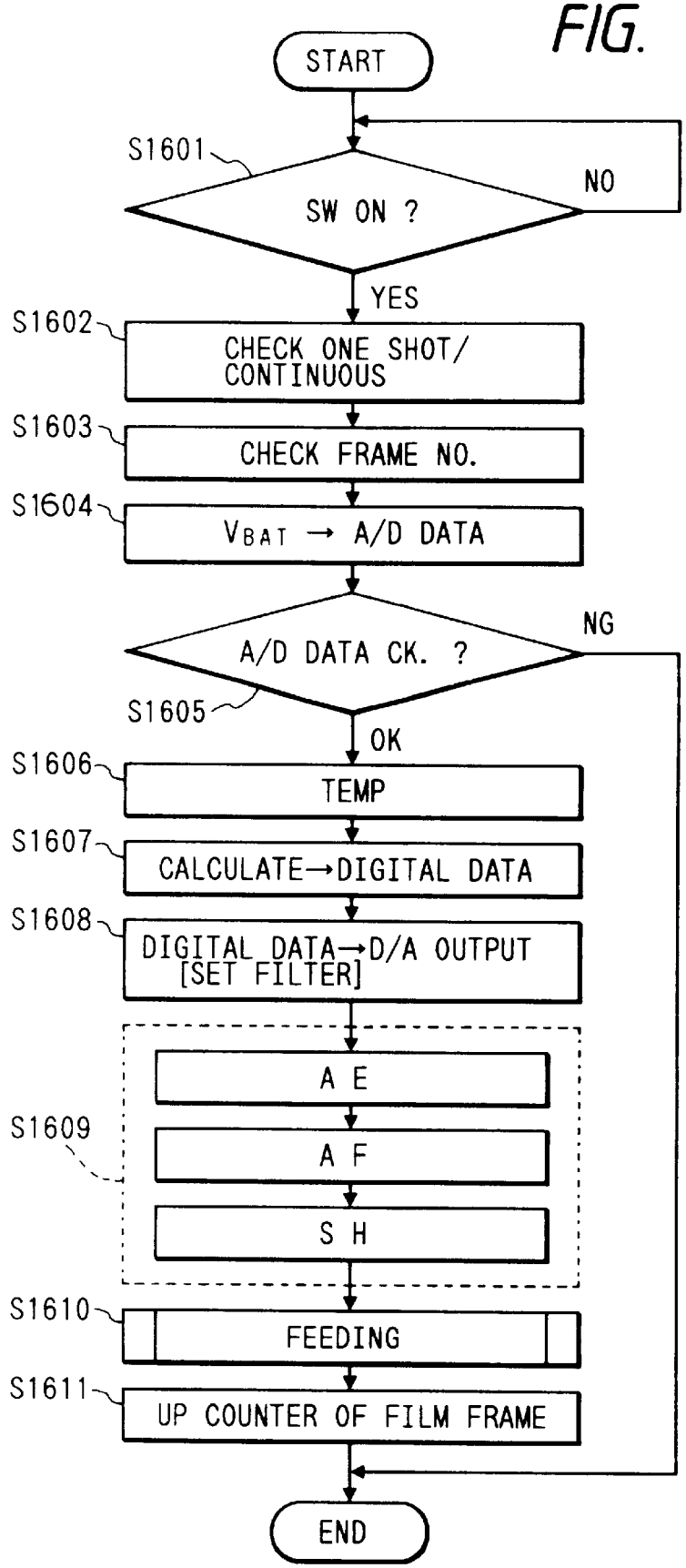
FIG. 68 is a flow chart which illustrates the operation of the circuit shown in FIGS. 66 and 67.

FIG. 68 is a flow chart which illustrates the operation of the circuit shown in FIGS. 66 and 67.

After the switch 2 has been switched on (S1601), the state of the one-shot/continuous mode switch 18 is checked to store the result as data for the CPU1 (S1602). Then, the state of the film counter 22 is checked to store the checked result as data for the CPU1 (S1603). Consequently, the residual voltage of the battery 3 is converted into digital data by the A/D converter 4 to store it as data for CPU1 (S1604) so as to be subjected to a comparison with the minimum voltage Vmin required to operate the camera and previously set (S1605). If the residual voltage of the battery 3 (the result of the process in S1604) is smaller than Vmin, the operation is completed. If it is larger than Vmin, temperature data supplied from the temperature detection circuit 21 is stored in the CPU1 (S1606). Then, calculations are performed on the basis of one-shot/continuous mode data (result of the process in S1602), film counter data (result of the process in step 1603), data about the battery 3 (result of the process in step 1604) and temperature data (result of the process in step 1606) to select/transmit data from the digital data table in the CPU1 (S1607). It is then converted into voltage by the D/A converter 23 before it is transmitted (S1608) to the filter circuit 25 of the reproducing circuit 24. For example, if the film feeding speed is raised under conditions of the continuous mode, the new battery and the room temperature, data with which the output voltage from the D/A converter 23 is raised is selected/transmitted from the CPU1. Thus, the brightness of each of the light emitting diodes LED and LED' is raised and the resistance value of each of the cadmium sulfide cells Cds and Cds' is thereby reduced. Also the capacity of each of the variable capacity diodes Di and Di' is reduced. As a result, the time constant of the filter circuit 25 is reduced and thereby the high frequency range can be reproduced. Similarly, under the condition in which the film feeding speed is low, data with which the output voltage from the D/A converter 23 is lowered is selected/transmitted from the CPU1. Thus, the resistance value of each of the cadmium sulfide cells Cds and Cds' is enlarged and the capacity of each of the variable capacity diodes Di and Di' is enlarged. Therefore, the time constant of the filter circuit 25 can be enlarged and thereby only a low frequency range can be reproduced. Therefore, the influence of the high frequency noise or the like can be reduced. That is, the voltage to be applied to the filter 25 is changed in accordance with data which is the factor for changing the feeding speed. Furthermore, the resistance value of each of the cadmium sulfide cells Cds and Cds' and the capacity of each of the variable capacity diodes Di and Di' are changed, causing the filter time constant to be changed. Then, the photographing operation (S1609) is performed and the film is fed (S1610) before the count of the film counter 22 is increased (S1611). Thus, the sequential operation is completed.

Figure 69:
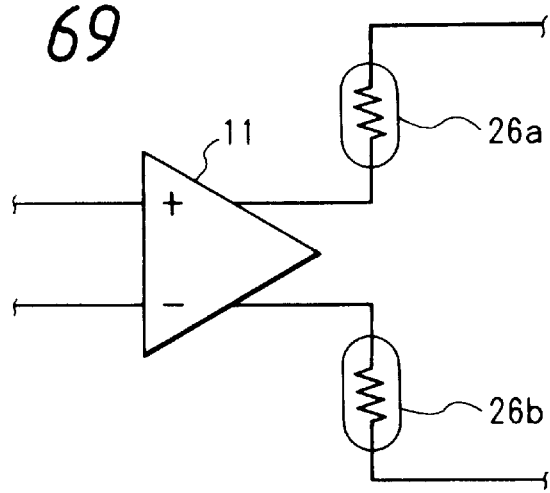
FIG. 69 is a circuit diagram which illustrates an essential portion of the modification shown in FIG. 67.

FIG. 69 is a circuit diagram which illustrates an essential portion of a modification to FIG. 67.

According to this embodiment, thermistors 26a and 26b having temperature coefficients are used in place of the filter circuit 25 shown in FIG. 67. The resistance value of each of the thermistors 26a and 26b is changed on the basis of the ambient temperature. As a result, the same operation can be performed as that according to the embodiment shown in FIG. 67.

As described above, a device with which the resistance value and the capacity can be changed in accordance with data transmitted from the CPU1 is used. Therefore, the filter time constant switching points can be increased while eliminating the necessity of increasing the number of the control signals.

Figure 72:
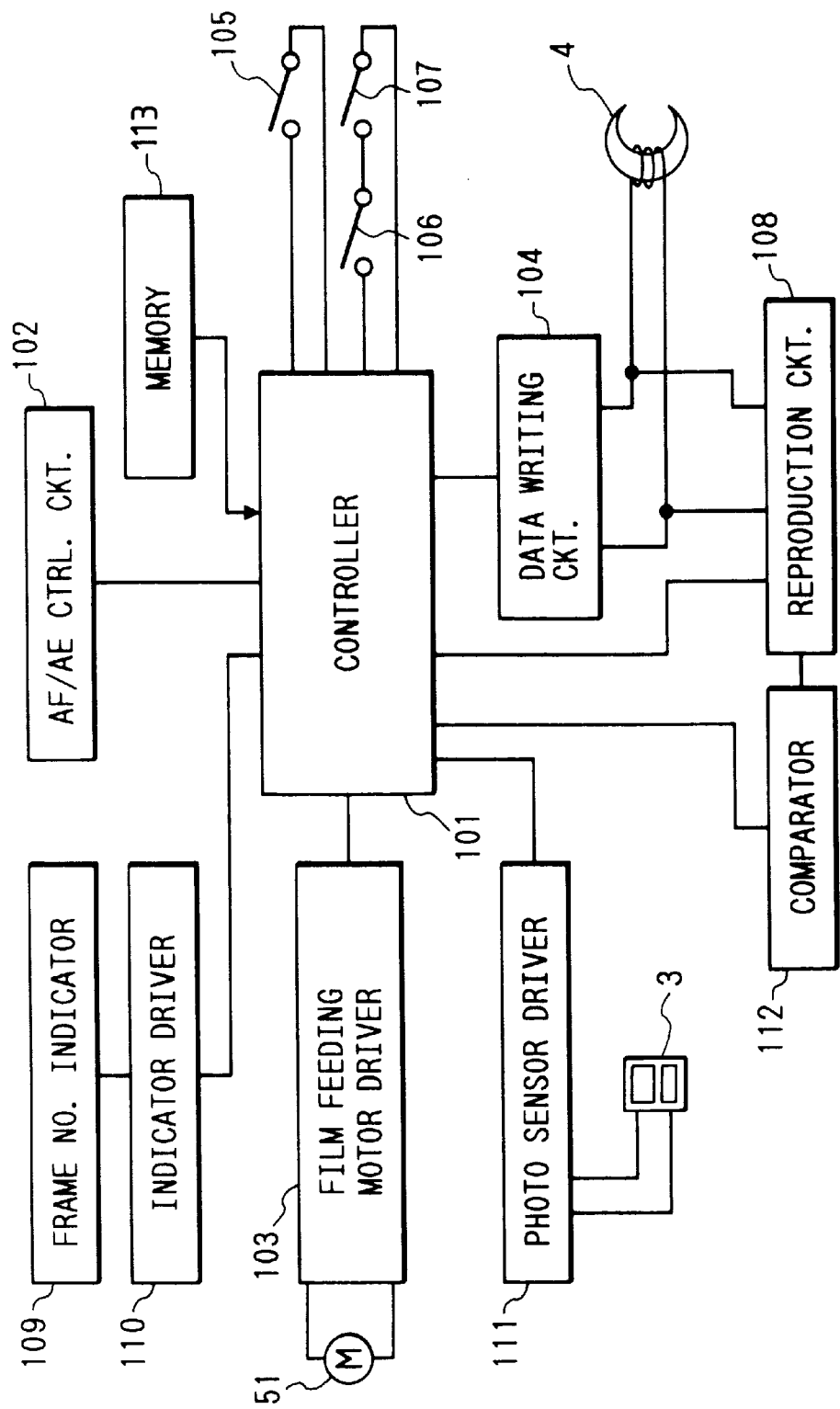
FIG. 72 is block diagram which illustrates the circuit for the camera according to another embodiment of the present invention.

FIG. 72 is a block diagram which illustrates a circuit for use in the camera according to another embodiment of the present invention. The mechanical structure of this embodiment is the same as that according to the embodiments shown in FIGS. 1 to 4.

Referring to FIG. 72, reference numeral 101 represents a control circuit comprising a microcomputer and the like and acting to control the operations of the camera. Reference numeral 102 represents an AF.AE control circuit for controlling the focusing of the photographing lens and the operation of the exposure control shutter. Reference numeral 103 represents a film feeding motor drive circuit for rotating the film feeding motor 51. Reference numeral 104 represents a data writing circuit for writing information by operating the magnetic head 4. Reference numeral 105 represents a release switch for releasing the shutter of the camera when the release switch is switched on. Reference numeral 106 represents a cartridge loading switch which is switched on when the film cartridge 1 is loaded into the camera. Reference numeral 107 represents a back cover switch which is switched on when the back cover is closed. When both the above-described switches 106 and 107 are switched on, the control circuit 101 operates the film feeding motor driver circuit 103 to commence setting of the first frame of the film 2.

Reference numeral 108 represents a reproducing circuit for detecting magnetic information written to the magnetic track T of the film 2 by the magnetic head 4, removing noise component and amplifying its signal. Reference numeral 109 represents a frame number display comprising a liquid crystal display or the like and displaying the number of the photographed frames. Reference numeral 110 represents a display drive circuit for operating the frame number display 109 to increase/decrease the count. Reference numeral 111 shows a driving circuit of photosensor 3. Reference numeral 112 represents a comparison circuit for converting the magnetically recording signal amplified by the reproducing circuit 108 into a digital signal to transmit it to the control circuit 101. Reference numeral 113 represents a storage circuit for storing the film feeding speed or the like.

Figure 73:
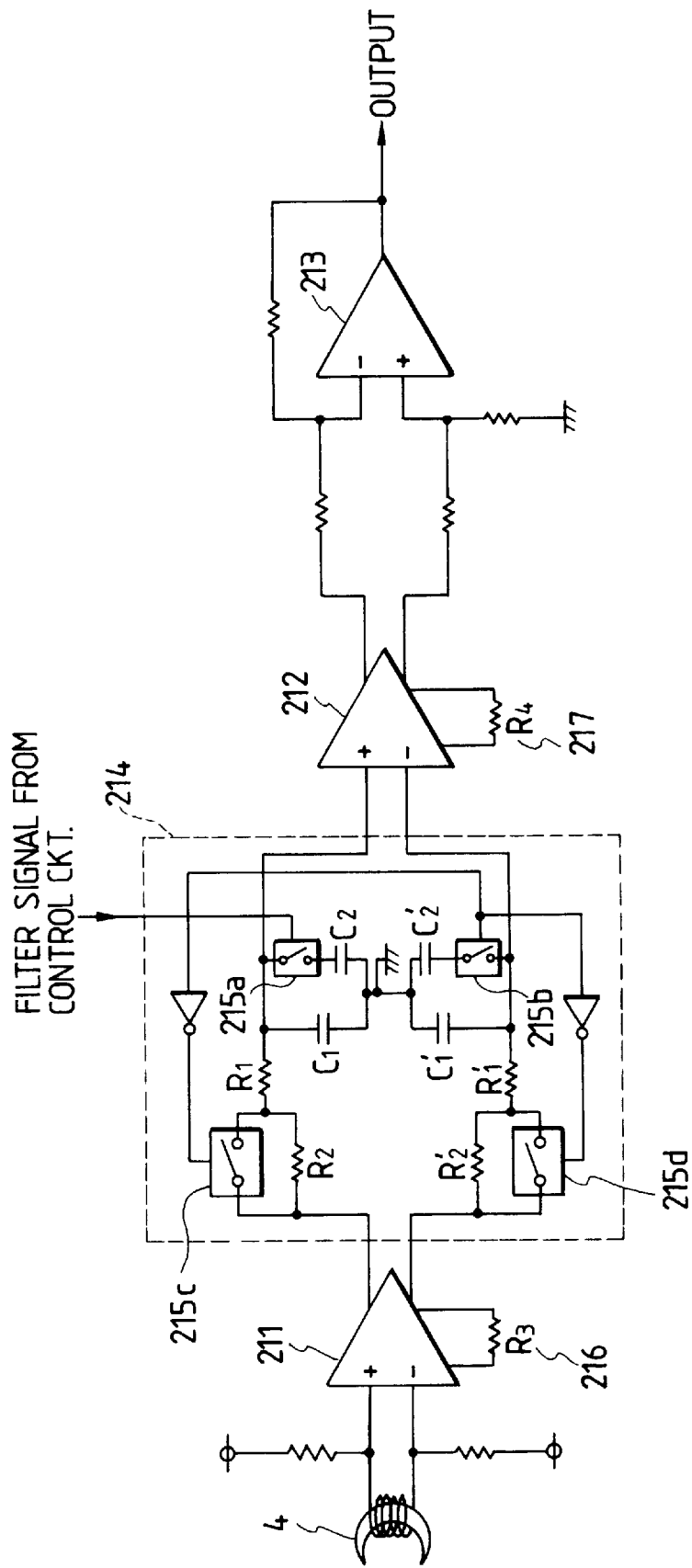
FIG. 73 is a circuit diagram which illustrates the schematic structure of the magnetic head and the reproducing circuit shown in FIG. 72.

FIG. 73 is a circuit diagram which illustrates the detailed structure of the magnetic head 4 and the reproducing circuit 108.

Referring to FIG. 73, reference numerals 211, 212 and 213 represent amplifiers for amplifying the reproduction signal of the magnetically recorded information transmitted from the magnetic head 4, the amplifiers 211, 212 and 213 being connected in series to form three stages. The amplifiers 211 and 212 may comprise, for example, TL592 manufactured by Texas Instrument and the amplifier 213 may comprise TL071. Reference numeral 214 represents a filter circuit for cutting noise or the like in the reproduction signal amplified by the amplifier 211. Reference numerals 215a, 215b, 215c and 215d represent analog switches for switching over the time constant (realized by a combination of resistors R1, R2 and capacitors C1 and C2 and a combination of resistors R1', R2' and capacitors C1' and C2') of the filter circuit 214. Reference numerals 216 and 217 represent amplification degree adjusting resistors connected between the input terminal and the output terminal of the amplifiers 211 and 212 and acting to determine the degree of the amplification. The resistors R1 and R2 are connected in series and connected to an output terminal of the amplifier 211. Similarly, the resistors R1' and R2' are connected in series and connected to another output terminal of the amplifier 211. In addition, analog switches 215c and 215d are connected in parallel to the resistors R2 and R2'. Furthermore, the capacitor C1 is connected to a portion between the output terminal of the resistor R1 and the earth.

In addition, the capacitor C1' is connected to a portion between the output terminal of the resistor R1' and the earth. Furthermore, the analog switch 215a and the capacitor C2, which are connected in series, are in parallel connected to the capacitor C1. In addition, the analog switch 215b and the capacitor C2', which are connected in series, are in parallel connected to the capacitor C1'.

In the above-described structure, by raising the level of the filter signal to be transmitted from the control circuit 101 to the reproducing circuit 108 to be raised, by switching on the analog switches 215a and 215b and by switching off the analog switches 215c and 215d, a low pass filter which allows only low frequency signals (that is, a large time constant) to pass through is set. In a case where the level of the filter signal is low, the analog switches 215a and 215b are switched off and the analog switches 215c and 215d are switched on. As a result, a high pass filter which allows high frequency to pass through (that is, a small time constant) is set.

According to this embodiment, the film feeding speed is detected in a manner to be described later and the filter is switched over for a filter for high frequency or a low frequency in accordance with the result of the detection. Thus, the unnecessary transmissible range of the filter is reduced to correspond to the reproducing frequency for reproducing the magnetically recorded information. As a result, the influence of noise can be eliminated and thereby the performance of reproducing magnetically recorded information can be improved.

The film feeding speed in the camera is proportional to the diameter of the wound film 2 if the rotational speed of the film winding spool 57 is the same. The frequency of the analog signal to be detected by the magnetic head is in proportional to the film feeding speed. Furthermore, the film feeding speed is also changed due to the thickness of the film 2, the characteristics of the film feeding motor 51, the degree of consumption of the battery which is the power source for operating the motor 51 and the ambient temperature and the like. In addition, the rate of the change in the film feeding speed is changed due to the above-described factors or the number of the photographed frames of the film 2.

Therefore, if the time constant of the filter is made to be constant for the purpose of eliminating noise, the effect will be lost because the constituted filter becomes a filter which allows unnecessary range to pass. If the transmissible frequency range is changed by changing the time constant of the filter, or if the time constant is changed in accordance with the number of the frames of the film 2 or data about the voltage of the battery or the like which is the power source, it is difficult to make the film feeding speed to correspond to the frequency of the reproduction signal due to various factors as described above.

Accordingly, this embodiment is arranged in such a manner that the film feeding speed is measured and the time constant of the filter is changed in accordance with it as described above.

Furthermore, the film feeding speed is calculated in such a manner that time t which is required for the photosensor 3 to detect the perforation P1 of the film 2 from the commencement of the film feeding operation is measured. Assuming that the pitch between the perforations P1 and P2 is L1, film feeding speed a is L1/t. According to this embodiment, the time constant of the filter is changed on the basis of the fact that the film feeding speed a is higher than predetermined value a1.

That is, if the film feeding speed a is higher than a1, frequencies larger than $f1=1/(2\pi.R1.C1)$ and $f2=1/(2\pi.R1'.C1')$ are cut. If the film feeding speed a is lower than a1, frequencies larger than $f3=1/\{2\pi(R1+R2)(C1+C2)\}$ and $f4=1/\{2\pi(R1'+R2')(C1'+C2')\}$ are cut. That is, if the speed is higher than a1, the time constant is small and the transmissible frequency is raised. If the speed is lower than a1, the time constant is larger and the transmissible frequency is lowered.

Then, the operation of the control circuit 101 will now be described with reference to a flow chart shown in FIG. 74.
(Step 99) When power is supplied to the camera, the flow proceeds to step 100.
(Step 100) When both of the film cartridge loading switch 106 and the switch 107 are switched on, a discrimination is made that the film cartridge 1 has been loaded in the camera and the flow proceeds to step 101.
(Step 101) The film feeding motor 51 is rotated by means of the film feeding motor drive circuit 103 so as to set the first frame of the film 2 to the position of the aperture and commence the so-called film idling operation.
(Step 102) During the film idle-feeding operation, the photosensor 3 is operated by means of the photosensor drive circuit 111 to detect the perforation of the film 2. Thus, the time taken from the perforation to the next perforation is measured to calculate the film feeding speed a. Assuming that the pitch of the perforations is L1 and the above-described detection time is t1, the film feeding speed a can be calculated by L1/t1. The film feeding speed a at this time is stored in the storage circuit 113 before a comparison is made between the film feeding speed a and a predetermined value a1. If it is faster than a1, the flow proceeds to step 103. If it is slower than a1, the flow proceeds to step 104.
(Step 103) The level of the filter signal to be transmitted to the filter circuit 214 is set to "L" and the limit values of the transmissible frequency are set to f1 and f2. Then, the flow proceeds to step 105.
(Step 104) The level of the filter signal to be transmitted to the filter circuit 214 is set to "H" and the limit values of the transmissible frequency are set to f3 and f4. Then, the flow proceeds to step 105.
(Step 105) The reproducing circuit 108 is operated to read out information about the film such as the film sensitivity, the number of the frames of the film and the type of the film (negative or positive) and the like which has been previously written to the magnetic storage portion T of the film 2 to be read by the magnetic head 4. Then, in accordance with the time constant of the filter set in step 103 or step 104, the noise component is removed from the detected signal before it is converted into a digital signal by a known circuit so as to store it in the storage circuit 113.
(Step 106) A discrimination is made whether or not the first frame has been set by a known means (for example, the quantity of the film fed or the time in which the motor is activated by an encoder or the detection of the number of perforations detected by the photosensor 3). If the first frame has been detected, the flow proceeds to step 107.
(Step 107) The film feeding motor 51 is stopped by means of the film feeding motor drive circuit 103 to stop the film idle-feeding operation. Furthermore, the display drive circuit 110 is operated to cause the frame number display 109 to display the first frame.
(Step 108) The state of the release switch 105 is discriminated. If it has been switched on, a discrimination is made that the releasing operation has been performed and the number of the releasing operations of the film is stored in the storage circuit 113 before the flow proceeds to step 109.
(Step 109) The AF.AE control circuit 102 is operated to perform known photographing operation such as the focusing of the photographing lens and the exposure operation by opening/closing the shutter.

(Step 110) A comparison between the number of the frames read in step 105 or the number of films which can be photographed and which has been previously set by a known means and the present number of the photographed frames is made to discriminate whether or not there are residual frames. If there are residual frames, the flow proceeds to step 111. If there is no residual frame, the flow proceeds to step 119.

(Step 111) A discrimination is made whether or not the film feeding speed a at the time of feeding the previous frame stored in the storage circuit 113 is higher than a1. If it is higher than a1, the flow proceeds to step 112. If it is lower than a1, the flow proceeds to step 113.

Assuming that the present film feeding speed a is the speed at the moment at which the first frame has been photographed, it is the film feeding speed at the time of the automatic loading operation, that is the film feeding speed calculated in step 102 and stored in the storage circuit 113. Assuming that the present feeding speed is the speed at the moment at which the frames from the second frame has been photographed, it is the film feeding speed which is stored in step 116 to be described later and at which the previous frame has been photographed.

(Step 112) The level of the filter signal to be transmitted to the filter circuit 214 is set to "L" and the limit values of the transmissible frequency are set to f1 and f2. Then, the flow proceeds to step 114.

(Step 113) The level of the filter signal to be transmitted to the filter circuit 214 is set to "H" and the limit values of the transmissible frequency are set to f3 and f4. Then, the flow proceeds to step 114.

(Step 114) The film feeding motor 51 is rotated by means of the film feeding motor drive circuit 103 to commence the operation of winding one frame and as well as start a timer.

(Step 115) At the time of winding the film 2 to the next frame, the magnetic head 4 is operated via the data writing circuit 104 so as to write photography information such as the shutter speed, the diaphragm value, the date of the photography and the like to the magnetic storage portion T of the film 2. Furthermore, information written to the film is read by the magnetic head 4 by operating the reproducing circuit 108 if necessary.

(Step 116) When a fact that the photosensor 3 has detected the perforation of the next frame via the photosensor drive circuit 111, a discrimination is made that winding of the film 2 to the next frame has been completed and the flow proceeds to step 116. At this time, the timer, which has been started in step 114, is stopped to obtain the time taken from the commencement of the winding operation to the detection of the perforation of the next frame. Thus, the film feeding speed a is calculated by the above-described method to store it in the storage circuit 113.

(Step 117) The operation of the film feeding motor 51 is stopped by means of the film feeding motor drive circuit 103 so as to stop feeding of the film.

(Step 118) The count displayed by the frame number display 109 is increased by one frame by operating the display drive circuit 110 before the flow returns to step 108.

In a case where a discrimination is made that there is no residual frame in step 110, the flow proceeds to step 119 as described above.

(Step 119) The film feeding motor 51 is rotated in the reverse direction by means of the film feeding motor drive circuit 103 so as to commence the film rewinding operation into the film cartridge 1.

(Step 120) A discrimination is made whether or not the rewinding of the film 2 into the film cartridge 1 has been completed by a known means. If it has been completed, the flow proceeds to step 121.

(Step 121) The operation of the film feeding motor 51 is stopped by means of the film feeding motor drive circuit 103 to stop the operation of rewinding the film.

(Step 122) The sequential operation of the camera is completed.

The above-described embodiment is arranged in such a manner that one filter switching point is provided, a plurality of the switching points may be provided, resulting a further improved performance of reproducing the magnetically recorded information to be realized.

Figure 74A:
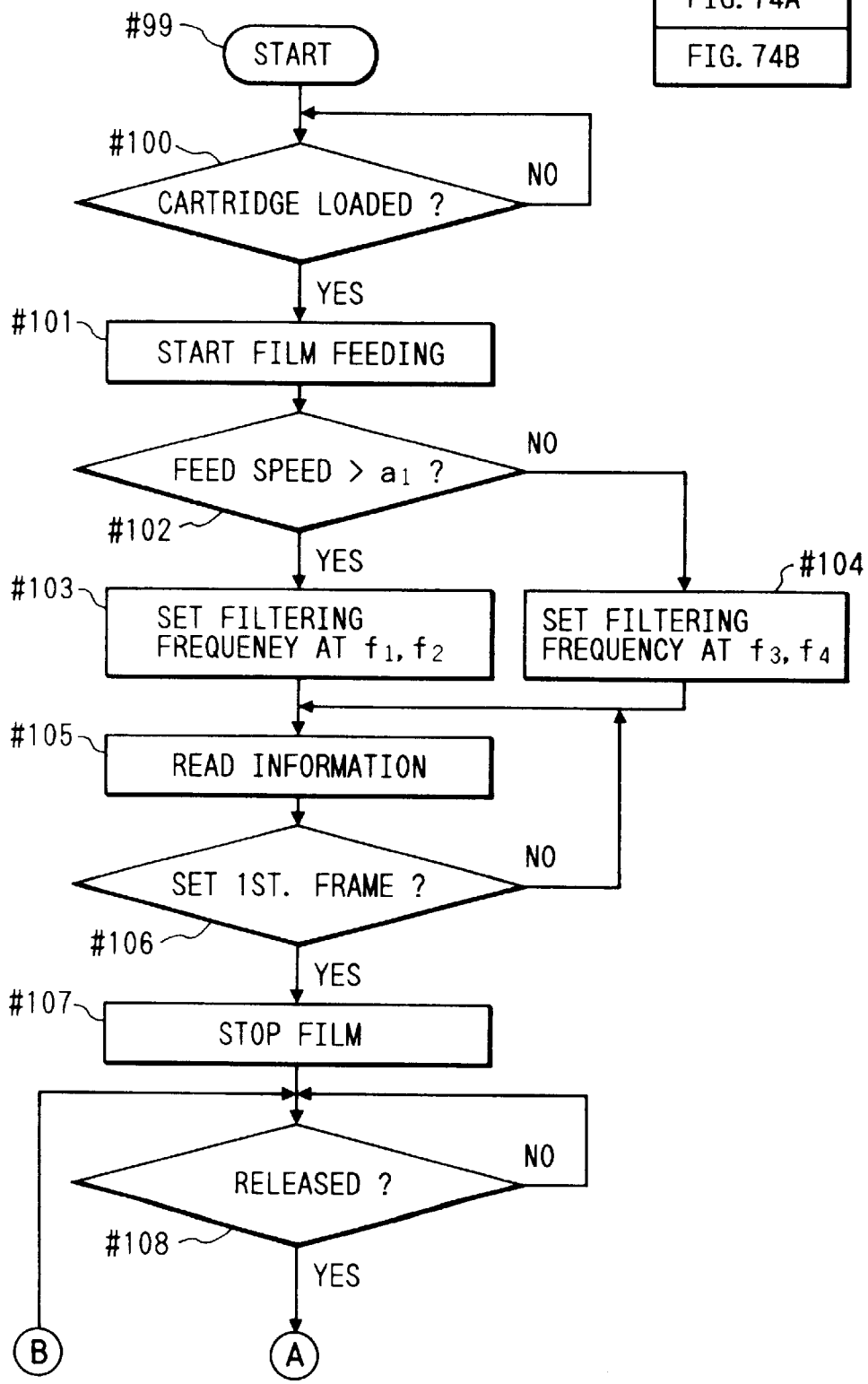
FIGS. 74, 74A, and 74B is a flow chart which illustrates the operation of the control circuit shown in FIG. 72.
Figure 74:
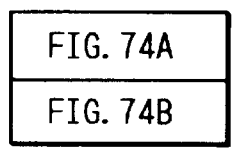
Figure 74B:
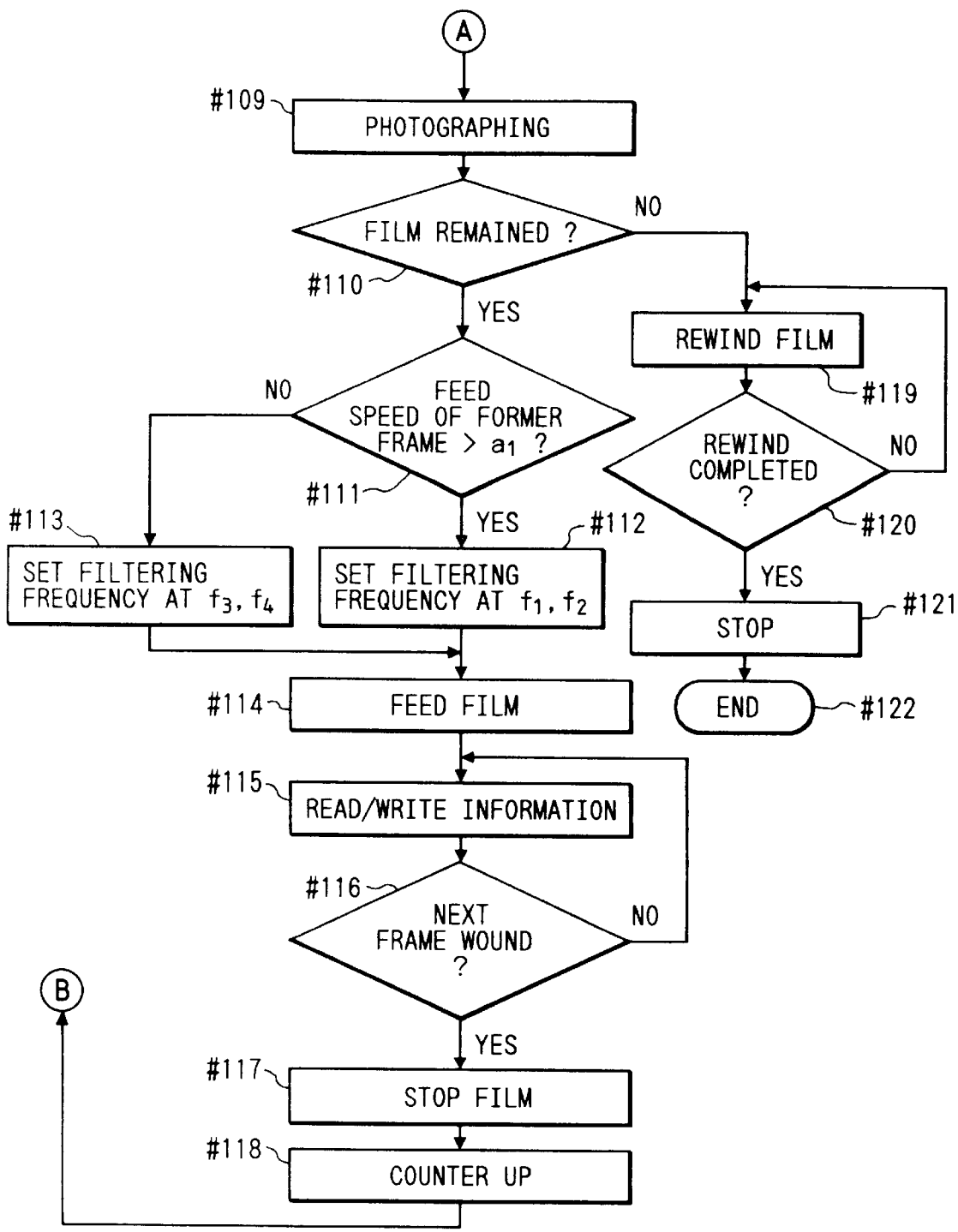
Figure 75B:
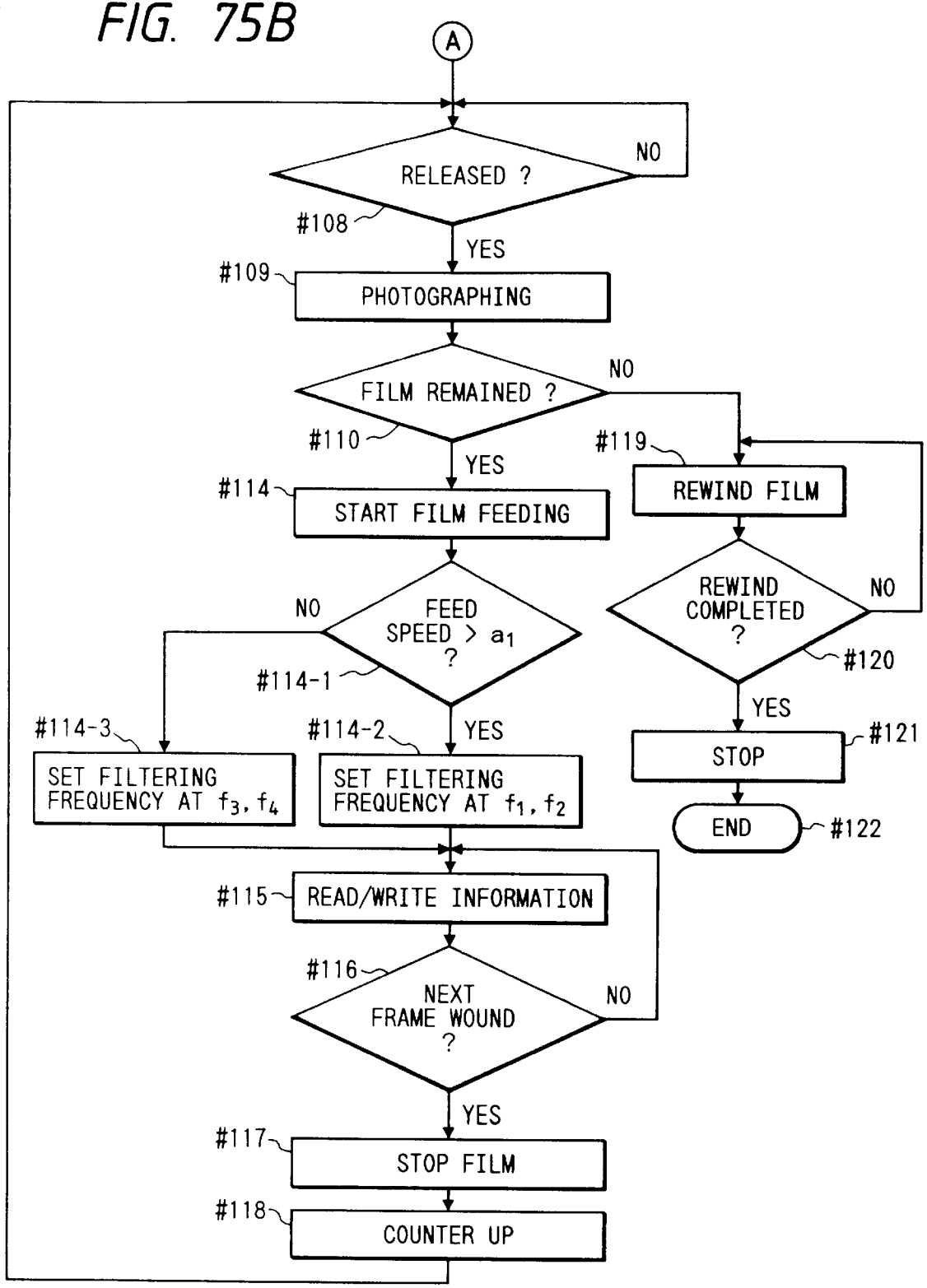

FIG. 75 is a flow chart which illustrates the operation of another embodiment. Then, the description will be made about the different elements from those according to the embodiment shown in FIG. 74. The mechanical structure of the camera according to this embodiment are arranged similarly to that according to the embodiment shown in FIGS. 17 and 18.

(Step 110) A discrimination is made whether or not there are residual frames of the film. If there are residual frames, the flow proceeds to step 114. If there is not a residual frame, the flow proceeds to step 119.

(Step 114) The film feeding motor 51 is rotated by means of the film feeding motor drive circuit 103 so as to commence the operation of winding the film 2 by one frame.

(Step 114-1) When the film is fed as described above, the roller 6 (see FIG. 17) is rotated and the pulse is generated by means of the pulse plate 8 and the sections 9 and 10. First, time t2 required to generate n2 pulses is detected. Then, the film feeding speed a is calculated by $a=(D\pi/t2)\times(n2/n1)$. If it is higher than a1, the flow proceeds to step 114-2. If it is lower than a1, the flow proceeds to step 114-3.

(Step 114-2) The level of the filter signal to be transmitted to the filter circuit 214 is set to "L" and the limit values of the transmissible frequency are set to f1 and f2.

(Step 114-3) The level of the filter signal to be transmitted to the filter circuit 214 is set to "H" and the limit values of the transmissible frequency are set to f3 and f4.

(Step 115) While removing the noise component at the time constant of the filter set in step 114-2 or step 114-3, information written to the magnetic storage portion T of the film 2 is read out by the magnetic head 4 so as to supply it to the control circuit 101. As an alternative to this, photography information is, if necessary, written by means of the data writing circuit 104.

The other operations are the same as those according to the embodiment shown in FIG. 74.

In a case where the film feeding speed is not directly detected from the film, but the same is calculated on the basis of the detected number of revolutions of the film feeding motor 51 in this embodiment shown in FIG. 75, the structure shown in FIG. 20 may be employed.

According to the above-described embodiments shown in FIGS. 72 to 75, the film feeding speed is detected and the time constant of the filter is changed in accordance with the result of the detection to change the transmissible range. Therefore, unnecessary transmissible range can be decreased and the influence of the noise can be eliminated. That is, the performance of reproducing magnetically recorded information can be improved.

Figure 76:
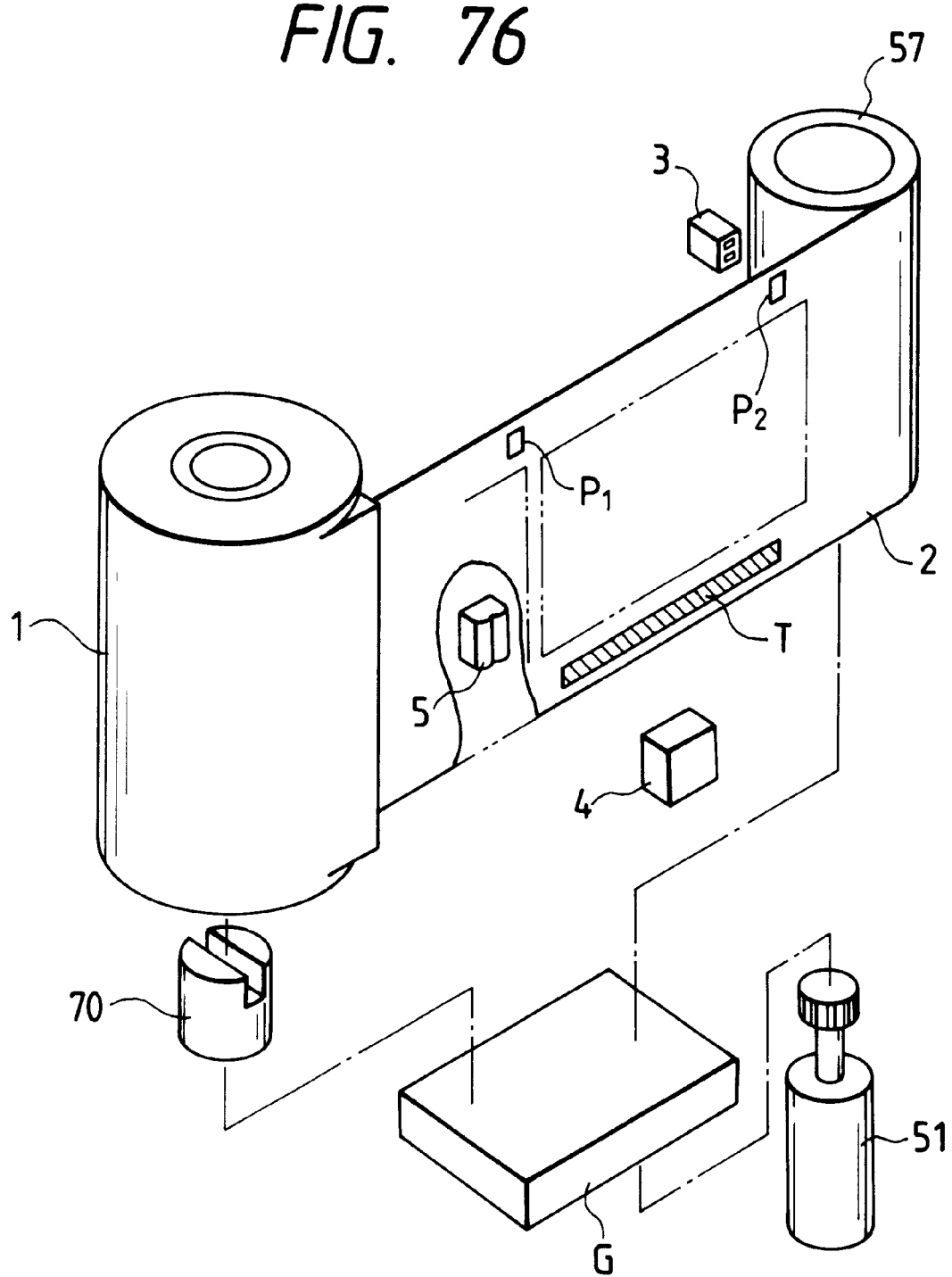
FIG. 76 is a perspective view which illustrates the essential structure of the camera according to another embodiment of the present invention.

FIGS. 76 to 85 illustrate the mechanical structure of another embodiment. FIG. 76 is a perspective view which illustrates an essential portion of the camera. The same elements as those according to the embodiment shown in FIG. 1 are given the same reference numerals.

Figure 77:
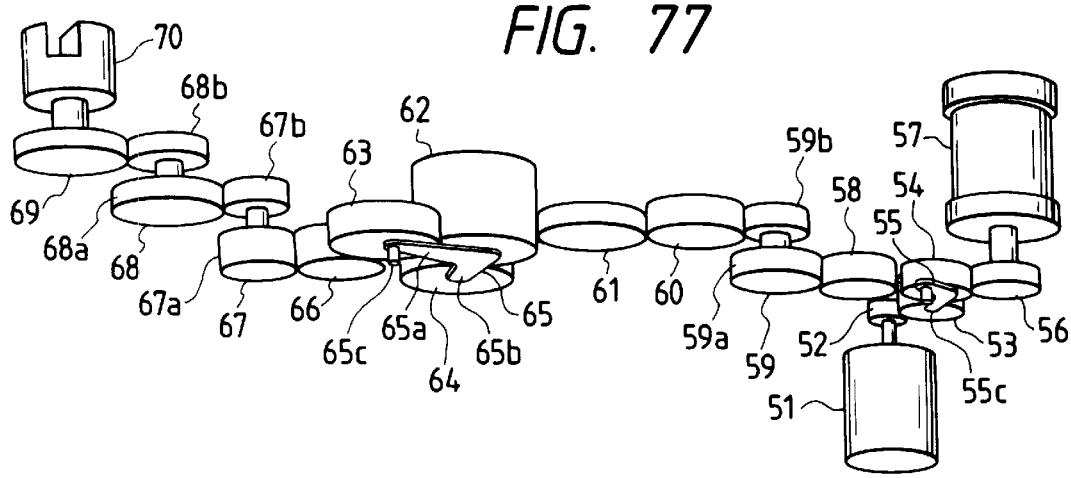
FIG. 77 is a perspective view which illustrates the gear configuration of the film feeding mechanism shown in FIG. 76.
Figure 78:
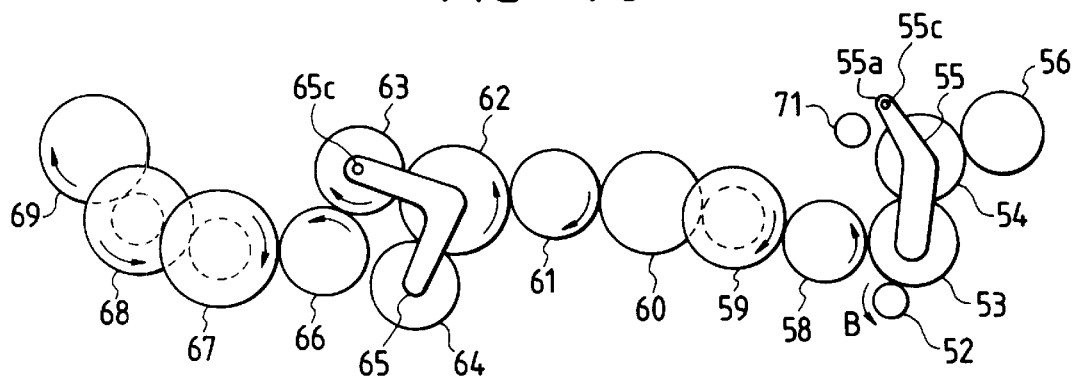
FIG. 78 is a plan view which illustrates the gear configuration at the time of winding the film in the film feeding mechanism shown in FIG. 77.
Figure 79:
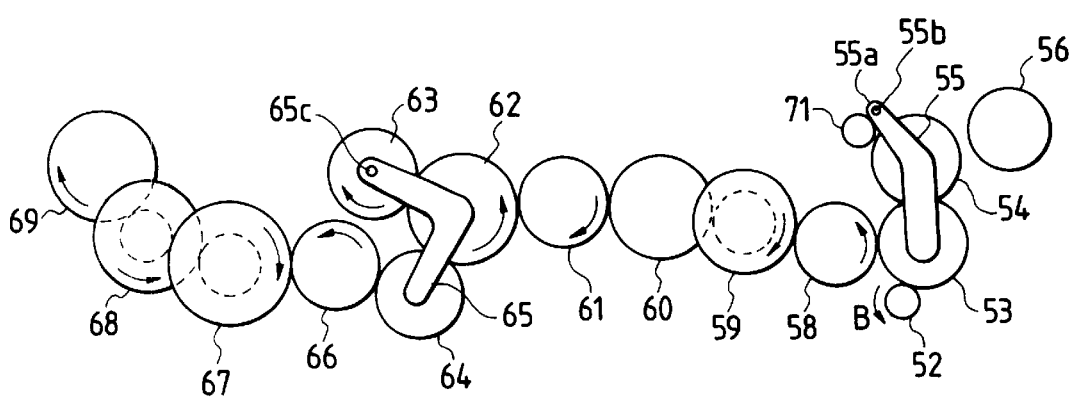
FIG. 79 is a plan view which illustrates the gear configuration at the time of rewinding the film in the film feeding mechanism shown in FIG. 77.

FIGS. 77 to 79 illustrate the schematic structure of the film feeding mechanism G which is structured similarly to that shown in FIGS. 2 to 4.

Figure 80:
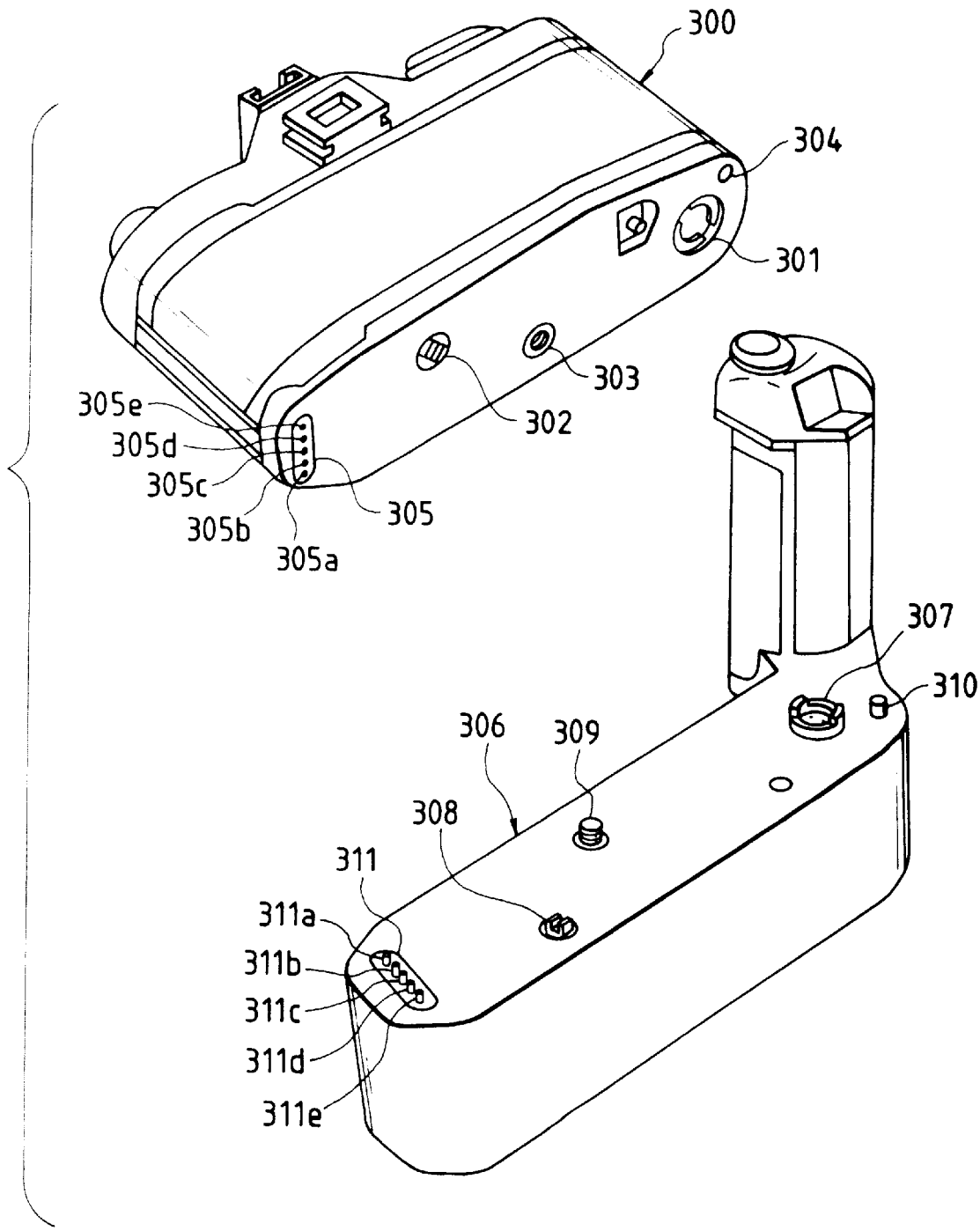
FIG. 80 is a perspective view which illustrates the camera and a motor drive device to be fastened to the camera according to the embodiment of the present invention shown in FIG. 76.

FIG. 80 is a perspective view which illustrates the motor drive device and the camera arranged in such a manner that the film is fed by the mounted motor drive device and the film feeding speed is switched to a higher speed.

Referring to FIG. 80, reference numeral 300 represents a camera body and 301 represents a coupling disc to be directly coupled to the film winding spool 57. Reference numeral 302 represents a coupling disc to be directly coupled to a fork 70. Reference numeral 303 represents a screw hole for fastening the motor drive device, 304 represents a detection pin hole and 305 represents a signal connecting portion with which the motor drive device and the camera are electrically connected.

Reference numeral 306 represents the motor drive device which includes the battery, the electric circuit motor and gear train and the like.

Reference numeral 307 represents a first motor drive fork connected to the coupling disc 1 and operating the film winding spool 57 of the camera. Reference numeral 308 represents a second motor drive fork connected to the coupling disc 2 and operating the fork 70 of the camera. Reference numeral 309 represents a fastening screw to be received by the screw hole 303 for fastening the motor drive device to connect the camera body 300 and the motor drive device 306. Reference numeral 310 represents a detection pin erected on the motor drive device 306 and inserted into the detection pin hole 304 when the device is fastened to the camera body. The detection pin 30 switches on a switch 316 to be described later when it is inserted into the detection pin hole 304 and as well as switches over the gear train in the camera to cause the film winding spool 57 and the fork 70 to be freed from the gear train in the camera.

Reference numeral 311 represents a signal connecting pin portion connected to the signal connecting portion 305 of the camera body 300 to electrically connect the motor drive device 306 and the camera body 300.

Figure 81:
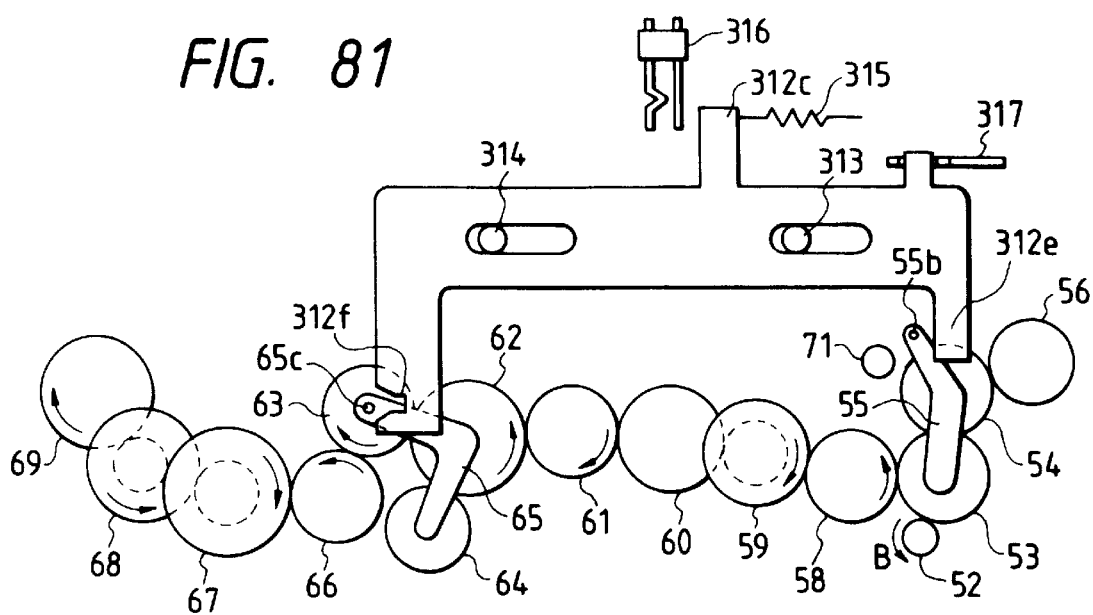
FIG. 81 is a plan view which illustrates the relationship between the film feeding gear train and the switch lever.

FIG. 81 is a plan view which illustrates the internal structure of the essential portion of the camera.

Referring to FIG. 81, reference numeral 312 represents a switch lever for selecting whether or not the film winding spool 57 and the fork 70 are freed from the gear train in the camera, the switch lever 312 being movably fastened at its projections 313 and 314 and elongated holes 312a and 312b. Reference numeral 315 represents a spring having an end portion fastened to the switch lever 312 and another end portion fastened to the body (omitted from illustration), the spring 315 giving urging force to the switch lever in a direction opposing the arrow E.

Reference numeral 316 represents a switch having a section 316a which is deformed by an arm portion 312c when the switch lever 312 is moved in the direction designated by an arrow E. As a result, the section 316a and a section 316b are brought to a conductive state. Referring to FIG. 81, they are in the non-conductive state. Reference numeral 317 represents a connection lever (to be described later).

Figure 82:
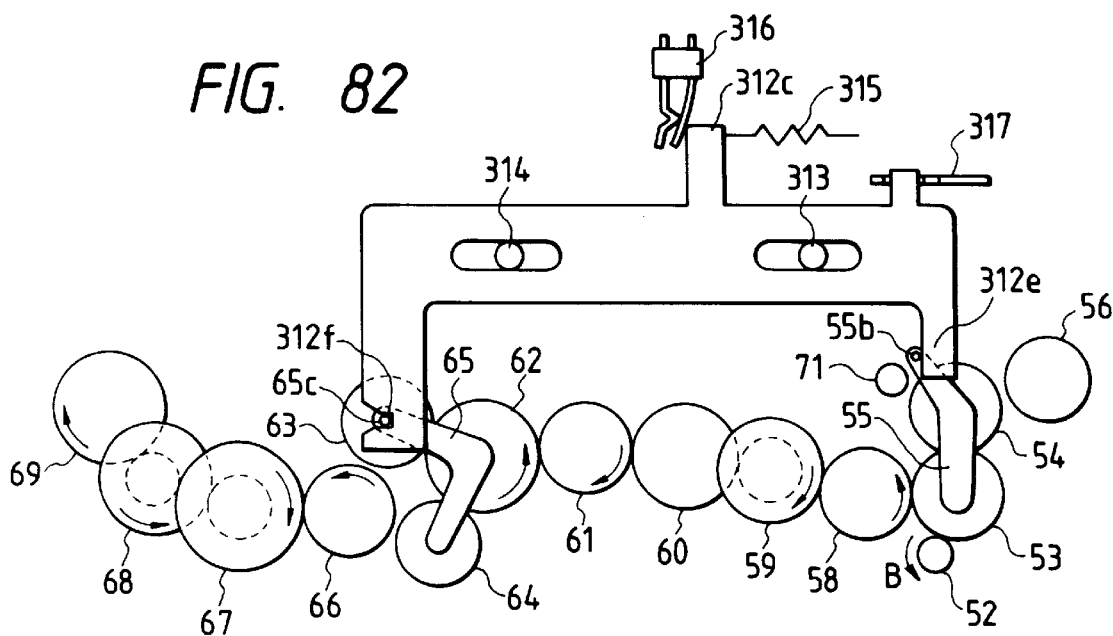
FIG. 82 is a plan view which illustrates the relationship between the film feeding gear train and the switch level which has been shifted.

An arm portion 312e of the switch lever 312 is able to be engaged to a pin 55b of the first connection lever 55. A groove 312f is able to be engaged to a pin 65c of the second connection lever 65. Referring to FIG. 81, the pins 55b and 65c are not engaged. However, when the switch lever 312 is moved in the direction designated by an arrow E, the arm portion 312e is, as shown in FIG. 82, engaged to the pin 55b to rotate the first connection lever 55 in the left direction.

Furthermore, the engagement between the first planetary gear 54 and the spool gear 56 is released and position them at which they are not engaged to each other. In addition, the groove 312f is engaged to the pin 65c to hold the second connection lever 65 at a position at which the second and the third planetary gears 63 and 64 are not engaged to the second sun gear 62.

As a result, the film winding spool 57 and the fork 70 are freed from the gear train in the camera and they can be driven by a gear train (omitted from illustration) in the motor drive device 306.

Figure 83:
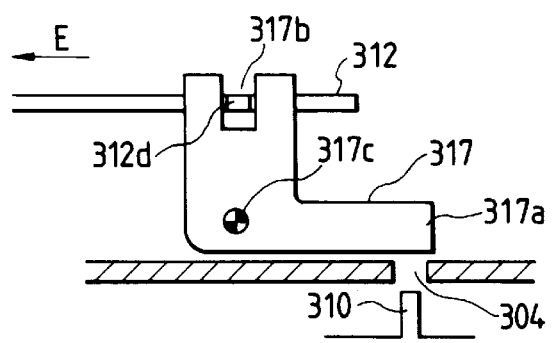
FIG. 83 is a side elevational view which illustrates a member which is changed when the motor drive device is fastened to the camera body.

FIG. 83 is a plan cross sectional view which illustrates the mechanism for moving the switching lever 312 in the direction designated by an arrow E.

Referring to FIG. 83, reference numeral 317 represents a connection lever rotatably fastened to the camera body at its shaft portion 317c. A groove 317b is fastened to an arm portion 312d of the switch lever 312 so as to be integrally moved.

When the motor drive device is mounted on the camera, the arm portion 317a is pushed by the detection pin 310 to be rotated in the left direction. As a result, the switch lever 312 is moved from the position shown in FIG. 81 in a direction designated by an arrow E so that a state shown in FIG. 82 is realized.

FIG. 84 is block diagram which illustrates an electric circuit structured as described above.

Referring to FIG. 84, reference numeral 101 represents a control circuit having a timer circuit, comprising a microcomputer and the like and acting to control the operations of the camera. Reference numeral 102 represents an AF.AE control circuit for controlling the focusing of the photographing lens and the operation of the exposure control shutter. Reference numeral 103 represents a film feeding motor drive circuit for rotating the film feeding motor 51. Reference numeral 104 represents a magnetic head drive circuit for driving the magnetic head 4 to write information. Reference numeral 105 represents a release switch for releasing the shutter of the camera when the release switch is switched on. Reference numeral 106 represents a switch which is switched on when a film cartridge (omitted from illustration) is loaded into the camera. Reference numeral 107 represents a switch which is switched on when the back cover is closed. When both the above-described switches 106 and 107 are switched on, the control circuit 101 operates the film feeding motor drive circuit 103 to commence setting of the first frame of the film 2.

Reference numeral 108 represents a magnetic reproducing circuit for detecting magnetic information written to the magnetic storage portion of the film 2 by the magnetic head 4 and amplifying it. Reference numeral 112 represents a comparator for converting the magnetically recorded signal amplified by the magnetic reproducing circuit 108 into a digital signal to transmit it to the control circuit 101.

Reference numeral 109 represents a frame number display comprising a liquid crystal display or the like for display the number of the frames of the film. Reference numeral 110 represents a display drive circuit for operating the frame number display 109 to increase/decrease the count.

Reference numeral 111 represents a photosensor drive circuit for operating the photosensor 3 to detect the perforation signal by its photosensor. The signal thus-detected is then transmitted to the control circuit 101.

Reference numeral 80 represents an internal power source which usually operates the overall operation of the camera. Reference numeral 316 represents a switch which is switched on when the switch lever 312 is moved in the direction E by the detection pin 310. The control circuit 101 inhibits the operation of the film feeding drive circuit 103 when the switch 316 is switched on. As a result, a feeding drive circuit (omitted from illustration) in the motor drive device 306 is operated.

The structure of the magnetic head 4 and the magnetic reproducing circuit 180 are arranged as shown in FIG. 73.

According to this embodiment, a fact whether or not the motor drive device is mounted is detected as described later. Furthermore, on the basis of the result of the detection, a high frequency filter or a low frequency filter is selected to eliminate the unnecessary band of the filter to correspond to the reproduction frequency for reproducing the magnetic information. As a result, the influence of noise can be eliminated and the performance of reproducing magnetic information can be improved.

When the motor drive device 306 is mounted, frequencies larger than $f1=1/(2\pi.R1.C1)$ (positive side) and $f2=1/(2\pi.R1'.C1')$ (negative side) are cut. When the motor drive device 306 is not mounted, frequencies larger than $f3=1/\{2\pi(R1+R2)(C1+C2)\}$ (positive side) and $f4=1/\{2\pi(R1'+R2')(C1'+C2')\}$ (negative side) are cut.

Figure 85B:
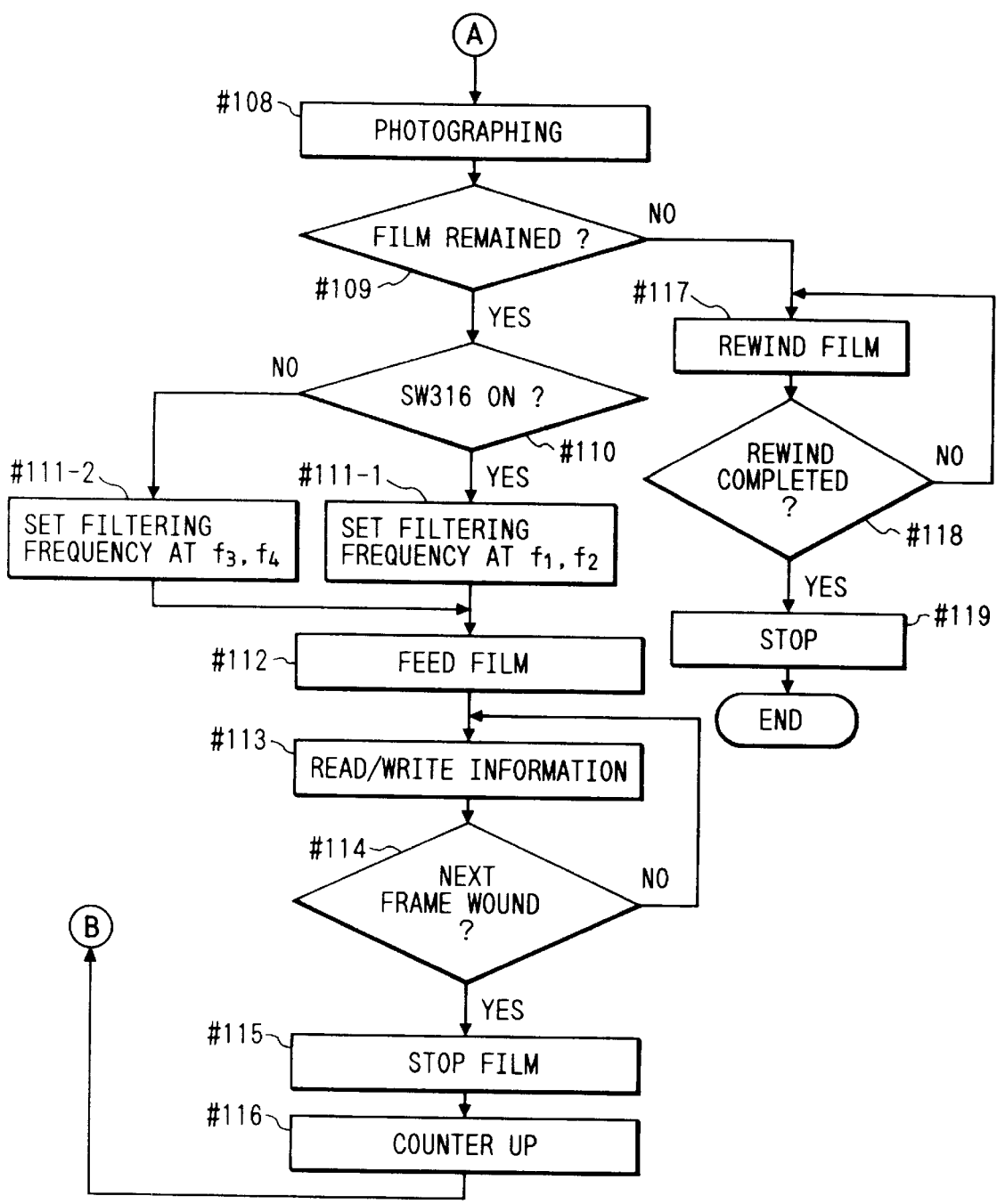

Then, the operation of the control circuit 101 will now be described with reference to a flow chart shown in FIG. 85.

When power is supplied to the camera, the flow proceeds to step 100.

(Step 100) When both of the film cartridge loading switch 106 and the back cover switch 107 are switched on, a discrimination is made that the film cartridge 1 has been loaded in the camera and the flow proceeds to step 101.

(Step 101) The film feeding motor 51 is rotated by means of the film feeding drive circuit 103 so as to set the first frame of the film 2 to the position of the aperture and commence the so-called film idling operation.

(Step 102) A fact whether or not the switch 316 is switched on is detected to discriminate whether or not the motor drive device 306 is fastened. If the same is switched on, the flow proceeds to step 103-1. If the same is switched off, the flow processed to step 103-2.

(Step 103-1) The level of the filter signal is set to "L" and the limit values of the transmissible frequency are set to f1 and f2. Then, the flow proceeds to step 104.

(Step 103-2) The level of the filter signal is set to "H" and the limit values of the transmissible frequency are set to f3 and f4. Then, the flow proceeds to step 104.

(Step 104) The reproducing circuit 108 is operated to read out information about the film such as the film sensitivity, the number of the frames of the film and the type of the film (negative or positive) and the like which has been previously written to the magnetic storage portion of the film 2 to be read by the magnetic head 4. Then, in accordance with the time constant of the filter set in step 103-1 or step 103-2, the noise component is removed from the detected signal before it is converted into a digital signal by the comparator 112 so as to store it.

(Step 105) A discrimination is made whether or not the first frame has been set by a known means (for example, the quantity of the film fed or the time in which the motor is activated by an encoder or the detection of the number of perforations detected by the photosensor 3). If the first frame has been detected, the flow proceeds to step 106.

(Step 106) The film feeding motor 51 is stopped by means of the film feeding drive circuit 103. Furthermore, the frame number display drive circuit 110 is operated to cause the frame number display 109 to display the first frame.

(Step 107) The state of the release switch 105 is discriminated. If it has been switched on, a discrimination is made that the releasing operation has been performed and the number of the releasing operations of the film is stored before the flow proceeds to step 108.

(Step 108) The AF.AE control circuit 102 is operated to perform known photographing operation such as the focusing of the photographing lens and the exposure operation by opening/closing the shutter.

(Step 109) A comparison between the number of the frames read in step 104 or the number of frames which can be photographed and which has been previously set by a known means and the present number of the photographed frames is made to discriminate whether or not there are residual frames. If there are residual frames, the flow proceeds to step 110. If there is no residual frame, the flow proceeds to step 117.

(Step 110) A discrimination is made whether or not the switch 316 is switched on to discriminate whether or not the motor drive device 306 is mounted. If the same is switched on, the flow proceeds to step 111-1. If the same is switched off, the flow proceeds to step 111-2.

(Step 111-1) The level of the filter signal is set to "L" and the limit values of the transmissible frequency are set to f1 and f2. Then, the flow proceeds to step 112.

(Step 111-2) The level of the filter signal is set to "H" and the limit values of the transmissible frequency are set to f3 and f4. Then, the flow proceeds to step 112.

(Step 112) The film feeding motor drive circuit 103 is operated to commence the operation of winding one frame.

(Step 113) At the time of winding the film 2 to the next frame, the magnetic head 4 is operated via the data writing circuit 104 so as to write photography information such as the shutter speed, the diaphragm value, the date of the photography and the like to the magnetic storage portion of the film 2. Furthermore, information written to the film 2 is read by the magnetic head 4 by operating the magnetic reproducing circuit 108.

(Step 114) When a fact that the photosensor 3 has detected the perforation of the next frame is discriminated, a discrimination is made that winding of the film 2 to the next frame has been completed and the flow proceeds to step 115.

(Step 115) The operation of the film feeding motor drive circuit 103 is stopped so as to stop feeding of the film 2.

(Step 116) The count displayed by the frame number display 109 is increased by one frame by operating the display drive circuit 110 before the flow returns to step 105.

In a case where a discrimination is made that there is no residual frame in step 109, the flow proceeds to step 117 as described above.

(Step 117) The film feeding motor 51 is rotated in the reverse direction by means of the film feeding drive circuit 103 so as to commence the film rewinding operation into the film cartridge 1.

(Step 118) A discrimination is made whether or not the rewinding of the film 2 into the film cartridge 1 has been completed by a known means. If it has been completed, the flow proceeds to step 119.

(Step 119) The sequential operation of the camera is completed.

FIGS. 86 to 89 illustrate another embodiment of the present invention.

The above-described embodiment is arranged in such a manner that only one filter switching point is provided to correspond the case in which the motor drive device is mounted and the case in which the same is not mounted. According to this embodiment, a plurality of switching points are provided to correspond to the case where the subject device is a high speed motor drive device or the case where the same is a ultra-high speed motor drive device. As a result, the performance of reproducing the magnetic information is further improved.

Figure 86:
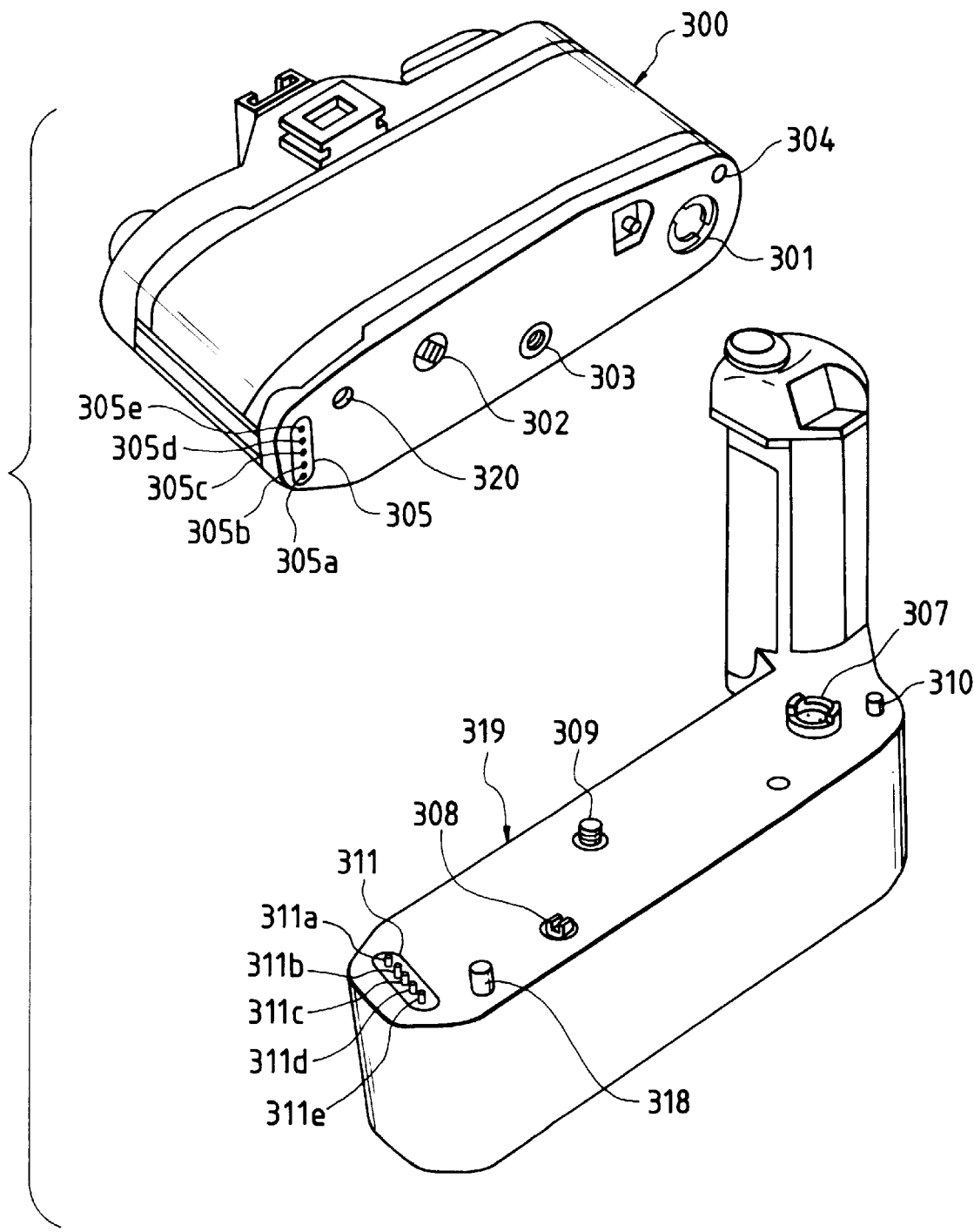
FIG. 86 is a perspective view which illustrates the camera and the motor drive device to be fastened to the camera according to another embodiment of the present invention.

Referring to FIG. 86, reference numeral 318 represents an identification pin for specifying the type of the motor drive. For example, a motor drive device having the pin 318 is a ultra-high speed motor drive device 319 and that having no pin is a high speed motor drive device.

Reference numeral 320 represents a pin hole into which the identifying pin 318 is inserted when the motor drive device 306 having the identifying pin 318 is mounted.

The other structures are the same as those according to the embodiment shown in FIG. 80.

Figure 87:
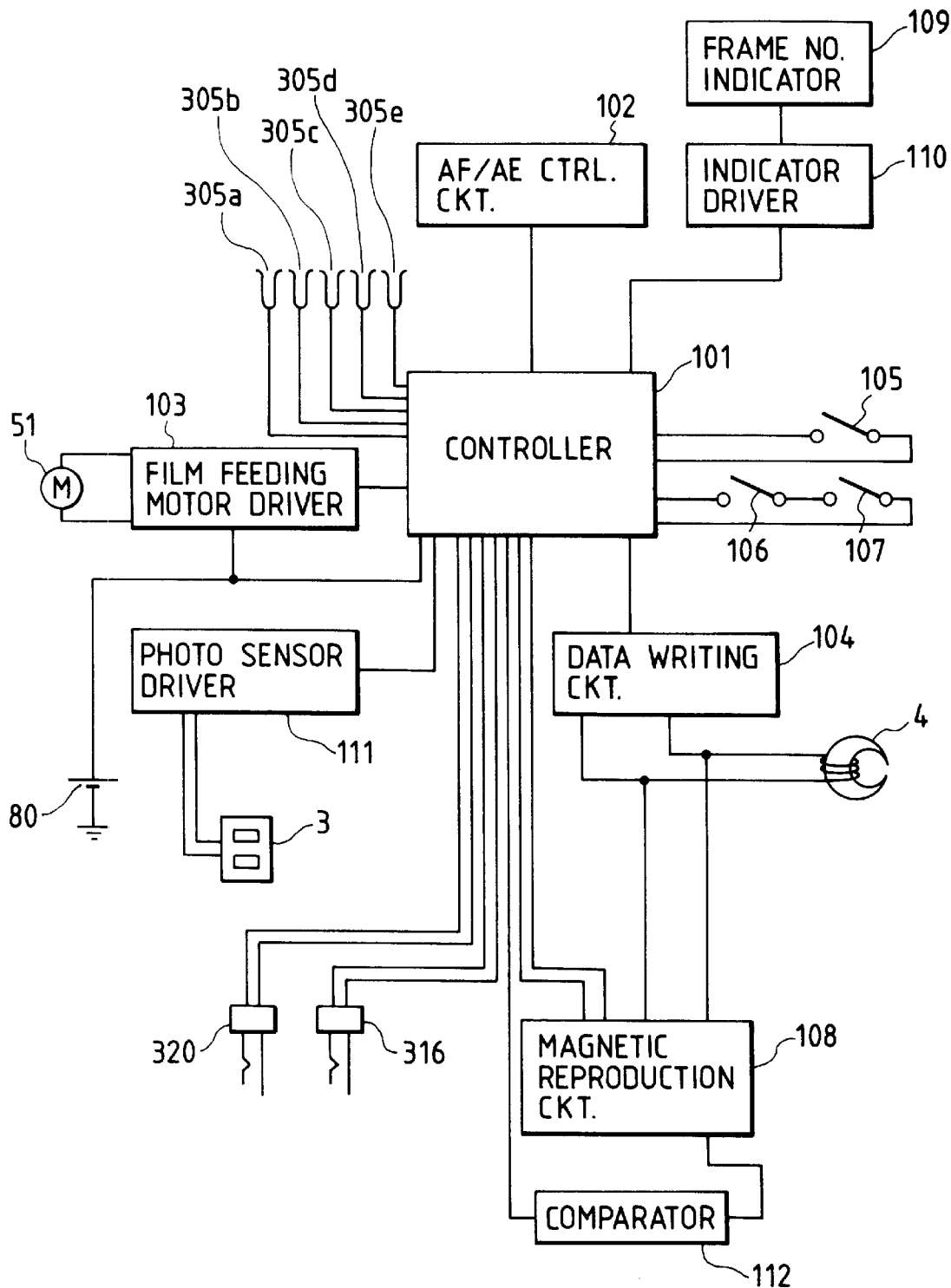
FIG. 87 is a block diagram which illustrate the circuit for the camera according to the embodiment of the present invention shown in FIG. 86.

FIG. 87 is a block diagram which illustrates an electric circuit for use in the camera according to this embodiment. The same elements as those according to the embodiment shown in FIG. 84 are given the same reference numerals.

Reference numeral 320 represents an identifying switch which is switched on by the identifying pin 318 when the ultra-high speed motor drive device 319 having the identifying pin 318 as shown in FIG. 86 is mounted on the camera.

Figure 88:
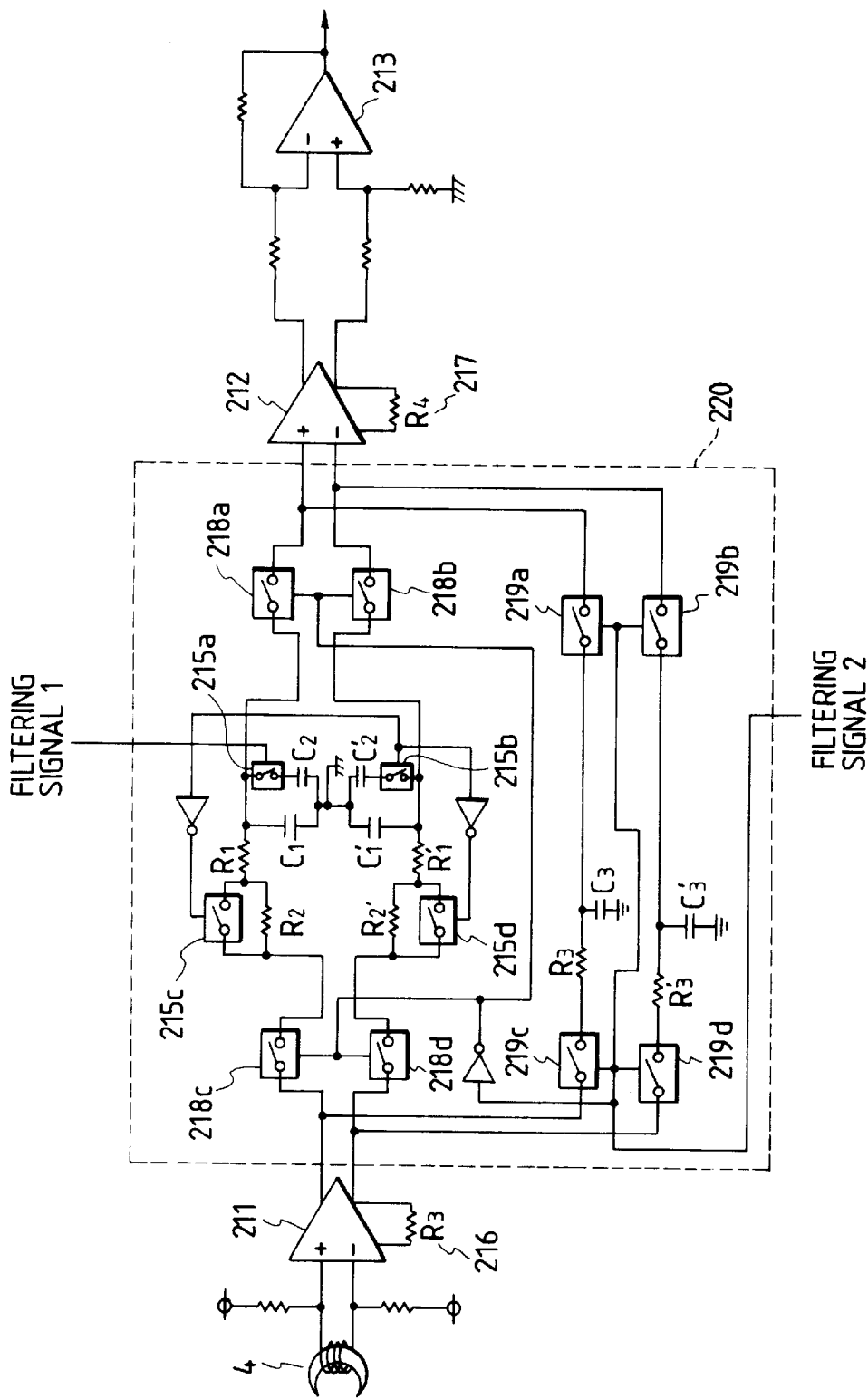
FIG. 88 is a circuit diagram which illustrates a filter circuit in the magnetic reproducing circuit shown in FIG. 87.

FIG. 88 is a circuit diagram which illustrates the detailed structure of the magnetic head 4 and the magnetic reproducing circuit 108 according to this embodiment. The same elements as those according to the embodiment shown in FIG. 73 are given the same reference numerals.

Referring to FIG. 88, reference numeral 220 represents a filter circuit. Reference numerals 218a, 218b, 218c, 218d, 219a, 219b, 219c and 219d represent analog switches. When the level of the filter signal 2 is high level, the analog switches 219a to 219d are switched on and the analog switches 218a to 218d are switched off. When the same is low level, the analog switches 219a to 219d are switched off and the analog switches 218a to 218d are switched on.

In the above-described structure, the control circuit 101 raises the level of the filter signal 2 when the identifying switch 320 is switched on. As a result, the frequencies higher than f5=1/(2π.R3.C3) (positive side) and f6=1/(2π.R3'.C3') (negative side) are cut by the filter circuit 220.

In order to make f5, f6>f1 and f2>f3, f4, the values of R1, R2, R1', R2', C1, C2, C1', C2', R3, C3, R3' and R3' are determined.

The control circuit 101 operates the filter circuit as follows:

(a) In a case where no motor drive device is mounted, the level of the filter signal 1 is raised and that of the filter signal 2 is raised to cut the frequencies higher than the following frequencies:

$$f3=1/\{2\pi(R1+R2)(C1+C2)\} \text{ (positive side)}$$

$$f4=1/\{2\pi(R1'+R2)(C1'+C2)\} \text{ (negative side)}$$

(b) In a case where the high speed motor drive device is mounted, the level of the filter signal 1 is lowered and that of the filter signal 2 is lowered to cut the frequencies higher than the following frequencies:

$$f1=1/(2\pi \cdot R1 \cdot C1) \text{ (positive side)}$$

$$f2=1/(2\pi \cdot R1' \cdot C1') \text{ (negative side)}$$

(c) In a case where the ultra-high speed motor drive device is mounted, the level of the filter signal 2 is raised to cut the frequencies higher than the following frequencies:

$$f5=1/(2\pi R3 \cdot C3) \text{ (positive side)}$$

$$f6=1/(2\pi R3' \cdot C3') \text{ (negative side)}$$

Figure 89B:
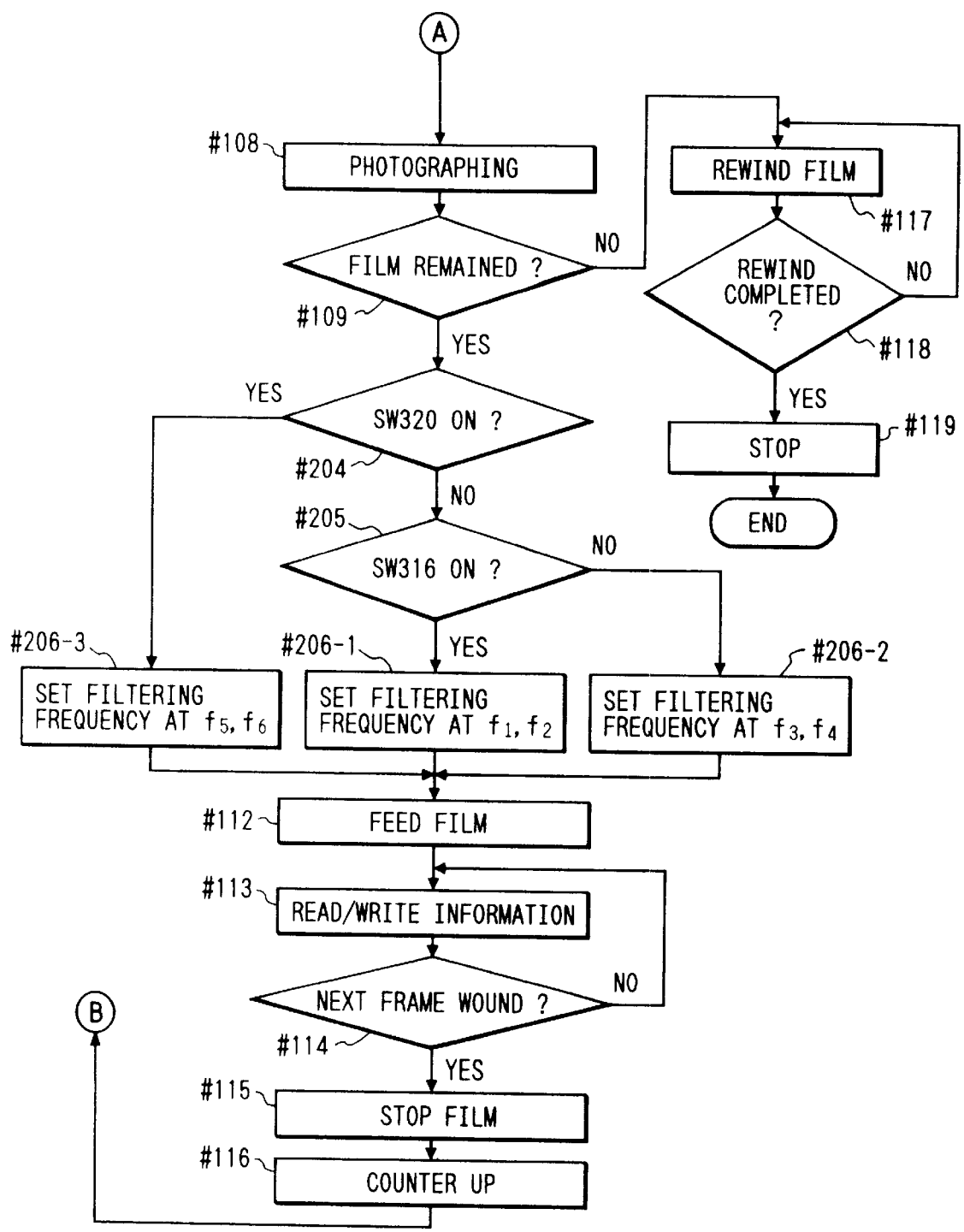

FIG. 89 is a flow chart which illustrates the operation of the control circuit 101 shown in FIG. 87. The same operations as those according to the embodiment shown in FIG. 85 are given the same step Nos. The description will be made about the different portions.

When feeding of the film is commenced in step 101, the flow proceeds to step 201.

(Step 201) A fact that the identifying switch 320 is switched on or off is discriminated. If the same is switched on (that is, the ultra-high speed motor drive device 319 is mounted), the flow proceeds to step 203-3. If the same is switched off, the flow proceeds to step 202.

(Step 202) A fact that the switch 316 is switched on or off is discriminated. If the same is switched on (that is, the high speed motor drive device is mounted), the flow proceeds to step 203-1. If the same is switched off (that is, no motor drive device is mounted), the flow proceeds to step 203-2.

(Step 203-1) The level of the filter signal 1 is lowered and the level of the filter signal 2 is also lowered. Furthermore, the limit values of the frequency of the transmissible signal are set to f1 and f2 before the flow proceeds to step 104.

(Step 203-2) The level of the filter signal 1 is raised and the level of the filter signal 2 is also raised. Furthermore, the limit values of the frequency of the transmissible signal are set to f3 and f4 before the flow proceeds to step 104.

(Step 203-3) The level of the filter signal 2 is raised. Furthermore, the limit values of the frequency of the transmissible signal are set to f5 and f6 before the flow proceeds to step 104.

(Step 104) The magnetic reproducing circuit 108 is operated to read out film information such as the film sensitivity, the number of the frames of the film, the type of the film, which has been previously written to the magnetic storage portion of the film by the magnetic head 4. Furthermore, in accordance with the time constant set in any one of steps 203-1, 203-2 or 203-3, the noise factor of the detection signal is removed before it is converted into a digital signal by the comparator 112 so as to store it.

In a case where there are residual frames in the film in step 109, the flow proceeds to step 204.

(Step 204) A fact that the switch 320 is switched on or off is discriminated. If the same is switched on (that is, the ultra-high speed motor drive device 319 is mounted), the flow proceeds to step 206-3. If the same is switched off, the flow proceeds to step 205.

(Step 205) A fact that the switch 316 is switched on or off is discriminated. If the same is switched on (that is, the high speed motor drive device is mounted), the flow proceeds to step 206-1. If the same is switched off (that is, the high speed motor drive device is mounted), the flow proceeds to step 206-2.

(Step 206-1) The level of the filter signal 1 is lowered and the level of the filter signal 2 is also lowered. Furthermore, the limit values of the frequency of the transmissible signal are set to f1 and f2 before the flow proceeds to step 112.

(Step 206-2) The level of the filter signal 1 is raised and the level of the filter signal 2 is also raised. Furthermore, the limit values of the frequency of the transmissible signal are set to f3 and f4 before the flow proceeds to step 112.

(Step 206-3) The level of the filter signal 2 is raised. Furthermore, the limit values of the frequency of the transmissible signal are set to f5 and f6 before the flow proceeds to step 112.

Figure 90:
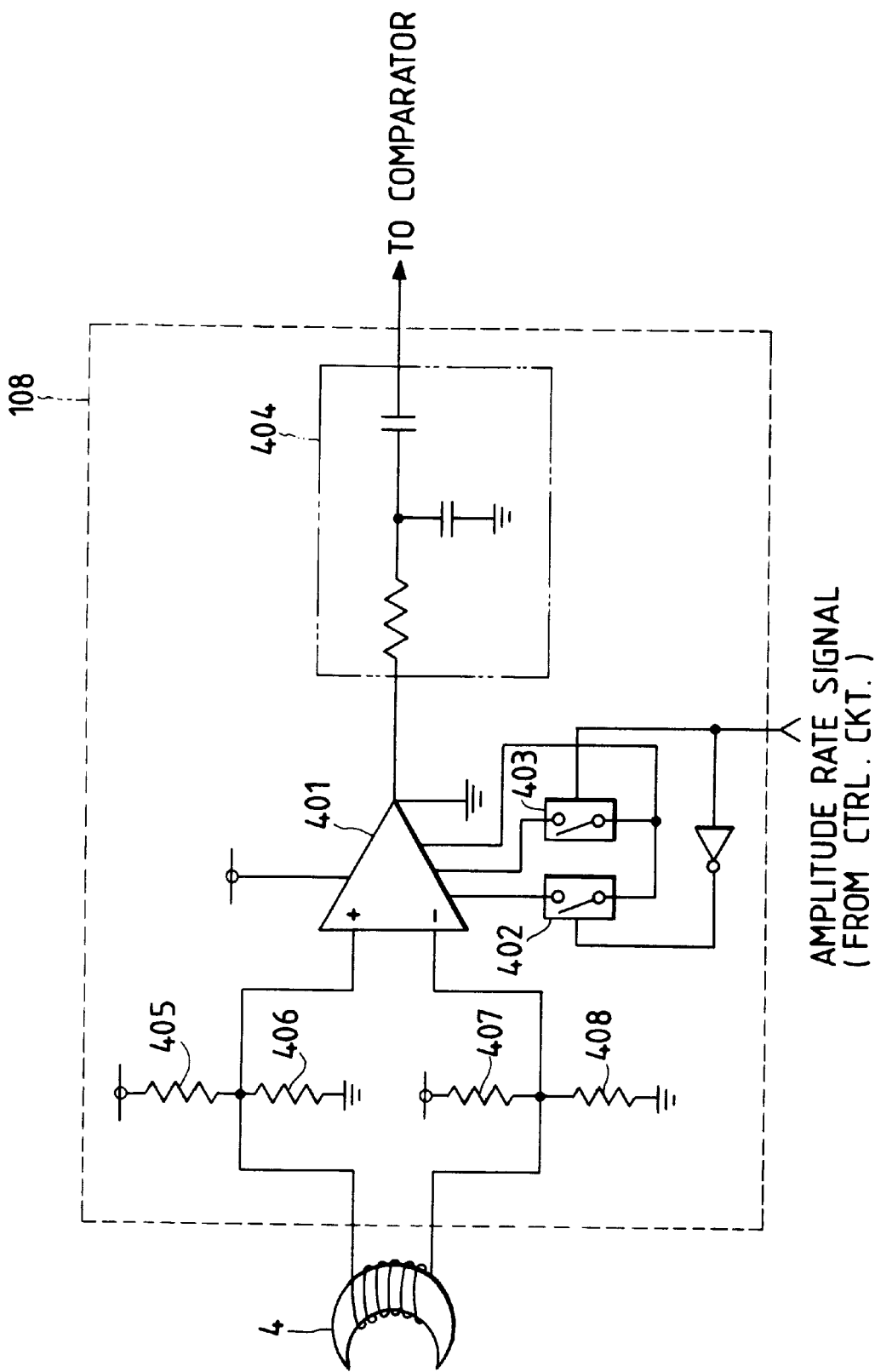
FIG. 90 is a circuit diagram which illustrates an analog signal amplifying portion in the magnetic reproducing circuit according to another embodiment of the present invention.
Figure 91B:
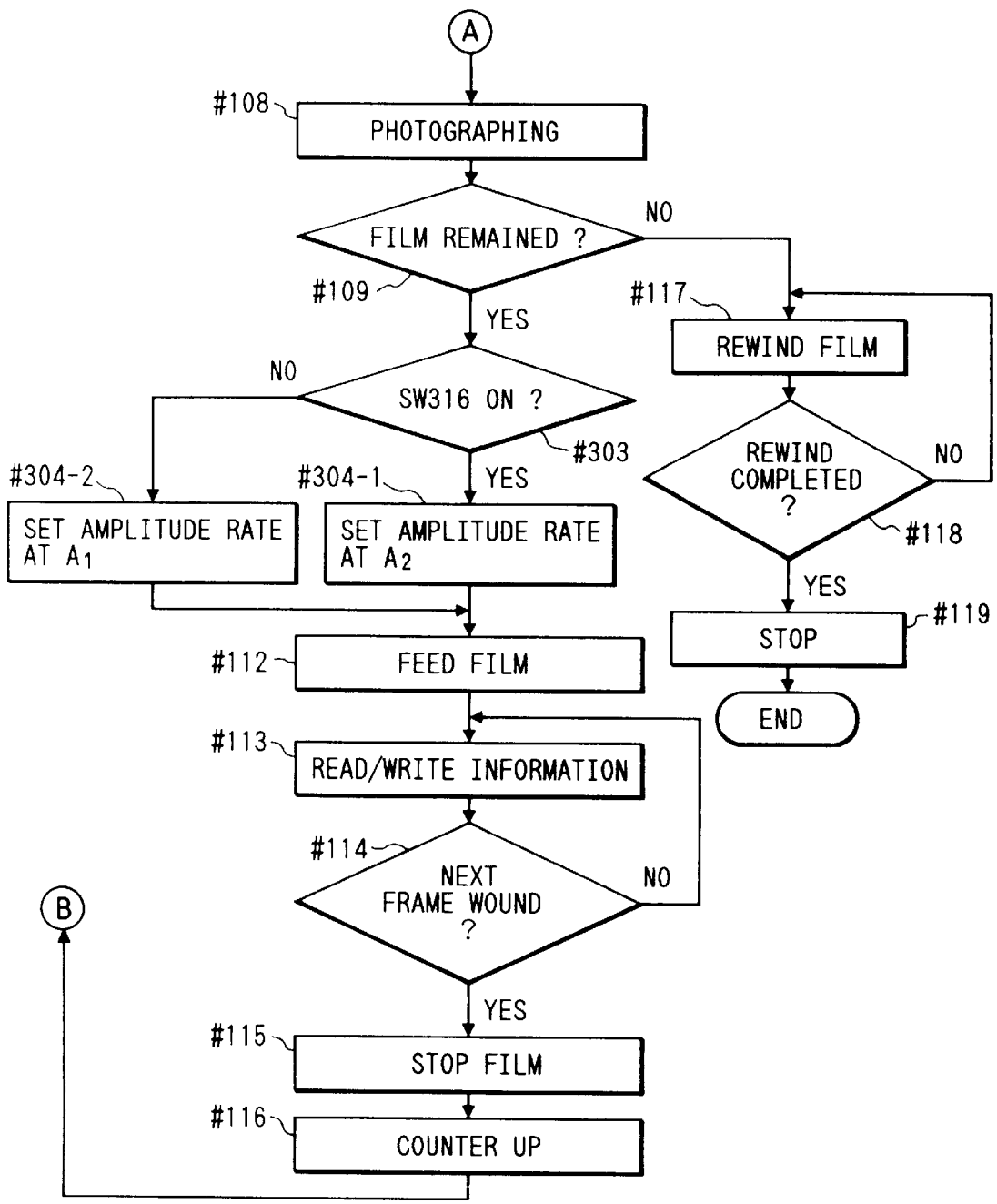

FIGS. 90 and 91 illustrate the structure of the magnetic head and the magnetic reproducing circuit according to another embodiment of the present invention. According to this embodiment, the amplification rate of the analog signal amplifying portion in the magnetic reproducing circuit 108 is switched over depending upon the fact that the motor drive device is mounted.

FIG. 90 illustrates the structure of the magnetic reproducing circuit 108. Reference numeral 401 represents an amplifier (for example, AD524 manufactured by Analog Devices) for amplifying the input from the magnetic head 4, the amplifier 401 having an amplification rate of A1 and A2 (A1>A2). Reference numerals 402 and 403 represent analog switches arranged such that the analog switch 403 is switched on when the level of the amplification rate signal supplied from the control circuit is raised to set the amplification rate of the amplifier 401 to a large rate (A1). When the level of the amplification rate signal is lowered, the analog switch 402 is switched on to set the amplification rate of the amplifier 401 to a small rate (A2). Reference numeral 404 represents a filter circuit for cutting the noise of the output from the amplifier 401, the filter circuit 404 being composed of resistors and capacitors. Reference numerals 405, 406, 407 and 408 represent bias resistors.

FIG. 91 is a flow chart which illustrates the operation of the control circuit 101 of the camera according to this embodiment. The same operations as those according to the embodiment shown in FIG. 85 are given the same step Nos.

When feeding of the film is commenced in step 101, the flow proceeds to step 301.

(Step 301) A fact that the switch 316 is switched on or off is discriminated. If the same is switched on (that is, the motor drive device is mounted), the flow proceeds to step 302-1. If the same is switched off, the flow proceeds to step 302-2.

(Step 302-1) The level of the amplification rate signal is lowered and the amplification rate of the amplifier 401 is set to a small rate, that is A2. Thus, it is made to a suitable rate at which the film is fed by the motor drive device.

(Step 302-2) The level of the amplification rate signal is raised and the amplification rate of the amplifier 401 is set to a large rate, that is A1. Thus, it is made to a suitable rate at which the film is fed by the motor drive device in a case where no motor drive device is mounted.

(Step 104) The magnetic reproducing circuit 108 is operated to read out film information such as the film sensitivity and the number of the frames of the film which has been previously written to the magnetic storage portion of the film by the magnetic head 4. At this time, the signal is amplified in accordance with the amplification rate set in step 302-1 or step 302-2 before it is converted into a digital signal by the comparator 112 to store it.

In a case where there are residual frames in the film in step 109, the flow proceeds to step 303.

(Step 204) A fact that the switch 316 is switched on or off is discriminated. If the same is switched on (that is, the motor drive device is mounted), the flow proceeds to step 304-1. If the same is switched off, the flow proceeds to step 304-2.

(Step 304-1) The level of the amplification rate signal is lowered and the amplification rate of the amplifier 401 is set to a small rate, that is A2. Thus, it is made to a suitable rate at which the film is fed by the motor drive device.

(Step 304-2) The level of the amplification rate signal is raised and the amplification rate of the amplifier 401 is set to a large rate, that is A1. Thus, it is made to a suitable rate at which the film is fed by the motor drive device in a case where no motor drive device is mounted.

The other operations are the same as those according to the first embodiment. Furthermore, the gain may be changed on the basis of the motor drive device, resulting a satisfactory effect to be obtained.

According to the above-described embodiments, a fact whether or not the motor drive device is mounted is discriminated and the circuit constant (the time constant of the filter and the amplification rate of the amplifier) is changed in accordance with the discriminated fact. Therefore, the performance of reproducing magnetic information can be improved. By changing the transmissible range of the filter, unnecessary transmissible ranges of the filter can be reduced and thereby the influence of the noise can be eliminated. Furthermore, a problem taken place in that the output signal becomes different from the original signal can be overcome or another problem taken place in that a signal the level of which does not reach the digital conversion level is undesirably generated and thereby a read error is generated can be prevented.

Figure 92:
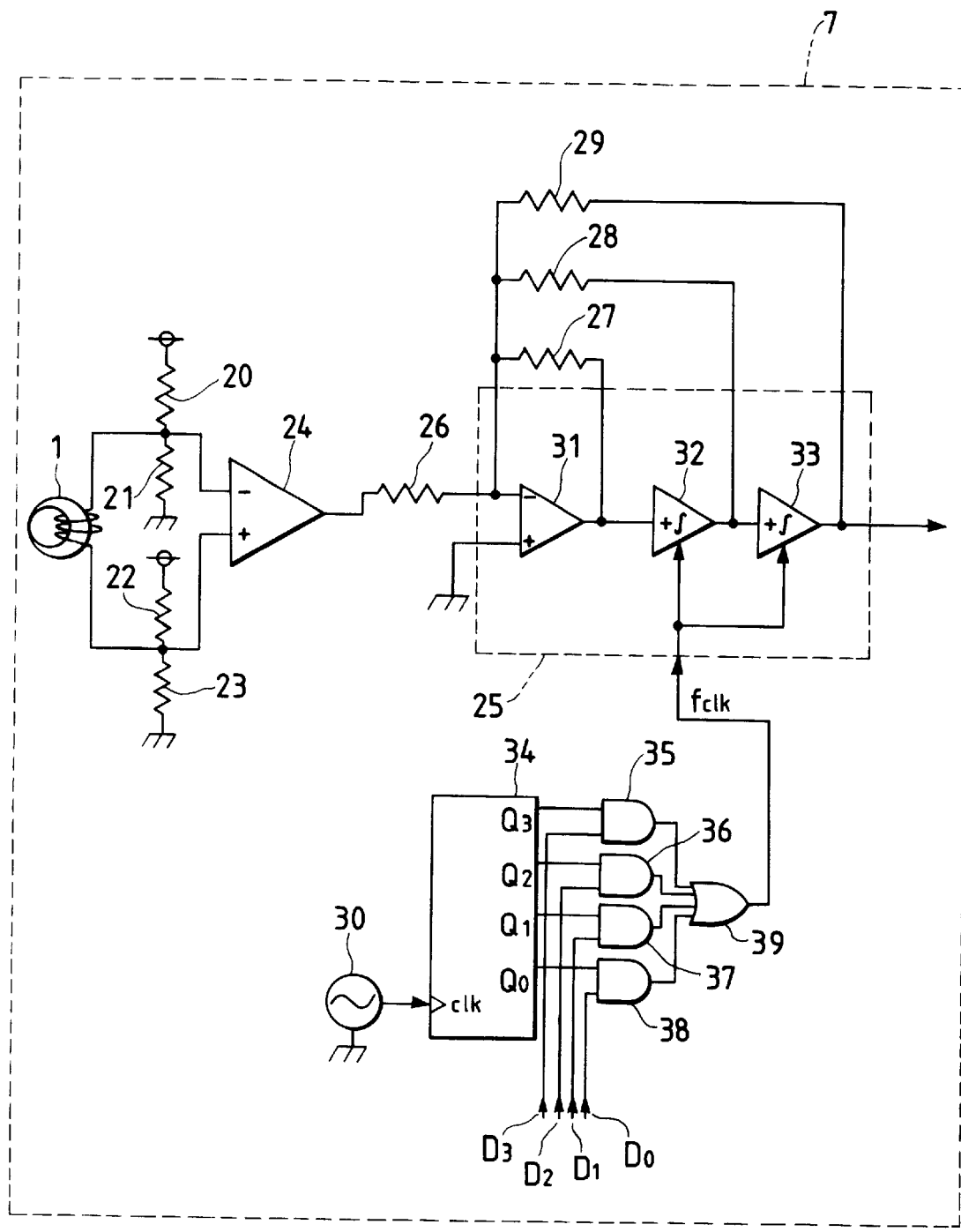
FIG. 92 illustrates the schematic structure of an essential portion of the reproducing circuit according to another embodiment of the present invention.

FIG. 92 illustrates the schematic structure of an essential portion of the reproducing circuit according to another embodiment of the present invention. Referring to FIG. 92, reference numerals 20, 21, 22 and 23 represent bias resistors and 24 represents a differential amplifying circuit comprising, for example, AD524 manufactured by Analog Devices. Reference numerals 26, 27, 28 and 29 represent resistors and 25 represents a switched capacitor circuit comprising, for example LMF100 manufactured by National Semiconductor. Reference numeral 30 represents an oscillating circuit, 31 represents an OP amplifier and 34 represents a counter circuit (comprising, for example, SN74163 manufactured by TI). Reference numerals 35 to 38 represent AND circuits and 39 represents an OR circuit. Reference numerals 32 and 33 represent switched capacitor integrating circuit.

The output signal from the magnetic head 6 is amplified by the differential amplifying circuit 24 so as to become a single output.

Assuming that a secondary filter by the switched capacitor circuit 25, Q=0.707. Furthermore, the values of the resistors 26, 27, 28 and 29 are made to be $R_{26}$, $R_{27}$, $R_{28}$ and $R_{29}$. In addition, assuming that the cut-off frequency of the filter is $f_c$, $fc=(f_{clk}/100)(R_{27}/R_{29})^{1/2}$ $Q=(R_{27}/R_{29})^{1/2}(R_{28}/R_{27})$ $A=-R_{29}/R_{26}$ where $f_{clk}$ is the operation clock frequency of the switched capacitor circuit 25 and A is an amplification degree of the switched capacitor circuit 25

Assuming that $f_{clk}$=1 MHz, A=−1 and fc=40 KHz:

$R_{26}$=10 kΩ

$R_{27}$=160 kΩ

$R_{28}$=28.3 kΩ

$R_{29}$=10 kΩ

When $f_{clk}$ is made to be 0.5 MHz, only fc is made to be 20 KHz. The results are shown in FIG. 93.

Figure 93:
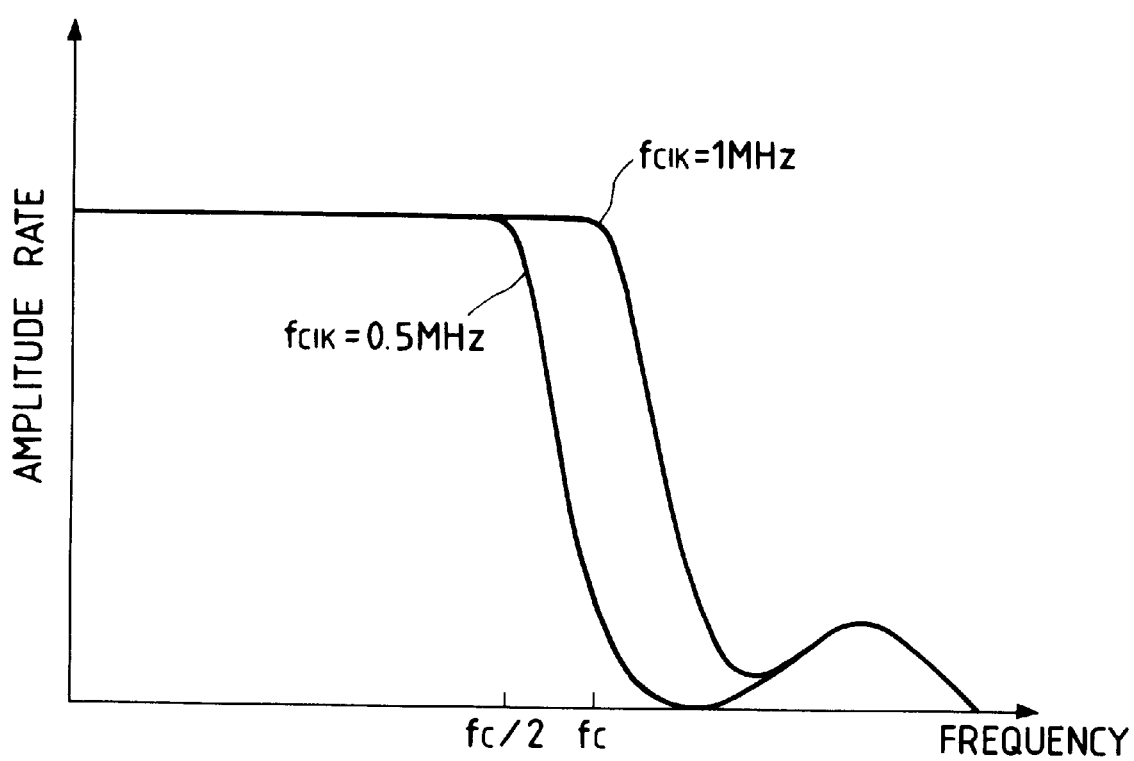
FIG. 93 illustrates the degree of amplification with respect to the change in the frequency of a switched capacitor circuit.

FIG. 93 illustrates the degree of the amplification with respect to the change in the frequency of the switched capacitor circuit, where the axis of ordinate stands for the degree of the amplification of the switched capacitor circuit 25 and the axis of abscissa stands for the frequency. As shown in FIG. 93, the change of $f_{clk}$ in accordance with the film feeding speed will enable the cut-off frequency fc of the switched capacitor circuit 25 to be changed.

The fclk is used to divide the oscillated frequency (2 MHz according to this embodiment) of the oscillating circuit 30 by the counter circuit 34. Therefore, a signal the frequency of which is 1 MHz is transmitted from output $Q_0$, a signal the frequency of which is 0.5 MHz is 1transmitted from output $Q_1$, a signal the frequency of which is 0.25 MHz is transmitted from output $Q_2$ and a signal the frequency of which is 0.125 MHz is transmitted from output $Q_3$.

When signals $D_0$ to $D_3$ from the microcomputer 1 are $D_0=1$, $D_1$ to $D_3=\phi$, the output ($f_{clk}$) from the OR circuit 39 becomes 1 MHz. When $D_1=1$, and $D_0$, $D_2$ and $D_3=\phi$, the output ($f_{clk}$) becomes 0.5 MHz.

According to this embodiment, the secondary filter circuit is employed. A higher filter circuit can be constituted by longitudinally connecting the filter circuits by the similar method.

Figure 94:
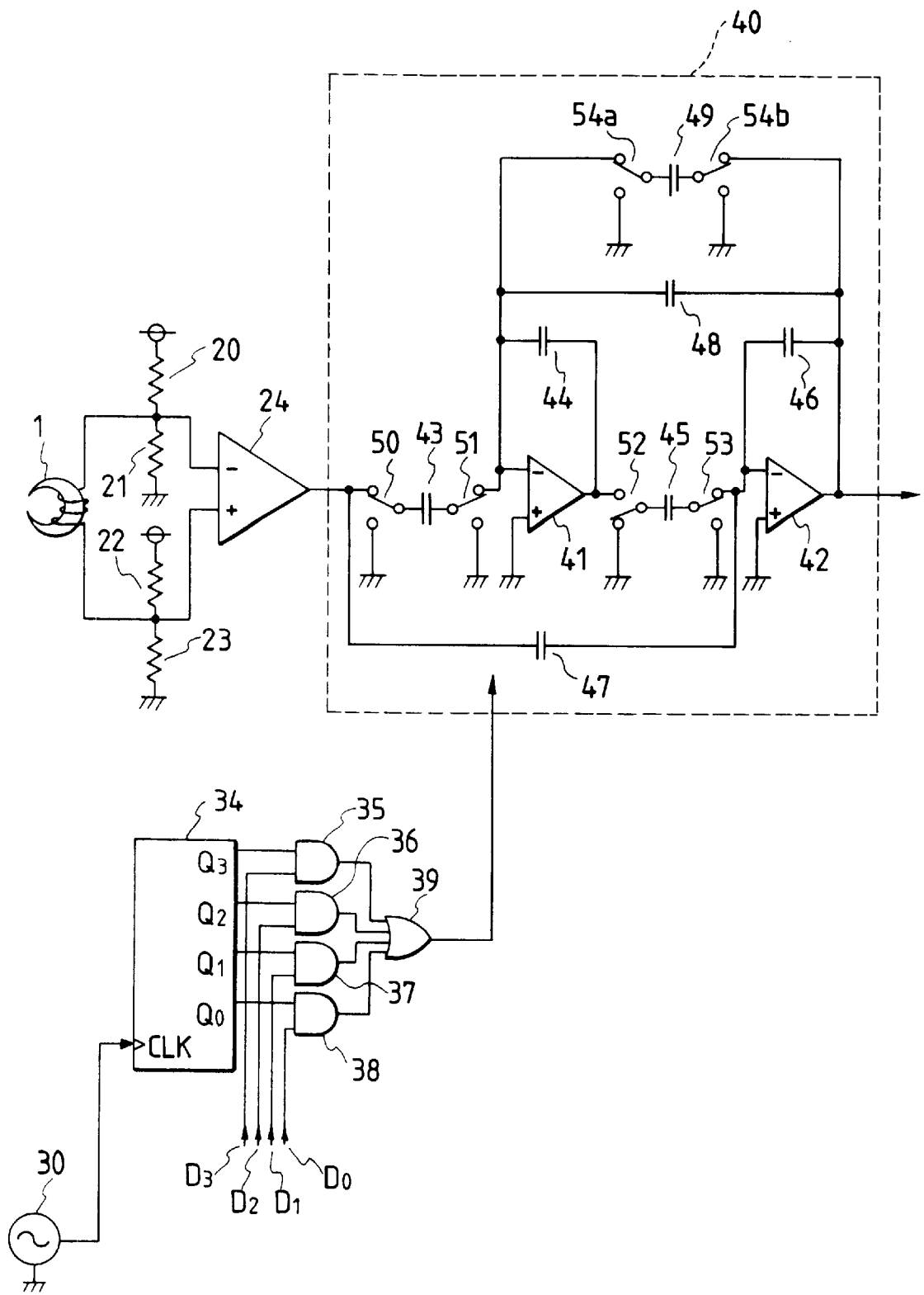
FIG. 94 illustrates another embodiment of the present invention.

FIG. 94 illustrates another embodiment of the present invention. Referring to FIG. 94, reference numeral 40 represents a switched capacitor circuit. Reference numerals 43, 44, 45, 46, 47, 48 and 49 represent capacitors. Reference numerals 41 and 42 represent OP amplifiers. Reference numerals 50, 51, 52, 53, 54*a* and 54*b* represent switch circuits.

This embodiment is arranged in such a manner that the switched capacitor circuit 25 according to the embodiment shown in FIG. 92 is replaced by a switched capacitor 40. Since the filter circuit is constituted by using no resistance device, it is advantageous when IC are manufactured.

Figure 95:
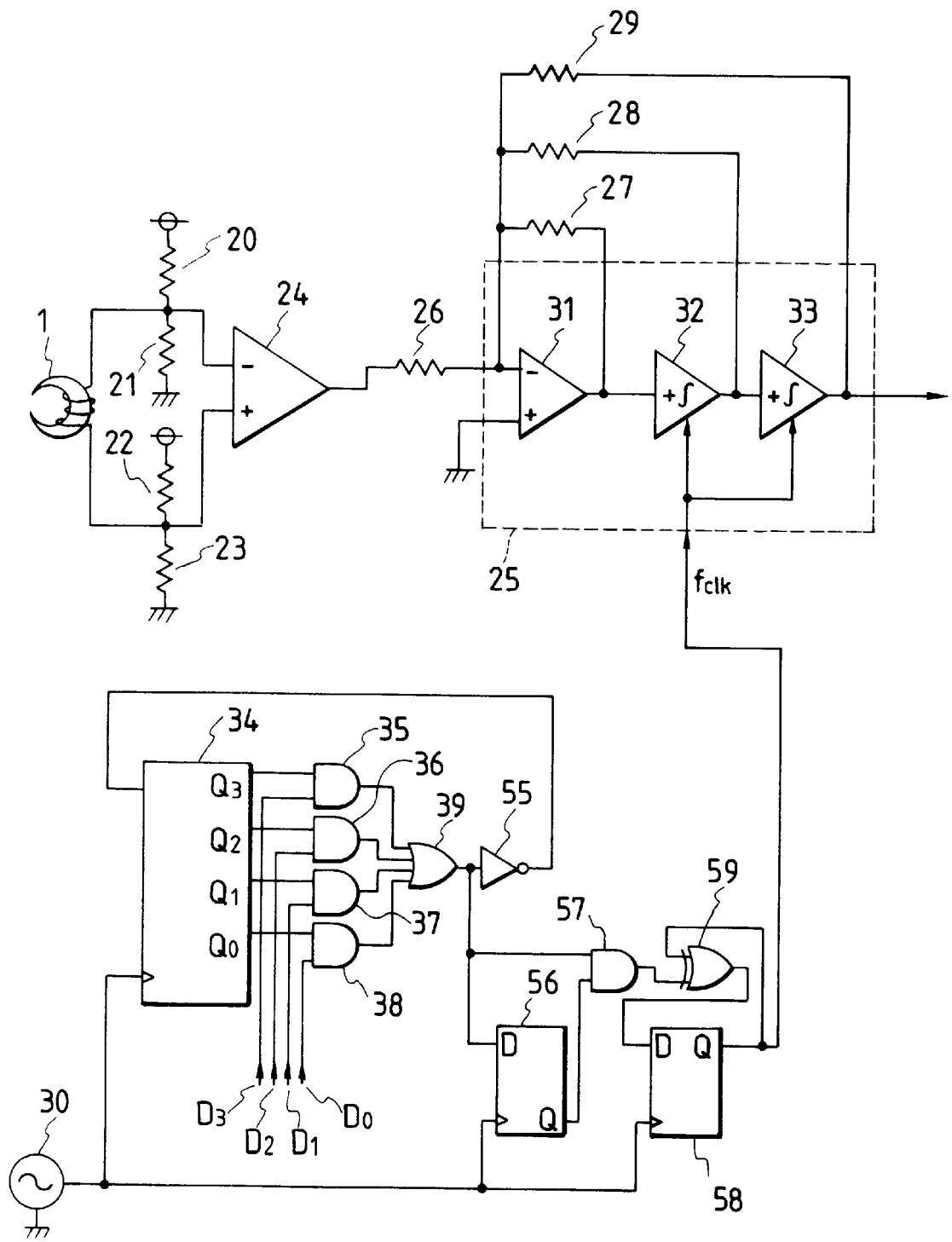
FIG. 95 illustrates another embodiment of the present invention.

FIG. 95 illustrates another embodiment of the present invention. Referring to FIG. 95, reference numeral 55 represents a NOT circuit, 56 and 58 represent D-flip flop circuits, 57 represents an AND circuit and 59 represents an EQUISIBLE-OR circuit. According to this embodiment, the clock $f_{clk}$ of the switched capacitor circuit 25 can be varied into 16 steps in units of 1/4 from 1/4 times to 1/64 times of the oscillated frequency f0 of the oscillating circuit 30.

The counter circuit 34, the AND circuits 35 to 38, the OR circuit 39 and the NOT circuit 55 can be changed in a range of 16 steps in units of 1/2 times from 1/2 times to 1/32 times of the oscillated frequency $f_0$ of the oscillating circuit 30. However, since the output from the OR circuit 39 is not arranged such that the duty ratio is 1:1, fclk is processed by making the duty ratio to be 1:1 while changing the frequency to 1/2 times by a dividing circuit comprising the D-flip flop 56 and 58, the AND circuit 57 and the EQUISIVE-OR circuit 59. Therefore, the cut-off frequency of the switched capacitor circuit 25 can be sectioned finely.

Figure 96:
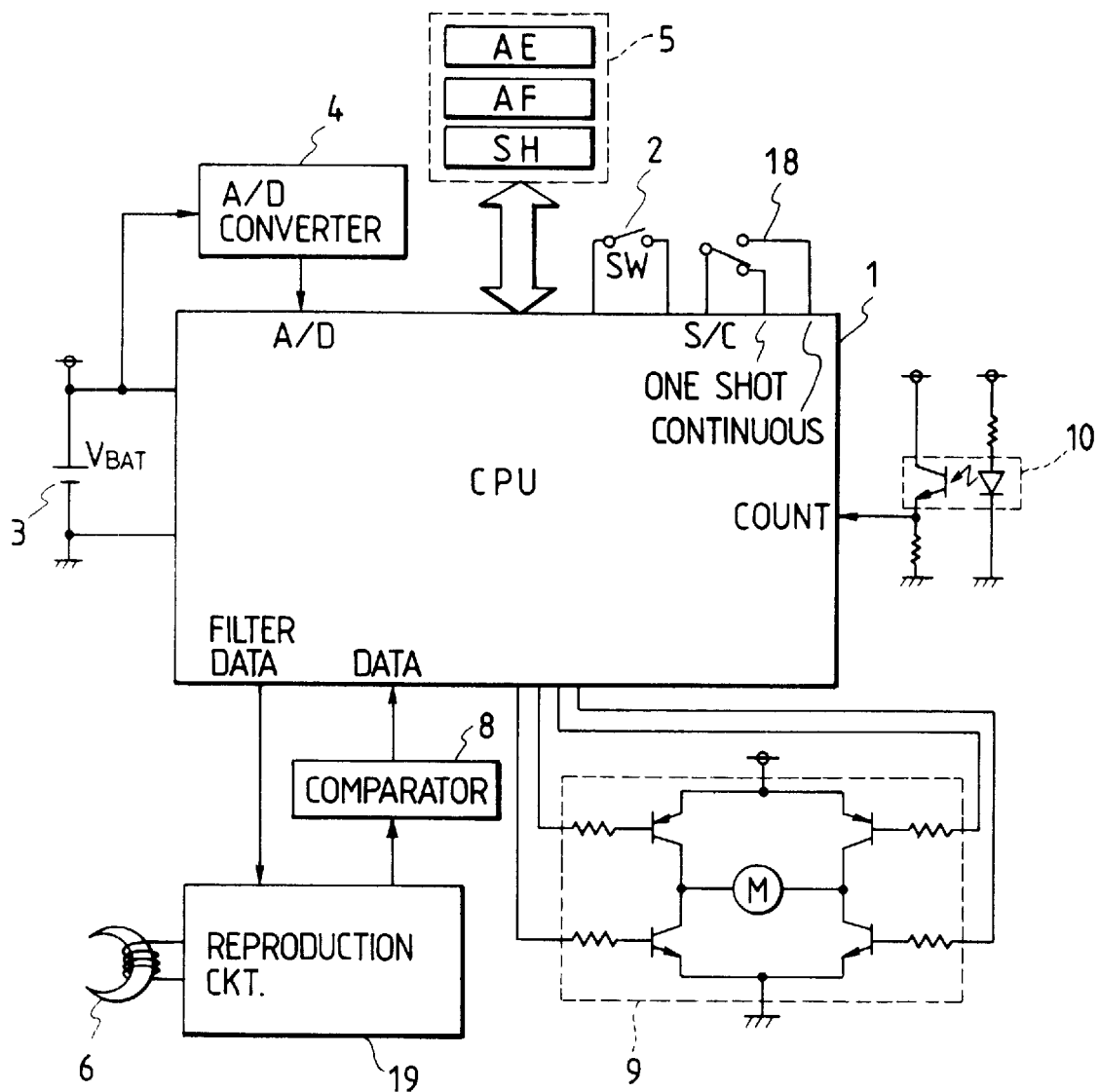
FIG. 96 is a circuit block diagram which illustrates the schematic structure of the camera which uses the film having the magnetic recording portion according to another embodiment of the present invention.

FIG. 96 is a block diagram which schematically illustrates another embodiment of the circuit for use in the camera having a magnetic recording portion according to the present invention. The structure of this is arranged to be the same as that according to the embodiment shown in FIG. 57.

As the reproducing circuit 19, the circuits shown in FIGS. 92, 94 and 95 are employed.

Figure 97:
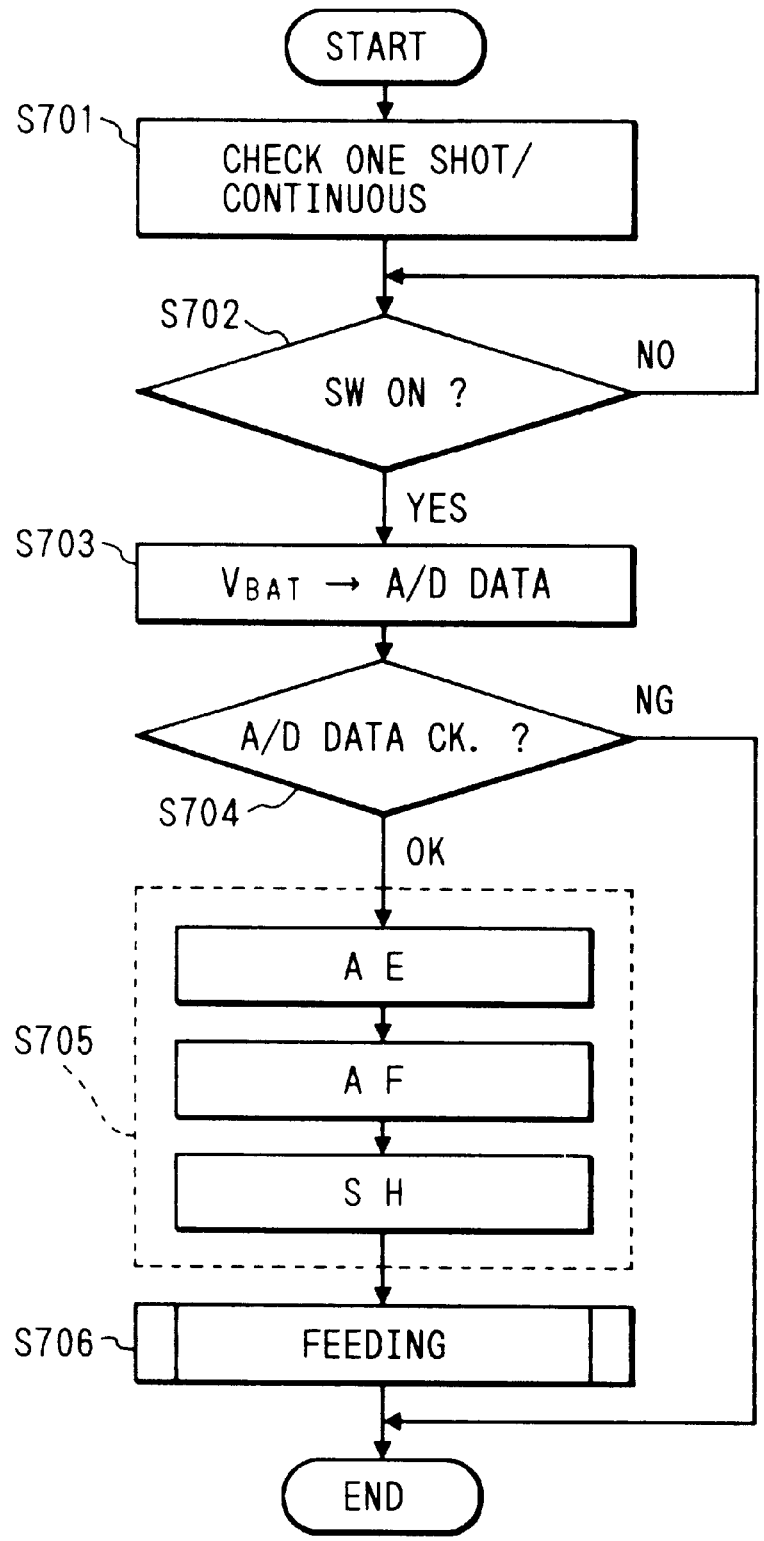
FIG. 97 is a flow chart which illustrates the operation of the structure shown in FIGS. 92 and 93.

FIG. 97 is a flow chart which illustrates the operation of the structure shown in FIG. 96.

Referring to FIG. 97, first the state of the one-shot/continuous mode switch 18 is checked to store the fact that the subject mode is the one-shot mode or the continuous mode as data for the CPU1 (S701). Then, the state of the switch 2 is checked (S702). If the switch 2 is switched on, the voltage of the battery 3 is converted into digital data by the A/D converter 4 to store it in the CPU1 (S703). Then, the digital data is subjected to a comparison with the minimum voltage Vmin required to operate the camera which has been previously set in the CPU1 (S704). If it is smaller than Vmin, the operation is completed. If it is larger than Vmin, the mode is shifted to the photography operation (S705). In this photography operation, the automatic circuit 5 is used to perform the known light measuring and distance measuring operations. Then, the photography is performed in accordance with the data. Then, the film is fed (S706) and the sequential operation is completed. The magnetically recorded data is detected as a signal by the reproducing head 6 during the operation of feeding the film. It is amplified by the reproducing circuit 19 before it is converted into a digital signal by the comparator 8 so as to be received by the CPU1.

Figure 98:
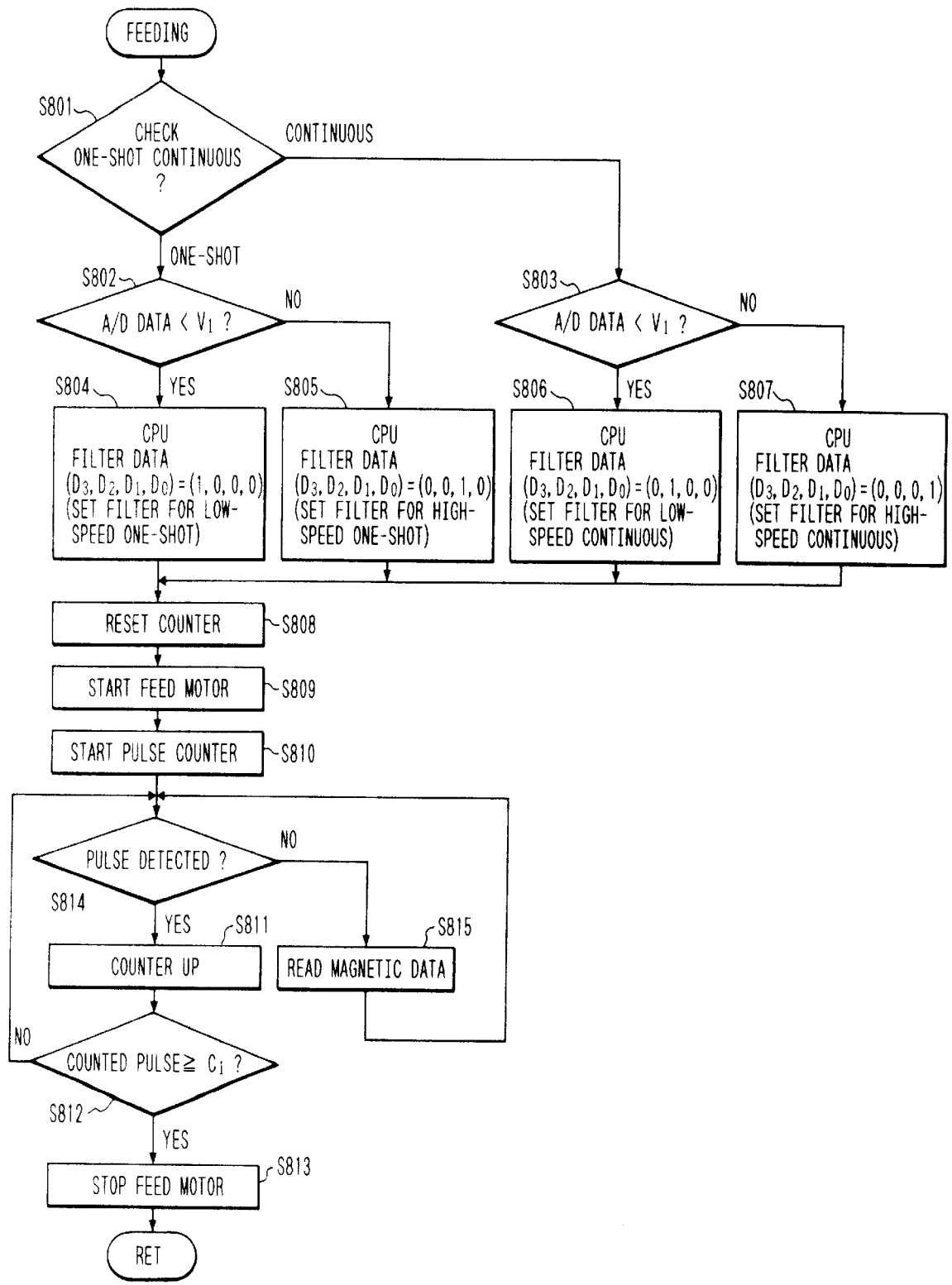
FIG. 98 is a flow chart which illustrates the detailed feeding operation shown in FIG. 96.

FIG. 98 is a flow chart which illustrates the detailed process of the feeding operation shown in FIG. 97. A fact whether or not the mode is (S801) the one-shot mode or the continuous mode (the result of the discrimination in S701) is discriminated. Then, a comparison is made (S802 and S803) between digital data about the residual voltage of the battery (the result of the operation in S703) and the filter time constant switch point V1. If the digital data is less than V1 (A/D data<V1) in the one-shot mode, the filter data (D3, D2, D1, D0)=(1, 0, 0, 0). Thus, a one-shot low speed filter is set (S804). If the digital data is larger than V1 (A/D data>V1) in the one-shot mode, the filter data (D3, D2, D1, D0)=(0, 0, 1, 0). Thus, a one-shot high speed filter is set (S805).

If the digital data is smaller than V1 (A/D data<V1) in the continuous mode, the filter data V1 (D3, D2, D1, D0)=(0, 1, 0, 0). Thus, a continuous low speed filter is set (S806). If the digital data is larger than V1 in the continuous mode, the filter data (D3, D2, D1, D0)=(0, 0, 0, 1). Thus, a continuous high speed filter is set (S807). After the filter has been set in any one of S804 to S807, the counter in the CPU1 for counting the pulses generated by the photocoupler 10 is reset (S805) and the feeding circuit 9 is started (S809). Furthermore, counting of the pulses generated from the photocoupler 10 by the pulse plate which is rotated when the feeding motor is rotated is commenced (S810). A fact whether or not the pulse has been supplied from the photocoupler 10 to the CPU1 is detected (S814). If the pulse has been supplied, the pulse count is increased (S811). If no pulse is supplied, the magnetically recorded data about the film is detected/amplified by the reproducing head 6 and the reproducing circuit 19. It is then converted into a digital signal by the comparator 8 before it is received by the CPU1 (S815). Then, the flow again returns to the pulse detection process (S814). After the pulse counting process (S811) has been completed, a discrimination is made whether or not the pulse count is larger than a predetermined feeding stop count C1 (S812). If the pulse count is smaller than C1, the flow again returns to the pulse counting process (S814). If the pulse count is larger than C1, the feeding circuit 9 is stopped (S813) and the sequential operation is completed.

As described above, this embodiment is arranged in such a manner that the filter time constant is switched over on the basis of the photography mode in addition to the switching of the filter time constant on the basis of the residual voltage of the battery 3. Therefore, the performance of reproducing magnetically recorded data can be improved in a camera in which the feeding speed is changed depending upon the photography mode.

According to the above-described embodiment, the description is made about a case in which the feeding speed is changed by the switching of the photography mode in addition to the residual voltage of the battery 3. Furthermore, the feeding speed is changed by the number of the fed frames and the temperature.

Then, an example to be adapted to the change in the temperature or the number of the frames will now be described. In this case, the structure of the circuit shown in FIG. 63 is employed as the control circuit.

Figure 99:
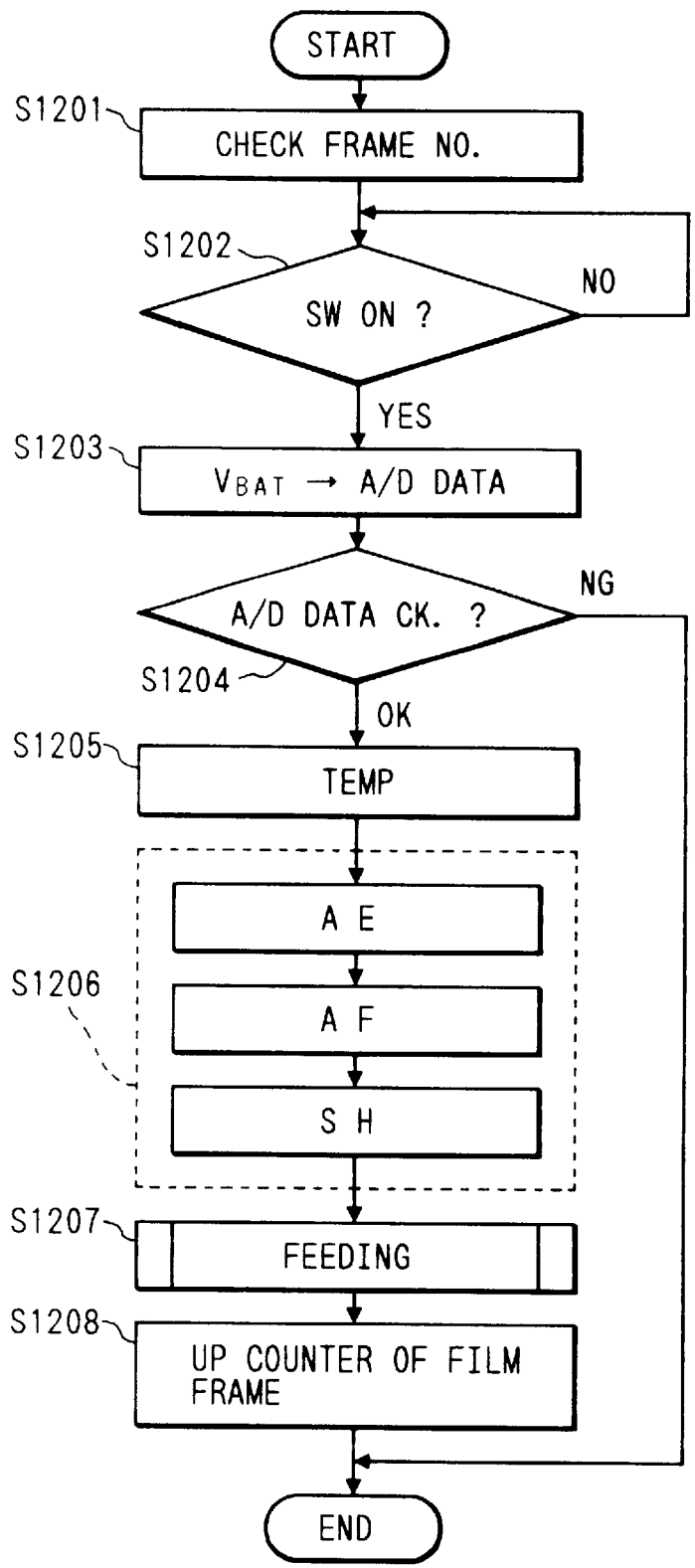
FIG. 99 is a flow chart which illustrates the operation of another embodiment of the present invention.

First, referring to FIG. 99, the state of the film counter 22 is checked (S1201) to be stored in the CPU1. Then, a fact whether or not the switch 2 is switched on is discriminated (S1202) before the residual voltage of the battery 3 and the data about is stored (S1203). Then, it is compared with the minimum voltage Vmin required to operate the camera which has been previously set in the CPU1 (S1204). If it is larger than Vmin, temperature data is supplied from the temperature detection circuit 21 to the CPU1 (S1205). Then, the photography operation (S1206) is performed and the film is fed (S1207) before the count of the film counter 22 is increased (S12O8). Thus, the sequential operation is completed.

Figure 100:
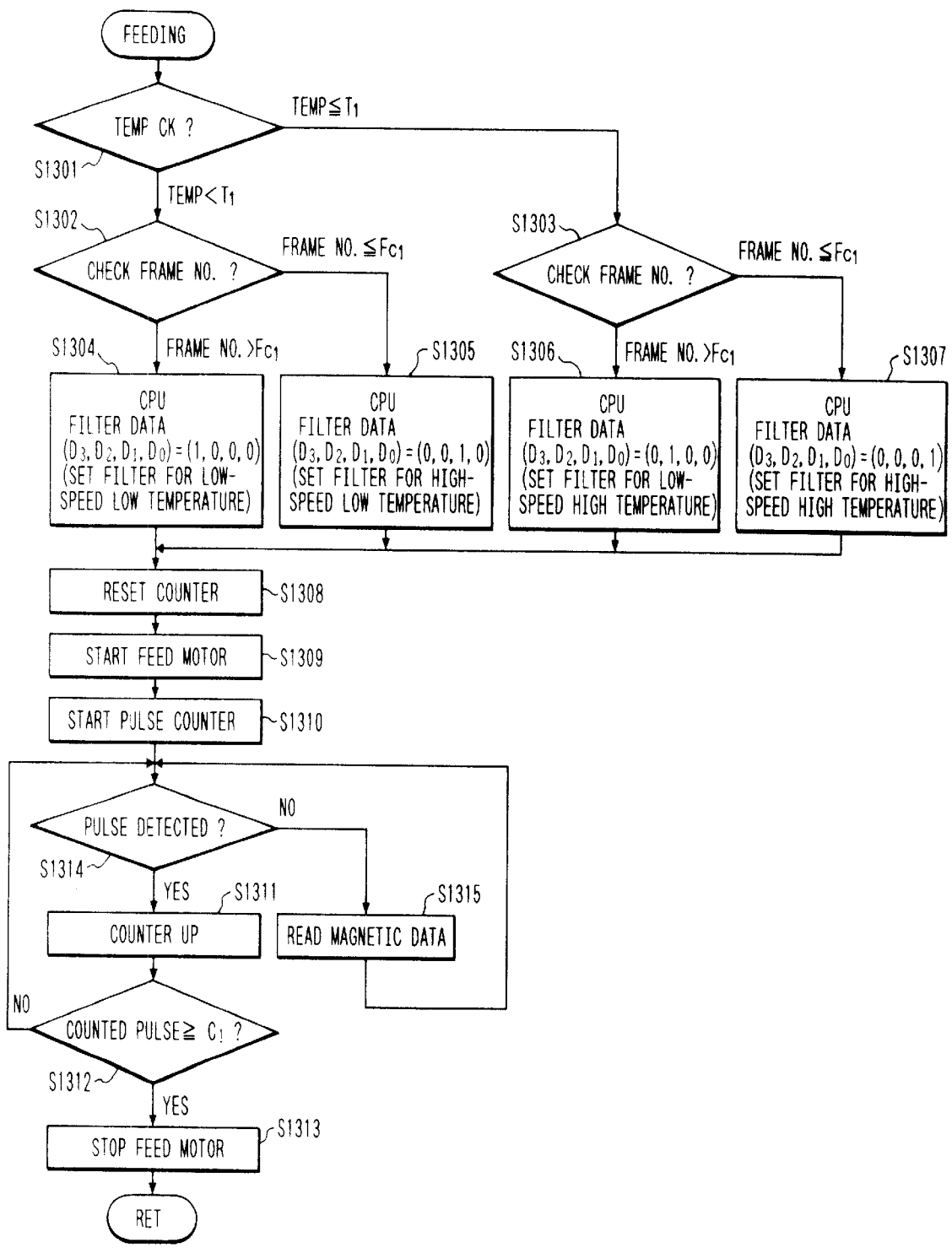
FIG. 100 is a flow chart which illustrates the detailed process (film feeding operation) shown in FIG. 99.

FIG. 100 is a flow chart which illustrates the process in S1207 (film feeding operation).

After the photographing operation has been performed, temperature data Temp (the result of the operation in step 1205) and filter time constant switching point data T1 which has been previously set are subjected to a comparison (S1302 and 1303). If (temperature data Temp<T1) and as well as (film count data>FC1), filter data (D3, D2, D1, D0)=(1, 0, 0, 0). Thus, a low temperature and low speed filter is set (S1304). If (temperature data Temp<T1) and as well as (film count data≦FC1), the filter data (D3, D2, D1, D0)=(0, 0, 1, 0). Thus, a low temperature and high speed filter is set (S13O5). If (temperature data Temp≧T1) and as well as (film count data>FC1), the filter data (D3, D2, D1, D0)=(0, 1, 0, 0). Thus, a high temperature and low speed filter is set (S1306). If (temperature data Temp≧T1) and as well as (film count data≦FC1), the filter data (D3, D2, D1, D0)=(0, 0, 1, 0). Thus, a high temperature and high speed filter is set (S1307). After the filter has been set in any one of S1304 to S1307, the counter in the CPU1 for counting the pulses generated by the photocoupler 10 is reset (S13O8) and the feeding circuit 9 is started (S1309). Furthermore, counting of the pulses generated from the photocoupler 10 by the pulse plate which is rotated when the feeding motor is rotated is commenced (S1310). A fact whether or not the pulse has been supplied from the photocoupler 10 to the CPU1 is detected (S1314). If the pulse has been supplied, the pulse count is increased (S1311). If no pulse is supplied, the magnetically recorded data about the film is detected/ amplified by the reproducing head 6 and the reproducing circuit 19. It is then converted into a digital signal by the comparator 8 before it is received by the CPU1 (S1315). Then, the flow again returns to the pulse detection process (S1314). After the pulse counting process (S1311) has been completed, a discrimination is made whether or not the pulse count is larger than a predetermined feeding stop count C1 (S1312). If the pulse count is smaller than C1, the flow again returns to the pulse counting process (S1314). If the pulse count is larger than C1, the feeding circuit 9 is stopped (S1313) and the sequential operation is completed.

As described above, the filter time constant is switched in accordance with the feeding speed which is changed due to the number of the frames and the ambient temperature. Therefore, the performance of reproducing magnetically recorded data can be improved.

Figure 101:
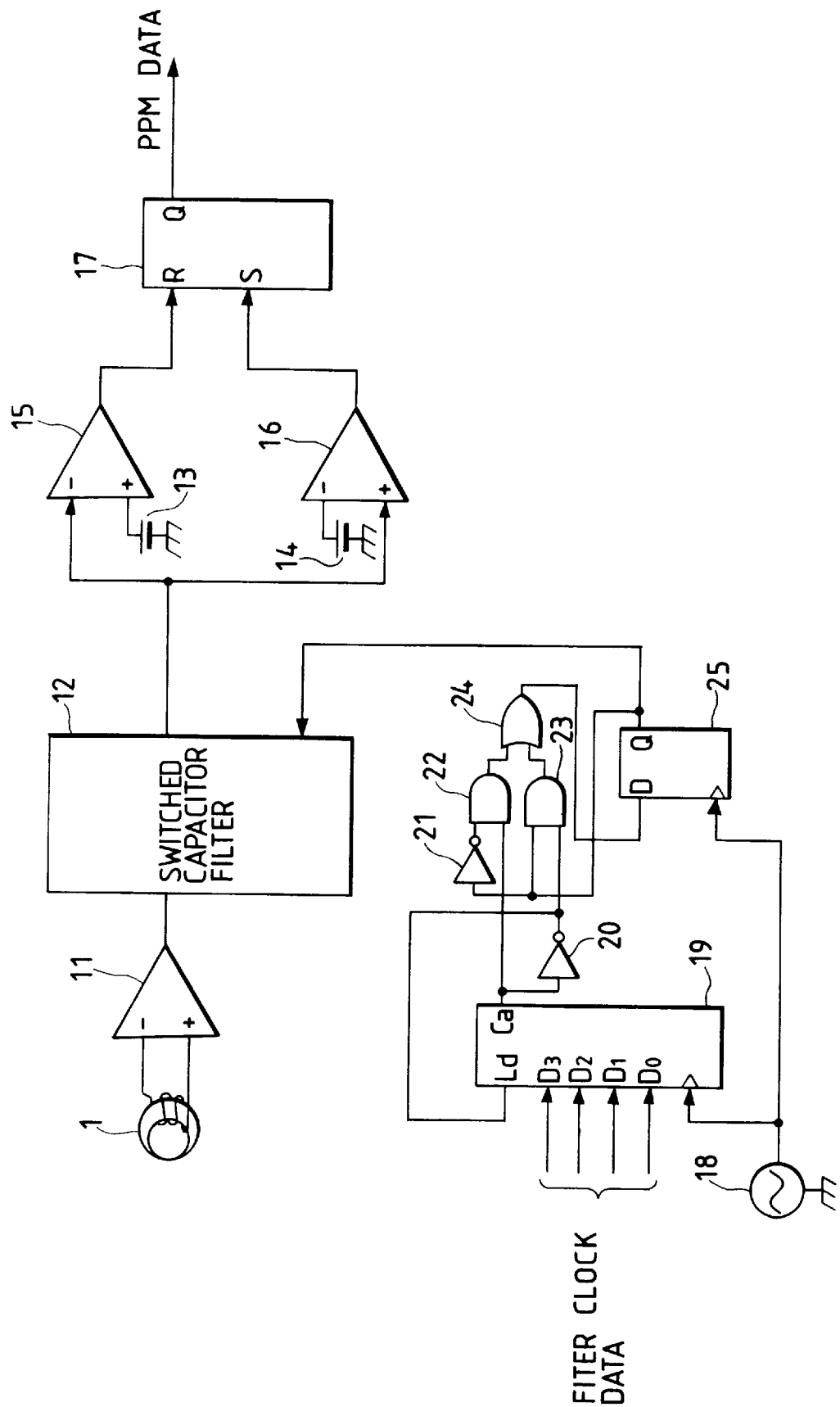
FIG. 101 is a circuit diagram which illustrates another embodiment of the data reproducing circuit according to the present invention.

FIG. 101 is a circuit diagram which illustrates another embodiment of the magnetic data reproducing circuit. Referring to FIG. 101, reference numeral 11 represents a differential amplifier (for example, AD524 manufactured by Analog Devices), 12 represents a switched capacitor filter (for example, LTC1064-3 manufactured by Linear Technology) and 13 and 14 represent referential voltage levels. Reference numerals 15 and 16 represent voltage comparison circuits (for example, LM2903 manufactured by TI). Reference numeral 17 represents an RS flip-flop (for example, SN74279 manufactured by TI) and 18 represents an oscillating circuit. Reference numeral 19 represents a counter circuit (for example, SN74163 manufactured by TI). Reference numerals 20 and 21 represent NOT circuits and 22 and 23 represent AND circuits. Reference numeral 24 represents an OR circuit and 25 represents a D-flip flop.

A magnetic signal recorded to the film is converted into a voltage signal by the magnetic head 1 before it is amplified by the differential amplifier 11. Then, it passes through the switched capacitor filter 12 so that its frequency band is limited. As a result, its signal-to-noise ratio is improved. Then, it is supplied to the voltage comparison circuits 15 and 16 such that the "1" is transmitted if the signal voltage is lower than the reference voltage 13 in the voltage comparison circuit 15. If the same is higher, "0" is transmitted. If the signal voltage is higher than the reference voltage in the voltage comparison circuit 16, "1" is transmitted. If the same is lower than the same, "0" is transmitted. Then, in the RS flip-flop circuit 17, the output Q becomes 0 when the reset signal, which is the output from the voltage comparison circuit 15, becomes 1. If the rest signal, which is the output from the voltage comparison circuit 16, becomes 1, the output Q becomes 1. The above-described outputs are supplied to the CPU 3.

The cut-off frequency of the switched capacitor filter 12 is controlled by the frequency of the filter clock fclk to be supplied as shown in FIG. 93. Therefore, the oscillated frequency from the oscillating circuit 18 is divided by clock data D0 to D3 from the CPU3. As a result, the filter clock can be controlled. By the filter clock data D0 to D3 of the CPU3, the cut-off frequency of the switched capacitor filter 12 can be controlled.

Figure 102:
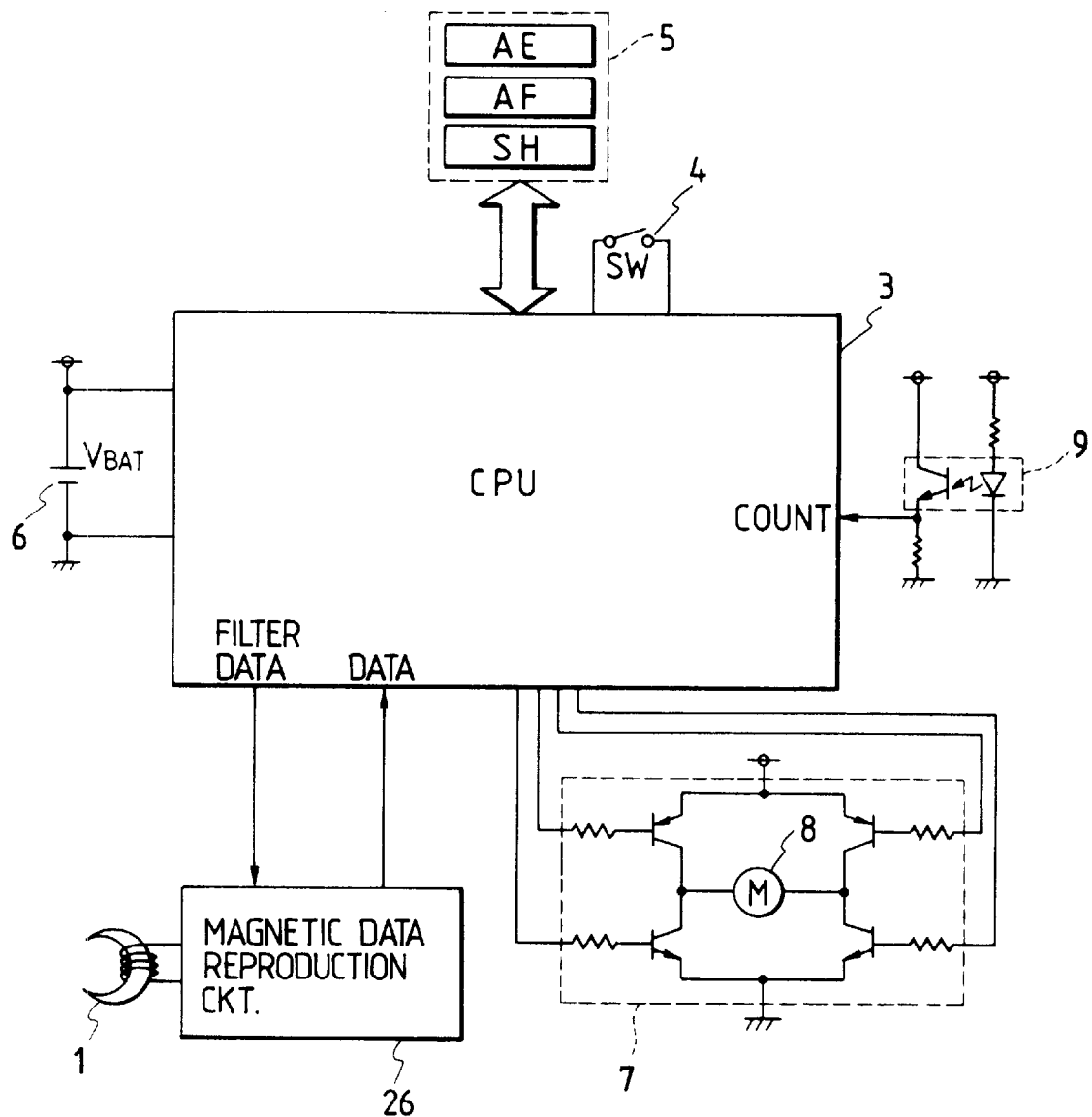
FIG. 102 is a block diagram which illustrates an electric circuit according to another embodiment of the present invention.

FIGS. 102 to 106 illustrate another embodiment of the present invention. FIG. 102 is a block diagram which illustrates an electric circuit for use in the structure according to this embodiment. The device shown in FIG. 102 is different from that shown in FIG. 96 in only that the A/D converter circuit and the one-shot/continuous shot switch are omitted from the structure. Therefore, detailed descriptions are omitted here. Reference numeral 26 represents a magnetic data reproducing circuit.

Figure 103:
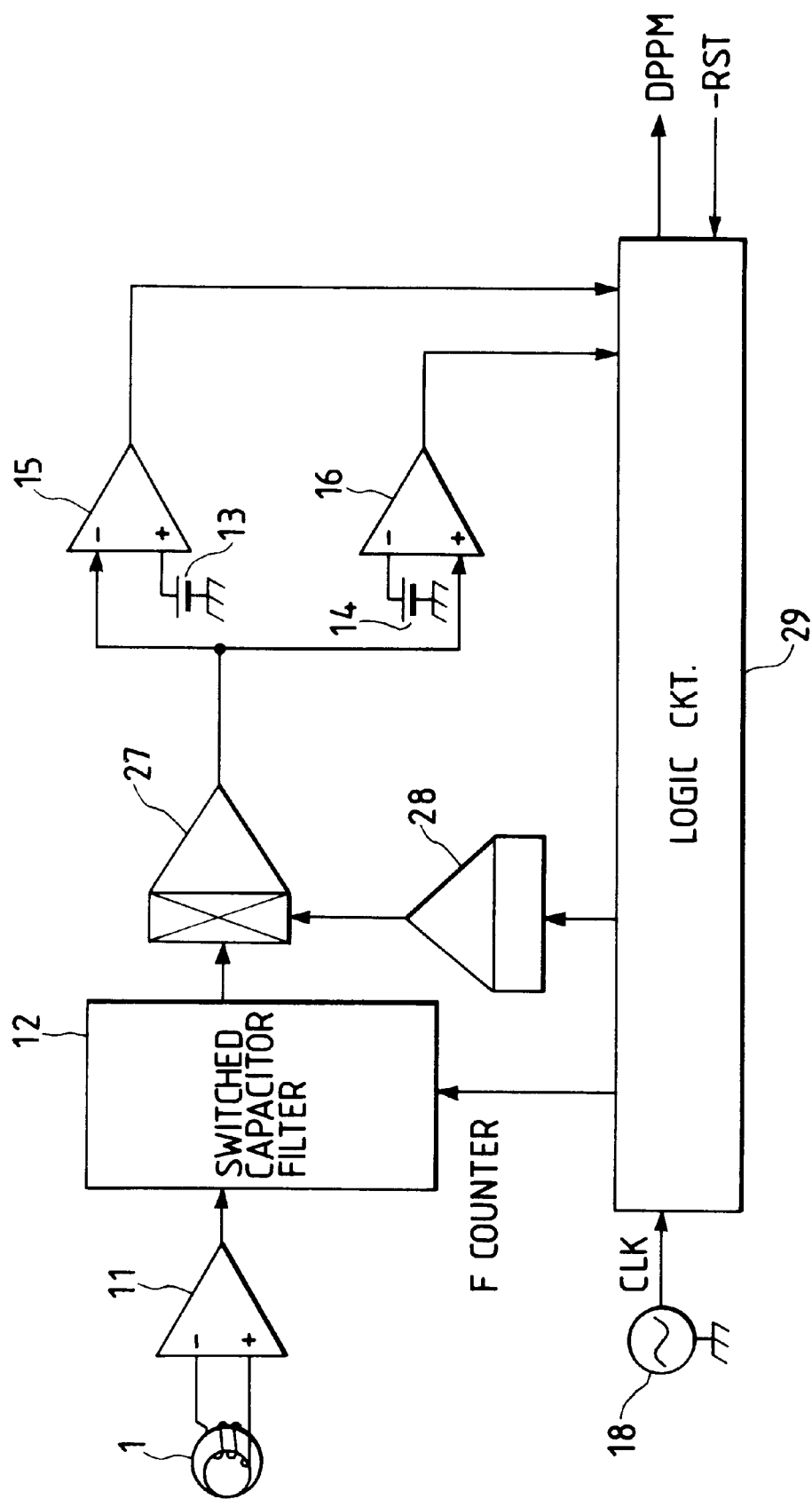
FIG. 103 illustrates the detailed structure of the magnetic data reproducing circuit 26 shown in FIG. 102.

FIG. 103 illustrates the detailed structure of the magnetic data reproducing circuit 26 shown in FIG. 102. Reference numeral 27 represents a multiplying circuit (for example, AD534 manufactured by Analog Devices), 28 represents a D/A converter and 29 represents a logic circuit.

Figure 104:
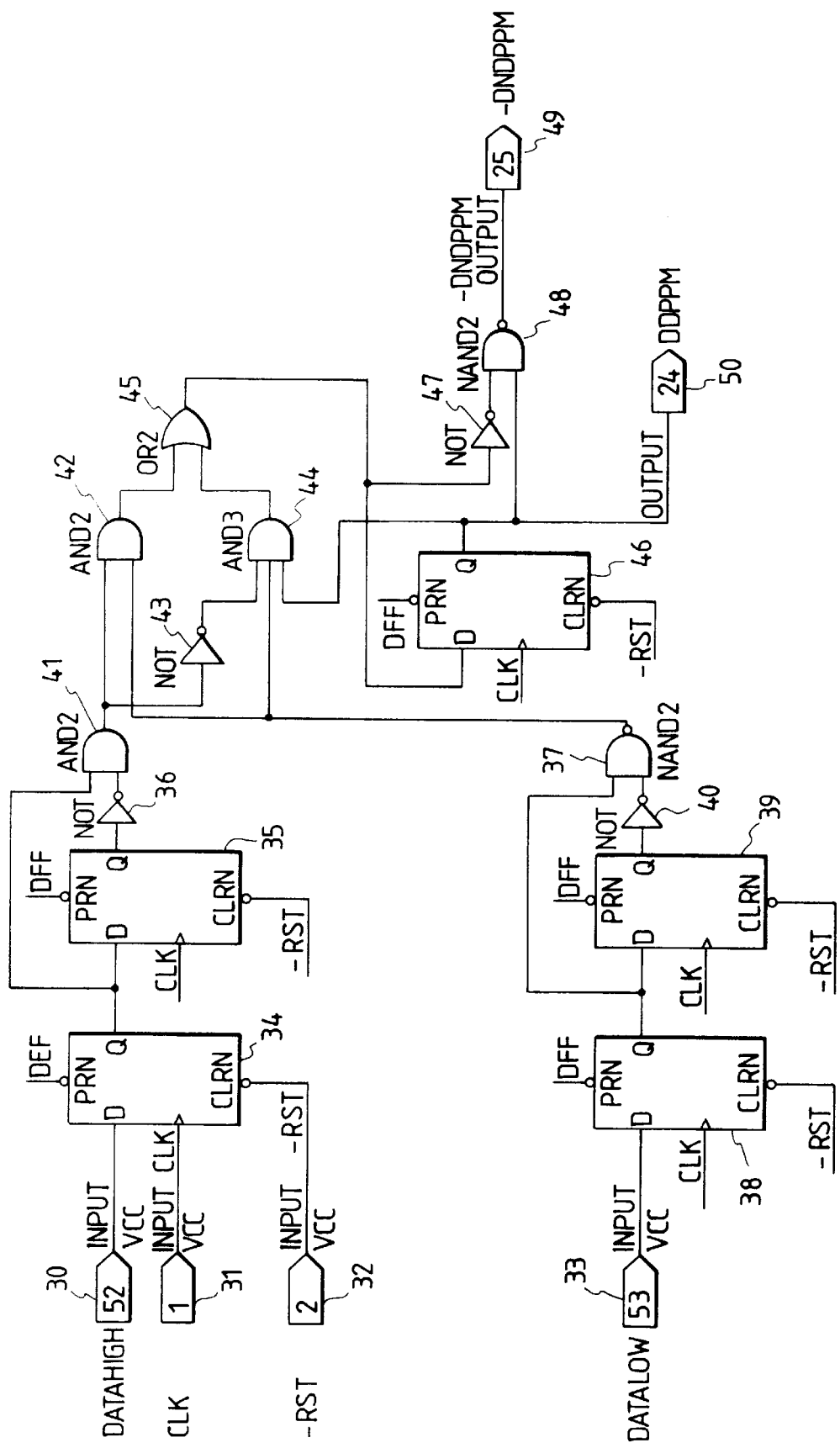
FIG. 104 illustrates the detailed structure of a logic circuit 29 shown in FIG. 103.
Figure 105:
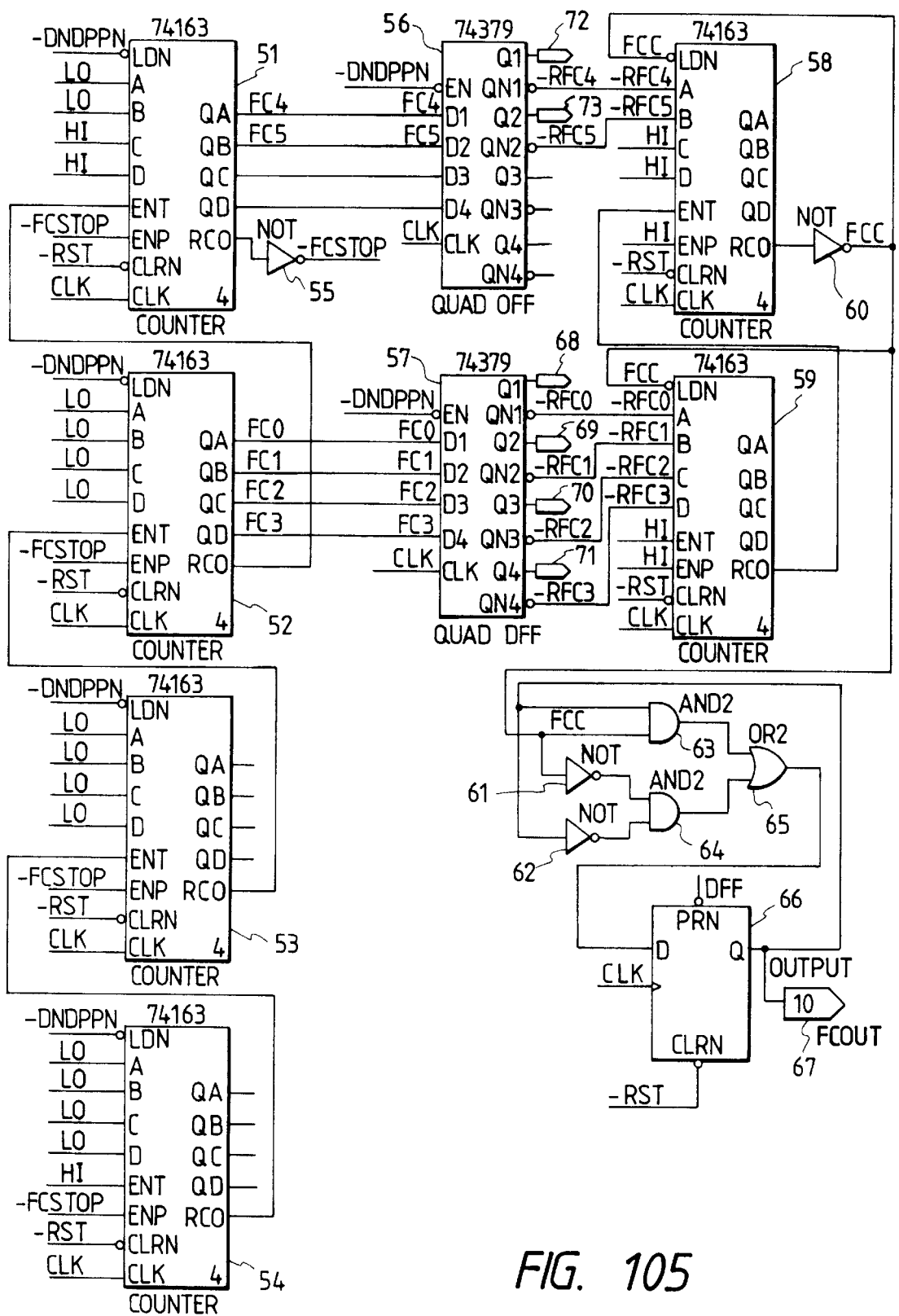
FIG. 105 illustrates the detailed structure of the logic circuit 29 shown in FIG. 103.

FIGS. 104 and 105 represent the detailed structure of the logic circuit 29. Referring to FIGS. 104 and 105, reference numerals 30, 31, 32 and 33 represent input terminals, 34, 35, 38, 39, 46 and 66 represent D-flip flops, 36, 40, 43, 47, 55, 60, 61 and 62 represent NOT circuits, 37 and 48 represent NAND circuits, 41, 42, 44, 63 and 64 represent AND circuits, 45 and 65 represent OR circuits, 49, 50, 67, 68, 69, 70, 71, 72 and 73 represent output terminals, 51, 52, 53, 54, 58 and 59 represent 4-bit counters (for example, SN74163 manufactured by TI) and 56 and 57 represent 4-bit latches (for example, SN74379 manufactured by TI).

Figure 108:
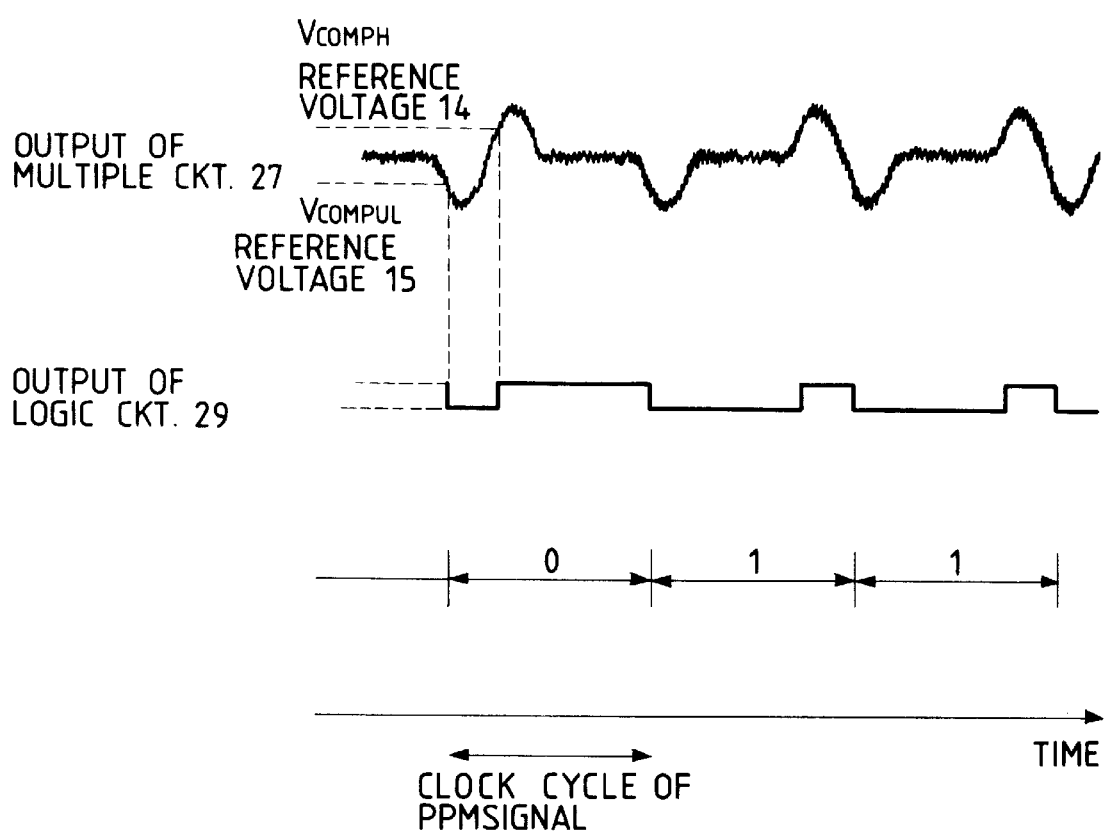
FIG. 108 illustrates a PPM signal.

According to this embodiment, the period of the clock signal of the pulse position signal shown in FIG. 108 are measured by 14-bit counters comprising the 4-bit counters 51, 52, 53 and 54. Then, a filter clock signal which corresponds to the period of the clock signal of the PPM signal is transmitted to control the switched capacitor filter 12 to the frequency range which is suitable to the pulse position signal. Simultaneously, a control is performed such that the amplitude of the PPM signal is made to be constant by the D/A converter 28 and the multiplying circuit 27.

Then, the structure will now be described in detail.

Referring to FIG. 103, the output signal from the magnetic head 1 is amplified by the differential amplifier 11 before it is supplied to the switched capacitor filter 12. The switched capacitor filter 12 receives the filter clock from the logic circuit 29 in accordance with the period of the clock signal of the PPM signal. The output from the switched capacitor filter 12 is supplied to the multiplying circuit 27. Another input to the multiplying circuit 27 is supplied from the D/A converter 28. Therefore, the output from the D/A converter 28 is controlled by the PPM clock latch signal supplied from the logic circuit 29. Furthermore, the amplitude of the output from the multiplying circuit 27 is controlled in such a manner that the amplitude of the PPM signal becomes constant in accordance with the period of the clock signal of the PPM signal. The outputs from the multiplying circuit 27 are supplied to the two voltage comparison circuits 15 and 16. The voltage comparison circuit 15 transmits 1 when the level of the PPM signal is lower than the level of the reference voltage 13. If the same is higher than the reference voltage 13, 0 is transmitted.

The voltage comparison circuit 16 transmits 1 when the level of the PPM signal is higher than the level of the reference voltage 14. If the same is higher than the reference voltage 14, 0 is transmitted.

The logic circuit 29 causes the output from the voltage comparison circuit 16 to be supplied to the input terminal 30. Furthermore, the output from the voltage comparison circuit 15 is supplied to the input terminal 33. In addition, the output from the oscillating circuit 18 is supplied to the input terminal 31. As shown in FIG. 104, the input signals are not simultaneously supplied to the input terminals 30 and 33.

Referring to FIG. 104, the output from the voltage comparison circuit 16 is changed from 0 to 1, that is, the input terminal 30 is changed from 0 to 1, 1 is transmitted to the output terminal 50 after 2 system clocks. When the input terminal 33 is changed from 0 to 1, 0 is transmitted to the output terminal 50 after its system clock. Simultaneously, 0 is transmitted to the output terminal 49 during one system clock. Thus, signal-DNDPPM signal is transmitted at every clock of the PPM signal.

The 14-bit counter comprising the 4-bit counters 51, 52, 53 and 54 loads input data when the –DNDPPM signal becomes 0. The input data is expressed as C000H in the form of the hexadecimal number. Assuming that the oscillated frequency of the oscillating circuit 18 is 8 MHz, the Carry output from the 4-bit counter 51 becomes 1 after 2.048 mS from the commencement of the counting operation. The 6-bit latch comprising the 4-bit latches 56 and 57 latches upper 6 bits of the 14-bit counter when the -DNDPPM signal becomes 0.

The upper 6 bits of the 14-bit counter is transmitted to the output terminals 68, 69, 70, 71, 72 and 73 at the clock frequency of the PPM signal. That is, the clock frequency of the PPM signal is counted by 6 bits. The output terminals 68, 69, 70, 71, 72 and 73 are transmitted to the D/A converter 28 to change the degree of amplification of the multiplying circuit 27 in accordance with the frequency of the clock for the PPM signal.

The 6-bit counter comprising the 4-bit counters 58 and 59 loads the negative output of 6-bit latch whenever it transmits the carry signal after the count has been increased. Therefore, the period in which the carry signal is transmitted is changed in accordance with the clock period of the PPM signal.

The output from the D-flip flop 66 is inverted whenever the carry signal from the 4-bit counter 58 becomes 1. The above-described output is transmitted to the switched capacitor filter 12 as the filter clock.

According to this embodiment, it is arranged such that the clock period of PPM signal/filter clock period=128.

Figure 106:
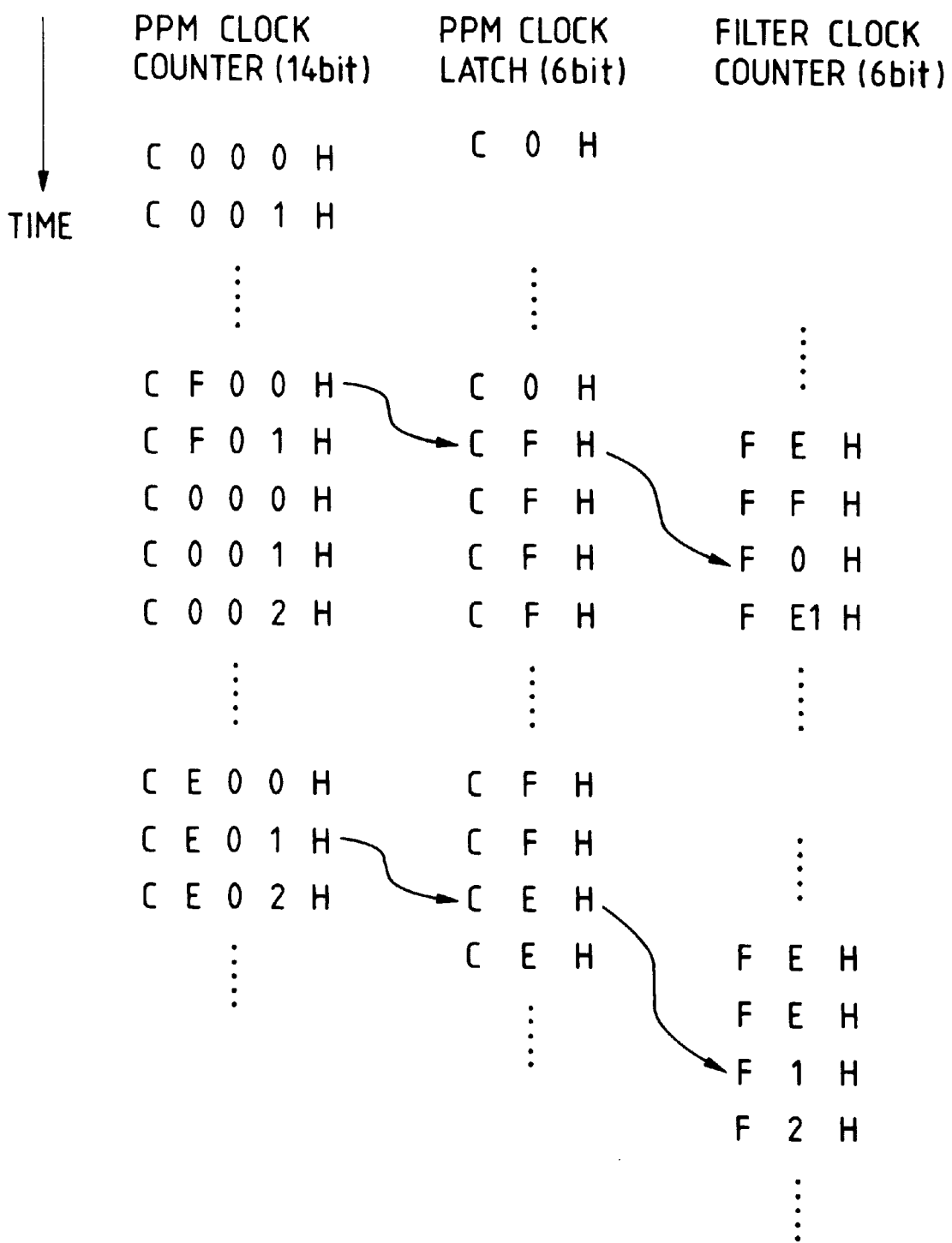
FIG. 106 illustrates the operation of the logic circuit shown in FIG. 103.

The relationship between the counters and the latches is shown in FIG. 106. When the –DNDPPM signal becomes 0 in a state where the PPM clock counter is CF00H, CFH is latched in the PPM clock latch. Then, when the filter clock counter makes the Carry signal to be 1 after plural system clocks and the negative output from the PPM clock latch is loaded, F0H is loaded and the counting is continued. Then, F0H is loaded whenever the Carry signal becomes 1. When the -DNDPPM signal becomes 0 in a state where the PPM clock counter is CE00H, CEH is latched in the PPM clock latch. Therefore, the filter clock counter loads F1H whenever the Carry signal becomes 1.

Figure 107A:
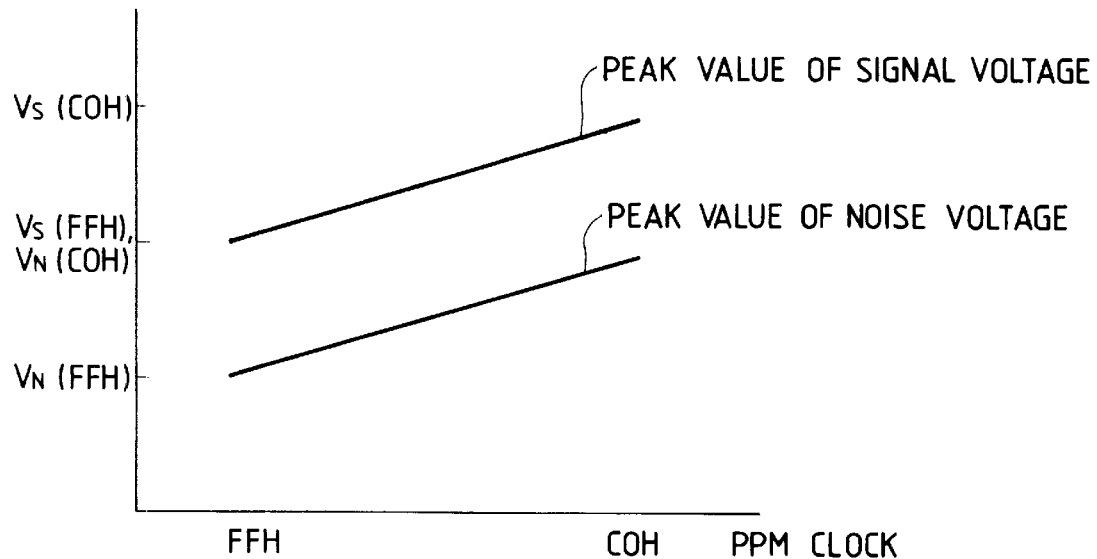
FIGS. 107A and 107B illustrate the operation of multiplying circuit and that of the D/A converter shown in FIG. 103.

FIG. 107A illustrates the relationship between the output voltage of the switched capacitor filter 12 and the clock period of the PPM signal. The amplitude of the signal from the magnetic head 1 is in proportion to the film feeding speed. Furthermore, since the filter clock of the switched capacitor filter 12 is changed by the logic circuit 29, the noise voltage is also in proportion to the clock period.

Figure 107B:
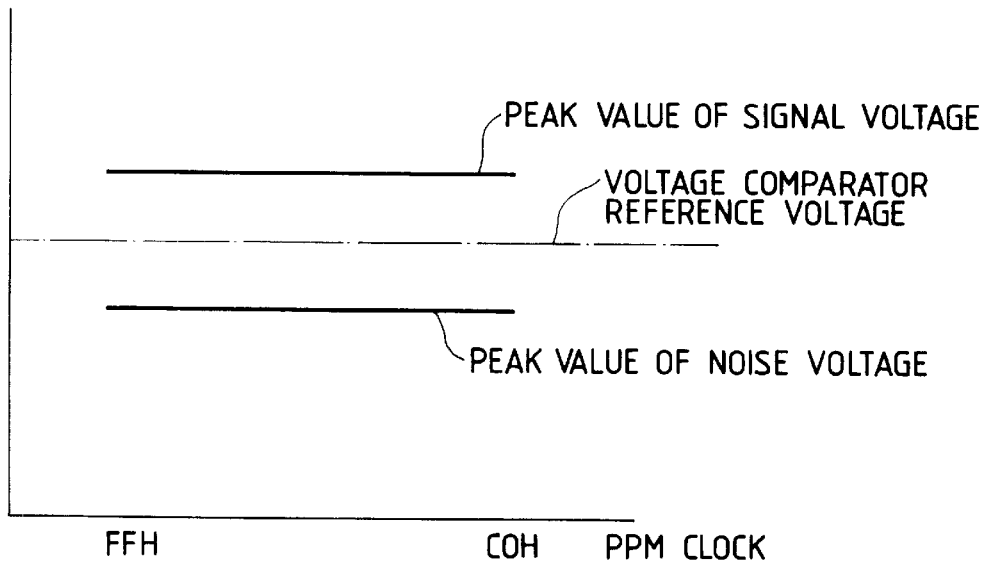

When the output level from the D/A converter is set such that the output from the multiplying circuit 27 becomes constant at FFH and C0H, the amplitude of the output from the multiplying circuit 27 becomes constant as shown in FIG. 107B regardless of the clock period of the PPM signal. Therefore, even if the reference voltage for the voltage comparison circuit is made to be constant, magnetic data information can be reproduced accurately regardless of the clock period of the PPM signal.

Figure 109:
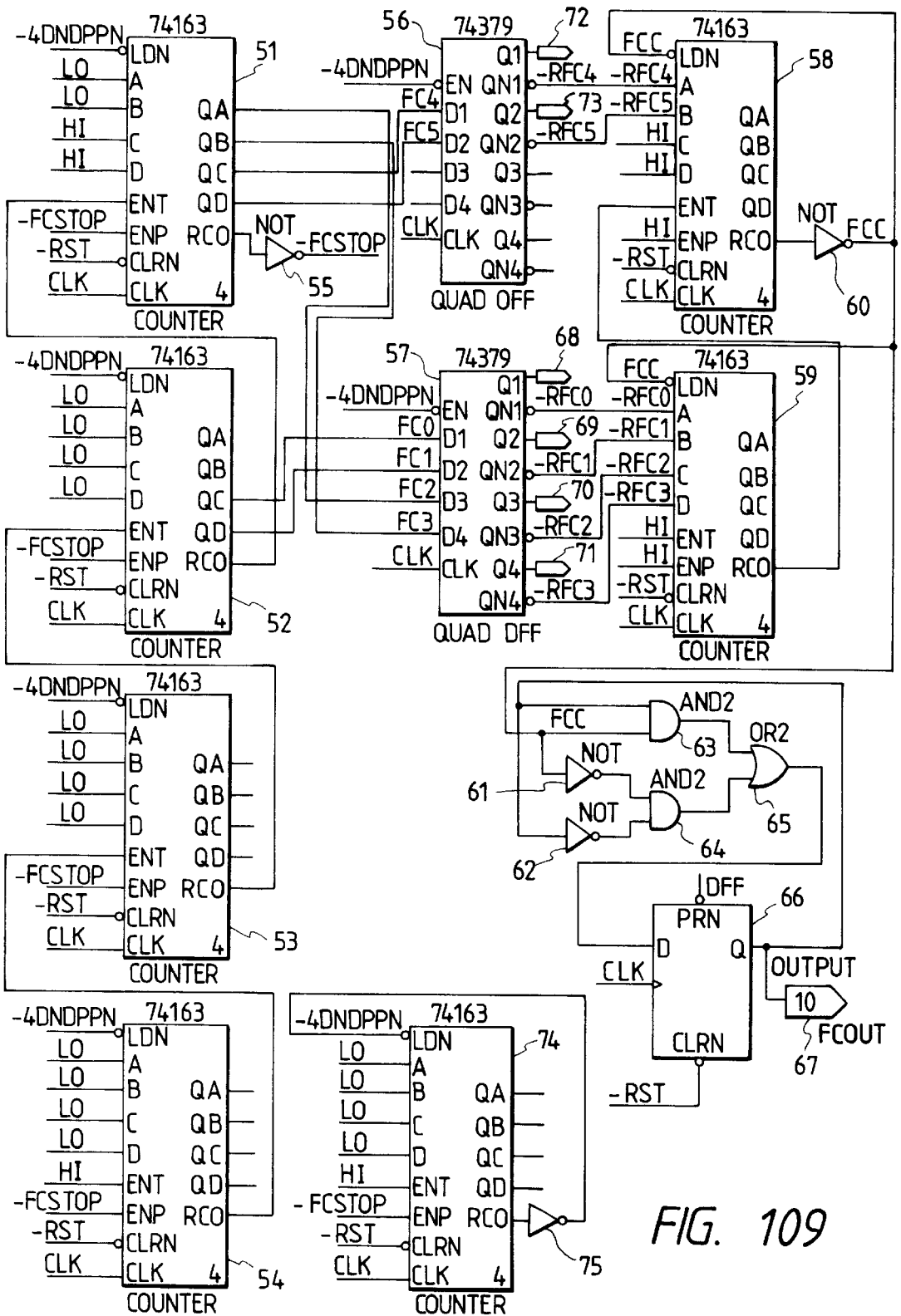
FIG. 109 illustrates the detailed structure of the logic circuit according to another embodiment of the present invention.

FIG. 109 illustrates the detailed structure of another embodiment of the logic circuit and a state which corresponds to FIG. 105. Referring to FIG. 109, the 16-bit PPM clock counter is constituted by 4-bit counters 51, 52, 53 and 54. Therefore, the clock period of the PPM signal can be counted by a degree of 2 bits (four times) longer than that according to the structure shown in FIG. 105. Furthermore, a 4-bit counter 74 for counting 2-bit is provided, a –4 DNDPPM signal is made to be 0 one time when the –DNDPPM signal becomes 0 four times. Therefore, the PPM clock counter of 16 bits counts the period for four times of the clock of the PPM signal. Furthermore, the PPM clock latch latches the period of four times of the clocks of the PPM signal as 6 bits.

As a result, the filter clock period can be generated on the bias of the average period of four times of the PPM signal in comparison to the first embodiment. For example, the filter clock can be stably generated even if there is an excessive jitter at the time of feeding the film.

Figure 110:
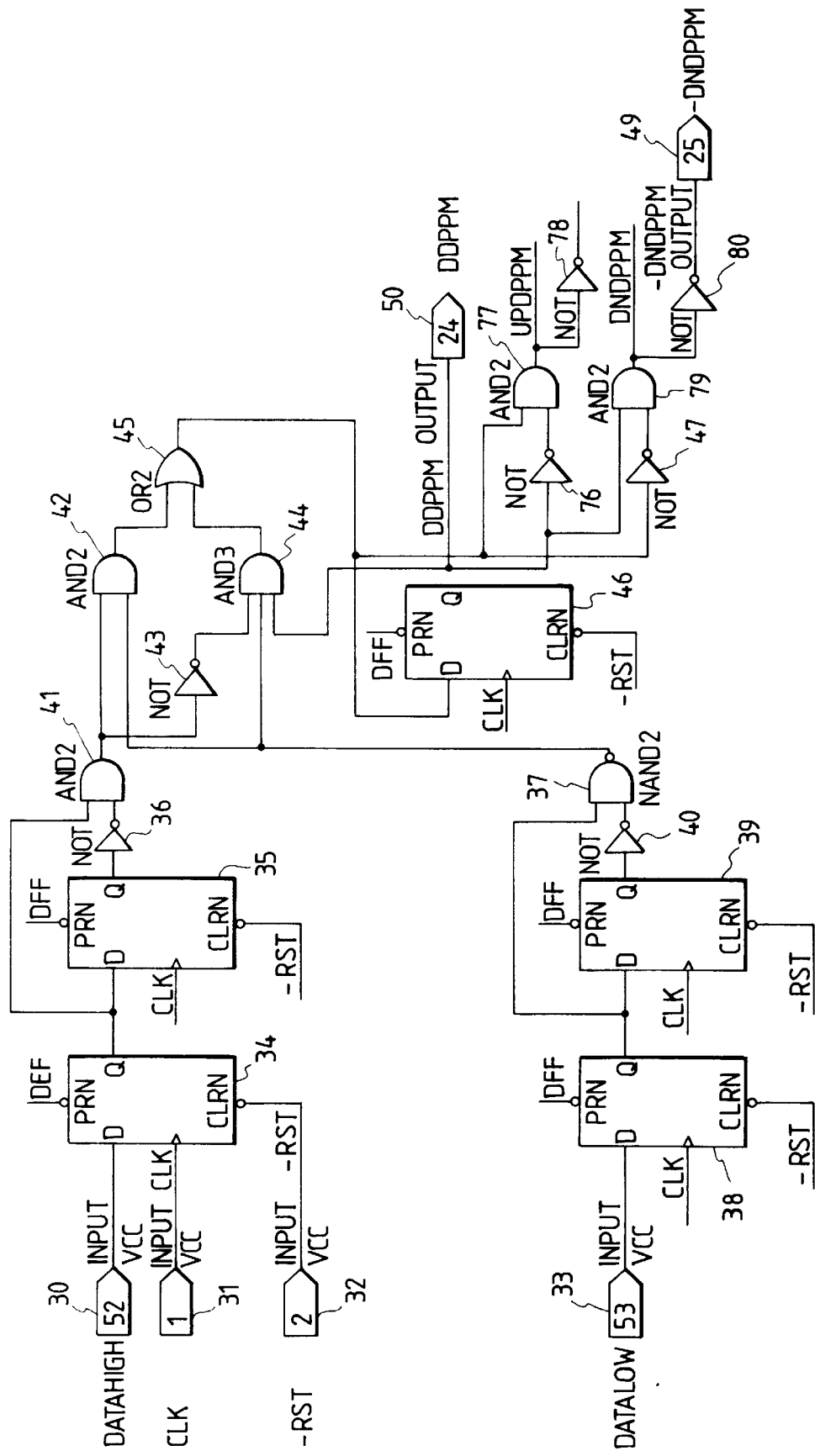
FIG. 110 illustrates the detailed structure of the logic circuit according to another embodiment of the present invention.
Figure 111:
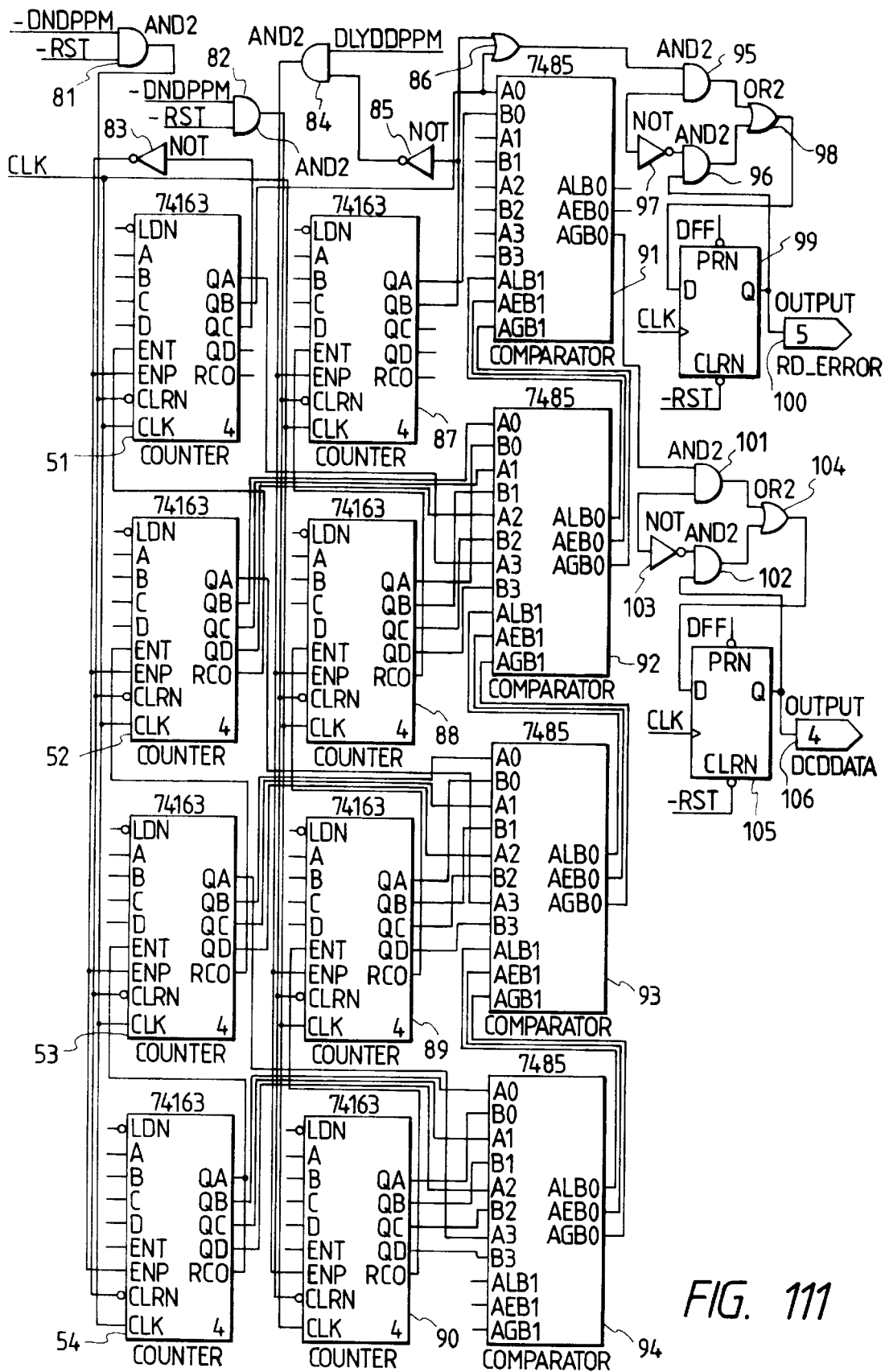
FIG. 111 illustrates the detailed structure of the logic circuit according to another embodiment of the present invention.

FIGS. 110 and 111 illustrate another embodiment of the present invention in which a circuit is arranged in such a manner that the count made by the 4-bit counters 51, 52, 53 and 54 shown in FIG. 105 are used to modulate the pulse position modulating signal (PPM signal).

Referring to FIGS. 110 and 111, elements added to the circuit shown in FIGS. 104 and 105 will now be described. Referring to FIG. 110, reference numerals 76, 78 and 80 represent NOT circuits and 77 and 79 represent AND circuits. As a result of the addition of these circuits, 1 is generated in output UPDPPM from the AND circuit 77 during one system clock at the time of first transition of the PPM signal, that is when the data signal in the PPM signal is generated. Furthermore, 0 is simultaneously generated in output –UPDPPM of the NOT circuit 78.

Referring to FIG. 111, reference numerals 81, 82, 84, 95, 96, 101 and 102 represent AND circuits, 83, 85, 97 and 103 represent NOT circuits, 86, 98 and 104 represent OR circuits and 87, 88, 89 and 90 represent 4-bit counters (for example, SN74104 manufactured by TI). Reference numerals 91, 92, 93, 94 represent 4-bit comparators (for example, SN7485 manufactured by TI). Reference numerals 99 and 105 represent D-flip flops and 100 and 106 represent output terminals.

The 4-bit counters 51 to 54 constitute a 14-bit counter and it is cleared by –DNDPPM which generates 0 at the last transition of the PPM signal (that is, it is generated at the clock signal of the PPM signal). Then, counting is increased. Thus, the 14-bit counter counts the period of the PPM signal.

The 4-bit counters 87 to 90 constitute a 13-bit counter and is cleared by –UPDPPM which generates 0 at the first transition of the PPM signal (that is, it is generated at the data signal of the PPM signal). When the PPM signal is 0 (where DDPPM approximates 0), the 13-bit counter stops its counting operation. In another case, that is, when the PPM signal is 1 (where DDPPM approximates 1), the 13-bit counter increases its count. Therefore, the 13-bit counter counts the data signal of the PPM signal to the clock signal. The 4-bit comparators 91 to 94 subject the output from the above-described counters to comparisons. The output from the 14-bit counter is subjected to the comparison by eliminating the lowermost bit. As a result, the digit of the 14-bit counter is halved. The 4-bit comparators 91 to 94 are sequentially connected to constitute a 13-bit comparator. The output AGBO from the 4-bit comparator 91 is 1 in a case where its input A (the output from the 14-bit counter) is larger than input B (the output from the 13-bit counter).

The latch circuit constituted by the AND circuits 101 and 102, the NOT circuit 103, the OR circuit 104 and the D-flip flop 105 latches the output from a 11-bit comparator at the last transition of the PPM signal (during one system clock in which DNPPM=1) so as to transmit it to the output terminal 106. A latch circuit constituted by the AND circuits 95, 96, the NOT circuit 97, the OR circuit 98 and the D-flip flop circuit 99 generates an error signal when either of the 14-bit counter or the 13-bit counter encounters an overflow.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A camera having a reproducing circuit for reading information from an information recording portion formed in a frame of a film at the time of feeding the film to reproduce said information, said camera having a reproducing circuit comprising:

(a) a head portion for reading information in said information recording portion and outputting an information signal;

(b) an amplifying circuit for amplifying the information signal output by said head portion;

(c) film frame counter means for generating information in accordance with a number of exposed frames of the film; and (d) a gain adjusting circuit for adjusting the gain of said amplifying circuit in accordance with the information generated by said film frame counter means.

2. A camera according to claim 1, wherein said gain adjusting circuit sets the gain higher when a number of exposed frames is small than a gain when a number of exposed frames is large on the basis of information from said film frame counter means.

3. A camera having a reproducing circuit for reading information from an information recording portion formed in a frame of a film at the time of feeding the film to reproduce the information, said camera having a reproducing circuit comprising:

(a) a head portion for reading information in said information recording portion and outputting an information signal;

(b) an amplifying circuit for amplifying the information signal output by said head portion;

(c) a winding member for winding said film;

(d) detection means for detecting a diameter of said film wound by said winding member; and (e) a gain adjusting circuit for adjusting the gain of said amplifying circuit in accordance with the diameter of the wound film detected by said detection means.

4. A camera according to claim 3, wherein said gain adjusting circuit sets the gain higher when the diameter of the wound film detected by said detection means is small than a gain when the diameter of the wound film is large.

5. A camera having a reproducing circuit for reading information from an information recording portion formed in a frame of a film at the time of feeding the film to reproduce the information, said camera having a reproducing circuit comprising:

(a) a head portion for reading information in said information recording portion and outputting an information signal;

(b) an amplifying circuit for amplifying the information signal output by said head portion;

(c) feeding speed detection means for detecting a feeding speed of the film; and (d) a gain adjusting circuit for adjusting a gain of said amplifying circuit in accordance with the feeding speed of the film detected by said feeding speed detection means, wherein said gain adjusting circuit sets a present gain of said amplifying circuit in accordance with the feeding speed of the film of a previous frame detected by said feeding speed detection means.

6. A camera according to claim 5, wherein said feeding speed detection means detects the feeding speed of the film on the basis of information read by said head portion.

7. A camera having a reproducing circuit for reading information from an information recording portion formed in a frame of a film at the time of feeding the film to reproduce the information, said camera having a reproducing circuit comprising:

(a) a head portion for reading information in said information recording portion and outputting an information signal;

(b) feeding speed detection means for detecting a feeding speed of the film; and (c) an adjusting circuit for adjusting reproducing characteristics of said reproducing circuit in accordance with the feeding speed of the film detected by said feeding speed detection means, wherein said adjusting circuit sets a present adjusting value of said reproducing circuit in accordance with the feeding speed of the film of a previous frame detected by said feeding speed detection means.

* * * * *

UNITED STATES PATENT AND TRADEMARK OFFICE
CERTIFICATE OF CORRECTION

PATENT NO.    : 6,049,677
DATED         : April 11, 2000
INVENTOR(S)   : Toshiharu Ueda et al.

It is certified that error appears in the above-identified patent and that said Letters Patent is hereby corrected as shown below:

Column 2,
Line 28, "be appear" should read -- appear --.

Column 3,
Line 24, "is perspective" should read -- is a perspective --.

Column 5,
Line 35, "is block" should read -- is a block --.
Line 45, "anther" should read -- another --.

Column 15,
Line 40, "corresponds o" should read -- corresponds to --.
Line 66, "illustrates is" should read -- is --.

Column 16,
Line 42, "Vref32-ato" should read -- Vref32-a to --.

Column 18,
Line 51, "mate." should read -- mated. --.

Column 20,
Line 44, "pule plate 8" should read -- pulse plate 8 --.

Column 21,
Line 51, "of m)" should read -- of m. --.

Column 23,
Line 39, "to rotate to rotate" should read -- to rotate --.

Column 24,
Line 13, "and and" should read -- and --.

Column 25,
Line 50, "FIG. 24" should read -- FIG. 24, --.
Line 51, "is" should be deleted.
Line 62, "is is" should read -- is --.

UNITED STATES PATENT AND TRADEMARK OFFICE
CERTIFICATE OF CORRECTION

PATENT NO.    : 6,049,677
DATED         : April 11, 2000
INVENTOR(S)   : Toshiharu Ueda et al.

It is certified that error appears in the above-identified patent and that said Letters Patent is hereby corrected as shown below:

Column 28,
Line 43, "the all" should read -- all --.

Column 31,
Line 55, "amplifier" should be deleted.

Column 34,
Line 16, "photointerupter" should read -- photointerrupter --.

Column 35,
Line 37, "film )" should read -- film) --.

Column 36,
Line 27, "Portion" should read -- portion --.

Column 37,
Line 12, "stablized," should read -- stabilized, --.

Column 39,
Line 48, "illustration.)." should read -- illustration). --.

Column 43,
Line 60, "to an" should read -- to a --.
Line 66, "completeed" should read -- completed --.

Column 45,
Line 42, "to an" should read -- to a --.
Line 47, "completeed" should read -- completed --.
Line 66, "to" (1$^{st}$ occurrence) should be deleted.

Column 55,
Line 31, "pin 30" should read -- in 310 --.

UNITED STATES PATENT AND TRADEMARK OFFICE
CERTIFICATE OF CORRECTION

PATENT NO. : 6,049,677
DATED : April 11, 2000
INVENTOR(S) : Toshiharu Ueda et al.

It is certified that error appears in the above-identified patent and that said Letters Patent is hereby corrected as shown below:

Column 59,
Line 41, "R3'and" should read -- R3' and --, and "R3'" ($2^{nd}$ occurrence) should read -- C3' --.
Line 51, "f4=1/{2π(R1'+R2)(C1'+C2)}" should read -- f4=1/{2π(R1'+R2')(C1'+C2')} --.

Column 62,
Line 64, "1transmitted" should read -- transmitted --.

Column 67,
Line 34, "signal-DNDPPM" should read -- signal -DNDPPM --.

Signed and Sealed this

Nineteenth Day of August, 2003

JAMES E. ROGAN
*Director of the United States Patent and Trademark Office*